(12) United States Patent
Casuscelli et al.

(10) Patent No.: US 12,521,395 B2
(45) Date of Patent: Jan. 13, 2026

(54) GEM-DISUBSTITUTED HETEROCYCLIC COMPOUNDS AND THEIR USE AS IDH INHIBITORS

(71) Applicant: NERVIANO MEDICAL SCIENCES S.R.L., Nerviano (IT)

(72) Inventors: Francesco Casuscelli, Dairago Milan (IT); Teresa Disingrini, Vanzago Milan (IT); Paola Magnaghi, Nerviano Milan (IT); Stefano Nuvoloni, Milan (IT); Paolo Orsini, Legnano (IT)

(73) Assignee: NERVIANO MEDICAL SCIENCES S.R.L., Nerviano (IT)

( * ) Notice: Subject to any disclaimer, the term of this patent is extended or adjusted under 35 U.S.C. 154(b) by 785 days.

(21) Appl. No.: 17/775,124

(22) PCT Filed: Oct. 29, 2020

(86) PCT No.: PCT/EP2020/080361
§ 371 (c)(1),
(2) Date: May 6, 2022

(87) PCT Pub. No.: WO2021/089395
PCT Pub. Date: May 14, 2021

(65) Prior Publication Data
US 2023/0000871 A1 Jan. 5, 2023

(30) Foreign Application Priority Data
Nov. 8, 2019 (EP) .................................. 19208128

(51) Int. Cl.
| | |
|---|---|
| A61K 31/519 | (2006.01) |
| A61K 31/4375 | (2006.01) |
| A61K 31/496 | (2006.01) |
| A61K 31/5365 | (2006.01) |
| A61K 45/06 | (2006.01) |
| C07D 471/04 | (2006.01) |
| C07D 498/04 | (2006.01) |

(52) U.S. Cl.
CPC ........ *A61K 31/519* (2013.01); *A61K 31/4375* (2013.01); *A61K 31/496* (2013.01); *A61K 31/5365* (2013.01); *A61K 45/06* (2013.01); *C07D 471/04* (2013.01); *C07D 498/04* (2013.01); *C07B 2200/05* (2013.01)

(58) Field of Classification Search
CPC .................................................. A61K 31/519
USPC ....................................................... 514/210
See application file for complete search history.

(56) References Cited

U.S. PATENT DOCUMENTS

2021/0206759 A1\* 7/2021 Casale ................. C07D 471/04

FOREIGN PATENT DOCUMENTS

| WO | 1998033798 A2 | 8/1998 |
|---|---|---|
| WO | 2005047284 A1 | 5/2005 |
| WO | 2007044813 A1 | 4/2007 |
| WO | 2008021389 A2 | 2/2008 |
| WO | 2008034008 A2 | 3/2008 |
| WO | 2016171755 A1 | 10/2016 |
| WO | 2017019429 A1 | 2/2017 |
| WO | 2018/111707 A1 | 6/2018 |
| WO | 2019224096 A1 | 11/2019 |

OTHER PUBLICATIONS

Martínez-Teipel et al., 2-Methoxy-6-oxo-1,4,5,6-tetrahydropyridine-3-carbonitriles: Versatile Starting Materials for the Synthesis of Libraries with Diverse Heterocyclic Scaffolds, Journal of Combinatorial Chemistry, 2005, vol. 7(3), pp. 436-448 (Year: 2005).\*
Amary M.F. et al., "IDH1 and IDH2 Mutations are Frequent Events in Central Chondrosarcoma and Central and Periosteal Chondromas But Not in Other Mesenchymal Tumours", Journal of Pathology 224:334-343 (May 2011).
Balass J. et al., "Enzymatic Assay for Quantitative Analysis of (D)-2-Hydroxyglutarate", Acta Neuropathol 124:883-891 (2012).
Borger D.R. et al., "Frequent Mutation of Isocitrate Dehydrogenase (IDH) 1 and IDH2 in Cholangiocarcinoma Identified Through Broad-Based Tumor Genotyping", The Oncologist 17(1):72-79 (2012).
Cairns R.A. et al., "IDH2 Mutations are Frequent in Angioimmunoblastic T-Cell Lymphoma", Blood 119 (8):1901-1903 (Feb. 23, 2012).
Calvert A.E. et al., "Cancer-Associated IDH1 Promotes Growth and Resistance to Targeted Therapies in the Absence of Mutation", Cell Reports 19:1858-1873 (May 30, 2017).
Cerami E. et al., "The cBio Cancer Genomics Portal: An Open Platform for Exploring Multidimensional Cancer Genomics Data", Cancer Discov. 2(5):401-404 (May 2012).
Dang L. et al., "Cancer-Associated IDH1 Mutations Produce 2-Hydroxyglutarate", Nature 462:739-744 (2009).
Gross S. et al., "Cancer-Associated Metabolite 2-Hydroxyglutarate Accumulates in Acute Myelogenous Leukemia With Isocitrate Dehydrogenase 1 and 2 Mutations", J. Exp. Med. 207(2):339-344 (Feb. 15, 2010).
Marcucci G. et al., "IDH1 and IDH2 Gene Mutations Identify Novel Molecular Subsets Within De Novo Cytogenetically Normal Acute Myeloid Leukemia: A Cancer and Leukemia Group B Study", Journal of Clinical Oncology 28(14):2348-2355 (May 10, 2010).
Mardis E.R. et al., "Recurring Mutations Found by Sequencing an Acute Myeloid Leukemia Genome", N Engl J Med 361(111):1058-1066 (Sep. 10, 2009).

(Continued)

Primary Examiner — Jeffrey H Murray
Assistant Examiner — Rilla Marie Samsell
(74) Attorney, Agent, or Firm — Scully, Scott, Murphy & Presser, P.C.

(57) ABSTRACT

The present invention relates to certain gem-disubstituted heterocyclic compounds, which modulate the activity of Isocitrate Dehydrogenase (IDH). The compounds of this invention are therefore useful in treating diseases caused by mutated IDH1 and/or mutated IDH2 enzyme and/or IDH1 wild type (wt) enzyme. The present invention also provides methods for preparing these compounds, pharmaceutical compositions comprising these compounds, and methods of treating diseases utilizing pharmaceutical compositions comprising these compounds.

10 Claims, No Drawings

(56) References Cited

OTHER PUBLICATIONS

Pansuriya T.C. et al., "Somatic Mosaic IDH1 or IDH2 Mutations are Associated With Enchondroma and Spindle Cell Hemangioma in Ollier Disease and Maffucci Syndrome", Nat Genet 43(12):1256-1261 (2011).

Ward P.S. et al., "The Common Feature of Leukemia-Associated IDH1 and IDH2 Mutations is a Neomorphic Enzyme Activity Converting a-Ketoglutarate to 2-Hydroxyglutarate", Cancer Cell 17:225-234 (Mar. 16, 2010).

Watanabe T. et al., "IDH1 Mutations are Early Events in the Development of Astrocytomas and Oligodendrogliomas", The American Journal of Pathology 174(4):1149-1153 (Apr. 2009).

Weissman S.A. et al., "Ligand-Free Palladium-Catalyzed Cyanation of Aryl Halides", J. Org. Chem. 70:1508-1510 (2005).

Yan H et al., "IDH1 and IDH2 Mutations in Gliomas", N Engl J Med. 360(8):765-773 (Feb. 19, 2009).

Yeung P Y et al., "A Mild and Efficient Palladium-Catalyzed Cyanation of Aryl Chlorides With K4[Fe(CN)6]", Organic Letters 13(4):648-651 (2011).

Zhang D. et al., "General and Cost-Effective Synthesis of 1-Heteroaryl/Arylcycloalkylamines and Their Broad Applications", Tetrahedron 72:1941-1953 (2016).

International Search Report dated Dec. 11, 2020 issued in PCT/EP2020/080361.

* cited by examiner

GEM-DISUBSTITUTED HETEROCYCLIC COMPOUNDS AND THEIR USE AS IDH INHIBITORS

The present invention relates to certain gem-disubstituted heterocyclic compounds, which modulate the activity of Isocitrate Dehydrogenase (IDH). The compounds of this invention are therefore useful in treating diseases caused by mutated IDH1 and/or mutated IDH2 enzyme and/or IDH1 wild type (wt) enzyme. The present invention also provides methods for preparing these compounds, pharmaceutical compositions comprising these compounds, and methods of treating diseases utilizing pharmaceutical compositions comprising these compounds.

BACKGROUND OF THE INVENTION

Isocitrate dehydrogenases (IDHs) represent a family of metal dependent oxidoreductases involved in cellular metabolism. These enzymes catalyze the oxidative decarboxylation of isocitrate to alpha-ketoglutarate generating carbon dioxide and NADH or NADPH in the process.

Three different members of this family have been identified: IDH1 and IDH2 that are structurally related homodimers and use $NADP^+$ as electron acceptor, and IDH3 that is a heterotrimeric complex and uses instead $NAD^+$ as electron acceptor.

IDH1 is localized in the cytoplasm and peroxisomes and represent a major source of NADPH production for cells, while IDH2 is localized in the mitochondria as an integral part of the tricarboxylic acid cycle (TCA).

The human IDH1 gene encodes a protein of 414 amino acids whose amino acid sequence can be found as UniProtKB accession no. O75874. The human IDH2 gene encodes a protein of 452 amino acid whose amino acid sequence can be found as UniProtKB accession no. P48735.

Somatic heterozygous mutations in isocitrate dehydrogenase 1 (IDH1) were identified in approximately 80% of grade II-III gliomas and in secondary glioblastomas (see Balss, J. Acta Neuropathol, 2008, 116, 597-602, Watanabe, T., Am. J. Pathol, 2009, 174, 1149-1153, Yan, H. N. Engl. J. Med. 2009, 360, 765-773). IDH1 mutations were also found in 50% of chondrosarcoma (see Amary M F, J. Pathol 2011, 224, 334-43), in 15%-20% of intrahepatic cholangiocarcinoma (see Borger D R, Oncol. 2012, 17, 72-9), and at lower frequency (<5%) in other solid tumors (e.g. glioblastomas, colorectal cancer, esophageal cancer, bladder cancer, melanoma, prostate carcinoma, breast adenocarcinoma (see Cerami E, Cancer Discov. 2012, 2, 401-4).

IDH1 and IDH2 mutations were also observed in a number of hematopoietic neoplasms, most commonly in 10%-15% acute myeloid leukemia (AML) (see, e.g. Mardis E R, N Engl J. Med. 2009, 361, 1058-66, Gross S, J. Exp. Med. 2010, 207, 339-44, Marcucci G, J. Clin. Oncol. 2010, 28, 2348-55) and 20% of angio-immunoblastic T-cell lymphoma (see Cairns R A, Blood 2012, 119, 1901-3).

Interestingly the same mutations in IDH1 or IDH2 were identified in the majority of enchondromas and spindle cell hemangiomas in patients with the Ollier disease and Maffuci syndrome, nonhereditary skeletal disorders (see Amary et al., Nature Genetics, 2011, 1261-1265; and Pansuriya T C, Nat. Genet. 2011, 43, 1256-61).

All mutations have been found in heterozygosity in a mutual exclusive way and in specific tissues. These mutations reside in the catalytic domain of the enzyme responsible for 2-oxoglutarate coordination, and involve mainly Arg 132 (R132) in IDH1 and Arg 140 (R140) or Arg 172 (R172) in IDH2, that can mutate to different aminoacids. Other mutations were also identified in IDH1 although with very low frequency (e.g. Arg 100, and Gly 97; Dang L, Nature, 2009, 462, 739-44). In all cases these points of mutation of Arg to Cys, His, Lys, Leu or Ser abolish magnesium binding and prevent the conversion of isocitrate to alpha-ketoglutarate. Instead, the mutated enzymes acquired a neomorphic activity that converts the alpha-ketoglutarate into R(−)-2-hydroxyglutarate (R-2-HG) (See P. S. Ward et al., Cancer Cell, 2010, 17, 225). In general, the production of 2-HG is enantiospecific, resulting in generation of the D-enantiomer (also known as R enantiomer or R-2-HG. R(−)-2-hydroxyglutarate was shown to act as an oncometabolite, mainly through the inhibition of several DNA and histone demethylases. The consequence at cellular level is an epigenetic reprogramming, leading to a different transcriptional asset, that induce dedifferentiation and tumorigenesis.

IDH1 over-expression was shown to sustain a less differentiated tumor cell state, to promote growth, to accelerate tumor progression and to reduce susceptibility to RTK-targeting therapies in glioblasoma (GBM) and other solid and systemic cancer models. At molecular level, diminished IDH1 activity results in reduced $\alpha$-ketoglutarate ($\alpha$-KG) and NADPH production, exhaustion of reduced glutathione, increased levels of reactive oxygen species (ROS), and enhanced histone methylation and differentiation markers expression. Pharmacological inhibition of IDH1 with a small molecule reduces GBM tumor burden and increases the survival of PDX mice. These data suggest also that cancer-associated IDH1 upregulation represents an actionable ("druggable") cancer-promoting mechanism and provide the rationale for the evaluation of wild-type IDH1 inhibitors as anti-neoplastic agents (see Calvert et al., 2017, Cell Reports 19, 1858-1873).

The inhibition of activity of IDH enzymes is therefore a potential therapeutic treatment option for tumors and other IDH related disorders.

Accordingly, there is a strong medical need for therapeutic agents active against diseases caused by and/or associated with mutated IDH enzymes, and/or IDH wt over-functions, and several efforts are ongoing to develop inhibitors, in particular small molecule inhibitors, of their alpha hydroxyl neomorphic activity.

Certain pyrido-pyridin-7-one derivatives having biological activity as kinase inhibitors are disclosed in WO2005/047284 in the name of Hoffmann La Roche.

Other pyrido-pyrimidin-7-one compounds useful as kinase inhibitors are disclosed in WO2007044813 and in WO20087021389, in the name of Exelixis Inc., in WO1998/33798 in the name of Warner Lambert Co and in WO2008/034008 in the name of Deciphera Pharmaceuticals Lcc.

Certain pyrimido-oxazin-2-one derivatives having biological activity as IDH inhibitors are disclosed in WO2016/171755A1 in the name of Forma Therapeutics.

The inventors have now found that compounds of formula (I), described below, are inhibitors of mutated IDH1 and/or mutated IDH2 and/or IDH1 wt enzymes and are thus useful to treat diseases caused by high level of 2-HG, or caused by IDH wt over-functions.

Accordingly, a first object of the present invention is a substituted gem-disubstituted heterocyclic derivative of formula (I):

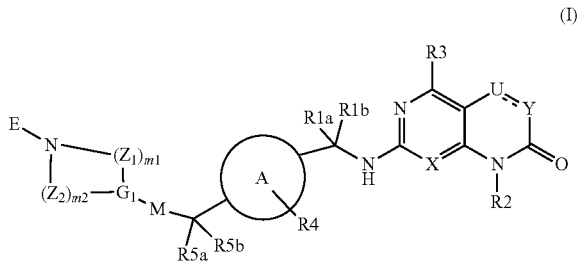

(I)

wherein:
X is nitrogen or —CH—;
U is CH, CH2, or CMe;
Y is CH, CF, or O;
==== indicate a single or a double bond;
R1a, R1b are each independently hydrogen, an optionally substituted straight or branched (C1-C6)alkyl, or together with the atom to which they are bound, may form a (C3-C6)cycloalkyl;
A is a (C3-C6)cycloalkyl, aryl or heteroaryl;
R4 is hydrogen, halogen, cyano or an optionally substituted straight or branched (C1-C6) alkyl;
R5a and R5b are each independently a group selected from an optionally substituted straight or branched (C1-C6)alkyl, (C3-C6)cycloalkyl, or together with the atom to which they are bound, may form a 3 to 7 membered cyclylalkyl or heterocyclyl group containing one heteroatom selected from O, S, N—R6;
  wherein:
    R6 is an optionally substituted straight or branched (C1-C6) alkyl, —COOR7 or —COR8;
      wherein:
        R7 and R8 are an optionally substituted straight or branched (C1-C6)alkyl;
M is a bond, NH, NR6 or O, wherein R6 is as defined above;
G1 is N, CH, CH2 or CO;
Z1 is CR9aR9b;
Z2 is CR10aR10b;
  wherein:
    R9a, R9b, R10a and R10b are independently hydrogen or an optionally substituted straight or branched (C1-C6) alkyl;
m1 is 1, 2 or 3;
m2 is 0, 1, 2 or 3;
E is CN, or an optionally substituted straight or branched (C1-C6)alkyl, (C2-C6)alkenyl, (C2-C6)alkynyl or a group of formula —COR11;
  wherein:
    R11 is an optionally substituted straight or branched (C2-C6)alkyl or (C2-C6)alkenyl or (C2-C6)alkynyl;
R2 is an optionally substituted group selected from straight or branched (C1-C6)alkyl, (C3-C6)cycloalkyl-(C1-C6)alkyl, aryl-(C1-C6)alkyl, and heterocyclyl-(C1-C6)alkyl;
R3 is hydrogen, chloro, cyano, CONH2, NH2, NR12aR12b, OR13, or an optionally substituted group selected from straight or branched (C1-C6)alkyl, (C3-C6)cycloalkyl-(C1-C6)alkyl, aryl and heteroaryl;
  wherein:
    R12a, R12b are each independently selected from hydrogen or optionally substituted straight or branched (C1-C6)alkyl;
    R13 is an optionally substituted straight or branched (C1-C6)alkyl;
or a pharmaceutically acceptable salt thereof.

Preferred compounds of formula (I) are the compounds wherein:
Y is CH, or O;
R3 is hydrogen, chloro, cyano, CONH2, NH2, NR12aR12b, OR13, or an optionally substituted group selected from straight or branched (C1-C6)alkyl, (C3-C6)cycloalkyl-(C1-C6)alkyl;
  wherein:
    R12a, R12b are each independently selected from hydrogen or optionally substituted straight or branched (C1-C6)alkyl;
    R13 is an optionally substituted straight or branched (C1-C6)alkyl;
m1 is 1 or 2;
m2 is 0, 1 or 2; and
X, U, ====, R1a, R1b, A, R4, R5a, R5b, M, G1, $Z_1$, $Z_2$, E, and R2 are as defined above.

In one embodiment more preferred compounds of formula (I) are the compounds wherein:
A is an aryl or heteroaryl;
R4 is hydrogen, halogen or an optionally substituted straight or branched (C1-C6) alkyl;
R3 is hydrogen, chloro, cyano, CONH2, NH2, NR12aR12b, or an optionally substituted group selected from straight or branched (C1-C6)alkyl, (C3-C6)cycloalkyl-(C1-C6)alkyl;
  wherein:
    R12a, R12b are each independently selected from hydrogen or optionally substituted straight or branched (C1-C6)alkyl; and
X, U, Y, ====, R1a, R1b, R5a, R5b, M, G1, $Z_1$, $Z_2$, m1, m2, E and R2 are as defined above.

In another embodiment, more preferred compounds of formula (I) are the compounds wherein:
R4 is hydrogen or halogen;
R3 is hydrogen, chloro, cyano, CONH2, NH2, NR12aR12b, or an optionally substituted group selected from straight or branched (C1-C6)alkyl;
  wherein:
    R12a, R12b are each independently selected from hydrogen or optionally substituted straight or branched (C1-C6)alkyl; and
X, U, Y, ====, R1a, R1b, A, R5a, R5b, M, G1, $Z_1$, $Z_2$, m1, m2, E and R2 are as defined above.

In another embodiment, more preferred compounds of formula (I) are the compounds wherein:
R1a, R1b are each independently hydrogen, straight or branched (C1-C3)alkyl, or together with the atom to which they are bound, may form a cyclopropyl group;
A is phenyl, pyridyl or pyrimidinyl group;
R5a and R5b are each independently a group selected from a straight or branched (C1-C6)alkyl, or together with the atom to which they are bound, may form a 3 to 7 membered cyclylalkyl or heterocyclyl group containing one heteroatom selected from 0 or N—R6;
  wherein:
    R6 is a straight or branched (C1-C6) alkyl or COR8;
      wherein:
        R8 is a straight or branched (C1-C6)alkyl;
R2 is a straight or branched (C1-C6)alkyl, (C3-C6)cycloalkyl-(C1-C6)alkyl;
R3 is hydrogen, chloro, cyano, NH2, NR12aR12b or a straight or branched (C1-C6)alkyl; and X, U, Y, ═══, R4, M, G1, Z1, Z2, m1, m2, E, R12a and R12b are as defined above.

In another embodiment, more preferred compounds of formula (I) are the compounds wherein:

R1a, R1b are each independently hydrogen, methyl, ethyl, or together with the atom to which they are bound, may form a cyclopropyl group;

A is phenyl or a pyridyl group;

R4 is hydrogen;

R5a and R5b are each independently a group selected from methyl or ethyl, or together with the atom to which they are bound, may form an optionally substituted (C3-C6)cycloalkyl group selected from cyclopentyl, cycloexyl, 4,4-difluorocycloexyl or an heterocyclyl group selected from pyranyl, oxetyl, N-methylpiperidinyl, N-acetylpiperidinyl;

R2 is methyl, ethyl, isopropyl or cyclopentyl;

R3 is hydrogen, cyano, methyl, NH2, NHMe or N(Me)2

X, U, Y, ═══, G1, Z1, Z2, m1, m2, and E are as defined above.

Preferred specific compounds of formula (I), or a pharmaceutically acceptable salt thereof, are the compounds listed below:

2-{[(1S)-1-{4-[4-(4-acryloylpiperazin-1-yl)tetrahydro-2H-pyran-4-yl]phenyl}ethyl]amino}-8-(propan-2-yl)pyrido[2,3-d]pyrimidin-7(8H)-one (cpd 1)

2-{[(1S)-1-{4-[2-(4-acryloylpiperazin-1-yl)propan-2-yl]phenyl}ethyl]amino}-8-(propan-2-yl)pyrido[2,3-d]pyrimidin-7(8H)-one (cpd 2);

2-{[(1S)-1-{4-[3-(4-acryloylpiperazin-1-yl)oxetan-3-yl]phenyl}ethyl]amino}-8-(propan-2-yl)pyrido[2,3-d]pyrimidin-7(8H)-one (cpd 3)

2-{[(1S)-1-{4-[3-(4-acryloylpiperazin-1-yl)pentan-3-yl]phenyl}ethyl]amino}-8-(propan-2-yl)pyrido[2,3-d]pyrimidin-7(8H)-one (cpd 4);

2-{[(1S)-1-(4-{4-[4-(but-2-ynoyl)piperazin-1-yl]tetrahydro-2H-pyran-4-yl}phenyl)ethyl]amino}-8-(propan-2-yl)pyrido[2,3-d]pyrimidin-7(8H)-one (cpd 5)

2-{[(1S)-1-{4-[1-acetyl-4-(4-acryloylpiperazin-1-yl)piperidin-4-yl]phenyl}ethyl]amino}-8-(propan-2-yl)pyrido[2,3-d]pyrimidin-7(8H)-one (cpd 6);

2-{[4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazin-1-yl]methyl}prop-2-enoic acid (cpd 7)

2-{[(1S)-1-{4-[4-(4-propanoylpiperazin-1-yl)tetrahydro-2H-pyran-4-yl]phenyl}ethyl]amino}-8-(propan-2-yl)pyrido[2,3-d]pyrimidin-7(8H)-one (cpd 8);

2-{[(1R)-1-{4-[4-(4-acryloylpiperazin-1-yl)tetrahydro-2H-pyran-4-yl]phenyl}ethyl]amino}-8-(propan-2-yl)pyrido[2,3-d]pyrimidin-7(8H)-one (cpd 9)

2-{[(1S)-1-(4-{4-[4-(2,3-dihydroxypropanoyl)piperazin-1-yl]tetrahydro-2H-pyran-4-yl}phenyl)ethyl]amino}-8-(propan-2-yl)pyrido[2,3-d]pyrimidin-7(8H)-one (cpd 10);

7-{[(1S)-1-{4-[4-(4-acryloylpiperazin-1-yl)tetrahydro-2H-pyran-4-yl]phenyl}ethyl]amino}-1-(propan-2-yl)-1,6-naphthyridin-2(1H)-one (cpd 11)

2-{[(1S)-1-{6-[4-(4-acryloylpiperazin-1-yl)tetrahydro-2H-pyran-4-yl]pyridin-3-yl}ethyl]amino}-8-(propan-2-yl)pyrido[2,3-d]pyrimidin-7(8H)-one (cpd 12);

2-{[(1S)-1-{4-[4-(4-acryloylpiperazin-1-yl)tetrahydro-2H-pyran-4-yl]phenyl}ethyl]amino}-4-methyl-8-(propan-2-yl)pyrido[2,3-d]pyrimidin-7(8H)-one (cpd 13);

2-{[(1S)-1-{4-[4-(4-acryloylpiperazin-1-yl)tetrahydro-2H-pyran-4-yl]phenyl}ethyl]amino}-8-ethylpyrido[2,3-d]pyrimidin-7(8H)-one (cpd 14);

2-{[(1S)-1-{4-[4-(4-acryloylpiperazin-1-yl)tetrahydro-2H-pyran-4-yl]phenyl}ethyl]amino}-8-cyclopentyl-5-methylpyrido[2,3-d]pyrimidin-7(8H)-one (cpd 15)

2-{[(1S)-1-{4-[1-(4-acryloylpiperazin-1-yl)cyclopentyl]phenyl}ethyl]amino}-8-(propan-2-yl)pyrido[2,3-d]pyrimidin-7(8H)-one (cpd 16);

2-{[(1S)-1-{4-[3-(4-acryloylpiperazin-1-yl)tetrahydrofuran-3-yl]phenyl}ethyl]amino}-8-(propan-2-yl)pyrido[2,3-d]pyrimidin-7(8H)-one (cpd 17)

2-{[(1S)-1-{4-[4-(4-acryloylpiperazin-1-yl)tetrahydro-2H-pyran-4-yl]phenyl}ethyl]amino}-5-methyl-8-(propan-2-yl) pyrido[2,3-d]pyrimidin-7(8H)-one (cpd 18);

2-{[(1S)-1-{4-[4-(4-acryloylpiperazin-1-yl)tetrahydro-2H-pyran-4-yl]phenyl}ethyl]amino}-4-amino-8-(propan-2-yl) pyrido[2,3-d]pyrimidin-7(8H)-one (cpd 19);

2-{[(1S)-1-{4-[1-(4-acryloylpiperazin-1-yl)cyclohexyl]phenyl}ethyl]amino}-8-(propan-2-yl)pyrido[2,3-d]pyrimidin-7(8H)-one (cpd 20);

2-{[(1S)-1-(4-{4-[4-(2-methylacryloyl)piperazin-1-yl]tetrahydro-2H-pyran-4-yl}phenyl)ethyl]amino}-8-(propan-2-yl) pyrido[2,3-d]pyrimidin-7(8H)-one (cpd 21)

2-{[(1S)-1-(4-{4-[4-(chloroacetyl)piperazin-1-yl]tetrahydro-2H-pyran-4-yl}phenyl)ethyl]amino}-8-(propan-2-yl) pyrido[2,3-d]pyrimidin-7(8H)-one (cpd 22);

2-{[(1S)-1-(4-{4-[4-(3-chloropropanoyl)piperazin-1-yl]tetrahydro-2H-pyran-4-yl}phenyl)ethyl]amino}-8-(propan-2-yl) pyrido[2,3-d]pyrimidin-7(8H)-one (cpd 23);

7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrimido[4,5-d][1,3]oxazin-2-one (cpd 24);

7-{[(1S)-1-{4-[4-(4-acryloylpiperazin-1-yl)tetrahydro-2H-pyran-4-yl]phenyl}ethyl]amino}-1-(propan-2-yl)-1,4-dihydro-2H-pyrido[4,3-d][1,3]oxazin-2-one (cpd 25)

2-{[(1S)-1-{4-[1-(4-acryloylpiperazin-1-yl)-4,4-difluorocyclohexyl]phenyl}ethyl]amino}-8-(propan-2-yl)pyrido[2,3-d]pyrimidin-7(8H)-one (cpd 26);

2-{[(1S)-1-{5-[4-(4-acryloylpiperazin-1-yl)tetrahydro-2H-pyran-4-yl]pyridin-2-yl}ethyl]amino}-8-(propan-2-yl) pyrido[2,3-d]pyrimidin-7(8H)-one (cpd 27)

2-{[(1S)-1-(4-{4-[(1-acryloylazetidin-3-yl)(methyl)amino] tetrahydro-2H-pyran-4-yl}phenyl)ethyl]amino}-8-(propan-2-yl) pyrido[2,3-d]pyrimidin-7(8H)-one (cpd 28);

2-{[(1S)-1-(4-{4-[(1-acryloylazetidin-3-yl)oxy]tetrahydro-2H-pyran-4-yl}phenyl)ethyl]amino}-8-(propan-2-yl) pyrido[2,3-d]pyrimidin-7(8H)-one (cpd 29)

2-[(1-{4-[4-(4-acryloylpiperazin-1-yl)tetrahydro-2H-pyran-4-yl]phenyl}cyclopropyl)amino]-8-(propan-2-yl)pyrido[2,3-d]pyrimidin-7(8H)-one (cpd 30);

2-({4-[4-(4-acryloylpiperazin-1-yl)tetrahydro-2H-pyran-4-yl]benzyl}amino)-8-(propan-2-yl)pyrido[2,3-d]pyrimidin-7(8H)-one (cpd 31)

2-{[(1S)-1-{4-[4-(4-acryloylpiperazin-1-yl)-1-methylpiperidin-4-yl]phenyl}ethyl]amino}-8-(propan-2-yl)pyrido[2,3-d]pyrimidin-7(8H)-one (cpd 32);

2-{[(1S)-1-{4-[(2R)-2-(4-acryloylpiperazin-1-yl)butan-2-yl]phenyl}ethyl]amino}-8-(propan-2-yl)pyrido[2,3-d]pyrimidin-7(8H)-one (cpd 33)

2-{[(1S)-1-{4-[(2S)-2-(4-acryloylpiperazin-1-yl)butan-2-yl]phenyl}ethyl]amino}-8-(propan-2-yl)pyrido[2,3-d]pyrimidin-7(8H)-one (cpd 34);

2-{[(1S)-1-{4-[4-(4-acryloylpiperazin-1-yl)tetrahydro-2H-pyran-4-yl]phenyl}ethyl]amino}-8-(pentan-3-yl)pyrido[2,3-d]pyrimidin-7(8H)-one (cpd 35)

2-{[(1S)-1-{4-[4-(4-acryloylpiperazin-1-yl)tetrahydro-2H-pyran-4-yl]phenyl}ethyl]amino}-4-(dimethylamino)-8-(propan-2-yl)pyrido[2,3-d]pyrimidin-7(8H)-one (cpd 36);

2-{[(1S)-1-{4-[4-(4-acryloylpiperazin-1-yl)tetrahydro-2H-pyran-4-yl]phenyl}ethyl]amino}-4-(methylamino)-8-(propan-2-yl)pyrido[2,3-d]pyrimidin-7(8H)-one (cpd 37)

2-{[(1S)-1-{4-[4-(4-acryloylpiperazin-1-yl)tetrahydro-2H-pyran-4-yl]phenyl}ethyl]amino}-7-oxo-8-(propan-2-yl)-7,8-dihydropyrido[2,3-d]pyrimidine-4-carbonitrile (cpd 38);

2-{[(1S)-1-(4-{4-[(1-acryloylpiperidin-4-yl)oxy]tetrahydro-2H-pyran-4-yl}phenyl)ethyl]amino}-8-(propan-2-yl)pyrido[2,3-d]pyrimidin-7(8H)-one (cpd 39)

2-[(2-{4-[4-(4-acryloylpiperazin-1-yl)tetrahydro-2H-pyran-4-yl]phenyl}propan-2-yl)amino]-8-(propan-2-yl)pyrido[2,3-d]pyrimidin-7(8H)-one (cpd 40);

7-{[(1S)-1-{4-[4-(4-acryloylpiperazin-1-yl)tetrahydro-2H-pyran-4-yl]phenyl}ethyl]amino}-5-amino-1-(propan-2-yl)-1,4-dihydro-2H-pyrimido[4,5-d][1,3]oxazin-2-one (cpd 41)

2-{[(1S)-1-{4-[(2S)-2-(4-acryloylpiperazin-1-yl)-1-(morpholin-4-yl)propan-2-yl]phenyl}ethyl]amino}-8-(propan-2-yl) pyrido[2,3-d]pyrimidin-7(8H)-one (cpd 42);

2-{[(1S)-1-{4-[(2R)-2-(4-acryloylpiperazin-1-yl)-1-(morpholin-4-yl)propan-2-yl]phenyl}ethyl]amino}-8-(propan-2-yl) pyrido[2,3-d]pyrimidin-7(8H)-one (cpd 43)

7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrido[4,3-d][1,3]oxazin-2-one (cpd 44);

7-{[(1S)-1-{4-[4-(4-ethylpiperazin-1-yl)tetrahydro-2H-pyran-4-yl]phenyl}ethyl]amino}-1-ethyl-1,4-dihydro-2H-pyrimido[4,5-d][1,3]oxazin-2-one (cpd 45)

2-{[(1S)-1-{4-[2-(4-acryloylpiperazin-1-yl)butan-2-yl]phenyl}ethyl]amino}-8-(propan-2-yl)pyrido[2,3-d]pyrimidin-7(8H)-one (cpd 46);

7-{[(1S)-1-{4-[1-(4-acryloylpiperazin-1-yl)-4,4-difluorocyclohexyl]phenyl}ethyl]amino}-1-(propan-2-yl)-1,6-naphthyridin-2(1H)-one (cpd 47)

7-{[(1S)-1-(4-{4-[(1-acryloylazetidin-3-yl)(methyl)amino]tetrahydro-2H-pyran-4-yl}phenyl)ethyl]amino}-1-(propan-2-yl)-1,6-naphthyridin-2(1H)-one (cpd 48);

2-[(1-{4-[1-(4-acryloylpiperazin-1-yl)cyclopentyl]phenyl}cyclopropyl)amino]-8-(propan-2-yl)pyrido[2,3-d]pyrimidin-7(8H)-one (cpd 49)

2-{[(1S)-1-(4-{1-[(1-acryloylazetidin-3-yl)(methyl)amino]-4,4-difluorocyclohexyl}phenyl)ethyl]amino}-8-(propan-2-yl) pyrido[2,3-d]pyrimidin-7(8H)-one (cpd 50);

8-(propan-2-yl)-2-({(1S)-1-[4-(4-{4-[(²H3)prop-2-enoyl]piperazin-1-yl}tetrahydro-2H-pyran-4-yl)phenyl]ethyl}amino) pyrido[2,3-d]pyrimidin-7(8H)-one (cpd 51)

2-[(2-{4-[1-(4-acryloylpiperazin-1-yl)-4,4-difluorocyclohexyl]phenyl}propan-2-yl)amino]-8-(propan-2-yl)pyrido[2,3-d]pyrimidin-7(8H)-one (cpd 52);

2-{[(1S)-1-(4-{1-[{1-[chloro(fluoro)acetyl]azetidin-3-yl}(methyl)amino]-4,4-difluorocyclohexyl}phenyl)ethyl]amino}-8-(propan-2-yl)pyrido[2,3-d]pyrimidin-7(8H)-one (cpd 53)

2-{[(1S)-1-(4-{4-[4-(2-fluoroacryloyl)piperazin-1-yl]tetrahydro-2H-pyran-4-yl}phenyl)ethyl]amino}-8-(propan-2-yl) pyrido[2,3-d]pyrimidin-7(8H)-one (cpd 54);

2-{[(1S)-1-{4-[4-(4-acryloylpiperazin-1-yl)tetrahydro-2H-pyran-4-yl]phenyl}ethyl]amino}-8-[(²H7)propan-2-yl] pyrido[2,3-d]pyrimidin-7(8H)-one (cpd 55)

N-{2-[(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)amino]-2-oxoethyl}prop-2-enamide (cpd 56);

N2-acryloyl-N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-D-alaninamide (cpd 57);

N2-acryloyl-N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-L-alaninamide (cpd 58);

N-{2-[(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)amino]ethyl}prop-2-enamide (cpd 59)

7-{[(1S)-1-(4-{1-[4-(2,3-dihydroxypropanoyl)piperazin-1-yl]-4,4-difluorocyclohexyl}phenyl)ethyl]amino}-1-(propan-2-yl)-1,6-naphthyridin-2(1H)-one (cpd 60);

7-{[(1S)-1-(4-{1-[(1-acryloylazetidin-3-yl)(methyl)amino]-4,4-difluorocyclohexyl}phenyl)ethyl]amino}-1-(propan-2-yl)-1,6-naphthyridin-2(1H)-one (cpd 61)

N-(1-acryloylazetidin-3-yl)-N-(4,4-difluoro-1-{4-[(1S)-1-{[2-oxo-1-(propan-2-yl)-1,2-dihydro-1,6-naphthyridin-7-yl]amino}ethyl]phenyl}cyclohexyl)acetamide (cpd 62);

7-{[(1R)-1-{4-[1-(4-acryloylpiperazin-1-yl)-4,4-difluorocyclohexyl]phenyl}ethyl]amino}-1-(propan-2-yl)-1,6-naphthyridin-2(1H)-one (cpd 63)

2-{[(1S)-1-(4-{4,4-difluoro-1-[4-(4-hydroxybutyl)piperazin-1-yl]cyclohexyl}phenyl)ethyl]amino}-8-(propan-2-yl) pyrido[2,3-d]pyrimidin-7(8H)-one (cpd 64);

4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazine-1-carbonitrile (cpd 65)

N-{2-[(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)(trifluoroacetyl)amino]ethyl}prop-2-enamide (cpd 66) and 7-{[(1S)-1-{4-[4,4-difluoro-1-(4-propanoylpiperazin-1-yl)cyclohexyl]phenyl}ethyl]amino}-1-(propan-2-yl)-1,6-naphthyridin-2(1H)-one (cpd 67).

If a stereogenic center or another form of an asymmetric center is present in a compound of the present invention, all forms of such optical isomer or isomers, including enantiomers and diastereomers, are intended to be covered herein. Compounds containing a stereogenic center may be used as a racemic mixture, an enantiomerically enriched mixture, or the racemic mixture may be separated using well-known techniques and an individual enantiomer may be used. In cases in which compounds have unsaturated carbon-carbon double bonds, both the cis (Z) and trans (E) isomers are within the scope of this invention.

In cases wherein compounds may exist in tautomeric forms, such as keto-enol tautomers, each tautomeric form is contemplated as being included within this invention whether existing in equilibrium or predominantly in one form.

Pharmaceutically acceptable salts of the compounds of formula (I) include the salts with inorganic or organic acids, e.g. nitric, hydrochloric, hydrobromic, sulfuric, perchloric, phosphoric, acetic, trifluoroacetic, propionic, glycolic, lactic, oxalic, fumaric, malonic, malic, maleic, tartaric, citric, benzoic, cinnamic, mandelic, methanesulphonic, isethionic and salicylic acid.

Pharmaceutically acceptable salts of the compounds of formula (I) also include the salts with inorganic or organic bases, e.g. alkali or alkaline-earth metals, especially sodium, potassium, calcium, ammonium or magnesium hydroxides, carbonates or bicarbonates, acyclic or cyclic amines.

Further object of the present invention are compounds of formula (I) wherein one or more hydrogen/s is/are replaced by one or more deuterium atom/s.

When m2 is 0 we intended that the group Z2 is absent and the groups G1 and N are saturated with hydrogen.

With the term "(C1-C6) alkyl", we intend an aliphatic (C1-C6) hydrocarbon chain, containing carbon-carbon single bonds only, which can be straight or branched. Representative examples include, but are not limited to, methyl, ethyl, n-propyl, isopropyl, n-butyl, isobutyl, tert-butyl, sec-butyl, n-pentyl, n-hexyl, and the like.

With the term "($C_3$-$C_6$) cycloalkyl", we intend, unless otherwise provided, 3- to 6-membered all-carbon monocyclic ring, which may contain one or more double bonds, but does not have a completely conjugated r-electron system.

Examples of ($C_3$-$C_6$) cycloalkyl groups, without limitation, are cyclopropyl, cyclobutyl, cyclopentyl, cyclopentenyl, cyclohexanyl, cyclohexenyl and cyclohexadienyl. The ($C_3$-$C_6$) cycloalkyl ring can be optionally further fused or linked to aromatic and non-aromatic carbocyclic or heterocyclic rings.

With the term "heterocyclyl", we intend a 3- to 7-membered, saturated or partially unsaturated carbocyclic ring where one or more carbon atoms are replaced by heteroatoms such as nitrogen, oxygen and sulfur. Non limiting examples of heterocyclyl groups are, for instance, pyranyl, tetrahydropyranyl, pyrrolidinyl, pyrrolinyl, imidazolinyl, imidazolidinyl, pyrazolidinyl, pyrazolinyl, thiazolinyl, thiazolidinyl, dihydrofuranyl, tetrahydrofuranyl, tetrahydropyridinyl, 1,3-dioxolanyl, piperidinyl, piperazinyl, morpholinyl and the like. The heterocyclyl ring can be optionally further fused or linked to aromatic and non-aromatic carbocyclic or heterocyclic rings.

With the term "($C_2$-$C_6$) alkenyl", we intend an aliphatic straight or branched ($C_2$-$C_6$) hydrocarbon chain containing at least one carbon-carbon double bond. Representative examples include, but are not limited to, ethenyl, 1-propenyl, 2-propenyl, 1- or 2-butenyl, and the like.

With the term "($C_2$-$C_6$) alkynyl", we intend an aliphatic straight or branched ($C_2$-$C_6$) hydrocarbon chain containing at least one carbon-carbon triple bond. Representative examples include, but are not limited to, ethynyl, 1-propynyl, 2-propynyl, 1- or 2-butynyl, and the like.

With the term "($C_1$-$C_6$) alkoxy", we intend any of the above defined ($C_1$-$C_6$) alkyl linked to the rest of the molecule through an oxygen atom (—O—).

The term "aryl" refers to a mono-, bi- or poly-carbocyclic hydrocarbon with from 1 to 4 ring systems, optionally further fused or linked to each other by single bonds, wherein at least one of the carbocyclic rings is "aromatic", wherein the term "aromatic" refers to completely conjugated r-electron bond system. Non limiting examples of such aryl groups are phenyl, α- or β-naphthyl, α- or β-tetrahydronaphthalenyl, biphenyl, and indanyl groups.

The term "heteroaryl" refers to aromatic heterocyclic rings, typically 5- to 7-membered heterocycles with from 1 to 3 heteroatoms selected among N, O or S; the heteroaryl ring can be optionally further fused or linked to aromatic and non-aromatic carbocyclic and heterocyclic rings. Not limiting examples of such heteroaryl groups are, for instance, pyridyl, pyrazinyl, pyrimidinyl, pyridazinyl, indolyl, imidazolyl, thiazolyl, isothiazolyl, pyrrolyl, furanyl, oxazolyl, isoxazolyl, pyrazolyl, thiophenyl, thiadiazolyl, isoxazolyl, isothiazolyl, oxadiazolyl, indazolyl, cinnolinyl, benzo[1,3]dioxolyl, benzo[1,4]dioxinyl, benzothiazolyl, benzothiophenyl, benzofuranyl, isoindolinyl, benzoimidazolyl, benzoxazolyl, quinolinyl, isoquinolinyl, 1,2,3-triazolyl, 1-phenyl-1,2,3-triazolyl, 2,3-dihydroindolyl, 2,3-dihydrobenzofuranyl, 2,3-dihydrobenzothiophenyl, benzopyranyl, 2,3-dihydrobenzoxazinyl, 2,3-dihydroquinoxalinyl and the like.

With the term "halogen", we intend fluoro, chloro, bromo or iodo.

With the term "polyfluorinated ($C_1$-$C_6$)alkyl" or "polyfluorinated ($C_1$-$C_6$)alkoxy", we intend any of the above defined ($C_1$-$C_6$) alkyl or ($C_1$-$C_6$) alkoxy groups which are substituted by more than one fluoro atom such as, for instance, trifluoromethyl, trifluoroethyl, 1,1,1,3,3,3-hexafluoropropyl, trifluoromethoxy and the like.

With the term "hydroxy($C_1$-$C_6$)alkyl" we intend any of the above defined ($C_1$-$C_6$)alkyl groups, bearing a hydroxyl group such as, for instance, hydroxymethyl, 2-hydroxyethyl, 3-hydroxypropyl and the like.

According to the present invention and unless otherwise provided, R1a, R1b, R2, R3, R4, R5a, R5b, R9a, R9b, R10a, R10b and E may be optionally substituted, in any of their free positions, by one or more groups, for instance 1 to 6 groups, independently selected from: hydroxyl, hydroxy($C_1$-$C_6$)alkyl, halogen, nitro, oxo group (=O), cyano, ($C_1$-$C_6$) alkyl, polyfluorinated ($C_1$-$C_6$)alkyl, polyfluorinated ($C_1$-$C_6$) alkoxy, ($C_2$-$C_6$)alkenyl, ($C_2$-$C_6$)alkynyl, aryl, aryl($C_1$-$C_6$) alkyl, ($C_1$-$C_6$)alkylaryl, aryl($C_1$-$C_6$)alkoxy, heteroaryl, heteroaryl($C_1$-$C_6$)alkyl, ($C_1$-$C_6$)alkylheteroaryl, heterocyclyl, heterocyclyl($C_1$-$C_6$)alkyl, ($C_1$-$C_6$)alkylheterocyclyl, ($C_1$-$C_6$)alkylheterocyclyl($C_1$-$C_6$)alkyl, tri($C_1$-$C_6$)alkylsilyl, ($C_3$-$C_7$)cycloalkyl, ($C_1$-$C_6$)alkoxy, aryloxy, heterocycly-loxy, methylenedioxy, ($C_1$-$C_6$)alkylcarbonyloxy, arylcarbonyloxy, di($C_1$-$C_6$)alkylaminoheterocyclyl($C_1$-$C_6$)alkyl, ($C_3$-$C_7$)cycloalkenyloxy, heterocyclylcarbonyloxy, ($C_1$-$C_6$) alkylideneaminooxy, carboxy, ($C_1$-$C_6$)alkoxycarbonyl, aryloxycarbonyl, ($C_3$-$C_7$)cycloalkyloxycarbonyl, amino, heterocyclyl($C_1$-$C_6$)alkoxycarbonylamino, ureido, ($C_1$-$C_6$) alkylamino, amino($C_1$-$C_6$)alkyl, di($C_1$-$C_6$)alkylamino, arylamino, diarylamino, heterocyclylamino, formylamino, ($C_1$-$C_6$)alkylcarbonylamino, arylcarbonylamino, heterocyclylcarbonylamino, aminocarbonyl, ($C_1$-$C_6$)alkylaminocarbonyl, di($C_1$-$C_6$)alkylaminocarbonyl, arylaminocarbonyl, heteroarylaminocarbonyl, arylaminocarbonyl ($C_1$-$C_6$)alkyl, ($C_3$-$C_7$)cycloalkylaminocarbonyl, heterocyclylaminocarbonyl, ($C_1$-$C_6$)alkoxycarbonylamino, hydroxyaminocarbonyl, ($C_1$-$C_6$)alkoxyimino, ($C_1$-$C_6$)alkylsulfonylamino, arylsulfonylamino, heterocyclylsulfonylamino, formyl, ($C_1$-$C_6$)alkylcarbonyl, arylcarbonyl, ($C_3$-$C_7$)cycloalkylcarbonyl, heterocyclylcarbonyl, heterocyclylcarbonyl($C_1$-$C_6$)alkyl, ($C_1$-$C_6$)alkylsulfonyl, polyfluorinated ($C_1$-$C_6$)alkylsulfonyl, arylsulfonyl, aminosulfonyl, ($C_1$-$C_6$)alkylaminosulfonyl, di($C_1$-$C_6$)alkylaminosulfonyl, arylaminosulfonyl, heterocyclylaminosulfonyl, arylthio, ($C_1$-$C_6$)alkylthio; in their turn, whenever appropriate, each of the above substituents may be further substituted by one or more of the aforementioned groups.

From all of the above, it is clear to the skilled person that any group which name is a composite name such as, for instance, "arylamino" has to be intended as conventionally construed by the parts from which it derives, e.g. by an amino group which is substituted by aryl, wherein aryl is as above defined.

Likewise, any of the terms such as, for instance, ($C_1$-$C_6$) alkylthio, ($C_1$-$C_6$)alkylamino, di($C_1$-$C_6$)alkylamino, ($C_1$-$C_6$)alkoxycarbonyl, ($C_1$-$C_6$)alkoxycarbonylamino, heterocyclylcarbonyl, heterocyclylcarbonylamino, ($C_3$-$C_7$) cycloalkyloxycarbonyl and the like, include groups wherein the ($C_1$-$C_6$)alkyl, ($C_1$-$C_6$)alkoxy, aryl, ($C_3$-$C_7$)cycloalkyl and heterocyclyl moieties are as above defined.

The present invention also provides processes for the preparation of the compound of general formula (I) as defined above, by using the reaction routes and synthetic schemes described below, employing the techniques available in the art and starting materials readily available. The preparation of certain embodiments of the present invention is described in the examples that follow, but those of ordinary skill in the art will recognize that the preparations described may be readily adapted to prepare other embodiments of the present invention. For example, the synthesis of non-exemplified compounds according to the invention may be performed by apparent modifications to those skilled in the art, for instance by appropriately protecting interfering groups, by suitably replacing reagents with others known in the art, or by making routine modifications of reaction conditions. Alternatively, other reactions referred to herein or known in the art will be recognized as having adaptability for preparing other compounds of the invention.

The compounds of this invention can be prepared from readily available starting materials using the following general methods and procedures. Unless otherwise indicated, the starting materials are known compounds or may be prepared from known compounds according to well-known procedures. It will be appreciated that, where typical or preferred process conditions (i.e., reaction temperatures, times, mole ratios of reactants, solvents, pressures) are described, different process conditions can also be used unless otherwise stated. Optimum reaction conditions may vary with the reactants or solvents used, but such conditions can be determined by one skilled in the art by routine optimization procedures.

The compound of general formula (I), as defined above, can be prepared according to the general synthetic processes described in Scheme 1, starting from an intermediate compound of formula (II):

Scheme 1

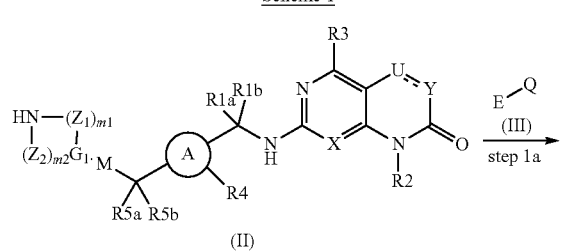

(II)

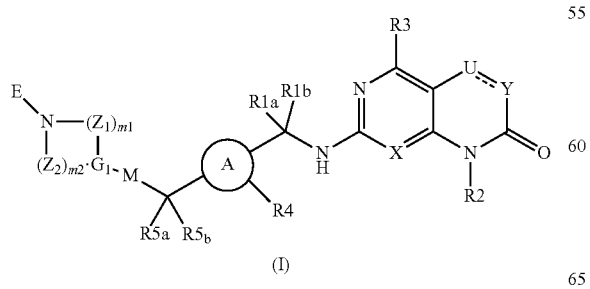

(I)

Step 1a) reacting a compound of formula (II):

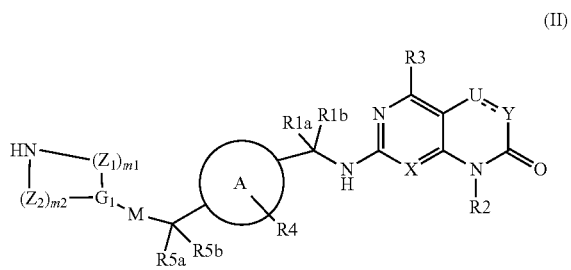

(II)

wherein X is nitrogen or —CH—; U is CH, CH2, or CMe; Y is CH, CF, or O; ═══ indicate a single or a double bond; R2 is an optionally substituted group selected from straight or branched (C1-C6)alkyl, (C3-C6)cycloalkyl-(C1-C6)alkyl, aryl-(C1-C6)alkyl, and heterocyclyl-(C1-C6)alkyl; R3 is hydrogen, chloro, cyano, CONH2, NH2, NR12aR12b, OR13, or an optionally substituted group selected from straight or branched (C1-C6)alkyl, (C3-C6)cycloalkyl-(C1-C6)alkyl, aryl and heteroaryl; wherein: R12a, R12b are each independently selected from hydrogen or optionally substituted straight or branched (C1-C6)alkyl; R13 is an optionally substituted straight or branched (C1-C6)alkyl; R1a and R1b are each independently hydrogen or an optionally substituted straight or branched (C1-C6)alkyl, or together with the atom to which they are bound, may form a (C3-C6)cycloalkyl; A is a (C3-C6)cycloalkyl, aryl or heteroaryl; R4 is hydrogen, halogen, cyano or an optionally substituted straight or branched (C1-C6) alkyl; R5a and R5b are each independently a group selected from an optionally substituted straight or branched (C1-C6)alkyl, (C3-C6)cycloalkyl, or together with the atom to which they are bound, may form a 3 to 7 membered cyclylalkyl or heterocyclyl group containing one heteroatom selected from O, S, N—R6; wherein: R6 is an optionally substituted straight or branched (C1-C6) alkyl, —COOR7 or —COR8; wherein: R7 and R8 are an optionally substituted straight or branched (C1-C6)alkyl; M is a bond, NH, NR6, wherein R6 is as defined above, or O; G1 is N, CH, CH2 or CO; Z1 is CR9aR9b; Z2 is CR10aR10b; wherein: R9a, R9b, R10a and R10b are independently hydrogen or an optionally substituted straight or branched (C1-C6) alkyl; m1 is 1, 2 or 3 and m2 is 0, 1, 2 or 3;

(III)

wherein E is CN or an optionally substituted straight or branched (C1-C6)alkyl, (C2-C6)alkenyl, or a group of formula —COR11; R11 is an optionally substituted straight or branched (C2-C6)alkyl or (C2-C6)alkenyl or (C2-C6)alkynyl; and Q is hydroxy, or chloro, or bromo to yield a compound of general formula (I), wherein X, U, Y, ═══, R2, R3, R1a, R1b, A, R4, R5a, R5b, M, G1, Z1, Z2 and E are as defined above.

The compound of general formula (II), as defined above, can be prepared according to the general synthetic processes described in Scheme 2, starting from an intermediate compound of formula (IV):

Scheme 2

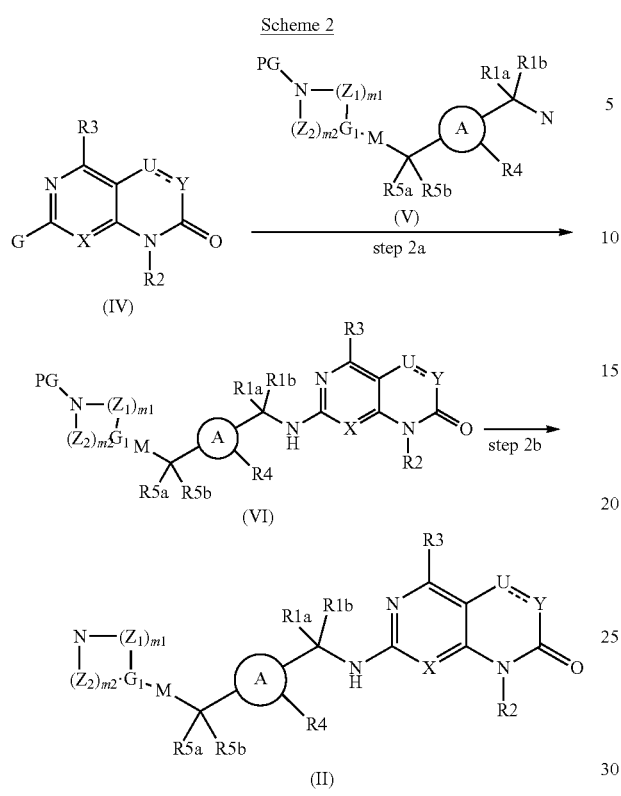

Accordingly, a process of the present invention comprises the following steps Scheme 2:

Step 2a) reacting a compound of formula (IV):

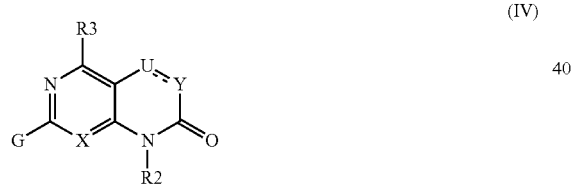

wherein G is chloro, MeS(O)$_2$—, MeS(O)—, or OTrif; X, U, Y, ====, R2 and R3 are as defined under step 1a, with a compound of formula (V):

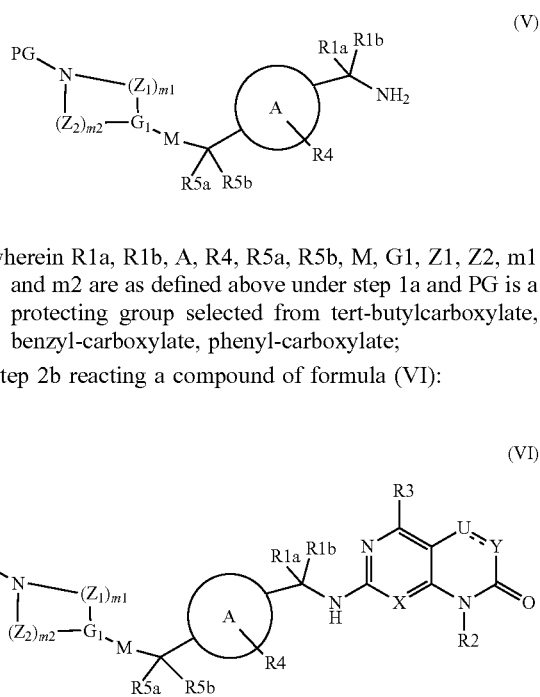

wherein R1a, R1b, A, R4, R5a, R5b, M, G1, Z1, Z2, m1 and m2 are as defined above under step 1a and PG is a protecting group selected from tert-butylcarboxylate, benzyl-carboxylate, phenyl-carboxylate;

Step 2b reacting a compound of formula (VI):

(VI)

wherein PG is as defined above in step 2a, with a suitable deprotecting agent;

to yield a compound of formula (II), wherein X, U, Y, A, R1a, R1b, R2, R3, R4, R5a, R5b, M, G1, Z1, Z2, m1 and m2 are as defined above.

The compound of formula (IV) wherein G is MeS(O)$_2$—, or MeS(O)—, X is N, R3 is hydrogen or chloro and U, Y, and R2 are as defined in step 1a, can be prepared following the Scheme 3:

Scheme 3

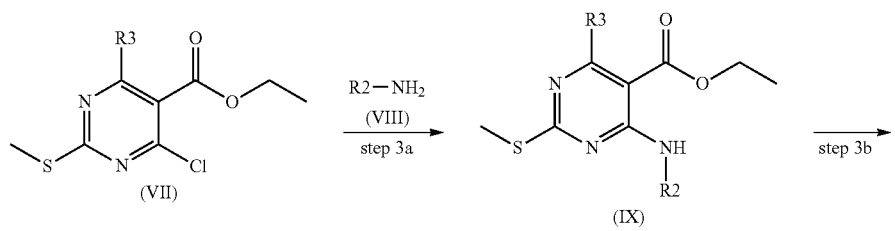

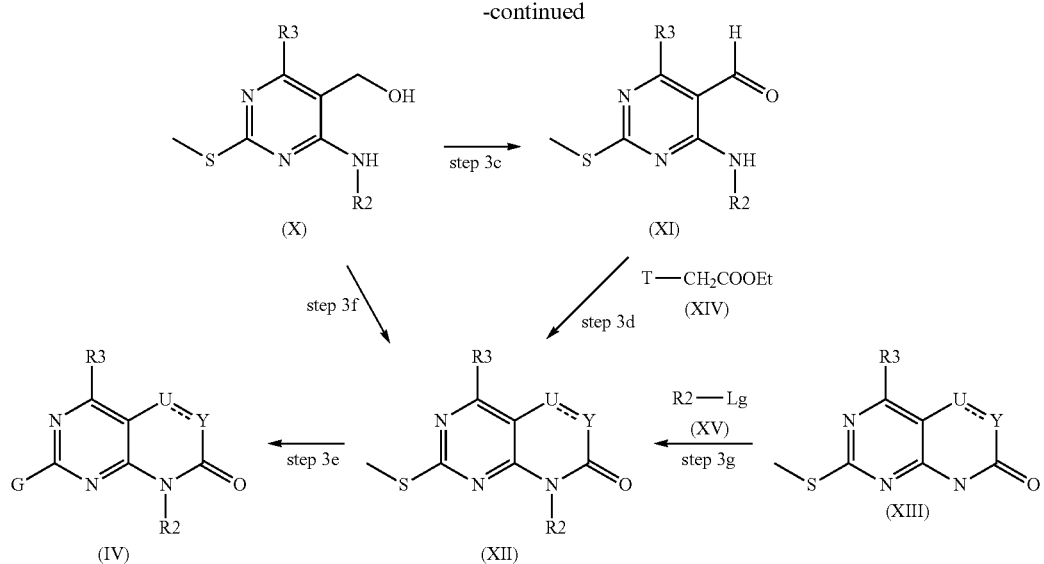

(IV) G = MeS(O)-; MeS(O)₂-

Step 3a) substituting the chlorine of an intermediate compound of formula (VII):

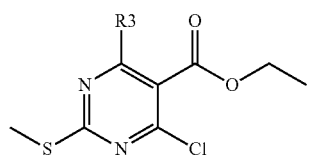
(VII)

wherein R3 is hydrogen, chloro, or an optionally substituted straight or branched $(C_1-C_6)$alkyl, with an amine intermediate compound of formula (VIII):

R2-NH₂ (VIII)

wherein R2 is as defined above in step 1a;

Step 3b) reacting a compound of formula (IX):

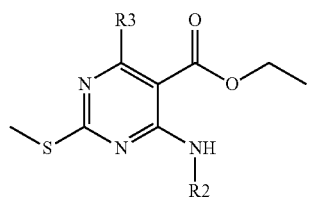
(IX)

wherein R2 and R3 are as defined above, with a reducing agent;

Step 3c) reacting the resultant compound of formula (X):

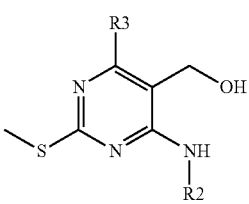
(XI)

wherein R2 and R3 are as defined above, with an appropriate oxydant reagent;

Step 3d) reacting the resultant compound of formula (XI):

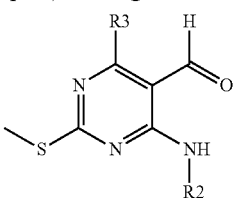
(XI)

wherein R2 and R3 are as defined above, with a reagent of formula T-CH₂COOEt (XIV), wherein T is hydrogen or fluoro:

Step 3e) mixing the resultant intermediate compound of formula (XII):

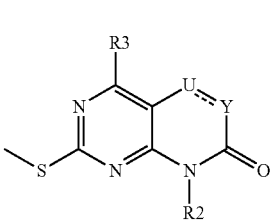
(XII)

wherein U, Y and ==== are as defined in step 1a and R2 and, R3, are as defined above, with a oxydant reagent, to give a compound of formula (IV) wherein G is MeS(O)$_2$—, or MeS(O)—, X is N and R2, R3, U, Y and ==== are as defined above;

or

Step 3f) reacting the compound of formula (X):

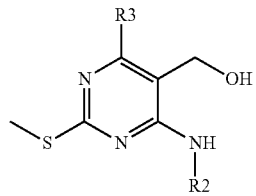
(X)

wherein R2 and R3 are as defined above in step 3e, with carbonyldiimidazole or triphosgene, to give a compound of formula (XII) wherein U is CH2, Y is O, ==== is a single bond and R2 and R3, are as defined above; or Step 3g) alkylating the intermediate compound of formula (XIII):

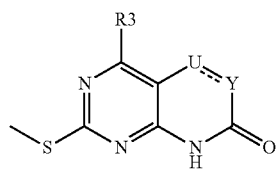
(XIII)

wherein R3, U, Y, ==== are as defined above in step 3e, with an alkylating agent of formula R2-Lg (XV), wherein Lg is bromine, iodine, —OMs-OTs or hydroxy and R2 is as defined above; to give a compound of formula (XII) wherein R2, R3, U, Y and ==== are as defined above.

The compound of formula (IV) wherein G is chloro and R3, X, U, Y and R2 are as defined above in step 1a, can be prepared following the Scheme 4:

Scheme 4

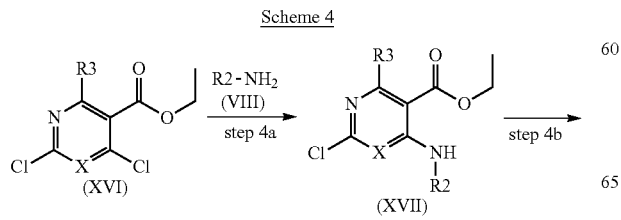

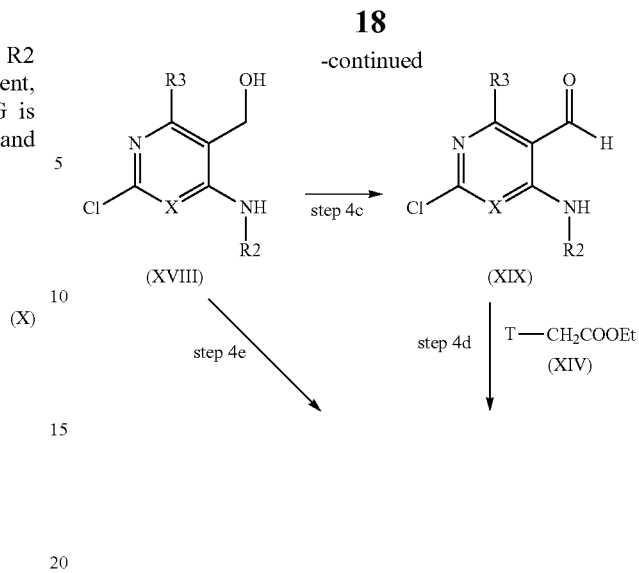

Step 4a) substituting the chlorine of an intermediate compound of formula (XVI):

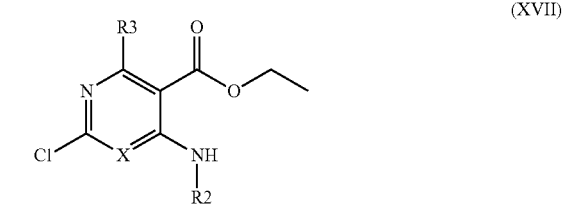
(XVI)

wherein X and R3 are as define above in step 1a, with an amine intermediate compound of formula (VIII):

R2-NH$_2$ (VIII)

wherein R2 is as defined above in step 1a;

Step 4b) reacting a compound of formula (XVII):

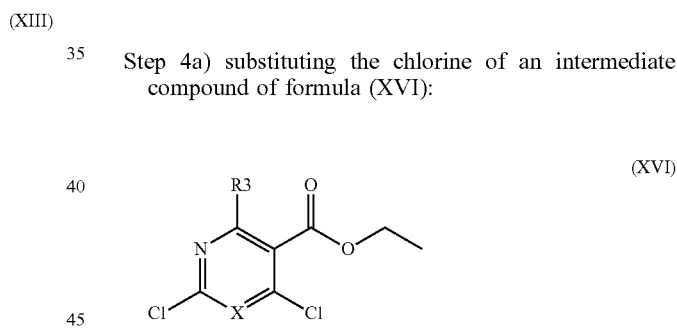
(XVII)

wherein X, R3 and R2 are as defined above, with a reducing agent;

Step 4c) reacting the resultant compound of formula (XVIII):

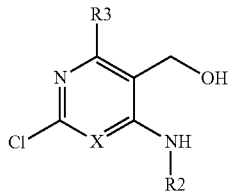

wherein X, R3 and R2 are as defined above, with an appropriate oxydant reagent; then Step 4d) reacting the resultant compound of formula (XIX):

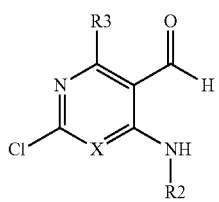

wherein X, R2 and R3 are as defined above, with an compound of formula T-CH$_2$COOEt (XIV), wherein T is hydrogen or fluoro, to give a compound of formula (IV) wherein G is chloro, U, Y, X, ====, R3 and R2 are as defined above in step 1a;

or

Step 4e) reacting the resultant compound of formula (XVIII):

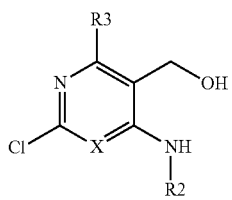

wherein X, R3 and R2 are as defined above, with carbonyldiimidazole or triphosgene; to give a compound of formula (IV) wherein G is chloro, U is CH$_2$, Y is O, ==== is a single bond and X and R2 are as defined above.

If desired, converting a first compound of formula (XII) into a second compound of formula (XII) by operating according to well-known synthetic conditions.

Examples of possible conversions are those reported below:

conv. A) converting a compound of formula (XII):

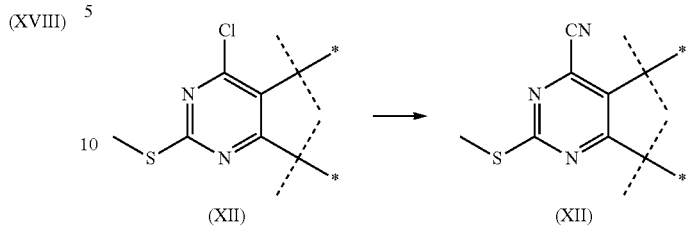

wherein R3 is chloro, into a compound of formula (XII) wherein R3 is CN, by reacting with a source of cyanide, following the condition known in the art for palladium-catalyzed cyanation of aryl halides;

conv. B) converting a compound of formula (XII):

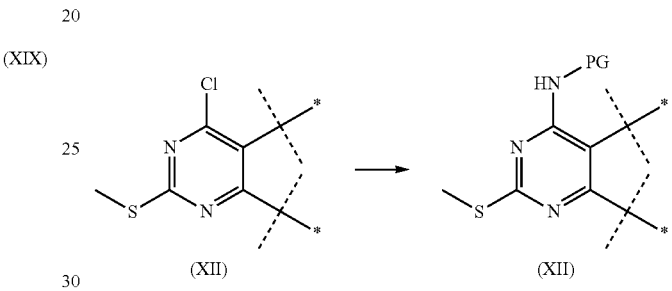

wherein R3 is chloro, into a compound of formula (XII) wherein R3 is NHPG, by reacting with an amine PG-NH2; conv. C) converting a compound of formula (XII):

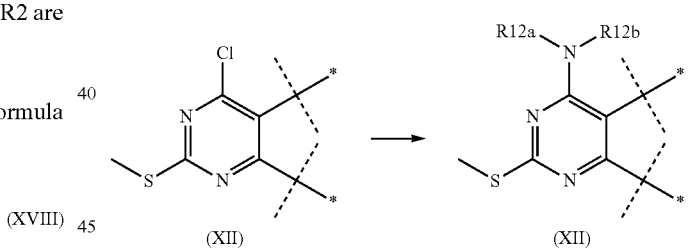

wherein R3 is chloro, into a compound of formula (XII) wherein R3 is NR12aR12b, by reacting with an amine HNR12aR12b wherein R12a and R12b are each independently selected from hydrogen or optionally substituted straight or branched $(C_1\text{-}C_6)$alkyl;

conv. D) converting a compound of formula (XII):

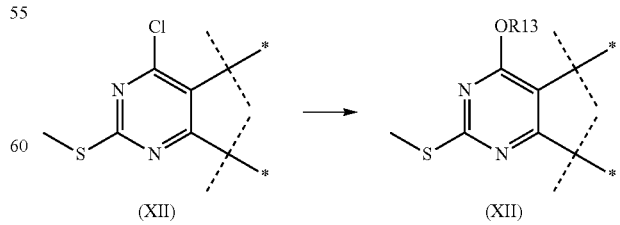

wherein R3 is chloro, into a compound of formula (XII) wherein R3 is OR13, by reacting with an alcohol R13-OH wherein R13 is an optionally substituted straight or branched $(C_1-C_6)$alkyl;

conv. E) converting a compound of formula (XII):

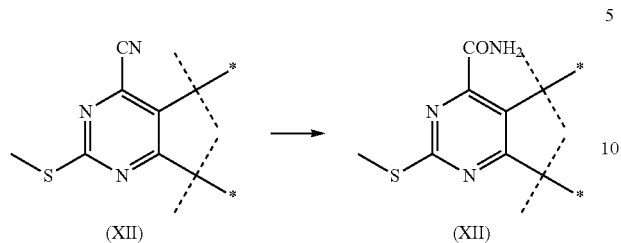

wherein R3 is cyano, into a compound of formula (XII) wherein R3 is $CONH_2$, by hydrolysis with a suitable agent.

If desired, converting a first compound of formula (IV) into a second compound of formula (IV) by operating according to well-known synthetic conditions.

EXAMPLE OF A POSSIBLE CONVERSION IS THAT REPORTED BELOW conv. A1) converting a compound of formula (IV):

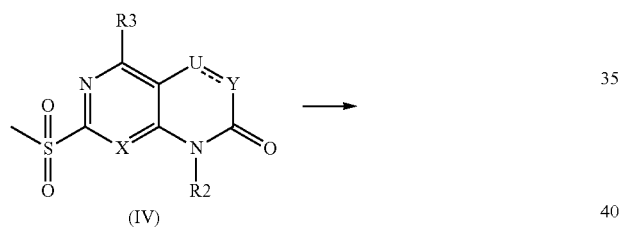

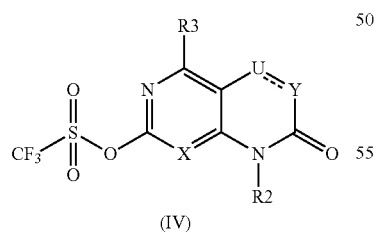

wherein G is $MeS(O)_2$—, into a compound of formula (IV) wherein G is —OTrif (triflate), by a two steps sequence with suitable reagents.

The compound of formula (V) wherein R1a, R1b, A, R4, R5a, R5b, M, G1, Z1, Z2, m1 and m2 are as reported above in step 1a and PG is a protecting group, can be prepared following the synthetic Scheme 5 reported below:

Scheme 5

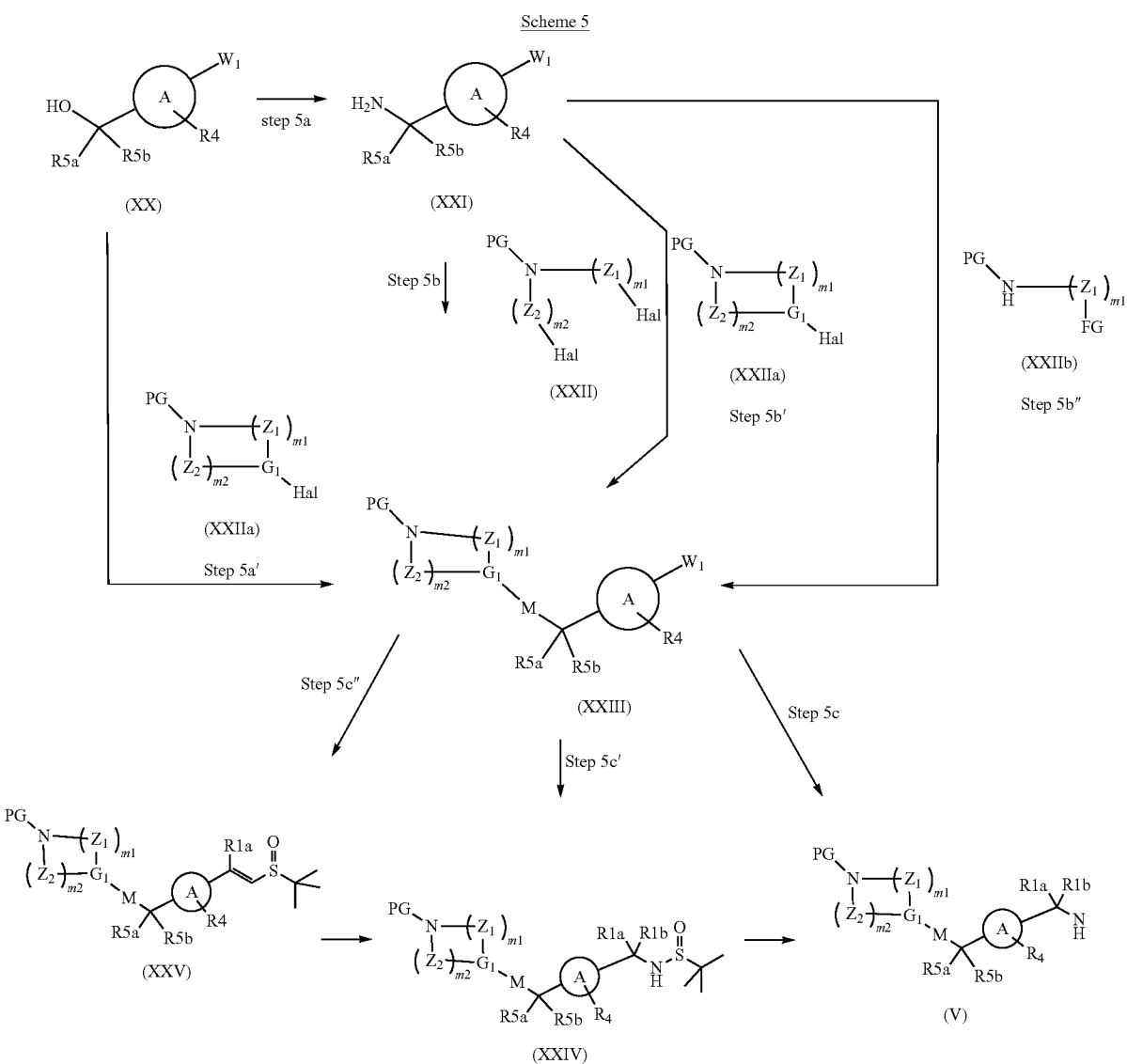

Step 5a) reacting a compound of formula (XX):

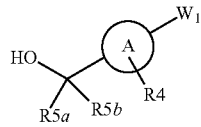
(XX)

wherein W1 is bromo, cyano, COR1a and A, R4, R5a, R5b and R1a are as defined above in step 1a, with ClCH$_2$CN under Ritter reaction condition, followed by deprotection of the amide intermediate with acid conditions, basic conditions or with thiourea, to obtain the compound of formula (XXI).

Step 5b) reacting amino intermediate of formula (XXI):

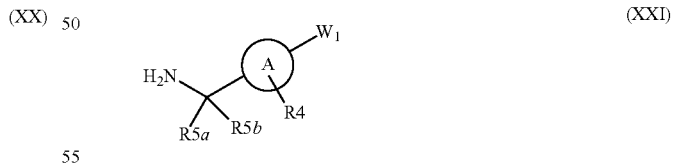

wherein W1, A, R4, R5a and R5b are as defined above in step 5a, with a compound of formula (XXII):

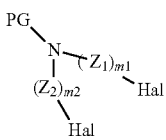

wherein Z1, Z2, m1 and m2 are as reported above in step 1a, PG is a protecting group and Hal is halogen, to yield a compound of formula (XXIII) wherein W1, A, R4, R5a, R5b, Z1, Z2, and PG are as defined above, m1 and m2 are 1, 2 or 3, G1 is N and M is a bond;

or,

Step 5b') reacting the amino intermediate of formula (XXI) with a heterocyclyl halide of formula (XXIIa)

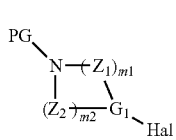
(XXIIa)

wherein Z1, Z2, m1, m2 and PG are as reported above in step 5b and Hal is halogen, then reacting the obtained intermediate by reductive amination with formaldehyde or with a suitable alkylaldehyde derivative or by acylation with suitable haloacyl derivative R8CO-hal or by reaction with alkylcholoroformate derivative R7OCO—Cl, wherein R7 and R8 are as defined in step 1a; to form a compound of formula (XXIII) wherein PG are as defined above, W1, A, R4, R5a, R5b, Z1, Z2, m1 and m2 are as defined in step 1a and, G1 is CH and M is NR6 wherein R6 is as defined in step 1a;

or,

Step 5b") reacting the amino intermediate of formula (XXI) with a protected aminoalkyl of formula (XXIIb)

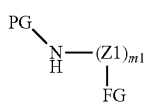
(XXIIb)

wherein Z1, m1, and PG are as reported above in step 5b and FG is a functional group selected from aldehyde (—CHO) or carboxylic acid (—COOH), to yield a compound of formula (XXIII) wherein m2 is 0, PG is as defined above, W1, A, R4, R5a, R5b, Z1 and m1 are as defined in step 1a, G1 is CH2 or CO and M is NH or NR6 wherein R6 is as defined in step 1a;

or,

Step 5a') reacting a compound of formula (XX):

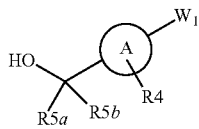
(XX)

wherein W1, A, R4, R5a and R5b are as defined above in step 5a, with a heterocyclyl halide of formula (XXIIa)

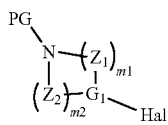
(XXIIa)

wherein Hal, Z1, Z2, m1, m2 and PG are as defined above in step 5b'; to form a compound of formula (XXIII) wherein W1, A, R4, R5a, R5b, are as defined above in step 5a; Z1, Z2, m1, m2 and PG are as defined above in step 5b'; G1 is CH and M is O;

then

Step 5c) reacting a compound of formula (XXIII):

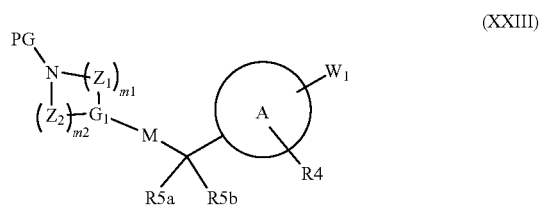
(XXIII)

obtained from step 5b or 5b' or 5b" or 5a', wherein W1 is cyano, and A, R4, R5a, R5b, M, G1, Z1, Z2, m1, m2 and PG are as reported above, with ethylmagnesium bromide and boron trifluoride diethyl eterate, to give the desired compound of formula (V) wherein A, R4, R5a, R5b, M, G1, Z1, Z2, m1, m2 and PG are as defined above and R1a and R1b are the same and are as defined in step 1a or R1a taken together with R1b is cyclopropyl;

or

Step 5c') reacting a compound of formula (XXIII):

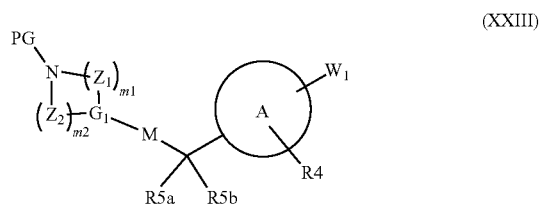
(XXIII)

obtained from step 5b or 5b' or 5b" or 5a', wherein W1 is COR1a wherein R1a and A, R4, R5a, R5b, M, G1, Z1, Z2, m1, m2, PG and R1a are as defined above in step 5b or 5b' or 5b" or 5a' with tert butanesulfinamide, to yield a compound of formula (XXIV) wherein R1b is hydrogen and R1a, A, R4, R5a, R5b, M, G1, Z1, Z2, m1, m2, PG and R1a are as defined above;

or

Step 5c") reacting a compound of formula (XXIII):

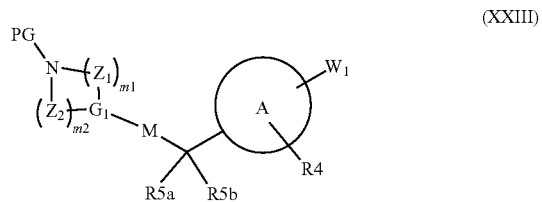
(XXIII)

obtained from step 5b or 5b' or 5b" or 5a', wherein W1 is COR1a and A, R4, R5a, R5b, M, G1, Z1, Z2, m1, m2, PG and R1a are as defined above in step 5b or 5b' or 5b" or 5a', with tert butanesulfinamide, to yield a compound of formula (XXV);

then

Step 5e) reacting the obtained compound of formula (XXV):

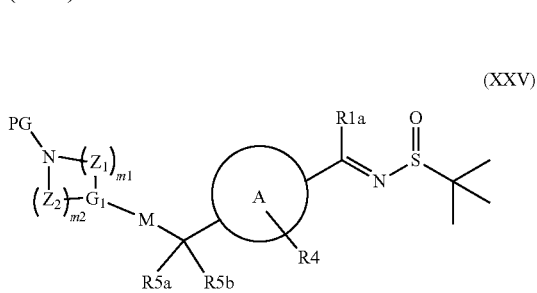

(XXV)

wherein R1a, A, R4, R5a, R5b, M, G1, Z1, Z2, m1, m2 and PG are as defined above in step 5b or 5b' or 5b" or 5a', with an alkyl Grignar reagent to give the desired compound of formula (XXIV);

finally

Step 5d) reacting the compound of formula (XXIV) obtained as described in step 5c' or 5e:

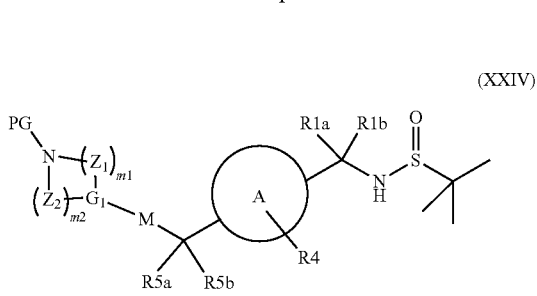

(XXIV)

wherein R1b, R1a, A, R4, R5a, R5b, M, G1, Z1, Z2, m1, m2, and PG are as defined above in step 5c' or 5e, with an acidic deprotecting reagent, or with iodine to give the desired compound of formula (V) wherein R1b, R1a, A, R4, R5a, R5b, M, G1, Z1, Z2, m1 and m2 are as defined in step 1a and PG is a protecting group;

Alternatively, a compound of formula (XXIII) can also be obtained by conversion of another compound of formula (XXIII) as described in the conversions below:

conv. F) a compound of formula (XXIII) wherein W1 is cyano is obtained by conversion of the corresponding compound of formula (XXIII), obtained from step 5b or 5b' or 5b" or 5a', wherein W1 is bromo, with a source of cyanide, following the condition known in the art for palladium-catalyzed cyanation of aryl halides;

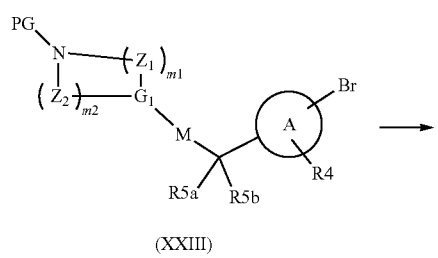

(XXIII)

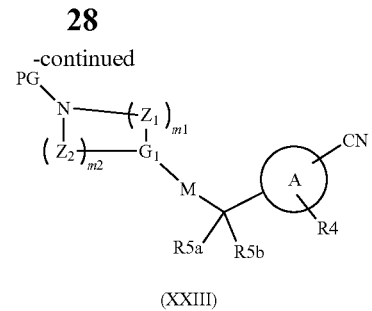

(XXIII)

conv. G) a compound of formula (XXIII) wherein W1 is COR1a wherein R1a is as defined in step1a is obtained by conversion of the compound of formula (XXIII), obtained from step 5b or 5b' or 5b" or 5a', wherein W1 is bromo, with a suitable enol ether organometal derivative followed by hydrolysis;

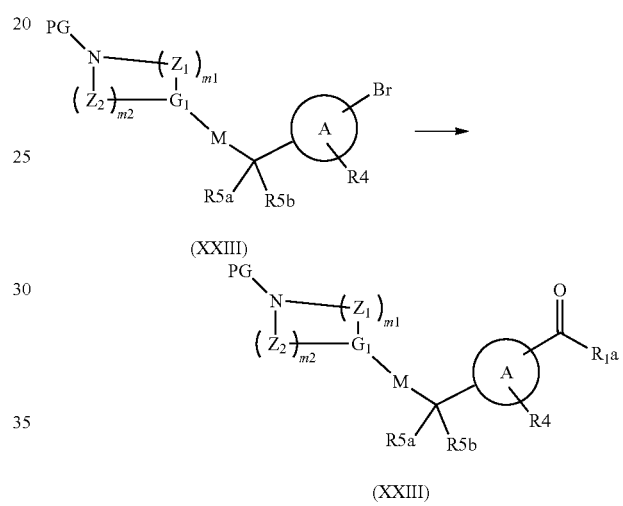

(XXIII)

A compound of formula (I) prepared according to scheme1, may be further converted into another compound of formula (I) following procedures well known to those skilled in the art.

conv. 1) converting a compound of formula (I):

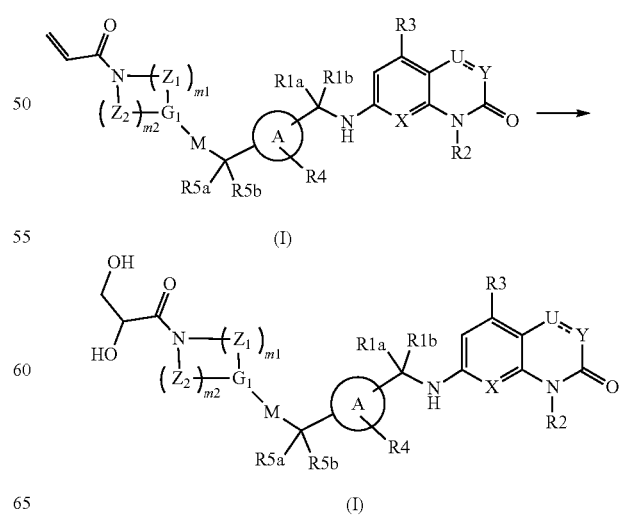

(I)

wherein E is an acrylamide group, into a compound wherein E is a dihydroxypropionic group.

According to step 1, reaction of a compound of the formula (II), with a compound of formula (III) wherein E is —COR11, can be accomplished in a variety of ways and operative conditions, which are widely known in the art for the preparation of amides. As an example, when an acyl chloride is used, the reaction is performed in a suitable solvent such as for instance, DCM. THF, 1,4-dioxane, ACN, or DMF or the like at a temperature ranging from about −10° C. to reflux and for a suitable time, for instance from about 30 minutes to about 96 hours. The reaction is carried out in the presence of an opportune proton scavenger such as triethylamine, N,N-diisopropylethylamine or pyridine; or when a carboxylic acid is involved, the reaction is carried out in the presence of a coupling agent such as, for instance, 2-(1H-benzotriazol-1-yl)-1,1,3,3-tetramethyluronium tetrafluoroborate (TBTU), (1-[Bis(dimethylamino)methylene]-1H-1,2,3-triazolo[4,5-b]pyridinium 3-oxide hexafluorophosphate (HATU), 1,3-dicyclohexylcarbodiimide, 1,3-diisopropylcarbodiimide, 1-(3-dimethylaminopropyl)-3-ethylcarbodiimide, N-cyclohexylcarbodiimide-N'-propylmethyl polystyrene or N-cyclohexylcarbodiimide-N'-methyl polystyrene, in a suitable solvent such as, for instance, dichloromethane, tetrahydrofuran, 1,4-dioxane, acetonitrile, N,N-dimethylformamide at a temperature ranging from about −10° C. to reflux and for a time from about 30 minutes to about 48 hours. The said reaction is optionally carried out in the presence of a suitable catalyst, for instance 4-dimethylaminopyridine, or in the presence of a further coupling agent such as N-hydroxybenzotriazole.

Alternatively, when E is an optionally substituted straight or branched (C1-C6)alkyl, (C2-C6)alkenyl, the alkylation of an intermediate of formula (II) can be carried out in the presence of a suitable base, such as $Na_2CO_3$, $K_2CO_3$, $C_{32}CO_3$, NaH, KH and the like, in a suitable solvent, such as DMF, DMA, ACN, acetone, THE and the like, at a temperature ranging from 0° C. to reflux.

According to step 2a, the replacement of a leaving group such as methylsulphone, methylsulphoxide or chloro or triflate from intermediate of formula (IV) with a group of formula (V) is carried out using an organic base such as DIPEA, optionally with CsF as reaction accelaretor, in a suitable solvent such as ACN, DMSO, 1,4-dioxane and at temperature ranging from room temperature to 90° C. under conventional heating or microwave irradiation, for a time ranging from 1 to 24 h;

alternatively, and more in particular when G is chloro and X is —CH the reaction can be accomplished under conditions well known by one skilled in the art. For example, the halide can be displaced by a Buchwald-Hartwig amination reaction with a suitable palladium source such as PEPPSI precatalyst and a base such as $C_{32}CO_3$, in a solvent such as toluene or ACN, at a temperature ranging from 60 to 110° C. under conventional heating or microwave irradiation, and for a time ranging from 1 to 24 h.

According to step 2b, deprotection of a compound of formula (VI) when the protecting group is a phenyl carbamate can be carried out under alkaline conditions by using for instance NaOH, KOH in a solvent such as ethanol, isopropanol, 1,4-dioxane at reflux for a time ranging from 6 to 18 h. Alternatively, when the protecting group is a Boc the reaction is performed under acidic conditions, such as for instance TFA, HCl and the like in a solvent such as DCM, 1,4-dioxane, or with a catalytic amount of CuCl in a suitable solvent such as MeOH, EtOH or a mixture EtOH/water at a temperature ranging from room temperature to reflux and for a time ranging from 1 to about 12 h. Alternatively, when the protecting group is a benzyl carbamate the reaction is performed with Pd/C in the presence of a source of hydrogen such as ammonium formate, cyclohexene, 1,3 cyclohexadiene, in a suitable solvent such as EtOH or isopropanol at reflux temperature for a time ranging from 1 to about 18 h.

According to step 3a, substitution of chlorine of compound of formula (VII) with an amine of formula $R_2$—$NH_2$ (VIII) can be carried out neat or in the presence of a suitable base, such as $Na_2CO_3$, $K_2CO_3$, $C_{32}CO_3$, TEA, DIPEA and the like, in a suitable solvent, such as DMF, DMA, ACN, DMSO and the like, at a temperature ranging from room temperature to reflux.

According to step 3b, of the process the reduction of an ester of formula (IX), to obtain a compound of formula (X) can be performed in different ways and experimental conditions well known in the art. A reducing agent such as lithium aluminium hydride or the like, in a suitable solvent such as THF at a temperature ranging from 0° C. to room temperature from 2 to about 24 h can be used. Preferably, the reaction is conveniently performed with lithium aluminium hydride in THF at room temperature.

According to step 3c of the process, the oxidation of an intermediate of formula (X) to aldehyde of formula (XI) can be carried out with Manganese(II)dioxide, Pyridinium chlorochromate, o-Iodoxybenzoic acid (IBX), Tetrapropylammonium perruthenate (TPAP), 4-Methylmorpholine N-oxide or Sodium hypochlorite/TEMPO/$Bu_4NHSO_4$, in a solvent such as DCM, ACN, THF, EtOAc, acetone or chloroform at room temperature.

According to step 3d, the Claisen-Schmidt condensation of an intermediate of formula (XI) with an intermediate of formula (XIV), can be carried out in the presence of a suitable base, such as $Na_2CO_3$, $K_2CO_3$, LiOH, $C_{32}CO_3$, Potassium t-butoxide, LiHMDS, KHMDS and the like, in a suitable solvent, such as THF, DMF, DMA, and the like, at a temperature ranging from −50° C. to reflux for a time ranging from 1 to 24 h in classical thermal conditions or in a microwave apparatus.

According to step 3e, the oxidation of methylthio group of an intermediate of formula (XII) to yield a compound of formula (IV) wherein G is $MeS(O)_2$— or MeS(O), can be carried out in the presence of an oxidant agent well-known to those skilled in the art, such as for instance, oxone or m-chloroperbenzoic acid and the like, in a suitable solvent such as DCM, or at room temperature for a time ranging from 1 to 16 h.

According to step 3f, cyclization of an intermediate of formula (X) under carbamoylation conditions to the oxazine-2-one can be accomplished by using triphosgene, carbonyldiimidazole, or phosgene in the presence of a base such as DIPEA or TEA at a temperature of about −30° C. to room temperature for a time ranging from 1 to 6 h.

According to step 3g, the alkylation of an intermediate of formula (XIII) with an intermediate of formula (XV), wherein Lg is bromine, iodine, —OMs or —OTs, can be carried out in the presence of a suitable base, such as $Na_2CO_3$, $K_2CO_3$, $C_{32}CO_3$, NaH, KH and the like, in a suitable solvent such as DMF, DMA, ACN, acetone, THF and the like, at a temperature ranging from 0° C. to reflux. When an intermediate of formula (XV), wherein Lg is hydroxy is used, the reaction is preferentially carried out under Mitsunobu alkylation conditions in the presence of a suitable reagent such as, for instance, diethylazodicarboxylate (DEAD), diisopropylazodicarboxylate (DIAD), ditertbutylazodicarboxylate (DBAD), 1,1'-(azodicarbonyl)dipiperidine (ADDP), and a phosphine reagent such as, for instance, trimethylphosphine, tritertbutylphosphine, triphenylphosphine and the like, in a suitable solvent, such as THF, DMF, DCM, toluene, and the like, at a temperature ranging from 0° C. to 65° C.

According to step 4a, substitution of chlorine of compound of formula (XVI) with an amine of formula (VIII) can be carried out as described above in step 3a.

According to step 4b, of the process the reduction of an ester of formula (XVII), to obtain a compound of formula (XVIII) can be performed as described above in step 3b.

According to step 4c of the process, the oxidation of an intermediate of formula (XVIII) to aldehyde of formula (XIX) can be carried out as described above in step 3c.

According to Step 4d, the compound of formula (XIX) is cyclized under Claisen-Schmidt condensation condition reported in step 3d so to afford the compound of formula (IV) wherein G is chloro and X is nitrogen or —CH—.

According to Step 4e, the compound of formula (XVIII) is cyclized under carbamoylation to the oxazine-2-one condition reported in step 3f so to afford the compound of formula (IV) wherein G is chloro and X is nitrogen or —CH—, U is CH2, Y is O.

According to conv. A of the process an heteroaryl chloride of formula (XII) can be reacted in different ways and experimental conditions known in the art as nucleophylic aromatic substitution with a source of cyanide such as sodium cyanide, potassium cyanide or alternatively by using ZnCN, CuCN or potassium hexacyanoferrate(II) as a source of cyanide in the presence of palladium(II) acetate as catalyst, sodium carbonate, potassium carbonate or cesium carbonate as base, in a suitable solvent such as DMF, N-methylpyrrolidone, or DMA, from 80° C. to reflux, for a time ranging from 4 to about 24 hours (J. Org. Chem. 2005, 70, 1508-1510, Org. Lett., 2011, 13 (4), pp 648-651, Org Lett. 2015 17(2), pp 202-205).

According to conv. B of the process a heteroaryl chloride of formula (XII) can be reacted in different ways and experimental conditions with amine PG-NH2 in acetonitrile at reflux for a time ranging from 1 to about 24 hours.

According to conv. C of the process an heteroaryl chloride of formula (XII) can be reacted in different ways and experimental conditions with amines of formula NR12aR12b in suitable solvent such as acetonitrile, DMF, DMA from rt to reflux for a time ranging from 2 to about 24 hours.

According to conv. D of the process an heteroaryl chloride of formula (XII) can be reacted in different ways and experimental conditions with alcohol of formula OR13 in suitable solvent such as acetonitrile, THF, in the presence of potassium carbonate, cesium carbonate, from rt to reflux for a time ranging from 2 to about 24 hours.

According to conv. E of the process a heteroaryl nitrile of formula (XII) can be reacted with acetamide in the presence of 1,4-dioxanne, with addition of Pd(OAc)$_2$, at reflux for a time ranging from 4 to about 24 h.

According to conv. A1 of the process conversion of compound of formula (IV) into the corresponding triflate derivative of formula (IV), can be accomplished in different ways, and experimental conditions known in the art. The compound of formula (IV) is reacted at first with NaOH, KOH or the like in a suitable solvent such as water, acetonitrile, dioxane, DMSO from room temperature to 90° C. for a time ranging from 1 to about 4 h. The obtained hydroxyl derivative is then reacted with triflic anhydride or N-phenyltriflimide in the presence of a base such as DIPEA, TEA, 2,6-lutidine, in a solvent such as DCM, THF at a temperature of about −10 to room temperature for a time ranging from 1 to 6 h.

According to step 5a of the process for transformation of compound of formula (XX) into a derivative of formula (XXI), can be accomplished under acid-induced nucleophilic addition of a nitrile, followed by hydrolysis to the corresponding amide. The reaction is well known as Ritter reaction and is performed with H$_2$SO$_4$ and chloroacetonitrile at temperature ranging from 0° C. to 20° C. for 6 to 12 h. The so obtained amide is reacted further with thiourea in ethanol and acetic acid at 60° C. for 6 to 12 h to yield the derivative of formula (XXI).

According to step 5b, the reaction of a compound of formula (XXI) with a suitable substituted alkyl dihalide of formula (XXII) to give the corresponding derivative of formula (XXIII) is accomplished using a solvent such as DIPEA with addition of NaI, at reflux for 24 to 72 h.

According to step 5a' the reaction of a compound of formula (XX) with a suitable substituted heterocyclyl halide of formula (XXIIa) is accomplished by using a suitable base such as NaH, K$_2$CO$_3$ C$_{32}$CO$_3$, LiHMDS, in a suitable solvent such as DMF, acetonitrile, THF, DIPEA with addition of NaI, at temperatures ranging from rt to reflux and for a time ranging from 4 to about 24 h, to give the corresponding derivative of formula (XXIII).

According to step 5b' the reaction of a compound of formula (XXI) with a suitable substituted heterocyclyl halide of formula (XXIIa) is accomplished by using a suitable base such as NaH, K$_2$CO$_3$ C$_{32}$CO$_3$, LiHMDS, in a suitable solvent such as DMF, acetonitrile, THF, DIPEA with addition of NaI, at temperatures ranging from rt to reflux and for a time ranging from 4 to about 24 h.

Alternatively, the reaction of a compound of formula (XXI) with a suitable heterocyclylketone of formula (XXIIa) is accomplished in the presence of tetraethoxytitanium or tetraisopropoxytitanium as suitable catalyst in a suitable solvent such as THF, toluene, 1,4-dioxane at temperatures ranging from 70° C. to reflux for a time ranging from 16 to 24 h. The obtained intermediate is treated directly with a reducing agent such as NaCNBH$_3$ (sodium cyanoborohydride) at a temperatures ranging from 20° C. to 70° C., for a time ranging from 1 to 4 hours to yield an intermediate compound then is reacted in reductive amination conditions with formaldehyde or an alkyl aldehyde, in the presence of a reductive agent such as, NaCNBH$_3$, NaBH(OAc)$_3$ and the like, in a solvent such as MeOH, EtOH, 2,2,2-trifluoroethanol and the like, at a temperature ranging from rt to 40° C. and for a time ranging from 1 to about 24 h. Said reducing reaction can be optionally carried out in the presence of a suitable catalyst such as AcOH, TFA and the like or is reacted with suitable haloacyl derivative in a solvent such as DCM, THF, DMF and the like, optionally in the presence of a base, at a temperature ranging from rt to 40° C. and for a time ranging from 1 to about 24 h or is reacted with alkylchoroformate derivative in a solvent such as DCM, THF, DMF, Dioxane and the like, optionally in the presence of a base, at a temperature ranging from rt to 40° C. and for a time ranging from 1 to about 24 h, to yield the compound of formula (XXIII).

According to step 5b'' the reaction of a compound of formula (XXI) with a protected aminoalkyl aldehyde of formula (XXIIb) is accomplished by using a reducing agent such as NaCNBH$_3$ (sodium cyanoborohydride), NaBH (OAc)$_3$ (sodium triacetoxyborohydride), in a solvent such as DCM, THF and the like at a temperatures ranging from 20° C. to 50° C., for a time ranging from 1 to 4 hours. Said reducing reaction can be optionally carried out in the presence of a suitable catalyst such as AcOH, TFA to yield an intermediate compound that is reacted further with trifluoroacetic anhydride in the presence of pyridine and the like, at room temperature and for a time ranging from 1 to about 24 h, to yield the compound of formula (XXIII).

Alternatively, the reaction of a compound of the formula (XXI), with a protected aminoalkyl carboxylic acid of formula (XXIIb) wherein FG is —COOH, can be accomplished in a variety of ways and operative conditions, which are widely known in the art for the preparation of amides. As an example, the reaction is carried out in the presence of a coupling agent such as, for instance, 2-(1H-benzotriazol-1-yl)-1,1,3,3-tetramethyluronium tetrafluoroborate (TBTU), (1-[Bis(dimethylamino)methylene]-1H-1,2,3-triazolo[4,5-b]pyridinium 3-oxide hexafluorophosphate (HATU), T3P (1-propanephosphonic anhydride), in a suitable solvent such as, for instance, dichloromethane, tetrahydrofuran, 1,4-dioxane, acetonitrile, N,N-dimethylformamide, ethyl acetate at a temperature ranging from about −10° C. to reflux and for a time from about 30 minutes to about 48 hours.

According to step 5c a compound of formula (XXIII) is submitted to the Kulinkovich-Szymoniak reaction that allows the preparation of primary cyclopropylamines by the reaction of Ethyl Grignard reagents in the presence of a stoichiometric amount of titanium(IV) isopropoxide, and exposure to a boron trifluoride diethyletherate in a subsequent step. The reaction is performed in diethylether, methyl tert-butyl ether (MTBE) at a temperature ranging from −70° C. to 0° C., for a time ranging from 1 to 4 hours, to give the corresponding derivative of formula (V).

According to step 5c' a compound of formula (XXIII) is reacted with tert-butanesulfinamide in the presence of tetraethoxytitanium or tetraisopropoxytitanium as suitable catalyst in a suitable solvent such as THF, toluene, 1,4-dioxane at temperatures ranging from 50° C. to reflux for a time ranging from 4 to 16 h. The obtained intermediate is treated directly with a reducing agent such as $NaBH_4$ (sodium borohydride), L-selectride at a temperature ranging from −70° C. to 0° C., for a time ranging from 1 to 4 hours to yield the compound of formula (XXIV).

According to step 5c'' a compound of formula (XXIII) is reacted with tert-butanesulfinamide in the presence of tetraethoxytitanium or tetraisopropoxytitanium as suitable catalyst in a suitable solvent such as THF, toluene, 1,4-dioxane at temperatures ranging from 50° C. to reflux for a time ranging from 4 to 16 h.

According to step 5e a compound of formula (XXV) is reacted with methyl or ethyl Grignard reagent in diethyl ether or THF at temperature ranging from 0° C. to room temperature for 1 to 4 h, to give a compound of formula (XXIV).

According to step 5d a compound of formula (XXIV) is reacted with a strong acid such as for instance hydrochloric acid in 1,4-dioxane or in methanol at room temperature for a time ranging from 1 to 24 hours to yield a compound of formula (V).

Alternatively, a compound of formula (XXIV) is reacted with iodine in a mixture of solvents such as THF and $H_2O$ at temperature ranging from room temperature to 80° C. for a time ranging from 1 to 24 hours to yield a compound of formula (V).

Examples of possible conversions are reported below:

According to conv. F a compound of formula (XXIII) is reacted with a suitable source of cyanide such as ZnCN, CuCN, $K_3[Fe(CN)_6]$ or the like in the presence of a suitable palladium catalyst such as Pd $(OAc)_2$, $PdCl_2(PPh_3)_3$, $Pd(dppf)Cl_2$ and the like. The reaction is carried out in the presence of a suitable base, such as sodium carbonate, potassium carbonate or cesium carbonate and the like, in a solvent such as THF, Dioxane, DMF, Acetonitrile, at a temperatures ranging from 80° C. to reflux for a time ranging from 4 to about 24 hours.

According to conv. G a compound of formula (XXIII) is cross-coupled with a suitable enol ether organometal derivative, such as 1-ethoxyvinyltri-n-butyltin in the presence of a suitable palladium catalyst such as $PdCl_2(PPh_3)_3$, $Pd(dppf)Cl_2$, and the like. The reaction is carried out in the presence of a suitable base, such as TEA, DIPEA and the like, at a temperature ranging from r.t. to reflux for a time ranging from 1 to about 24 hours. The so obtained intermediate is further hydrolyzed with aqueous HCl 6N at room temperature for a time ranging from 1 to about 24 h to yield the compound of formula (V).

According to conv. 1) the acrylamide of formula (I) is reacted with Osmium tetraoxide in pyridine and tert-butanol (as reported in WO211046964) at room temperature for a time ranging from 8 to 24 hours.

From all of the above it is clear to the skilled person that any compound of formula (I) bearing a functional group which can be further derivatized to another functional group, by working according to methods well known in the art thus leading to other compounds of the formula (I), is intended to be comprised within the scope of the present invention.

When preparing the compounds of general formula (I) according to any of the above variants of the process, optional functional groups within the starting materials, the reagents or the intermediates thereof, and which could give rise to unwanted side reactions, need to be properly protected according to conventional techniques (see e.g., Green, Theodora W. and Wuts, Peter G. M.—Protective Groups in Organic Synthesis, Fourth Edition, John Wiley & Sons Inc., New York (N.Y.), 2012). Likewise, the conversion of these latter into the free deprotected compounds may be carried out according to known procedures.

The compounds of every general formula can be further transformed in other compounds of the same general formula according to methods well known in the literature, as reported in the experimental section.

According to any variant of the process for preparing the compounds of the formula (I), the starting materials and any other reactants are known or easily prepared according to known methods.

The intermediates of formula (XI) wherein R3 is chloro is prepared as reported in WO2016204429A1.

The compounds of the formula (XXI) can be also prepared as described in Tetrahedron, Vol. 72, 2016, 1941-1953.

The compounds of the formula (XX) can be prepared as described in WO2014086316.

The compounds of the formula (XXII) can be prepared as described in WO2009065622A1.

The compounds of the formula (III, VII, VIII, XII, XIV, XV, XVI, XXIIa, XXIIb) are either commercially available or can be prepared with known methods.

The final compounds may be isolated and purified using conventional procedures, for example chromatography and/or crystallization and salt formation.

The compounds of general formula (I) as defined above can be converted into pharmaceutically acceptable salts. The compounds of general formula (I) as defined above, or the pharmaceutically acceptable salts thereof, can be subsequently formulated with a pharmaceutically acceptable carrier or diluent to provide a pharmaceutical composition.

The synthesis of a compound of general formula (I), according to the synthetic processes described above, can be conducted in a stepwise manner, whereby each intermediate is isolated and purified if needed by standard purification techniques, like, for example, column chromatography, before carrying out the subsequent reaction. Alternatively, two or more steps of the synthetic sequence can be carried out in a so-called "one-pot" procedure, as known in the art, whereby only the compound resultant from the two or more steps is isolated and purified.

In cases where a compound of general formula (I) contains one or more asymmetric centers, said compound can be separated into the single stereoisomers by procedures known to those skilled in the art. Such procedures comprise standard chromatographic techniques, including chromatography using a chiral stationary phase, or crystallization.

General methods for separation of compounds containing one or more asymmetric centers are reported, for instance, in Jacques, Jean; Collet, André; Wilen, Samuel H., Enantiomers, Racemates, and Resolutions, John Wiley & Sons Inc., New York (N.Y.), 1981.

The present invention also provides a method of treating a disease caused by and/or associated with increased 2-hydroxyglutarate level, which comprises administering to a mammal, preferably a human, in need thereof, an effective amount of a compound of formula (I) as defined above.

Furthermore the present invention provides a compound of formula (I) or a pharmaceutically acceptable salt thereof, as defined above, for use in a method of treating a disease caused by and/or associated with increased 2-hydroxyglutarate level, which comprises administering to a mammal, preferably a human, in need thereof, an effective amount of a compound of formula (I) as defined above.

Furthermore the present invention provides a pharmaceutical composition comprising a compound of formula (I) or a pharmaceutically acceptable salt thereof, for treating a disease caused by and/or associated with increased 2-hydroxyglutarate level, which comprises administering to a mammal, preferably a human, in need thereof, an effective amount of a compound of formula (I) as defined above.

In yet another aspect the invention provides the use or a pharmaceutically acceptable salt thereof, as defined above, in the manufacture of a medicament for treating a disease caused by and/or associated with increased 2-hydroxyglutarate level, which comprises administering to a mammal, preferably a human, in need thereof, an effective amount of a compound of formula (I) as defined above.

Additionally, the present invention provides a method of treating a disease caused by and/or associated with mutated IDH enzymes or with IDH wt over-functions, which comprises administering to a mammal, preferably a human, in need thereof, an effective amount of a compound of formula (I) as defined above.

Moreover the invention provides a compound of formula (I) or a pharmaceutically acceptable salt thereof, as defined above, for use in a method of treating a disease caused by and/or associated with mutated IDH enzymes or with IDH wt over-functions, which comprises administering to a mammal, preferably a human, in need thereof, an effective amount of a compound of formula (I) as defined above.

Moreover the invention provides a pharmaceutical composition comprising a compound of formula (I) or a pharmaceutically acceptable salt thereof, for treating a disease caused by and/or associated with mutated IDH enzymes or with IDH wt over-functions, which comprises administering to a mammal, preferably a human, in need thereof, an effective amount of a compound of formula (I) as defined above.

In yet another aspect the invention provides the use or a pharmaceutically acceptable salt thereof, as defined above, in the manufacture of a medicament for treating a disease caused by and/or associated with mutated IDH enzymes or with IDH wt over-functions, which comprises administering to a mammal, preferably a human, in need thereof, an effective amount of a compound of formula (I) as defined above.

Preferably the disease is selected from the group consisting of cancer, cell proliferative disorders, immune-related disorders. More preferably, the disease is cancer.

According to a most preferred embodiment of the present invention the cancer is selected from the group consisting of: carcinomas, such as bladder, breast, kidney, liver, colon, lung, including small cell lung cancer, esophagus, gallbladder, ovary, pancreas, stomach, cervix, prostate, and skin, including squamous cell carcinoma; hematopoietic tumors of lymphoid lineage including leukemia, acute lymphocitic leukemia, acute lymphoblastic leukemia, B-cell lymphoma, angioimmunoblastic T-cell lymphoma, Hodgkin's lymphoma, non-Hodgkin's lymphoma, hairy cell lymphoma and Burkitt's lymphoma; hematopoietic tumors of myeloid lineage, including acute and chronic myelogenous leukemias, myelodysplastic syndrome and promyelocytic leukemia; tumors of mesenchymal origin, including fibrosarcoma and rhabdomyosarcoma; tumors of the central and peripheral nervous system, including glioma, glioblastoma, glioblastoma multiforme, astrocytoma, oligodendroglioma, paraglioma, neuroblastoma, and schwannomas; and other tumors, including melanoma, seminoma, teratocarcinoma, osteosarcoma, xeroderma pigmentosum, keratoxanthoma, thyroid cancers, such as papillary thyroid carcinoma and medullary thyroid carcinoma, Kaposi's sarcoma, chondrosarcoma, and cholangiocarcinoma.

Other preferred diseases caused by and/or associated with mutated IDH enzymes or IDH wt over-functions, are cellular proliferation disorders such as, for example, benign prostate hyperplasia, familial adenomatosis, polyposis, neurofibromatosis, psoriasis, vascular smooth cell proliferation associated with atherosclerosis, pulmonary fibrosis, arthritis, glomerulonephritis and post-surgical stenosis and restenosis.

Further preferred diseases caused by and/or associated with mutated IDH enzymes with increased 2-hydroxyglutarate level are for example, Ollier disease or Mafucci syndrome.

Additional preferred diseases caused by and/or associated with mutated IDH enzymes or IDH wt over-functions, are immune-related disorders including but not limited to: transplant rejection, skin disorders like psoriasis, allergies, asthma and autoimmune-mediated diseases such as rheumatoid arthritis (RA), systemic lupus erythematosus (SLE), Crohn's disease and amyotrophic lateral sclerosis. Optionally, the methods of the present invention further comprise treating a mammal in need thereof in combination with radiation therapy or chemotherapy regimen.

Moreover, the present invention provides a compound of formula (I), or a pharmaceutically acceptable salt thereof, as defined above, for use in a method of treating a mammal in need thereof in combination with radiation therapy or in combination with a chemotherapy regimen.

In one embodiment the chemotherapy regimen comprises at least one cytostatic or cytotoxic agent.

Cytostatic or cytotoxic agents include, but are not limited to, antibiotic-type agents, alkylating agents, antimetabolite agents, hormonal agents, immunological agents, interferon-type agents, cyclooxygenase inhibitors (e.g. COX-2 inhibitors), matrixmetalloprotease inhibitors, telomerase inhibitors, tyrosine kinase inhibitors, anti-growth factor receptor agents, anti-HER agents, anti-EGFR agents, anti-angiogenesis agents (e.g. angiogenesis inhibitors), farnesyl transferase inhibitors, ras-raf signal transduction pathway inhibitors, cell cycle inhibitors, other cdks inhibitors, tubulin binding agents, topoisomerase I inhibitors, topoisomerase II inhibitors, aromatase inhibitors, inhibitors of kinesins, therapeutic monoclonal antibodies, inhibitors of mTOR, histone deacetylase inhibitors, inhibitors of hypoxic response, PD-1 antagonists, or antigen binding fragment thereof, which specifically binds to PD-1 or PD-L1.

If formulated as a fixed dose, such combination products employ the compounds of this invention within the dosage range described below and the other pharmaceutically active agent within the approved dosage range.

Compounds of formula (I) may be used sequentially with known anticancer agents when a combination formulation is inappropriate.

The compounds of formula (I) of the present invention, suitable for administration to a mammal, e.g. to humans, can be administered by the usual routes and the dosage level depends upon the age, weight, and conditions of the patient and administration route.

For example, a suitable dosage adopted for oral administration of a compound of formula (I) may range from about 10 to about 1000 mg per dose, from 1 to 5 times daily. The compounds of the invention can be administered in a variety of dosage forms, e.g. orally, in the form of tablets, capsules, sugar or film coated tablets, liquid solutions or suspensions; rectally in the form of suppositories; parenterally, e.g. intramuscularly, or through intravenous and/or intrathecal and/or intraspinal injection or infusion.

The pharmaceutical compositions containing the compounds of the invention are usually prepared following conventional methods and are administered in a suitable pharmaceutical form.

For example, the solid oral forms may contain, together with the active compound, diluents, e.g. lactose, dextrose, saccharose, sucrose, cellulose, corn starch or potato starch; lubricants, e.g. silica, talc, stearic acid, magnesium or calcium stearate, and/or polyethylene glycols; binding agents, e.g. starches, arabic gum, gelatine methylcellulose, carboxymethylcellulose or polyvinyl pyrrolidone; disintegrating agents, e.g. starch, alginic acid, alginates or sodium starch glycolate; effervescing mixtures; dyestuffs; sweeteners; wetting agents, such as lecithin, polysorbates, laurylsulphates; and, in general, non-toxic and pharmacologically inactive substances used in pharmaceutical formulations. These pharmaceutical preparations may be manufactured in known manner, for example, by means of mixing, granulating, tabletting, sugar-coating, or film-coating processes.

The liquid dispersions for oral administration may be, e.g. syrups, emulsions and suspensions.

As an example the syrups may contain, as a carrier, saccharose or saccharose with glycerine and/or mannitol and sorbitol.

The suspensions and the emulsions may contain, as examples of carriers, natural gum, agar, sodium alginate, pectin, methylcellulose, carboxymethylcellulose or polyvinyl alcohol.

The suspension or solutions for intramuscular injections may contain, together with the active compound, a pharmaceutically acceptable carrier, e.g. sterile water, olive oil, ethyl oleate, glycols, e.g. propylene glycol and, if desired, a suitable amount of lidocaine hydrochloride.

The solutions for intravenous injections or infusions may contain, as a carrier, sterile water or preferably they may be in the form of sterile, aqueous, isotonic, saline solutions or they may contain propylene glycol as a carrier.

The suppositories may contain, together with the active compound, a pharmaceutically acceptable carrier, e.g. cocoa butter, polyethylene glycol, a polyoxyethylene sorbitan fatty acid ester surfactant or lecithin.

The present invention also provides a pharmaceutical composition comprising a therapeutically effective amount of a compound of formula (I) or a pharmaceutically acceptable salt thereof, as defined above, and at least one pharmaceutically acceptable excipient, carrier or diluent.

The present invention further provides a pharmaceutical composition of a compound of formula (I) further comprising one or more chemotherapeutic agents. Chemotherapeutic agents included, but are not limited to, cytostatic or cytotoxic agents, antibiotic-type agents, alkylating agents, antimetabolite agents, hormonal agents, immunological agents, interferon-type agents, cyclooxygenase inhibitors (e.g. COX-2 inhibitors), matrixmetalloprotease inhibitors, telomerase inhibitors, tyrosine kinase inhibitors, anti-growth factor receptor agents, anti-HER agents, anti-EGFR agents, anti-angiogenesis agents (e.g. angiogenesis inhibitors), farnesyl transferase inhibitors, ras-raf signal transduction pathway inhibitors, cell cycle inhibitors, other cdks inhibitors, tubulin binding agents, topoisomerase I inhibitors, topoisomerase inhibitors, aromatase inhibitors, inhibitors of kinesins, therapeutic monoclonal antibodies, inhibitors of mTOR, histone deacetylase inhibitors, inhibitors of hypoxic response, PD-1 antagonists, or antigen binding fragment thereof, which specifically binds to PD-1 or PD-L1 and the like.

Moreover, the invention provides an in vitro method for inhibiting mutated IDH protein activity which comprises contacting the said protein with an effective amount of a compound of formula (I) as defined above.

Additionally, the invention provides a product comprising a compound of formula (I) or a pharmaceutically acceptable salt thereof, as defined above, and one or more chemotherapeutic agents, as a combined preparation for simultaneous, separate or sequential use in anticancer therapy.

In yet another aspect the invention provides a compound of formula (I) or a pharmaceutically acceptable salt thereof, as defined above, for use as a medicament.

Finally, the invention provides the use of a compound of formula (I) or a pharmaceutically acceptable salt thereof, as defined above, in the manufacture of a medicament with anticancer activity.

Experimental Part

The short forms and abbreviations used herein have the following meaning:

| | |
|---|---|
| 2-HG | 2-Hydroxy glutaric acid |
| ACN | Acetonitrile |
| AcOH | acetic acid |
| Bn | Benzyl |
| BSA | bovine serum albumin |
| $Cs_2CO_3$ | caesium carbonate |
| DCM | Dichloromethane |
| DIPEA | N,N-diisopropyl-N-ethylamine |
| DMA | N,N-dimethylacetamide |
| DMF | N,N-dimethylformamide |
| DMSO | Dimethylsulfoxide |
| DTT | Dithiothreitol |

| | |
|---|---|
| ESI | electrospray ionization |
| EtOAc | ethyl acetate |
| EtOH | Ethanol |
| g | Gram |
| h | hour(s) |
| hex | Hexane |
| Hz | Hertz |
| $K_2CO_3$ | potassium carbonate |
| $K_3PO_4$ | potassium phosphate |
| KH | potassium hydride |
| KOH | potassium hydroxide |
| LC | Liquid chromatography |
| LiHMS | lithium bis(trimethylsilyl)amide |
| LiOH | lithium hydroxide |
| M | Molar |
| m/z | mass to charge ratio |
| MeOH | methanol |
| mg | milligram |
| $MgCl_2$ | Magnesium chloride |
| MHz | Mega-Hertz |
| min | minutes |
| mL | milliliter |
| mL | microliter |
| mM | millimolar |
| μM | micromolar |
| μm | micron |
| mm | millimetres |
| mmol | millimole |
| MS | Mass spectroscopy |
| $Na_2CO_3$ | sodium carbonate |
| $Na_2SO_4$ | sodium sulphate |
| NADPH | Nicotinamide adenine dinucleotide phosphate |
| NaH | sodium hydride |
| NaOH | sodium hydroxide |
| NMR | Nuclear magnetic resonance |
| —OMs | mesylate |
| —OTrif | triflate |
| —OTs | tosylate |
| RP-HPLC | reverse phase high performance liquid chromatography |
| rt | room temperature |
| Rt | retention time |
| TBTU | N,N,N',N'-tetramethyl-O-(benzotriazol-1-yl)uronium-tetrafluoroborate |
| TEA | triethylamine |
| TFA | trifluoroacetic acid |
| THF | tetrahydrofuran |
| T3P | Propylphosphonic anhydride |

Biochemical Assay

In Vitro Assays for IDH1m (R132H or R132C) and $IDH2^{R172K}$ Inhibitors

IDH mutated enzyme activity converting alpha-ketoglutarate to 2-hydroxyglutaric acid is measured using a NADPH depletion assay. In the assay the remaining cofactor is measured at the end of the reaction with the addition of a catalytic excess of diaphorase and resazurin, to generate a fluorescent signal in proportion to the amount of NADPH remaining. IDH1 WT enzyme as well as mutated isoforms $IDH1^{R132H}$, $IDH1^{R132C}$, and $IDH2^{R172K}$ enzymes are commercially available proteins (see e.g. Sino Biological, Abcam, Active Motif or Creative BioMart).

$IDH1^{R132H}$ homodimer enzyme are diluted to 8 nM, in 10 μL of Assay Buffer (150 mM NaCl, 50 mM Tris-HCl pH 7.6, 10 mM $MgCl_2$, 0.001% Triton X-100, 4 mM β-mercaptoethanol); 0.2 μL of test compound, previously serially diluted 1 to 3, >10 experimental points from 1 mM in DMSO, is added and the mixture is incubated for 15 minutes at room temperature. The reaction is started with the addition of 10 μL of Substrate Mix (12 μM NADPH, 3.4 mM alpha-ketoglutarate in Assay Buffer) and the mixture is incubated for 60 minutes at room temperature. The reaction is terminated with the addition of 5 μl of Detection Buffer (100 μg/mL diaphorase, 30 μM resazurin, in IX Assay Buffer), and is incubated for 15 minutes before reading on a ViewLux as platereader at Ex544/Em590.

Compounds are assayed for their activity against $IDH1^{R132C}$ following the same assay as above with the following modifications: $IDH1^{R132C}$ and alpha-ketoglutarate final concentrations in the Assay Buffer is 2 nM and 0.14 mM, respectively.

Compounds are assayed for their activity against $IDH2^{R172K}$ following the same assay as above with the following modifications: $IDH2^{R172K}$ and alpha-ketoglutarate final concentrations in the Assay Buffer is 16 nM and 0.55 mM, respectively.

Enzymatic Assay for IDH1 Wild-Type (Wt)

IDH1WT enzymatic activity converting isocitric acid to alpha-ketoglutarate is measured using a NADPH forming assay. In the assay the forming cofactor is measured in continuous with the addition of a catalytic excess of diaphorase and resazurin, to generate a fluorescent signal in proportion to the amount of NADPH forming.

Compounds were preincubated with the enzyme, then the reaction was started by the addition of NADP+, isocitrate, diaphorase and a corresponding substrate, resazurin. Diaphorase reduces resazurin to the highly fluorescent resorufin with the concomitant oxidation of NADPH to NADP. Specifically, 0.2 μL of test compound, previously serially diluted 1 to 3, >10 experimental points from 1 mM in DMSO, was added to 0.016 nM IDH1WT enzyme in 10 μL of Assay Buffer (150 mM NaCl, 50 mM Tris-HCl pH 7.6, 10 mM $MgCl2$, 0.001% Triton X-100, 4 mM β-mercaptoethanol); the mixture is incubated for 15 minutes at room temperature. The reaction is started with the addition of 10 μL of Substrate Mix (400 μM $NADP^+$, 40 μM iso-citrate, 5 ugr/mL Diaphorase and 7 μM resazurin in Assay Buffer), the mixture is incubated at room temperature and the reaction is reading on a ViewLux as platereader at Ex544/Em590 in continuous.

Biochemical Activity

Biochemical potencies on mutants $IDH1^{R132H}$, $IDH1^{R132C}$ and $IDH2^{R172K}$ of representative compounds, which were determined according to the above described assays, are reported in Table 1 as $IC_{50}$ values (μM), while biochemical potencies on IDH1 wild type enzyme, determined according to the above described assays, are reported in Table 2 as $IC_{50}$ values (μM).

TABLE 1

| Cpd_number | $IDH1^{R132H}$ IC50(μM) | $IDH1^{R132C}$ IC50(μM) | $IDH2^{R172K}$ IC50(μM) |
|---|---|---|---|
| 1 | 0.0035 | 0.0033 | 0.11105 |
| 2 | | 0.0120 | |
| 3 | | 0.0272 | |
| 4 | 0.0038 | 0.0017 | 0.0228 |
| 5 | | 1.4677 | |
| 6 | | 0.0059 | |
| 7 | | 0.0402 | |
| 8 | | 1.3243 | |
| 9 | | 0.1249 | |
| 11 | 0.0064 | 0.0048 | 0.2914 |
| 12 | | 0.1174 | |
| 13 | | 0.0538 | |
| 14 | | 0.0044 | |
| 15 | | 0.0247 | |
| 16 | | 0.0013 | |
| 17 | | 0.0257 | |
| 18 | | 0.024 | |
| 19 | | 0.0031 | |
| 21 | | 0.9040 | |
| 22 | | 0.0080 | |
| 23 | | 1.4630 | |
| 35 | | 0.0040 | |

TABLE 1-continued

| Cpd_number | IDH1$^{R132H}$ IC50(μM) | IDH1$^{R132C}$ IC50(μM) | IDH2$^{R172K}$ IC50(μM) |
|---|---|---|---|
| 36 | | 0.9880 | |
| 20 | | 0.001 | |
| 24 | | 0.003 | |
| 26 | 0.003 | 0.002 | 0.126 |
| 27 | | 0.098 | |
| 28 | | 0.026 | |
| 30 | | 0.048 | |
| 31 | | 0.332 | |
| 32 | | 0.064 | |
| 37 | | 0.991 | |
| 40 | | 0.018 | |
| 43 | | 0.015 | |
| 44 | | 0.009 | |
| 45 | | 1.057 | |
| 46 | | 0.013 | |
| 47 | 0.002 | 0.001 | 0.097 |
| 48 | | 0.047 | |
| 49 | | 0.017 | |
| 50 | 0.020 | 0.005 | 0.516 |
| 51 | | 0.007 | |
| 52 | 0.014 | 0.009 | 0.322 |
| 53 | | 0.028 | |
| 54 | | 0.928 | |
| 55 | | 0.011 | |
| 56 | | 0.321 | |
| 57 | | 0.533 | |
| 58 | | 0.352 | |
| 59 | | 0.151 | |
| 60 | | 0.071 | |
| 61 | | 0.006 | |
| 62 | | 0.002 | |
| 63 | | 0.055 | |
| 65 | | 0.305 | |
| 66 | | 0.075 | |
| 67 | | 0.032 | |

TABLE 2

| Cpd_number | IDH1wt IC50 (μM) |
|---|---|
| 1 | 0.1328 |
| 4 | 0.3133 |
| 11 | 0.3639 |
| 26 | 0.1259 |
| 47 | 0.0974 |
| 50 | 0.5155 |
| 52 | 0.3215 |

Cellular Assay for IDHm Inhibitors

Cell lines HT-1080 (commercially available) are maintained in E-MEM 10% FCS and incubated at 37° C. in a humidified 5% $CO_2$ atmosphere.

Cells are seeded into 96 well black flat bottom plates at a density of 500 cells/well in 100 μL complete medium. After 24 hr the medium is replaced with 200 μL of fresh medium and compounds (dissolved into DMSO) are administrated to the cells using D300E Digital Dispenser (Tecan).

After 72 hr of incubation 100 μL from each well are collected and used for 2HG (R(−)-2-hydroxyglutarate) quantification. Levels of 2-HG in cell culture media are determined by LC-MS/MS. Cell supernatants (100 μL/well) are treated with 1 M aqueous trichloroacetic acid containing 130 μM of the internal standard 2-HG-d3 (20 μL/well) in a 96-well plate. The plates are sealed, mildly vortexed for 60 minutes, centrifuged at 4,000 RPM for 15 minutes, placed in a refrigerated autosampler taking care not to shake them, and aliquots of the upper part of the samples are directly injected in the chromatographic system. Calibration standards are obtained by ten folds dilution of aqueous 2-HG stock solutions with blank cell culture medium and denatured exactly in the same way as described above for samples. Samples and standards are assayed for 2-HG by reversed phase chromatography on a C18 column eluted with aqueous 0.15% formic acid and briefly washed with 90% methanol at the end of the run. 2-HG is determined by negative ion electrospray ionization with the internal standard method on a triple quadrupole mass spectrometer monitoring the MRM transitions 147>129 (2-HG) and 150>132 (2-HG-d3).

2-HG inhibition was calculated by comparing treated versus control data using Assay Explore (Symyx) software, with IC50 determined using a sigmoidal fitting algorithm.

Table 3 reports the $IC_{50}$ values (μM) of representative compounds on the inhibition of 2HG production in cell lines HT-1080 (IDH1$^{R132C}$), determined according to the above described assay.

TABLE 3

| Cpd_number | HT1080 2-HG IC50 (μM) |
|---|---|
| 1 | 0.0024 |
| 2 | 0.0049 |
| 3 | 0.0130 |
| 4 | 0.0006 |
| 6 | 0.0052 |
| 7 | 0.562 |
| 8 | 1.93 |
| 9 | 0.067 |
| 11 | 0.0026 |
| 12 | 0.034 |
| 14 | 0.0048 |
| 15 | 0.009 |
| 16 | 0.0003 |
| 17 | 0.0049 |
| 19 | 0.003 |
| 22 | 0.121 |
| 23 | 0.122 |
| 20 | 0.001 |
| 24 | 0.0021 |
| 26 | 0.0005 |
| 28 | 0.047 |
| 30 | 0.0075 |
| 40 | 0.0148 |
| 43 | 0.003 |
| 44 | 0.0040 |
| 47 | 0.0006 |
| 48 | 0.065 |
| 49 | 0.003 |
| 50 | 0.010 |
| 51 | 0.0024 |
| 52 | 0.004 |
| 53 | 0.040 |

Representative compounds of the invention when tested in cell lines having the mutated form of IDH1 as reported in Table 3, showed dose dependent inhibition of cellular production of 2-HG with potency lower than 5 μM. As expected, the compounds showed any effect on the cellular proliferation even at the highest dose (10 μM).

Preparation of Compounds of Formula (I)

For a reference to any specific compound of formula (I) of the invention, optionally in the form of a pharmaceutically acceptable salt, see the experimental section and claims. Referring to the examples that follow, compounds of the present invention were synthesized using the methods described herein, or other methods, which are well known in the art.

With the aim at better illustrating the present invention, without posing any limitation to it, the following examples are given.

As used herein the symbols and conventions used in the processes, schemes and examples are consistent with those used in the contemporary scientific literature, for example, the *Journal of the American Chemical Society* or the *Journal of Biological Chemistry*.

Compound names are IUPAC names, generated by using ACD Name (by Advanced Chemistry Development, Inc.).

Unless otherwise noted, all materials, including anhydrous solvent such as DMF, THF, DCM, were obtained from commercial suppliers, of the best grade and used without further purification. All reactions involving air- or moisture-sensitive compounds were performed under nitrogen or argon atmosphere.

General Purification and Analytical Methods

Flash Chromatography was performed on silica gel (Merck grade 9395, 60A).

The HPLC equipment consisted of a Waters Alliance™ HT 2795 system equipped with a Waters 996 PDA detector and Waters mod. ZQ 2000 single quadrupole mass spectrometer, equipped with an electrospray (ESI) ion source. Instrument control, data acquisition and data processing were provided by Empower 2 and MassLynx 4.1 softwares.

HPLC was carried out at 25° C. at a flow rate of 1.2 mL/min using a YMC-Triart C18 (4.6×50 mm, 3 μm) column. Mobile phase B was ammonium acetate 5 mM pH=5.2 buffer with acetonitrile (95:5), and mobile phase C was H₂O/acetonitrile (5:95); the gradient was from 10 to 90% C in 5 minutes then ramp to 100% C in 0.1 minutes. The injection volume was 10 μL. The mass spectrometer operated in positive and in negative ion mode, the capillary voltage was set up at 3.5 kV (ES⁺) and 2.8 kV (ES⁻); cone voltage was 14 V (ES⁺) and 28 V (ES⁻); the source temperature was 120° C.; full scan, mass range from 100 to 800 amu was set up.

The preparative HPLC equipment consisted of a Shimadzu HPLC system equipped with SCL-8A System Controller, two LC-8A Pumps, SPD-6A UV Spectrophotometric Detector and manual Rheodyne injection system. Data acquisition (analogic signal) and data processing were provided by Empower 2 software. Purification was carried out at 25° C. at a flow rate of 15 mL/min using a Waters X-Terra MS RP18 (150×30 mm, 10 μm) column. Mobile phase A was 0.1% TFA in water/acetonitrile (95:5) or, alternatively, Mobile phase A was 0.05% NH₃ in water/acetonitrile (95:5) and mobile phase B was H₂O/acetonitrile (5:95); the gradient was from 10 to 90% B in 15 minutes then ramp to 100% B in 0.1 minutes. Injection volume max 500 μL.

¹H-NMR spectra were recorded at a constant temperature of 28° C. on a Varian INOVA 400 spectrometer operating at 400.5 MHz and equipped with a 5 mm $^1H\{^{15}N$-$^{31}P\}$ z-axis PFG Indirect Detection probe and on a Varian INOVA 500 spectrometer operating at 499.7 MHz and equipped with a 5 mm $^1H\{^{13}C$-$^{15}N\}$triple resonance Indirect Detection probe.

Chemical shifts were referenced with respect to the residual solvent signals (DMSO-d₆: 2.50 ppm for ¹H). Data are reported as follows: chemical shift (δ), multiplicity (s=singlet, d=doublet, t=triplet, q=quartet, br. s=broad singlet, dd=doublet of doublets, ddd=doublet of doublets of doublets, m=multiplet), coupling constants (J, Hz) and number of protons.

As formerly reported (M. Colombo, F. R. Sirtori, V. Rizzo, Rapid Commun Mass Spectrom 2004, 18(4), 511-517), ESI(+) high-resolution mass spectra (HRMS) were obtained on a Q-T of Ultima (Waters, Manchester, UK) mass spectrometer directly connected with an Agilent 1100 microHPLC system (Palo Alto, US).

Preparation 1

Ethyl 2-(methylsulfanyl)-4-(propan-2-ylamino)pyrimidine-5-carboxylate [(IX), R2=propan-2-yl, R3=H] Step3a and Step 4a

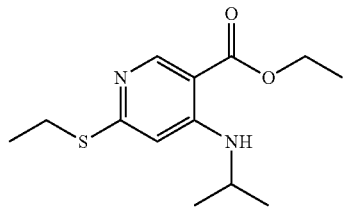 [SMILES: CCOC(=O)c1cnc(SCC)cc1NC(C)C]

Commercially available 4-choro-2-(methysulfanyl)pyrimidine-5-carboxylic acid ethyl ester (12 g, 51.4 mmol) was dissolved in ACN 300 ml and isopropylamine (8.8 mL, 102.8 mmol) was added at 0° C. and stirred at rt for 3 hour. The precipitated salts were filtered and washed with EtOAc, the solvent evaporated under reduced pressure. The resulting oil was dissolved in Et₂O, washed with NH₄Cl, and then dried over Na₂SO₄. The salts were filtered, and the solvent was evaporated under vacuum to give the product (7.0 g, 53% yield) which is carried on without further purification.

¹H NMR (500 MHz, DMSO-d₆) δ=8.55 (s, 1H), 8.09 (d, J=7.32 Hz, 1H), 4.31-4.37 (m, 1H), 4.25-4.30 (m, 2H), 2.48 (s, 3H), 1.27-1.32 (m, 3H), 1.23 (d, J=6.56 Hz, 6H).

HRMS (ESI) calcd for $C_{11}H_{16}ClN_2O_2[M+H]^+$ 243.0895 found 243.0901.

According to the same method the following compounds were prepared:

6-Chloro-4-ethylamino-nicotinic acid ethyl ester [(XVII), R2=Ethyl, X═CH]

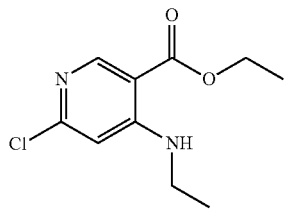

The title compound was obtained as a light yellow oil (80% yield).

¹H NMR (DMSO-d6) δ=8.52 (s, 1H), 8.05 (t, J=5.2 Hz, 1H), 6.80 (s, 1H), 4.29 (q, J=7.2 Hz, 2H), 3.25-3.32 (m, 2H), 1.31 (t, J=7.1 Hz, 3H), 1.17 (t, J=7.2 Hz, 3H). LCMS: m/z 229 [M+H]⁺ @ r.t. 6.27 min.

HRMS (ESI) calcd for $C_{10}H_{14}ClN_2O_2[M+H]^+$ 229.0739 found 229.0745.

6-Chloro-4-isopropylamino-nicotinic acid ethyl ester [(XVII), R2=propan-2-yl, X=CH]

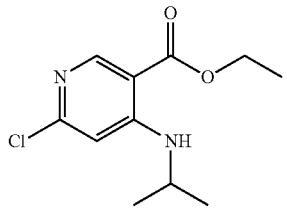 [SMILES: CCOC(=O)c1cnc(Cl)cc1NC(C)C]

$^1$H NMR (DMSO-$d_6$) δ=8.53 (s, 1H), 7.98 (d, J=7.9 Hz, 1H), 6.84 (s, 1H), 4.29 (q, J=7.1 Hz, 2H), 3.80-3.93 (m, 1H), 1.31 (t, J=7.1 Hz, 3H), 1.19 (d, J=6.4 Hz, 6H). LCMS: m/z 243 [M+H]$^+$ @ r.t. 6.72 min.

Preparation 2

[2-(methylsulfanyl)-4-(propan-2-ylamino)pyrimidin-5-yl]methanol [(X), R2=propan-2-ylamino, R3=H] Step 3b and Step 4b

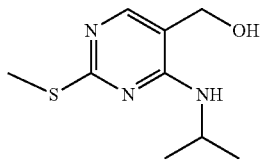

LiAlH$_4$ (29 mL, 4% in THF) is added to a solution of ethyl 2-(methylsulfanyl)-4-(propan-2-ylamino)pyrimidine-5-carboxylate (7 g, 27.4 mmol) in THF (70 mL) at −5° C. over 15 minutes. The cool bath was removed and left to reach room temperature, then was stirred for 2 h. It was then cooled to 0° C., and a saturated solution of NaHCO$_3$ (31 mL) was added slowly (exothermic reaction). After 30 minutes the quenched reaction mixture is filtered, and the filter cake is washed with AcOEt (50 ml). The combined organic washes are dried over Na$_2$SO$_4$ and filtered. The solvent was evaporated under vacuum to give the product (5.84 g, 96% yield) which is used without further purification.

The following compounds are prepared essentially by the same method of preparation:

(6-Chloro-4-ethylamino-pyridin-3-yl)-methanol [(XVIII), R2=Ethyl, X=CH]

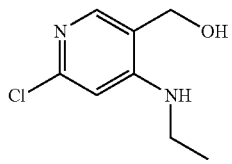

$^1$H NMR (DMSO-$d_6$) δ=7.77 (s, 1H), 6.49 (s, 1H), 6.11 (t, J=5.1 Hz, 1H), 5.18 (t, J=5.4 Hz, 1H), 4.37 (d, J=5.3 Hz, 2H), 3.17 (qd, J=7.1, 5.7 Hz, 2H), 1.15 (t, J=7.2 Hz, 3H). LCMS: m/z 187 [M+H]$^+$ @ r.t. 4.06 min.

HRMS (ESI) calcd for C$_6$H$_{12}$N$_2$OCl [M+H]$^+$ 187.0633 found 187.0638.

(6-Chloro-4-isopropylamino-pyridin-3-yl)-methanol [(XVIII), R2=propan-2-yl, X=CH]

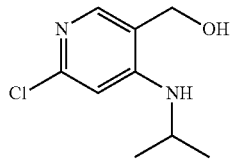

$^1$H NMR (DMSO-$d_6$) δ=7.76 (s, 1H), 6.53 (s, 1H), 5.81 (d, J=7.8 Hz, 1H), 5.24 (t, J=5.4 Hz, 1H), 4.38 (d, J=5.2 Hz, 2H), 3.65-3.77 (m, 1H), 1.16 (d, J=6.4 Hz, 6H). LCMS: m/z 201 [M+H]$^+$ @ r.t. 2.74 min.

HRMS (ESI) calcd for C$_9$H$_{14}$ClN$_2$O [M+H]$^+$ 201.0789 found 201.0787.

Preparation 3

2-(methylsulfanyl)-4-(propan-2-ylamino)pyrimidine-5-carbaldehyde[(XI), R2=2,2-Dimethyl-propyl, R3=H] Step 3c and 4c

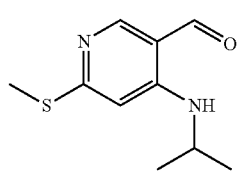

[2-(methylsulfanyl)-4-(propan-2-ylamino)pyrimidin-5-yl]methanol (5.3 g, 24.84 mmol) was dissolved in DCM (120 mL) to which MnO$_2$ pre-activated in oven at 50° C. for 4 h (17.27 g, 198.7 mmol) was added. The resulting suspension was stirred overnight. The solid was removed by filtration through a celite pad, which was washed with further DCM, the solvent was evaporated in vacuo. The crude was purified on silica gel column eluted with (n-Hex/EtOAc 9/1) to afford the title product (4.08 g, 78% yield).

$^1$H NMR (500 MHz, DMSO-$d_6$) δ=9.74 (s, 1H), 8.53 (s, 1H), 8.45 (d, J=7.32 Hz, 1H), 4.28-4.44 (m, 1H), 2.50 (s, 3H), 1.24 (d, J=6.56 Hz, 6H). LCMS: m/z 212 [M+H]$^+$ @ r.t. 5.9 min. HRMS (ESI) calcd for C$_6$H$_{14}$N$_3$OS [M+H]$^+$ 212.0852 found 212.0856.

According to the same method the following compounds were prepared:

2-chloro-4-(propan-2-ylamino)pyrimidine-5-carbaldehyde [(XIX), X=N, R2=propan-2-yl]

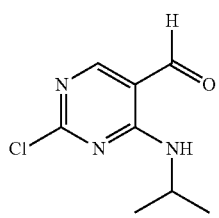

LCMS: m/z 200 [M+H]$^+$ @ r.t. 4.87 min.

6-Chloro-4-ethylamino-pyridine-3-carbaldehyde
[(XIX), R2=propan-2-yl, X=CH]

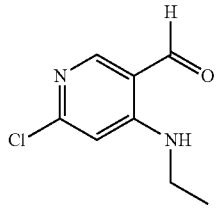

$^1$H NMR (DMSO-d$_6$) δ=9.86 (d, J=0.6 Hz, 1H), 8.56 (t, J=4.7 Hz, 1H), 8.44 (s, 1H), 6.85 (s, 1H), 3.34 (s, 2H), 1.17 (t, J=7.2 Hz, 3H). LCMS: m/z 185 [M+H]$^+$ @ r.t. 4.89 min. HRMS (ESI) calcd for C$_6$H$_{10}$ClN$_2$O [M+H]$^+$ 185.0476 found 185.0481.

6-Chloro-4-isopropylamino-pyridine-3-carbaldehyde
[(XIX), R2=propan-2-yl, X=CH]

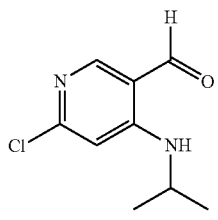

$^1$H NMR (DMSO-d$_6$) δ=9.85 (d, J=0.5 Hz, 1H), 8.40-8.49 (m, 2H), 6.90 (s, 1H), 3.90 (dt, J=7.9, 6.5 Hz, 1H), 1.20 (d, J=6.4 Hz, 6H). LCMS: m/z 199 [M+H]$^+$ @ r.t. 7.84 min. HRMS (ESI) calcd for C$_9$H$_{12}$ClN$_2$O [M+H]$^+$ 199.0633 found 199.0632.

Preparation 4

2-(methylsulfanyl)-8-(propan-2-yl)pyrido[2,3-d]pyrimidin-7(8H)-one [(XII), U=Y=CH, X=N, ≡, R2=propan-2-yl, R3=H] Step 3d and 4d

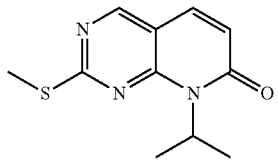 [SMILES: CSc1ncc2ccc(=O)n(C(C)C)c2n1]

LiHMDS (47 mL of 1 M in THF solution, 47 mmol) was added to THF (78 mL) at −78° C. and treated with EtOAc (5.8 mL, 53.92 mmol). The solution was stirred at −78° C. for 10 min, then solid 2-(methylsulfanyl)-4-(propan-2-ylamino)pyrimidine-5-carbaldehyde (2.6 g, 12.30 mmol) was added in one portion and the solution was stirred at −78° C. for 10 min then removed from the cooling bath warmed to RT in 2 h and left on stirring at room temperature for additional 4 h. The reaction was cooled in an ice bath and quenched with saturated solution of NH$_4$Cl (60 ml) and extracted with EtOAc (2×1 mL), dried over Na$_2$SO$_4$, filtered and concentrated to give an off-white solid of the title compound (2.8 g).

$^1$H NMR (500 MHz, DMSO-d$_6$) δ=8.86 (s, 1H), 7.88 (d, J=9.46 Hz, 1H), 6.57 (d, J=9.46 Hz, 1H), 5.68 (br. s., 1H), 2.60 (s, 3H), 1.54 (d, J=7.02 Hz, 6H). LCMS: m/z 236 [M+H]$^+$ @ r.t. 9.10 min. HRMS (ESI) calcd for C$_{11}$H$_{14}$N$_3$OS [M+H]$^+$ 236.0852 found 236.0861.

According to the same method the following compounds were prepared:

2-chloro-8-(propan-2-yl)pyrido[2,3-d]pyrimidin-7(8H)-one [(IV), U=Y=CH, X=N, =, R2=propan-2-yl, R3=H, G=Cl]

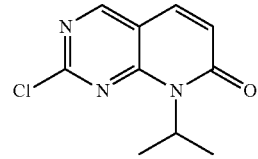

LCMS: m/z 224 [M+H]$^+$ @ r.t. 4.26 min.

7-Chloro-1-ethyl-1H-[1,6]naphthyridin-2-one [(IV), U=Y=CH, X=CH, R2=ethyl, R3=H, G=Cl]

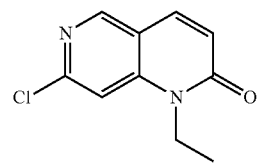

$^1$H NMR (500 MHz, DMSO-d$_6$) δ=8.74 (s, 1H), 8.02 (d, J=9.6 Hz, 1H), 7.69 (s, 1H), 6.71 (d, J=9.6 Hz, 1H), 4.21 (q, J=7.2 Hz, 2H), 1.17 (t, J=7.2 Hz, 3H). LCMS: m/z 209 [M+H]$^+$ @ r.t. 4.28 min.

HRMS (ESI) calcd for C$_{10}$H$_{10}$ClN$_2$O [M+H]$^+$ 209.0476 found 209.0485.

7-Chloro-1-isopropyl-1H-[1,6]naphthyridin-2-one [(IV), U=Y=CH, X=CH, R2=propan-2-yl, R3=H, G=Cl]

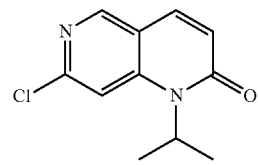

$^1$H NMR (500 MHz, DMSO-d$_6$) δ=8.71 (s, 1H), 7.96 (d, J=9.5 Hz, 1H), 7.79 (br. s., 1H), 6.63 (d, J=9.5 Hz, 1H), 5.14 (br. s., 1H), 1.50 (d, J=6.9 Hz, 6H). LCMS: m/z 223 [M+H]$^+$ @ r.t. 7.11 min.

HRMS (ESI) calcd for C$_{11}$H$_{12}$ClN$_2$O [M+H]$^+$ 223.0633 found 223.0633.

Preparation 5

2-(methylsulfanyl)-8-(propan-2-yl)pyrido[2,3-d]pyrimidin-7(8H)-one [(XII), U=Y=CH, X=N, =, R2=propan-2-yl, R3=H] Step 3g

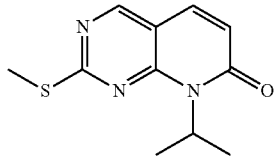 [SMILES: CSc1ncc2ccc(=O)n(C(C)C)c2n1]

A mixture of 2-(methylsulfanyl)pyrido[2,3-d]pyrimidin-7(8H)-one (100 mg, 0.52 mmol), cesium carbonate (337 mg, 1.04 mmol), and isopropyl iodide (77.8 ul, 0.78 mmol) in anhydrous DMF (2 mL) was purged with nitrogen and heated in a sealed tube at 70° C. for 2 h. The reaction mixture was allowed to cool to room temperature and diluted with water. The product precipitated, filtered and washed with water. To give the title compound as a light yellow solid (86 mg, 70% yield). $^1$H NMR (401 MHz, DMSO-$d_6$) δ=8.85 (s, 1H), 7.87 (d, J=9.52 Hz, 1H), 6.57 (d, J=9.40 Hz, 1H), 5.69 (td, J=6.93, 13.73 Hz, 1H), 2.60 (s, 3H), 1.54 (d, J=6.96 Hz, 6H). LCMS: m/z 236 [M+H]$^+$ r.t. 5.53 min. HRMS (ESI) calcd for $C_{11}H_{14}N_3OS$ [M+H]$^+$ 236.0852 found 236.0861.

According to the same method the following compounds were prepared:

8-ethyl-2-(methylsulfanyl)pyrido[2,3-d]pyrimidin-7(8H)-one [(XII), U=Y=CH, X=N, =, R2=ethyl, R3=H

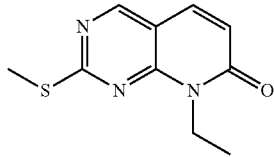

$^1$H NMR (401 MHz, DMSO-$d_6$) δ=8.88 (s, 1H), 7.93 (d, J=9.40 Hz, 1H), 6.62 (d, J=9.52 Hz, 1H), 4.32 (q, J=7.04 Hz, 2H), 2.60 (s, 3H), 1.22 (t, J=7.02 Hz, 3H). LCMS: m/z 222 [M+H]$^+$ r.t. 4.95 min. HRMS (ESI) calcd for $C_{10}H_{12}N_3OS$ [M+H]$^+$ 222.0696. found 222.07;

4-methyl-2-(methylsulfanyl)-8-(propan-2-yl)pyrido[2,3-d]pyrimidin-7(8H)-one [(XII), U=Y=CH, X=N, R2=propan-2-yl, R3=methyl]

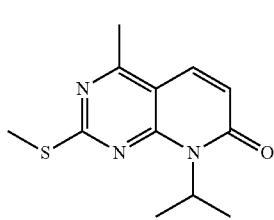 [SMILES: CSc1nc(C)c2ccc(=O)n(C(C)C)c2n1]

$^1$H NMR (500 MHz, DMSO-$d_6$) δ=8.04 (d, J=9.61 Hz, 1H), 6.54 (d, J=9.46 Hz, 1H), 5.73 (br.s, 1H), 2.61-2.64 (m, 3H), 2.58 (s, 3H), 1.54 (d, J=6.86 Hz, 6H). LCMS: m/z 250 [M+H]$^+$ r.t. 5.85 min.

1-ethyl-7-(methylsulfanyl)-1,4-dihydro-2H-pyrimido[4,5-d][1,3]oxazin-2-one [(XII), U=CH2, Y=O, X=N, R2=ethyl, R3=H]

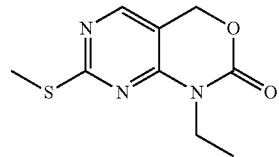

$^1$H NMR (500 MHz, DMSO-$d_6$) δ=8.33 (s, 1H), 5.30 (d, J=0.61 Hz, 2H), 3.94 (q, J=7.02 Hz, 2H), 2.51 (br. s., 3H), 1.19 (t, J=7.02 Hz, 3H).

5-methyl-2-(methylsulfanyl)-8-(propan-2-yl)pyrido[2,3-d]pyrimidin-7(8H)-one [(XII), U=CMe, Y=CH, X=N, R2=propan-2-yl, R3=H]

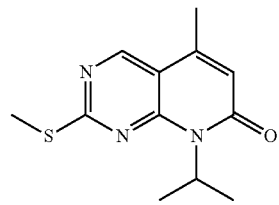 [SMILES: CSc1ncc2c(C)cc(=O)n(C(C)C)c2n1]

$^1$H NMR (500 MHz, DMSO-$d_6$) δ=8.90 (s, 1H), 6.44 (s, 1H), 5.67 (br. s., 1H), 2.60 (s, 3H), 2.40 (d, J=1.22 Hz, 3H), 1.53 (d, J=7.02 Hz, 6H). LCMS: m/z 250 [M+H]$^+$ @ r.t. 6.67 min. HRMS (ESI) calcd for $C_{12}H_{16}N_3OS$ [M+H]$^+$ 250.1009 found 250.101.

Preparation 6

2-(methylsulfanyl)-7-oxo-8-(2,2 dimethylpropyl)-7,8-dihydropyrido[2,3-d]pyrimidine-4-carbonitrile [(XII), U=Y=CH, X=N, R2=2,2-dimethylpropyl, R3=CN] Conv. A

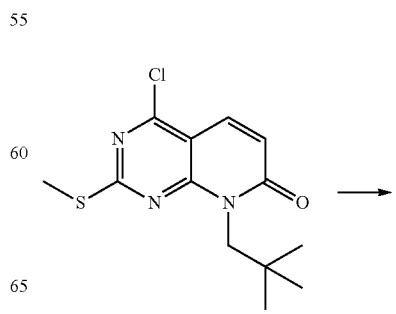

-continued

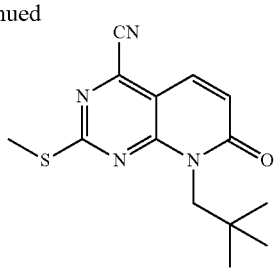

4-Chloro-8-(2,2-dimethyl-propyl)-2-methylsulfanyl-8H-pyrido[2,3-d]pyrimidin-7-one (60 mg, 0.2 mmol) was dissolved in DMSO (4.5 mL) to which triethylamine (300 µL) and NaCN (18 mg, 0.2 mmol) was added and stirred for 1 hour at 50° C. Water was then added 10 mL and extracted with AcOEt two times. The organic phases were washed with brine, and then dried over $Na_2SO_4$. The salts were filtered, and the solvent was evaporated in vacuo. The crude product was purified on $SiO_2$ chromatographic column eluent Exane/AcOEt 8/2 to give the product (12 mg, 20% yield).

$^1$H NMR (500 MHz, DMSO-$d_6$) δ=7.94 (d, J=9.61 Hz, 1H), 6.83 (d, J=9.61 Hz, 1H), 4.28 (br. s., 2H), 2.63 (s, 3H), 0.91 (s, 3H). LCMS: m/z 289 [M+H]$^+$ @ r.t. 7.09 min. HRMS (ESI) calcd for $C_{14}H_{17}N_4OS$ [M+H]$^+$ 289.1118 found 289.1122.

Preparation 7

4-[(2,4-dimethoxybenzyl)amino]-2-(methylsulfanyl)-8-(propan-2-yl)pyrido[2,3-d]pyrimidin-7(8H)-one [(XII), U=Y=CH, X=N, =, R2=propan-2-yl, R3=NH-2,4-dimethoxybenzyl] Conv. B

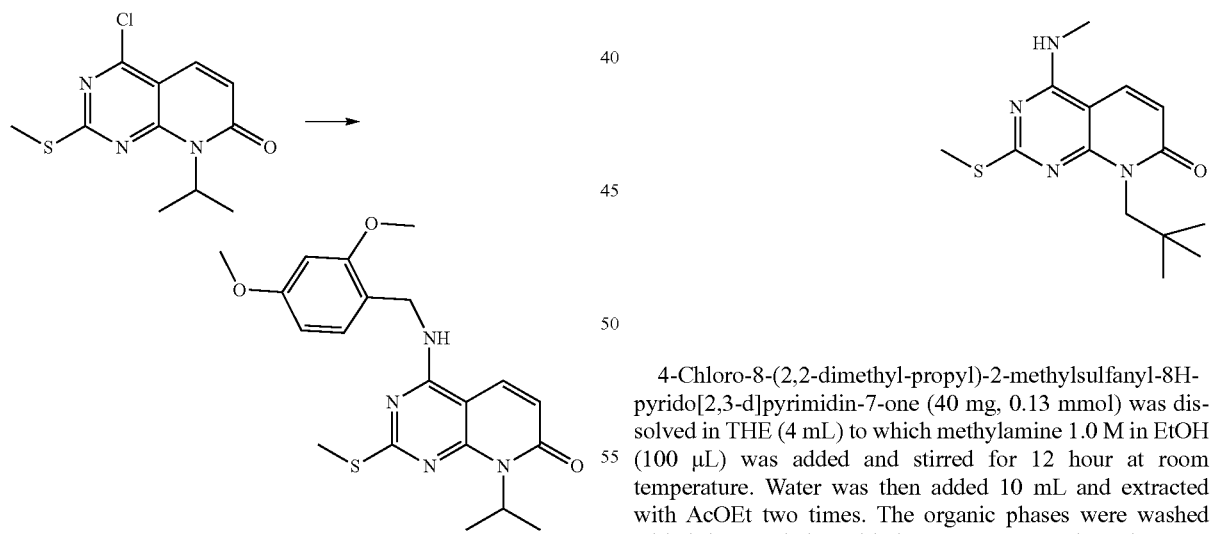

To a solution of 4-Chloro-8-isopropyl-2-methylsulfanyl-8H-pyrido[2,3-d]pyrimidin-7-one (370 mg, 1.37 mmol) in CH3CN (15 mL), 2,4-dimethoxybenzylamine (0.288 mL, 1.92 mmol) and triethylamine (0.268 mL, 1.92 mmol) were added. The solution was heated at 50° C. for 3 h. The reaction mixture was evaporated to dryness and the residue was purified un silica gel (AcOEt/Hexane: 1/1) to give a pale yellow solid. (325 mg)

$^1$H NMR (500 MHz, DMSO-$d_6$) δ=8.37 (t, J=5.57 Hz, 1H), 8.11 (d, J=9.61 Hz, 1H), 7.08 (d, J=8.24 Hz, 1H), 6.56 (d, J=2.29 Hz, 1H), 6.46 (dd, J=2.29, 8.39 Hz, 1H), 6.32 (d, J=9.46 Hz, 1H), 5.70 (br. s., 1H), 4.55 (d, J=5.64 Hz, 2H), 3.80 (s, 3H), 3.73 (s, 3H), 2.44 (s, 3H), 1.49 (d, J=6.86 Hz, 6H). LCMS: m/z 423 [M+Na]$^+$ @ r.t. 3.43 min. HRMS (ESI) calcd for $C_{20}H_{25}N_4NaO_4S$ [M+Na]$^+$ 423.1440 found 423.1444.

Preparation 8

4-(methylamino)-2-(methylsulfanyl)-8-(2,2-dimethylpropyl)pyrido[2,3-d]pyrimidin-7(8H)-one [(XII), U=Y=CH, X=N, R2=2,2-dimethylpropyl, R3=NHMe, R4=R5=H] Conv. C

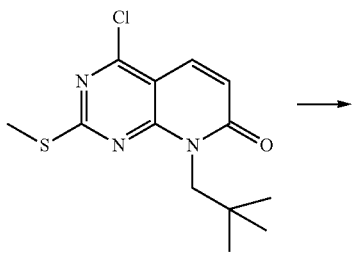

4-Chloro-8-(2,2-dimethyl-propyl)-2-methylsulfanyl-8H-pyrido[2,3-d]pyrimidin-7-one (40 mg, 0.13 mmol) was dissolved in THF (4 mL) to which methylamine 1.0 M in EtOH (100 µL) was added and stirred for 12 hour at room temperature. Water was then added 10 mL and extracted with AcOEt two times. The organic phases were washed with brine, and then dried over $Na_2SO_4$. The salts were filtered, and the solvent was evaporated in vacuo. The crude product was purified on $SiO_2$ chromatographic column DCM/MeOH 98/2 to give the product (33 mg, 85% yield).

$^1$H NMR (500 MHz, DMSO-$d_6$) δ=8.11 (q, J=4.02 Hz, 1H), 8.01 (d, J=9.61 Hz, 1H), 6.39 (d, J=9.61 Hz, 1H), 4.27 (br. s., 2H), 2.93 (d, J=4.42 Hz, 3H), 2.52 (s, 3H), 0.89 (s, 9H). LCMS: m/z 293 [M+H]$^+$ @ r.t. 6.63 min. HRMS (ESI) calcd for $C_{14}H_{21}N_4OS$ [M+H]$^+$ 293.1431 found 293.1436.

According to the same method the following compound was prepared:

4-(dimethylamino)-2-(methylsulfanyl)-8-(propan-2-yl)pyrido[2,3-d]pyrimidin-7(8H)-one [(XII), U=Y=CH, X=N, =, R2=propan-2-yl, R3=N(Me)$_2$]

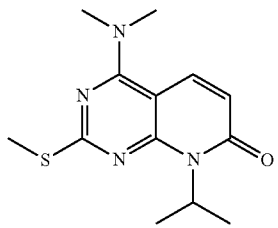 [SMILES: CSc1nc(N(C)C)c2ccc(=O)n(C(C)C)c2n1]

$^1$H NMR (500 MHz, DMSO-d$_6$) δ=7.93 (d, J=9.76 Hz, 1H), 6.25 (d, J=9.76 Hz, 1H), 5.72 (br. s., 1H), 3.21 (s, 6H), 2.50 (s, 3H), 1.50 (d, J=7.02 Hz, 6H). LCMS: m/z 279 [M+H]$^+$ @ r.t. 6.48 min. HRMS (ESI) calcd for C$_{13}$H$_{19}$N$_4$OS [M+H]$^+$ 279.1274 found 279.1276.

Preparation 9

2-(methylsulfonyl)-8-(propan-2-yl)pyrido[2,3-d]pyrimidin-7(8H)-one [(IV), U=Y=CH, X=N, =, R2=propan-2-yl, R3=H, G=MeS(O)$_2$—] Step 3e

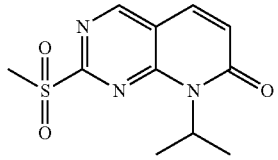 [SMILES: CC(C)n1c(=O)ccc2cnc(S(C)(=O)=O)nc21]

2-(methylsulfanyl)-8-(propan-2-yl)pyrido[2,3-d]pyrimidin-7(8H)-one (3.1 mg, 13.17 mmol) was dissolved in 62 mL DCM. To the stirring solution, m-CPBA 55% (10.32 g, 32.93 mmol) was added. The reaction was allowed to stir for 2 h at room temperature. LCMS indicated reaction had gone to completion. Sample was diluted with 50 mL of DCM and washed twice with saturated NaHCO$_3$ (170 ml) and then with 50 ml×2, followed by brine (50 ml). The organic phase was separated and dried over Na$_2$SO$_4$, filtered, and concentrated in vacuo. Purification with chromatographic column eluent EtOAc/Acetone 100:1 to give the title compound 2-(methylsulfonyl)-8-(propan-2-yl)pyrido[2,3-d]pyrimidin-7(8H)-one as off-white solid (2.29 mg 65% Yield).

$^1$H NMR (500 MHz, DMSO-d$_6$) δ=9.27 (s, 1H), 8.07 (d, J=9.46 Hz, 1H), 6.88 (d, J=9.46 Hz, 1H), 5.65 (spt, J=6.80 Hz, 1H), 3.46 (s, 3H), 1.56 (d, J=7.02 Hz, 6H). LCMS: m/z 268 [M+H]$^+$ @ r.t. 4.48 min. HRMS (ESI) calcd for C$_{11}$H$_{13}$N$_3$O$_3$S [M+H]$^+$ 268.0751 found 268.0746.

According to the same method the following compounds were prepared:

8-ethyl-2-(methylsulfanyl)pyrido[2,3-d]pyrimidin-7(8H)-one [(IV), U=Y=CH, X=N, =, R2=ethyl, R3=H, G=MeS(O)$_2$—]

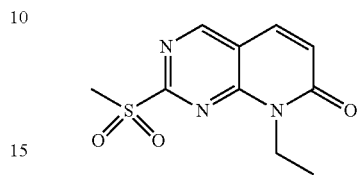

$^1$H NMR (500 MHz, DMSO-d$_6$) δ=9.30 (s, 1H), 8.12 (d, J=9.61 Hz, 1H), 6.93 (d, J=9.46 Hz, 1H), 4.35 (q, J=7.02 Hz, 2H), 3.48 (s, 3H), 1.24 (t, J=7.09 Hz, 3H). LCMS: m/z 254 [M+H]$^+$ @ r.t. 3.53 min. HRMS (ESI) calcd for C$_{10}$H$_{11}$N$_3$O$_3$S [M+H]$^+$ 254.0594 found 254.0595.

4-methyl-2-(methylsulfonyl)-8-(propan-2-yl)pyrido[2,3-d]pyrimidin-7(8H)-one [(IV), U=Y=CH, X=N, R2=propan-2-yl, R3=methyl, G=MeS(O)$_2$—]

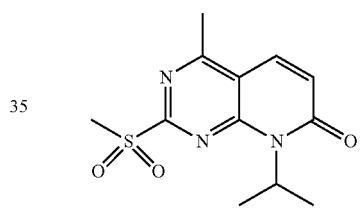

$^1$H NMR (500 MHz, DMSO-d$_6$) δ=8.22 (d, J=9.76 Hz, 1H), 6.84 (d, J=9.76 Hz, 1H), 5.59-5.77 (m, 1H), 3.44 (s, 3H), 2.81 (s, 3H), 1.55 (d, J=7.02 Hz, 6H). LCMS: m/z 282 [M+H]$^+$ r.t. 4.34 min.

5-methyl-2-(methylsulfonyl)-8-(propan-2-yl)pyrido[2,3-d]pyrimidin-7(8H)-one (IV), U=CMe, Y=CH, X=N, R2=propan-2-yl, R3=H, G=MeS(O)$_2$—]

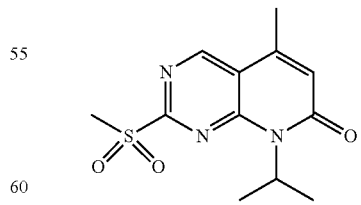

$^1$H NMR (500 MHz, DMSO-d$_6$) δ=8.90 (s, 1H), 6.44 (s, 1H), 5.67 (br. s., 1H), 2.60 (s, 3H), 2.40 (d, J=1.22 Hz, 3H), 1.53 (d, J=7.02 Hz, 6H). LCMS: m/z 282 [M+H]$^+$ @ r.t. 4.73 min. HRMS (ESI) calcd for C$_{12}$H$_{16}$N$_3$O$_3$S [M+H]$^+$ 282.0907 found 282.0907.

55

1-ethyl-7-(methylsulfonyl)-1,4-dihydro-2H-pyrimido[4,5-d][1,3]oxazin-2-one [(IV), U=CH₂, Y=O, X=N, R2=ethyl, R3=H, G=MeS(O)₂—]

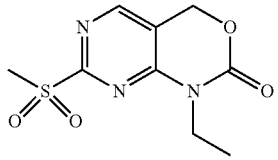 [SMILES: CCN1C(=O)OCc2cnc(S(C)(=O)=O)nc21]

¹H NMR (500 MHz, DMSO-d₆) δ=8.68 (s, 1H), 5.48 (d, J=0.61 Hz, 2H), 3.99 (q, J=7.02 Hz, 2H), 3.41 (s, 3H), 1.22 (t, J=7.02 Hz, 3H). LCMS: m/z 258 [M+H]⁺ @ r.t. 3.43 min. HRMS (ESI) calcd for C₉H₁₁N₃O₄S [M+H]⁺ 258.0543 found 258.054.

4-[(2,4-dimethoxybenzyl)amino]-2-(methylsulfinyl)-8-(propan-2-yl)pyrido[2,3-d]pyrimidin-7(8H)-one [(IV), U=Y=CH, X=N, =, R2=propan-2-yl, R3=4-[(2,4-dimethoxybenzyl)amino], G=MeSO)—]

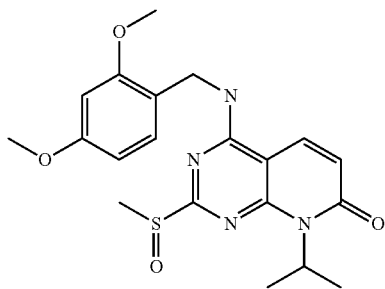 [SMILES: COc1ccc(CNc2nc(S(C)=O)nc3c2ccc(=O)n3C(C)C)c(OC)c1]

¹H NMR (500 MHz, DMSO-d₆) δ=8.74 (t, J=5.57 Hz, 1H), 8.22 (d, J=9.76 Hz, 1H), 7.16 (d, J=8.24 Hz, 1H), 6.56 (d, J=2.44 Hz, 1H), 6.53 (d, J=9.61 Hz, 1H), 6.45 (dd, J=2.36, 8.31 Hz, 1H), 5.75 (s, 1H), 4.48-4.67 (m, 2H), 3.80 (s, 3H), 3.73 (s, 3H), 2.78 (s, 3H), 1.51 (d, J=7.02 Hz, 6H). LCMS: m/z 258 [M+H]⁺ @ r.t. 3.43 min. HRMS (ESI) calcd for C₂₀H₂₅N₄NaO₄S [M+Na]⁺ 423.1440 found 423.1444.

Preparation 10

7-oxo-8-(propan-2-yl)-7,8-dihydropyrido[2,3-d]pyrimidin-2-yl trifluoromethanesulfonate [(IV), U=Y=CH, X=N, R2=propan-2-yl, R3=H, G=0-triflate] Conv A1

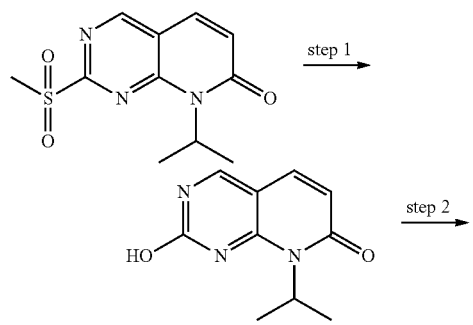

56

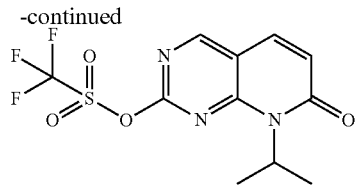

Step 1 To a solution of 2-(methylsulfonyl)-8-(propan-2-yl)pyrido[2,3-d]pyrimidin-7(8H)-one (5 g, 18.7 mmol) in 1,4-dioxane (86 mL) was added NaOH 1N (37.4 ml, 37.4 mmol) at rt. The mixture was stirred at 40° C. for 1 h. The mixture was cooled down to rt and diluted with DCM (80 ml) The aqueous phase was separated and conserved. The organic phase was washed with NaOH 0.5M (20 mL) and aqueous phase added to the previous. The aqueous solution was acidified with HCl 1N and portioned with a solution of DCM/i-pr-OH (4×50 mL). The organic phase was dried over Na₂SO₄, filtered and concentrated to give 2-hydroxy-8-(propan-2-yl)pyrido[2,3-d]pyrimidin-7(8H)-one as off-white solid (2.65 g Y=65%). ¹H NMR (500 MHz, DMSO-d₆) δ=12.26 (br. s., 1H), 8.46 (s, 1H), 7.58 (d, J=9.46 Hz, 1H), 6.17 (d, J=9.46 Hz, 1H), 5.59 (br. s., 1H), 1.44 (d, J=7.02 Hz, 6H). LCMS: m/z 204 [M−H]⁻.

Step 2 To a solution 2-hydroxy-8-(propan-2-yl)pyrido[2,3-d]pyrimidin-7(8H)-one (3.90 g, 19.02 mmol) in dry DCM (78 mL), under nitrogen atmosphere, at 2° C. (internal temperature) 2,6-lutidine (2.65 mL, 22.8 mmol, 1.2 eq) was added. Triflic anhydride (3.83 mL, 22.8 mmol, 1.2 eq) was then dropped over 5 minutes, keeping the internal temperature between 2 and 10° C. After 1 h the reaction was completed and diluted with DCM and water. The organic phase was separated and washed with brine and dried over Na₂SO₄ and concentrated in vacuo. The crude was purified by flash column chromatography on silica gel (DCM:EA=99/1 to 97.5/2.5) to afford the title compound (5.53 g, 86% yield). as off-white solid. ¹H NMR (500 MHz, DMSO-d₆) δ=9.16 (s, 1H), 8.4 (d, J=9.46 Hz, 1H), 6.80 (d, J=9.46 Hz, 1H), 5.52 (m, 1H), 1.52 (d, J=7.02 Hz, 6H). LCMS: m/z 338 [M+H]⁺. HRMS (ESI) calcd for C₁₁H₁₁F₃N₃O₄S [M+H]⁺ 338.0417 found 338.0412.

Preparation 11
Phenyl 4-(4-{4-[(1S)-1-aminoethyl]phenyl}tetrahydro-2H-pyran-4-yl)piperazine-1-carboxylate [(V) R1a=methyl, R1b=H, A=phenyl, R4=H, R5a and R5b=tetrahydro-2H-pyran-4-yl, M=Bond, G1=N, Z1, Z2=—CH2-m1=m2=2, PG=phenylcarboxylate] Step 5α-5e
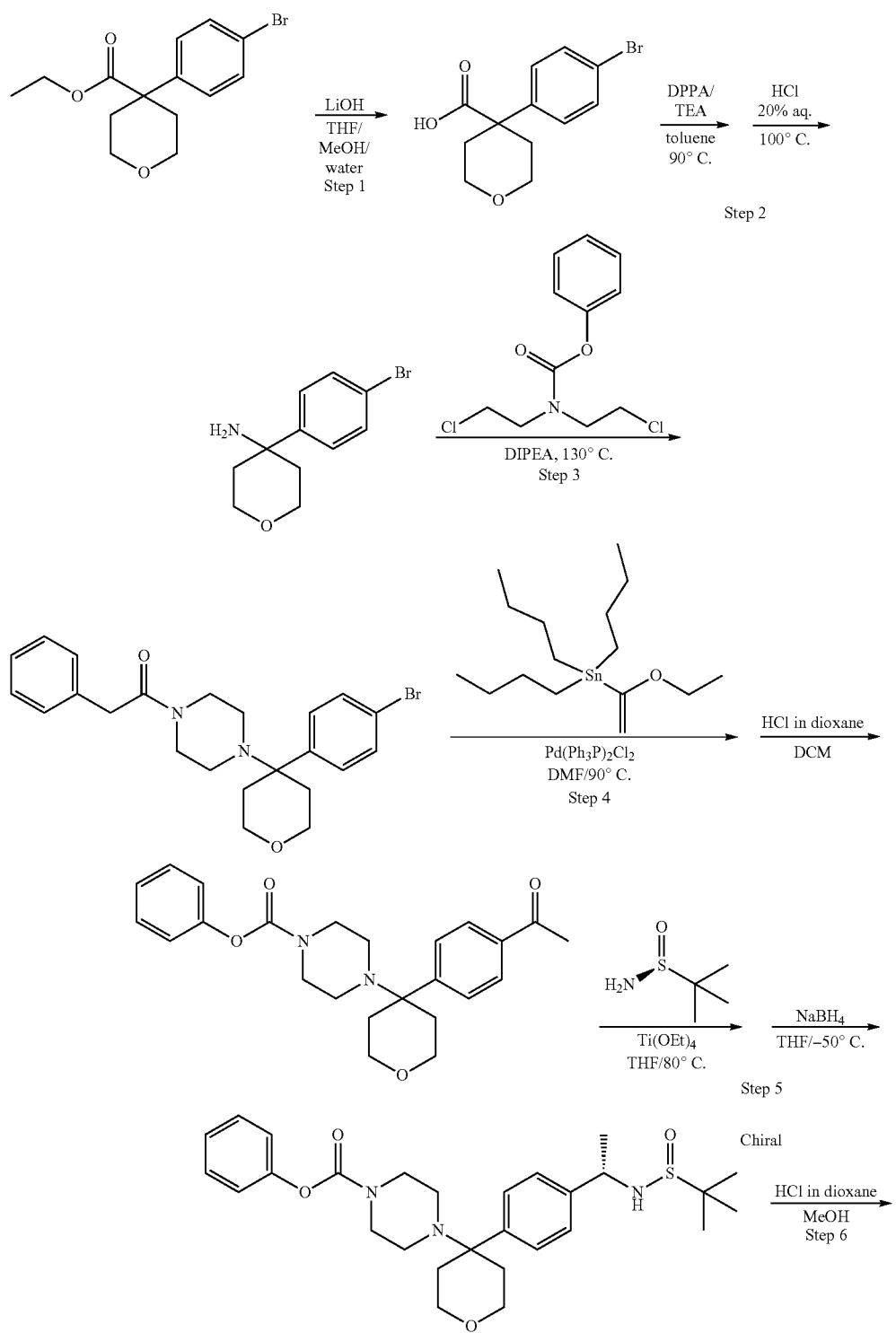

-continued

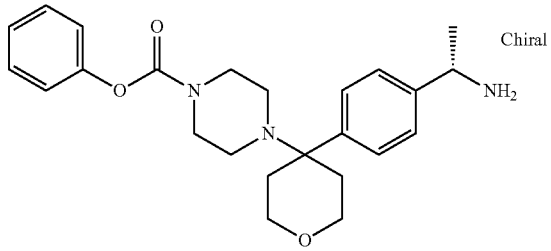

Step 1 Synthesis of 4-(4-bromophenyl)tetrahydro-2H-pyran-4-carboxylic acid

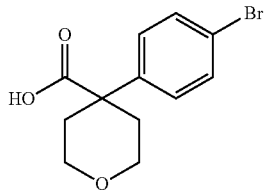 [SMILES: O=C(O)C1(c2ccc(Br)cc2)CCOCC1]

To a solution of ethyl 4-(4-bromophenyl)tetrahydro-2H-pyran-4-carboxylate (383.2 g, 1.22 mol) in THF/MeOH/H$_2$O (1 L/1 L/1 L) was added LiOH·H$_2$O (308.5 g, 7.35 mol). The mixture was stirred at 30° C. for 2 days. The most of solvent was removed in vacuo, adjusted pH=2 with 2N HCl solution and partitioned with EtOAc (2 L). The solvent was removed in vacuo to give 4-(4-bromophenyl)tetrahydro-2H-pyran-4-carboxylic acid (314 g, 90% yield) as white solid.

$^1$HNMR (400 MHz, DMSO-d$_6$) δ=12.77 (s, 1H), 7.60-7.58 (d, J=10.8 Hz, 2H), 7.40-7.37 (d, J=10.8 Hz, 2H), 3.85-3.76 (m, 2H), 3.51-3.38 (m, 2H), 1.94-1.84 (t, J=21.0 Hz, 2H), 1.27-1.09 (m, 2H).

According to the same method the following compounds were prepared:

1-(4-bromophenyl)cyclopentanecarboxylic acid

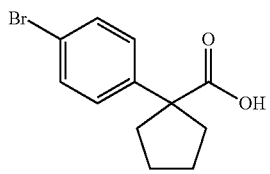 [SMILES: O=C(O)C1(c2ccc(Br)cc2)CCCC1]

$^1$HNMR (500 MHz, DMSO-d$_6$) δ=12.37 (br. s., 1H), 7.50-7.52 (m, 2H), 7.27-7.32 (m, 2H), 1.51-1.86 (m, 6H).

1-(4-bromophenyl)cyclohexanecarboxylic acid

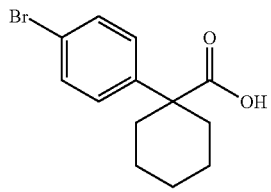 [SMILES: O=C(O)C1(c2ccc(Br)cc2)CCCCC1]

$^1$HNMR (500 MHz, DMSO-d$_6$) δ=12.47 (br. s., 1H), 7.51-7.57 (m, 2H), 7.28-7.37 (m, 2H), 2.29 (d, J=12.81 Hz, 2H), 1.51-1.73 (m, 5H), 1.34-1.47 (m, 2H), 1.16-1.30 (m, 1H).

Step 2. Synthesis of 4-(4-bromophenyl)tetrahydro-2H-pyran-4-amine [(XXI) W1=Br, A=Phenyl, R4=H, R5a and R5b=tetrahydro-2H-pyran-4-yl]

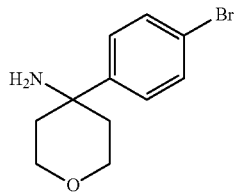 [SMILES: NC1(c2ccc(Br)cc2)CCOCC1]

A mixture of 4-(4-bromophenyl)tetrahydro-2H-pyran-4-carboxylic acid (314 g, 1.10 mol), TEA (189.2 g, 1.87 mol), and DPPA (Diphenylphosphoryl azide) (424 g, 1.54 mol) in anhydrous toluene (3 L) was purged with nitrogen and stirred at 90° C. for 3 h. The reaction mixture was allowed to cool to ambient temperature and diluted with water (1 L). The aqueous phase was extracted with EtOAc (1 L*2), and the combined organic phases were washed twice with saturated NaHCO$_3$, followed by brine, dried over Na$_2$SO$_4$, and concentrated in vacuo. The crude was suspended in 3.2 L of HCl (aq., 20%) and refluxed for 3 h. To the cold solution was added toluene and the azeotropic mixture was evaporated. Dilution with EtOAc and saturated NaHCO$_3$, the organic phase was separated, dried over Na$_2$SO$_4$ and concentrated in vacuo. The crude was purified by flash column chromatography on silica gel with DCM/EtOH=50/1-30/1 to afford 4-(4-bromophenyl)tetrahydro-2H-pyran-4-amine (215.6 g, 76% yield) as light yellow solid.

$^1$H-NMR (400 MHz, CDCl$_3$) δ=7.49-7.47 (d, J=8.4 Hz, 2H), 7.37-7.34 (d, J=8.4 Hz, 2H), 3.94-3.88 (m, 2H), 3.82-3.77 (m, 2H), 2.18-2.11 (m, 2H), 1.63-1.60 (d, J=12.8 Hz, 2H).

According to the same method the following compounds were prepared:

1-(4-bromophenyl)cyclopentanamine [(XXI) W1=Br, A=Phenyl, R4=H, R5a and R5b=cyclopentan-3-yl]

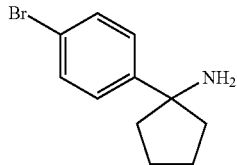 [SMILES: NC1(c2ccc(Br)cc2)CCCC1]

¹HNMR (500 MHz, DMSO-d₆) δ=7.44 (d, J=2.29 Hz, 4H), 1.57-1.93 (m, 10H).

1-(4-bromophenyl)cyclohexanamine [(XXI) W1=Br, A=Phenyl, R4=H, R5a and R5b=cyclohexyl]

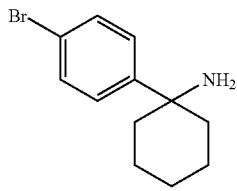 [SMILES: NC1(c2ccc(Br)cc2)CCCCC1]

¹HNMR (500 MHz, DMSO-d₆) δ=7.42 (dd, J=8.42, 2.29 Hz, 2H), 7.32 (dd, J=8.4, 2.3 Hz, 2H), 1.84 (br.s, 2H), 1.60-1.64 (m, 4H), 1.39-1.47 (m, 4H), 1.20-1.23 (m, 2H).

4-(5-bromopyridin-2-yl)tetrahydro-2H-pyran-4-amine [(XXI) W1=Br, A=pyrimidin-2-yl, R4=H, R5a and R5b=tetrahydro-2H-pyran-4-yl]

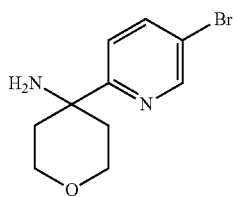

¹HNMR (500 MHz, DMSO-d₆) δ=8.67 (d, J=2.29 Hz, 1H), 8.05 (dd, J=2.36, 8.46 Hz, 1H), 7.66 (d, J=8.54 Hz, 1H), 3.82 (dt, J=2.52, 10.87 Hz, 2H), 3.59 (td, J=4.29, 11.40 Hz, 2H), 2.10-2.20 (m, 2H), 1.54 (d, J=13.27 Hz, 2H).

Step 3. Synthesis of phenyl 4-(4-(4-bromophenyl)tetrahydro-2H-pyran-4-yl)piperazine-1-carboxylate [(XXIII) W1=Br, A=Phenyl, R4=H, R5a and R5b=tetrahydro-2H-pyran-4-yl, M=Bond, G1=N, Z1, Z2=—CH2-, m1=m2=2, PG=phenylcarboxylate] Step 5b

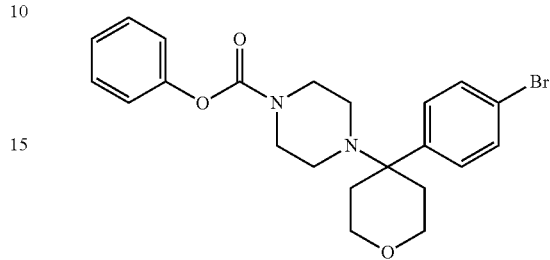

To a suspension of 4-(4-bromophenyl)tetrahydro-2H-pyran-4-amine (215.6 g, 0.84 mol) in DIEA (4 L) was added phenyl bis(2-chloroethyl)carbamate (prepared as reported in WO2009065622) (308 g, 1.18 mol). The mixture was stirred at 130° C. for 72 h and evaporated in vacuo. The residue was dissolved in DCM (2 L), washed with brine, dried over Na₂SO₄, concentrated in vacuo. The crude was purified by flash column chromatography on silica chromatography with DCM/acetone=100/0~ 20/1 to afford phenyl 4-(4-(4-bromophenyl)tetrahydro-2H-pyran-4-yl)piperazine-1-carboxylate (149 g, 40% yield) as off-white solid.

¹H-NMR (400 MHz, CDCl₃) δ=7.53-7.51 (d, J=8.4 Hz, 2H), 7.34-7.30 (t, J=7.8 Hz, 2H), 7.18-7.11 (m, 3H), 7.05-7.03 (d, J=7.6 Hz, 2H), 3.98-3.92 (m, 2H), 3.60-3.51 (m, 6H), 2.35 (s, 4H), 2.20-2.17 (m, 4H).

According to the same method the following compounds were prepared:

Phenyl 4-[1-acetyl-4-(4-bromophenyl)piperidin-4-yl]piperazine-1-carboxylate [(XXIII) W1=Br, A=Phenyl, R4=H, R5a and R5b=1-acetylpiperidin-4-yl, M=Bond, G1=N, Z1, Z2=—CH2-, m1=m2=2, PG=phenylcarboxylate]

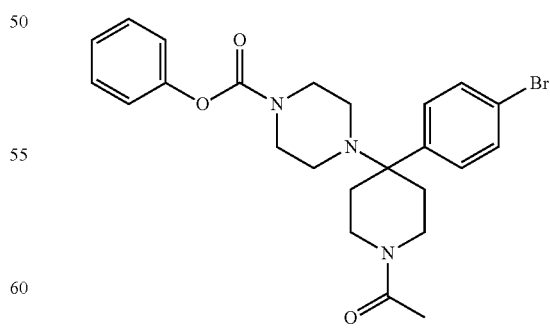

¹HNMR (500 MHz, DMSO-d₆) δ=7.58 (d, J=8.54 Hz, 2H), 7.32-7.36 (m, 2H), 7.30 (d, J=8.69 Hz, 2H), 7.16-7.21 (m, 1H), 7.01-7.07 (m, 2H), 3.36-3.58 (m, 7H), 2.21-2.35 (m, 6H), 1.98-2.03 (m, 3H).

phenyl 4-[1-(4-bromophenyl)cyclopentyl]piperazine-1-carboxylate [(XXIII) W1=Br, A=Phenyl, R4=H, R5a and R5b=cyclopentyl, M=Bond, G1=N, Z1, Z2=—CH2-, m1=m2=2, PG=phenylcarboxylate]

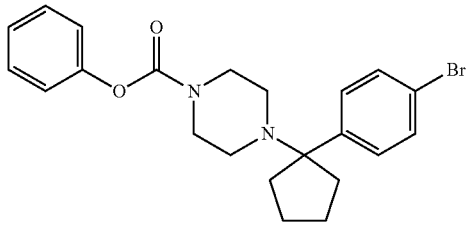

¹HNMR (500 MHz, DMSO-d₆) δ=7.51-7.58 (m, 2H), 7.30-7.38 (m, 4H), 7.16-7.22 (m, 1H), 7.01-7.07 (m, 2H), 3.51 (br. s., 4H), 2.30 (br. s., 4H), 1.98-2.08 (m, 4H), 1.66-1.80 (m, 2H), 1.35-1.49 (m, 2H).

phenyl 4-[4-(5-bromopyridin-2-yl)tetrahydro-2H-pyran-4-yl]piperazine-1-carboxylate [(XXIII) W1=Br, A=pyrimidin-2-yl, R4=H, R5a and R5b=tetrahydro-2H-pyran-4-yl, M=Bond, G1=N, Z1, Z2=—CH2-, m1=m2=2, PG=phenylcarboxylate]

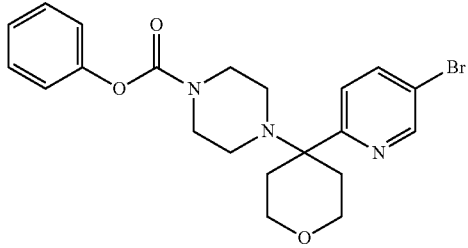 [SMILES: O=C(Oc1ccccc1)N1CCN(C2(c3ccc(Br)cc3)CCOCC2)CC1]

¹HNMR (500 MHz, DMSO-d₆) δ=8.74 (d, J=2.29 Hz, 1H), 8.07 (dd, J=2.52, 8.46 Hz, 1H), 7.40 (d, J=8.39 Hz, 1H), 7.29-7.37 (m, 2H), 7.15-7.22 (m, 1H), 7.01-7.07 (m, 2H), 3.76-3.88 (m, 2H), 3.51 (br. s., 2H), 3.20-3.31 (m, 4H), 2.23-2.37 (m, 6H), 1.95-2.10 (m, 2H).

Phenyl 4-[3-(4-bromophenyl)tetrahydrofuran-3-yl]piperazine-1-carboxylate [(XXIII) W1=Br, A=Phenyl, R4=H, R5a and R5b=tetrahydrofuran-3-yl, M=Bond, G1=N, Z1, Z2=—CH2-, m1=m2=2, PG=phenylcarboxylate]

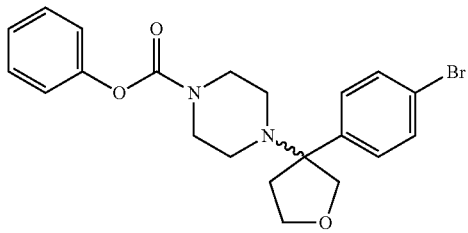 [SMILES: O=C(Oc1ccccc1)N1CCN(C2(c3ccc(Br)cc3)CCOC2)CC1]

¹HNMR (500 MHz, DMSO-d₆) δ=7.56 (d, J=8.54 Hz, 2H), 7.32-7.39 (m, 4H), 7.19 (dd, J=7.47, 7.32 Hz, 1H), 7.04-7.08 (m, 2H), 4.07 (d, J=9.15 Hz, 1H), 3.95-3.97 (m, 1H), 3.93 (d, J=9.15 Hz, 1H), 3.64-3.68 (m, 1H), 3.54 (br. s, 2H), 3.33-3.35 (m, 1H), 2.24-2.45 (m, 7H).

Phenyl 4-[4-(6-chloropyridin-3-yl)tetrahydro-2H-pyran-4-yl]piperazine-1-carboxylate [(XXIII) W1=Cl, A=pyrimidin-3-yl, R4=H, R5a and R5b=tetrahydro-2H-pyran-4-yl, M=Bond, G1=N, Z1, Z2=—CH2-, m1=m2=2, PG=phenylcarboxylate]

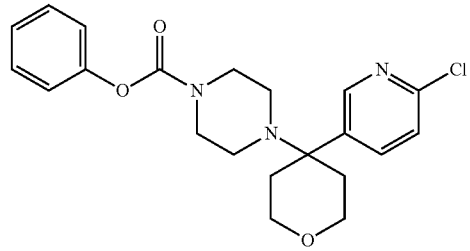 [SMILES: O=C(Oc1ccccc1)N1CCN(C2(c3ccc(Cl)nc3)CCOCC2)CC1]

¹HNMR (400 MHz, CHLOROFORM-d) δ=8.33 (d, J=2.50 Hz, 1H) 7.54 (dd, J=8.38, 2.50 Hz, 1H) 7.29-7.40 (m, 3H) 7.15-7.22 (m, 1H) 7.05 (d, J=8.13 Hz, 2H) 3.92-4.05 (m, 2H) 3.46-3.72 (m, 6H) 2.39 (br t, J=4.50 Hz, 4H) 2.21-2.33 (m, 2H) 2.09-2.21 (m, 2H).

Step 4. Synthesis of phenyl 4-(4-(4-acetylphenyl)tetrahydro-2H-pyran-4-yl)piperazine-1-carboxylate [(XXIII) W1=methylketone, A=Phenyl, R4=H, R5a and R5b=tetrahydro-2H-pyran-4-yl, M=Bond, G1=N, Z1, Z2=—CH2-, m1=m2=2, PG=phenylcarboxylate] Conv. G

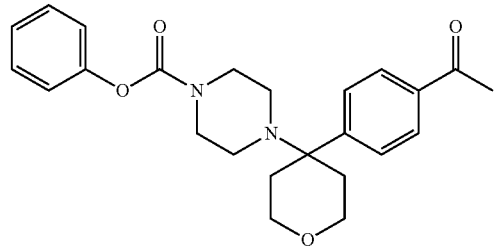 [SMILES: CC(=O)c1ccc(C2(N3CCN(C(=O)Oc4ccccc4)CC3)CCOCC2)cc1]

To a solution of 4-[4-(4-bromophenyl)tetrahydro-2H-pyran-4-yl]piperazine-1-carbamate (149 g, 0.34 mol) in DMF (1.2 L) was added tributyl(1-ethoxyvinyl)tin (242 g, 0.67 mol) and Pd(PPh₃)₂Cl₂ (2.35 g, 3.35 mmol) under N₂. The mixture was stirred at 90° C. overnight. After cooling the reaction mixture was diluted with aqueous solution of KF and stirred at r.t. for 1 h, and then the precipitate was filtered and washed with EtOAc. After separation, the aqueous phase was extracted with EtOAc (500 mL*5). Combined organics were dried over Na₂SO₄ and concentrated. The crude was suspended in 2 L of DCM and 1 L of 2N HCl (aq.) and stirred at r.t. for 2 h. The reaction mixture was diluted with DCM (2 L) and washed with sat. NaHCO₃. After separation, the aqueous phase was extracted with DCM (500 mL*3), dried over Na₂SO₄, concentrated in vacuo. The residue was purified by flash column chromatography on silica gel with DCM/acetone=100/0~ 10/1 to afford phenyl 4-(4-(4-acetylphenyl)tetrahydro-2H-pyran-4-yl)piperazine-1-carboxylate (63 g, 45% yield) as white solid. ¹H-NMR (400 MHz, CDCl₃) δ=8.00-7.98 (d, J=8.4 Hz, 2H), 7.36-7.29 (m, 4H), 7.18-7.16 (m, 1H), 7.03-7.01 (d, J=7.6 Hz, 2H), 3.99-3.96 (t, J=5.8 Hz, 2H), 3.61-3.53 (m, 6H), 2.63 (s, 3H), 2.37 (s, 4H), 2.24-2.23 (m, 4H). LCMS 409 Rt=6.19 min; HRMS (ESI) calcd for $C_{24}H_{29}N_2O_4$ [M+H]⁺ 409.2122 found 409.2118.

According to the same method the following compounds were prepared:

Phenyl 4-[3-(4-acetylphenyl)pentan-3-yl]piperazine-1-carboxylate [(XXIII) W1=methylketone, A=Phenyl, R4=H, R5a and R5b=Ethyl, M=Bond, G1=N, Z1, Z2=—CH2-, m1=m2=2, PG=phenylcarboxylate]

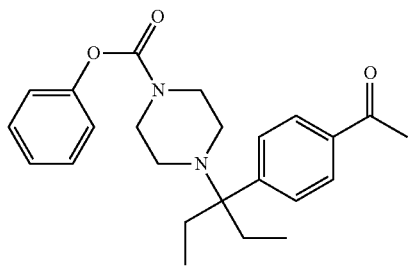 [SMILES: CCC(CC)(c1ccc(C(C)=O)cc1)N1CCN(C(=O)Oc2ccccc2)CC1]

¹HNMR (400 MHz, DMSO-d₆) δ=7.93 (d, J=8.54 Hz, 2H), 7.57 (d, J=8.54 Hz, 2H), 7.32-7.39 (m, 2H), 7.16-7.23 (m, 1H), 7.03-7.10 (m, 2H), 3.53 (br. s., 2H), 3.37 (d, J=2.29 Hz, 1H), 2.57 (s, 3H), 1.81-2.07 (m, 4H), 0.76 (t, J=7.32 Hz, 6H).

Phenyl 4-[1-acetyl-4-(4-acetylphenyl)piperidin-4-yl]piperazine-1-carboxylate [(XXIII) W1=methylketone, A=Phenyl, R4=H, R5a and R5b=1-acetylpiperidin-4-yl, M=Bond, G1=N, Z1, Z2=—CH2-, m1=m2=2, PG=phenylcarboxylate]

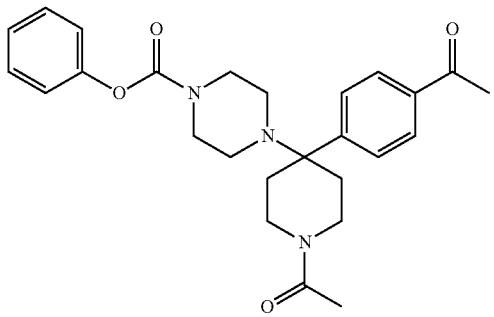 [SMILES: CC(=O)c1ccc(C2(N3CCN(C(=O)Oc4ccccc4)CC3)CCN(C(C)=O)CC2)cc1]

¹HNMR (500 MHz, DMSO-d₆) δ=7.97 (d, J=8.54 Hz, 2H), 7.46-7.52 (m, 2H), 7.29-7.37 (m, 2H), 7.15-7.20 (m, 1H), 6.99-7.06 (m, 2H), 3.37-3.65 (m, 8H), 2.59 (s, 3H), 2.23-2.46 (m, 8H), 1.95-2.07 (m, 3H).

Phenyl 4-[1-(4-acetylphenyl)cyclopentyl]piperazine-1-carboxylate [(XXIII) W1=methylketone, A=Phenyl, R4 =H, R5a and R5b=cyclopentyl, M=Bond, G1=N, Z1, Z2=—CH2-, m1=m2=2, PG=phenylcarboxylate]

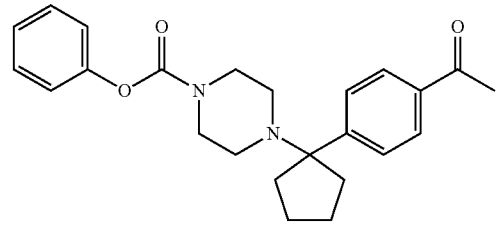 [SMILES: CC(=O)c1ccc(C2(N3CCN(C(=O)Oc4ccccc4)CC3)CCCC2)cc1]

¹HNMR (500 MHz, DMSO-d₆) δ=7.94 (d, J=8.39 Hz, 2H), 7.49-7.54 (m, 2H), 7.30-7.36 (m, 2H), 7.14-7.22 (m, 1H), 6.98-7.06 (m, 2H), 3.52 (br. s., 4H), 2.58 (s, 3H), 2.27-2.38 (m, 4H), 2.04-2.13 (m, 4H), 1.71-1.78 (m, 2H), 1.37-1.51 (m, 2H).

Phenyl 4-[4-(5-acetylpyridin-2-yl)tetrahydro-2H-pyran-4-yl]piperazine-1-carboxylate [(XXIII) W1=methylketone, A=pyridine-2-yl, R4=H, R5a and R5b=tetrahydro-2H-pyran-4-yl, M=Bond, G1=N, Z1, Z2=—CH2-, m1=m2=2, PG=phenylcarboxylate]

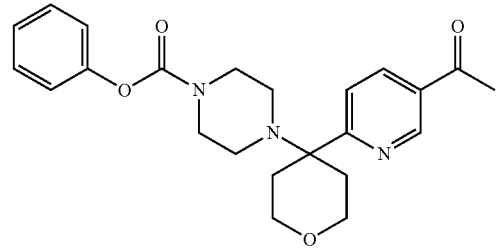 [SMILES: CC(=O)c1ccc(C2(N3CCN(C(=O)Oc4ccccc4)CC3)CCOCC2)nc1]

¹HNMR (500 MHz, DMSO-d₆) δ=9.16 (d, J=1.68 Hz, 1H), 8.30 (dd, J=2.36, 8.31 Hz, 1H), 7.55-7.58 (m, 1H), 7.30-7.37 (m, 2H), 7.16-7.20 (m, 1H), 7.00-7.05 (m, 2H), 3.80-3.89 (m, 2H), 3.52 (br. s., 2H), 3.23-3.32 (m, 4H), 2.64 (s, 3H), 2.28-2.42 (m, 6H), 2.04-2.13 (m, 2H).

Phenyl 4-[3-(4-acetylphenyl)tetrahydrofuran-3-yl]piperazine-1-carboxylate [(XXIII) W1=methylketone, A=pyridine-2-yl, R4=H, R5a and R5b=tetrahydrofuran-3-yl, M=Bond, G1=N, Z1, Z2=—CH2-, m1=m2=2, PG=phenylcarboxylate]

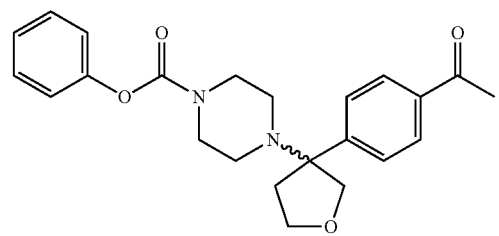 [SMILES: CC(=O)c1ccc(C2(N3CCN(C(=O)Oc4ccccc4)CC3)CCOC2)cc1]

$^1$HNMR (500 MHz, DMSO-d$_6$) δ=7.96 (d, J=8.39 Hz, 2H), 7.56 (d, J=8.54 Hz, 2H), 7.32-7.37 (m, 2H), 7.16-7.22 (m, 1H), 7.01-7.09 (m, 2H), 4.13 (d, J=9.15 Hz, 1H), 3.93-4.01 (m, 2H), 3.65-3.73 (m, 1H), 3.50-3.60 (m, 2H), 3.36-3.45 (m, 2H), 2.59 (s, 3H), 2.26-2.49 (m, 6H).

Phenyl 4-[4-(5-acetylpyridin-3-yl)tetrahydro-2H-pyran-4-yl]piperazine-1-carboxylate [(XXIII) W1=methylketone, A=pyridine-3-yl, R4=H, R5a and R5b=tetrahydro-2H-pyran-4-yl, M=Bond, G1=N, Z1, Z2=—CH2-, m1=m2=2, PG=phenylcarboxylate]

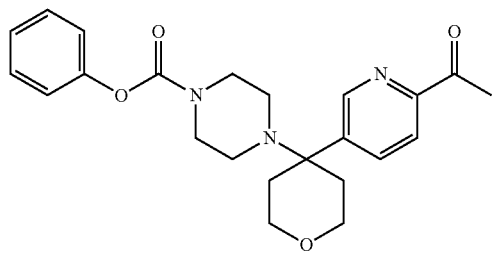 [SMILES: CC(=O)c1ccc(C2(N3CCN(C(=O)Oc4ccccc4)CC3)CCOCC2)cn1]

$^1$HNMR (400 MHz, CHLOROFORM-d) δ=8.64 (d, 1H, J=2.0 Hz), 8.09 (d, 1H, J=8.4 Hz), 7.71 (dd, 1H, J=2.2, 8.4 Hz), 7.3-7.4 (m, 2H), 7.1-7.2 (m, 1H), 7.03 (d, 2H, J=7.9 Hz), 3.9-4.1 (m, 2H), 3.5-3.7 (m, 6H), 2.75 (s, 3H), 2.40 (br t, 4H, J=4.3 Hz), 2.2-2.4 (m, 4H).

Benzyl 3-{[4-(4-acetylphenyl)tetrahydro-2H-pyran-4-yl](methyl)amino}azetidine-1-carboxylate [(XXIII) W1=methylketone, A=phenyl, R4=H, R5a and R5b=tetrahydro-2H-pyran-4-yl, M=N(R6), R6=methyl, G1=CH, Z1, Z2=—CH2-, m1=m2=1, PG=benzylcarboxylate]

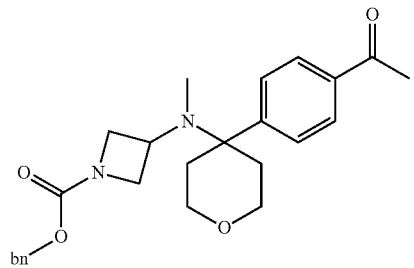

LCMS:LCMS: m/z 423 [M+H]$^+$ r.t. 2.29 min.

Step 5. Synthesis of phenyl 4-(4-{4-[(1S)-1-{[(S)-tert-butylsulfinyl]amino}ethyl]phenyl}tetrahydro-2H-pyran-4-yl)piperazine-1-carboxylate [(XXIV) R1a=methyl, R1b=H, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5c'

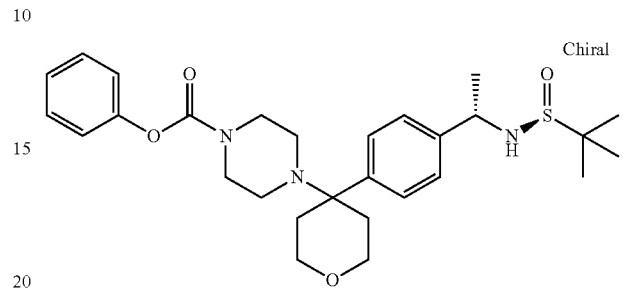

A mixture of tetraethoxytitanium (3 eq. 400 μL, 1,908 mmol), (S)-2-methylpropane-2-sulfinamide (2 eq 154 mg, 1,272 mmol), and phenyl 4-[4-(4-acetylphenyl)tetrahydro-2H-pyran-4-yl]piperazine-1-carboxylate (260 mg, 0.636 mmol) in THF (20 mL) was heated to 80° C. overnight and then cooled to room temperature. To this mixture was added NaBH$_4$ (5 eq 120 mg mg, 3.18 mmol) at −50° C. The mixture was then slowly warmed up to room temperature (2 h). MeOH (2 mL) was added to quench excess NaBH$_4$ and was followed by the addition of water. The resulting mixture was filtered to remove solids and the aqueous phase was extracted with EtOAc twice, dried over Na$_2$SO$_4$ and concentrated. The residue was purified on a silical gel column chromatography system using with gradient elution (100% DCM, then 0-20% Acetone/DCM) to afford phenyl 4-(4-{4-[(1S)-1-{[(S)-tert-butylsulfinyl]amino}ethyl]phenyl}tetrahydro-2H-pyran-4-yl)piperazine-1-carboxylate (225 mg, 69% yield).

$^1$H NMR (500 MHz, DMSO-d$_6$) δ=7.41 (d, J=8.24 Hz, 2H), 7.31-7.36 (m, 2H), 7.26 (d, J=8.39 Hz, 2H), 7.15-7.21 (m, 1H), 7.00-7.05 (m, 2H), 5.64 (d, J=6.86 Hz, 1H), 4.39 (s, 1H), 3.83 (d, J=7.78 Hz, 2H), 3.52 (br. s., 2H), 3.36-3.43 (m, 3H), 2.26 (br. s., 4H), 2.04-2.21 (m, 4H), 1.42 (d, J=6.71 Hz, 3H), 1.10-1.13 (m, 9H).

According to the same method the following compounds were prepared:

Phenyl 4-(3-{4-[(1S)-1-{[(S)-tert-butylsulfinyl]amino}ethyl]phenyl}pentan-3-yl)piperazine-1-carboxylate [(XXIV) R1a=methyl, R1b=H, A=phenyl, R4=H, R5a and R5b=ethyl, M=Bond, G1=N, Z1, Z2=—CH2-, m1=m2=2, PG=phenylcarboxylate]

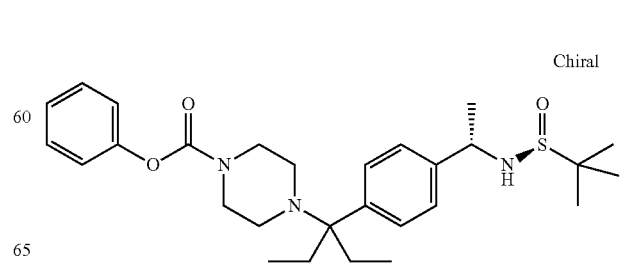

¹HNMR (500 MHz, DMSO-d₆) δ=7.29-7.40 (m, 6H), 7.17-7.21 (m, 1H), 7.07 (dd, J=0.99, 8.46 Hz, 2H), 5.61 (d, J=7.02 Hz, 1H), 4.37 (quin, J=6.75 Hz, 1H), 3.52 (br. s., 2H), 3.33 (m, 2H), 2.47 (br. s., 4H), (1.79-1.97 (m, 4H), 1.41 (d, J=6.86 Hz, 3H), 1.09-1.16 (m, 9H), 0.76 (t, J=6.94 Hz, 6H).

phenyl 4-(4-{5-[(1S)-1-{[(S)-tert-butylsulfinyl]amino}ethyl]pyridin-2-yl}tetrahydro-2H-pyran-4-yl)piperazine-1-carboxylate [(XXIV) R1a=methyl, R1b=H, A=pyridin-2-yl, R4=H, R5a and R5b=tetrahydro-2H-pyran-4-yl, M=Bond, G1=N, Z1, Z2=—CH2-, m1=m2=2, PG=phenylcarboxylate]

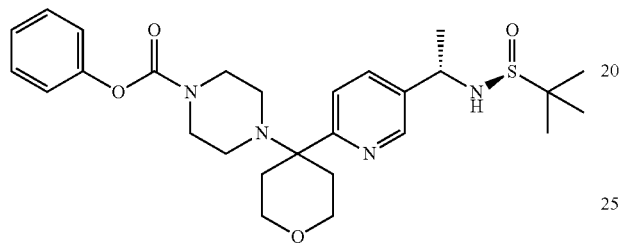

¹HNMR (500 MHz, DMSO-d₆) δ=8.62 (d, J=2.14 Hz, 1H), 7.83 (dd, J=2.29, 8.24 Hz, 1H), 7.37 (d, J=8.24 Hz, 1H), 7.30-7.35 (m, 2H), 7.16-7.20 (m, 1H), 7.01-7.05 (m, 2H), 5.79 (d, J=7.17 Hz, 1H), 4.46 (t, J=6.86 Hz, 1H), 3.79-3.88 (m, 2H), 3.51 (br. s., 2H), 3.24-3.32 (m, 4H), 2.27-2.37 (m, 6H), 2.02-2.10 (m, 2H), 1.45 (d, J=6.86 Hz, 3H), 1.12 (s, 9H).

Phenyl 4-(1-{4-[(1S)-1-{[(S)-tert-butylsulfinyl]amino}ethyl]phenyl}cyclopentyl)piperazine-1-carboxylate [(XXIV) R1a=methyl, R1b=H, A=phenyl, R4=H, R5a and R5b=cyclopentyl, M=Bond, G1=N, Z1, Z2=—CH2-, m1=m2=2, PG=phenylcarboxylate]

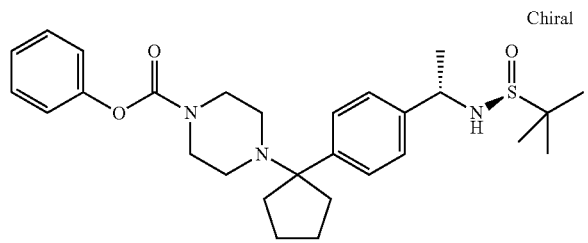 [SMILES: C[C@H](N[S@@](=O)C(C)(C)C)c1ccc(C2(N3CCN(C(=O)Oc4ccccc4)CC3)CCCC2)cc1]

¹H NMR (500 MHz, DMSO-d₆) δ=7.36-7.39 (m, 2H), 7.27-7.35 (m, 4H), 7.15-7.20 (m, 1H), 7.00-7.06 (m, 2H), 5.61 (d, J=6.86 Hz, 1H), 4.38 (t, J=6.71 Hz, 1H), 3.51 (br. s., 4H), 2.31 (br. s., 4H), 2.06 (t, J=8.54 Hz, 4H), 1.73 (br. s., 2H), 1.43-1.50 (m, 2H), 1.41 (d, J=6.86 Hz, 3H), 1.10-1.14 (m, 9H).

Phenyl 4-(4-{4-[(1R)-1-{[(R)-tert-butylsulfinyl]amino}ethyl]phenyl}tetrahydro-2H-pyran-4-yl)piperazine-1-carboxylate [(XXIV) R1a=H, R1b=methyl, A=phenyl, R4=H, R5a and R5b=tetrahydro-2H-pyran-4-yl, M=Bond, G1=N, Z1, Z2=—CH2-, m1=m2=2, PG=phenylcarboxylate]

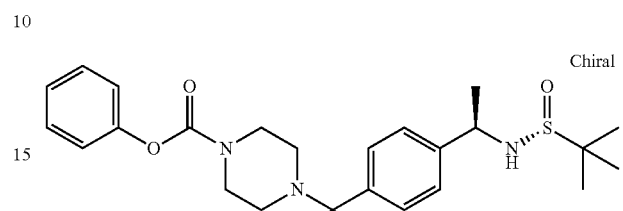

¹H NMR (500 MHz, DMSO-d₆) δ=7.41 (d, J=8.24 Hz, 2H), 7.30-7.36 (m, 2H), 7.26 (d, J=8.24 Hz, 2H), 7.15-7.20 (m, 1H), 7.00-7.05 (m, 2H), 5.64 (d, J=6.86 Hz, 1H), 4.39 (t, J=6.86 Hz, 1H), 3.84 (t, J=8.08 Hz, 2H), 3.53 (br. s., 2H), 3.35-3.43 (m, 4H), 2.26 (br. s., 4H), 2.05-2.21 (m, 4H), 1.42 (d, J=6.71 Hz, 3H), 1.12 (s, 9H).

Phenyl 4-(3-{4-[(1S)-1-{[(S)-tert-butylsulfinyl]amino}ethyl]phenyl}tetrahydrofuran-3-yl)piperazine-1-carboxylate [(XXIV) R1a=methyl, R1b=H, A=phenyl, R4=H, R5a and R5b=tetrahydrofuran-3-yl, M=Bond, G1=N, Z1, Z2=—CH2-, m1=m2=2, PG=phenylcarboxylate]

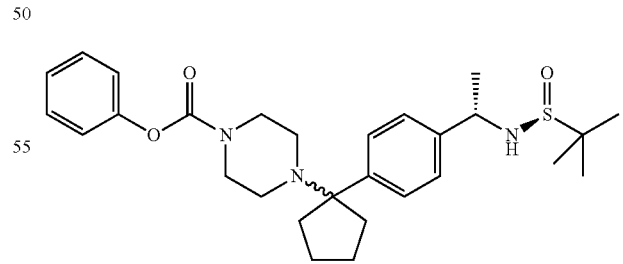

¹H NMR (500 MHz, DMSO-d₆) δ=7.38-7.42 (m, 2H), 7.29-7.37 (m, 4H), 7.16-7.21 (m, 1H), 7.02-7.07 (m, 2H), 5.63 (d, J=6.86 Hz, 1H), 5.31 (s, 1H), 4.07-4.11 (m, 1H), 3.94-3.98 (m, 2H), 3.67 (q, J=7.52 Hz, 1H), 3.54 (br. s., 2H), 3.38 (br. s., 2H), 2.24-2.44 (m, 6H), 1.41 (d, J=6.71 Hz, 3H), 1.12 (s, 9H).

71

Phenyl 4-(4-{5-[(1S)-1-{[(R)-tert-butylsulfinyl]
amino}ethyl]pyridin-3-yl}tetrahydro-2H-pyran-4-yl)
piperazine-1-carboxylate [(XXIV) R1a=methyl,
R1b=H, A=pyridin-2-yl, R4=H, R5a and
R5b=tetrahydro-2H-pyran-4-yl, M=Bond, G1=N,
Z1, Z2=—CH2-, m1=m2=2,
PG=phenylcarboxylate]

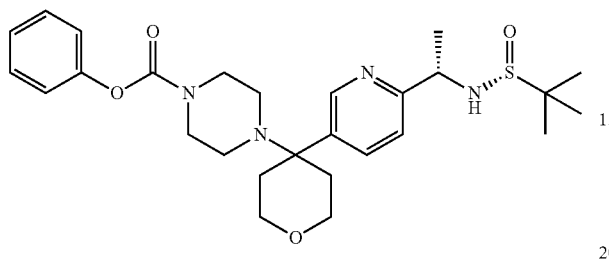

¹HNMR (400 MHz, CHLOROFORM-d) δ=8.50 (d, 1H, J=1.8 Hz), 7.54 (dd, 1H, J=2.1, 8.1 Hz), 7.3-7.4 (m, 3H), 7.1-7.2 (m, 1H), 7.03 (d, 2H, J=8.0 Hz), 4.67 (quin, 1H, J=6.7 Hz), 4.13 (q, 1H, J=7.1 Hz), 3.9-4.0 (m, 3H), 3.5-3.7 (m, 6H), 2.39 (br s, 4H), 2.1-2.3 (m, 4H), 1.66 (d, 3H, J=6.8 Hz), 1.23 (s, 8H).

Benzyl3-[(4-{4-[(1S)-1-{[(S)-tert-butylsulfinyl]
amino}ethyl]phenyl}tetrahydro-2H-pyran-4-yl)
(methyl)amino]azetidine-1-carboxylate [(XXIV)
R1a=methyl, R1b=H, A=Phenyl, R4=H, R5a and
R5b=tetrahydro-2H-pyran-4-yl, M=N(R6),
R6=methyl, G1=CH, Z1, Z2=—CH2-, m1=m2=1,
PG=benzylcarboxylate]

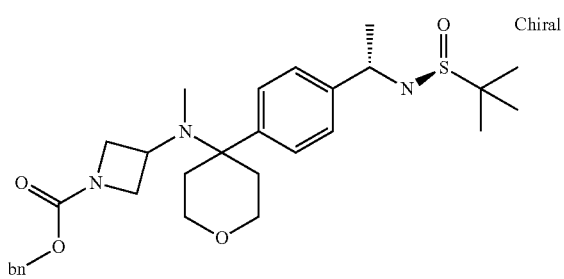

¹HNMR (400 MHz, CHLOROFORM-d) δ=7.27 (s, 9H), 5.03 (s, 2H), 4.56 (br dd, J=2.8, 6.5 Hz, 1H), 4.03-3.92 (m, 1H), 3.89-3.80 (m, 2H), 3.76-3.59 (m, 4H), 3.55-3.43 (m, 2H), 3.41 (d, J=2.4 Hz, 1H), 2.25 (s, 3H), 2.15 (br s, 4H), 1.51 (d, J=6.4 Hz, 3H), 1.24 (s, 9H).

72

Benzyl3-[acetyl(4-{4-[(1S)-1-{[(S)-tert-butylsulfi-
nyl]amino}ethyl]phenyl}tetrahydro-2H-pyran-4-yl)
amino]azetidine-1-carboxylate [(XXIV)
R1a=methyl, R1b=H, A=Phenyl, R4=H, R5a and
R5b=tetrahydro-2H-pyran-4-yl, M=N(R6),
R6=acetyl, G1=CH, Z1, Z2=—CH2-, m1=m2=1,
PG=benzylcarboxylate]

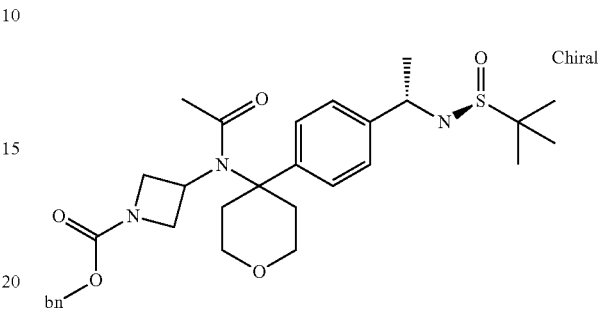

¹H NMR (500 MHz, DMSO-d₆) δ=7.29-7.39 (m, 7H), 7.24 (d, J=8.38 Hz, 2H), 5.62 (d, J=7.00 Hz, 1H), 5.02 (s, 2H), 4.60-4.71 (m, 1H), 3.97-4.41 (m, 6H), 2.64 (br s, 2H), 2.09 (s, 3H), 1.95-2.05 (m, 5H), 1.65-1.89 (m, 2H), 1.38 (d, J=6.75 Hz, 3H), 1.10 (s, 9H).

Step 6. Synthesis of phenyl 4-(4-{4-[(1S)-1-amino-
ethyl]phenyl}tetrahydro-2H-pyran-4-yl)piperazine-
1-carboxylate [(V) R1a=methyl, R1b=H, A=phenyl,
R4=H, R5a and R5b=tetrahydro-2H-pyran-4-yl,
M=Bond, G1=N, Z1, Z2=—CH2-, m1=m2=2,
PG=phenylcarboxylate] Step 5e

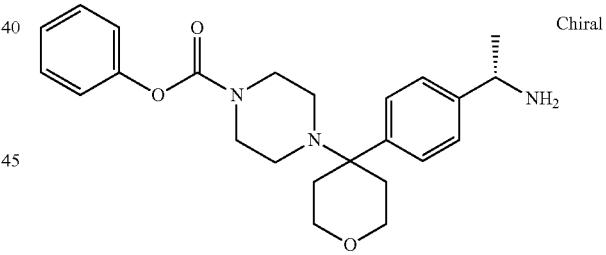

To a solution of phenyl 4-(4-{4-[(1S)-1-{[(S)-tert-bu-tylsulfinyl]amino}ethyl]phenyl} tetrahydro-2H-pyran-4-yl) piperazine-1-carboxylate (220 mg, 0.432 mmol) in MeOH (5 mL) was added HCl (2 mL, 8.0 mmol, 4M in 1,4-dioxane). The mixture was stirred at room temperature for 2 h. To this mixture was added DCM and saturated solution of NaHCO₃ the aqueous phase was extracted with DCM twice, dried over Na₂SO₄ and concentrated to afford phenyl 4-(4-{4-[(1S)-1-aminoethyl]phenyl}tetrahydro-2H-pyran-4-yl) piperazine-1-carboxylate (200 mg, 99% yield).

¹H NMR (500 MHz, DMSO-d₆) δ=7.37 (d, J=8.39 Hz, 2H), 7.31-7.34 (m, 2H), 7.23 (d, J=8.39 Hz, 2H), 7.16-7.20 (m, 1H), 7.00-7.06 (m, 2H), 3.98 (q, J=6.56 Hz, 1H), 3.79-3.87 (m, 2H), 3.52 (br. s., 2H), 2.25 (br. s., 4H), 2.03-2.20 (m, 5H), 1.81-2.01 (m, 1H), 1.25 (d, J=6.71 Hz, 3H).

According to the same method the following compounds were prepared:

phenyl 4-(4-{4-[(1R)-1-aminoethyl]phenyl}tetrahydro-2H-pyran-4-yl)piperazine-1-carboxylate [(V) R1a=H, R1b=methyl, A=phenyl, R4=H, R5a and R5b=tetrahydro-2H-pyran-4-yl, M=Bond, G1=N, Z1, Z2=—CH2-, m1=m2=2, PG=phenylcarboxylate]

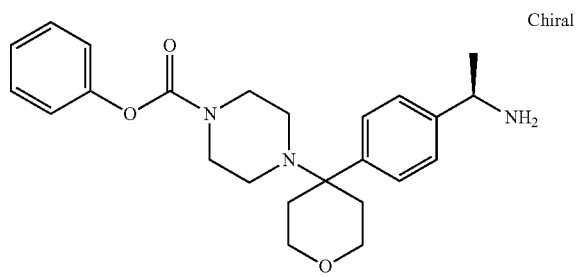 [SMILES: C[C@@H](N)c1ccc(C2(N3CCN(C(=O)Oc4ccccc4)CC3)CCOCC2)cc1]

$^1$H NMR (500 MHz, DMSO-$d_6$) δ=7.39 (d, J=8.24 Hz, 2H), 7.31-7.35 (m, 2H), 7.25 (d, J=8.24 Hz, 2H), 7.16-7.20 (m, 1H), 7.00-7.06 (m, 2H), 4.04 (d, J=6.56 Hz, 1H), 3.79-3.88 (m, 2H), 3.52 (br. s., 2H), 3.35-3.40 (m, 6H), 2.25 (br. s., 4H), 2.13 (dt, J=13.42, 17.46 Hz, 4H), 1.29 (d, J=6.56 Hz, 3H).

Phenyl 4-(1-acetyl-4-{4-[(1S)-1-aminoethyl]phenyl}piperidin-4-yl)piperazine-1-carboxylate [(V) R1a=methyl, R1b=H, A=phenyl, R4=H, R5a and R5b=1-acetylpiperidin-4-yl, M=Bond, G1=N, Z1, Z2=—CH2-, m1=m2=2, PG=phenylcarboxylate]

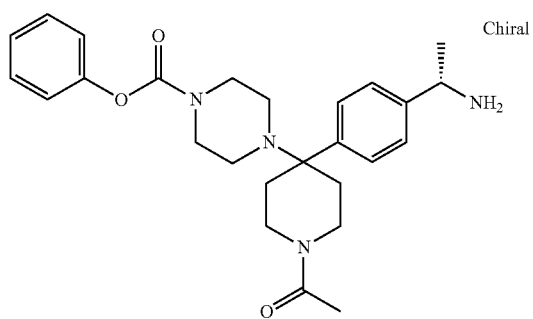 [SMILES: CC(=O)N1CCC(c2ccc([C@H](C)N)cc2)(N2CCN(C(=O)Oc3ccccc3)CC2)CC1]

$^1$H NMR (500 MHz, DMSO-$d_6$) δ=7.38 (d, J=8.24 Hz, 2H), 7.31-7.36 (m, 2H), 7.27 (d, J=8.39 Hz, 2H), 7.15-7.20 (m, 1H), 6.99-7.08 (m, 2H), 4.02 (d, J=6.41 Hz, 1H), 3.37-3.65 (m, 8H), 2.21-2.40 (m, 8H), 1.99 (s, 3H), 1.94 (d, J=2.90 Hz, 1H), 1.84 (d, J=12.96 Hz, 1H), 1.27 (d, J=6.71 Hz, 3H).

Phenyl 4-(4-{5-[(1S)-1-aminoethyl]pyridin-2-yl}tetrahydro-2H-pyran-4-yl)piperazine-1-carboxylate [(V) R1a=methyl, R1b=H, A=pyridine-2-yl, R4=H, R5a and R5b=tetrahydro-2H-pyran-4-yl, M=Bond, G1=N, Z1, Z2=—CH2-, m1=m2=2, PG=phenylcarboxylate]

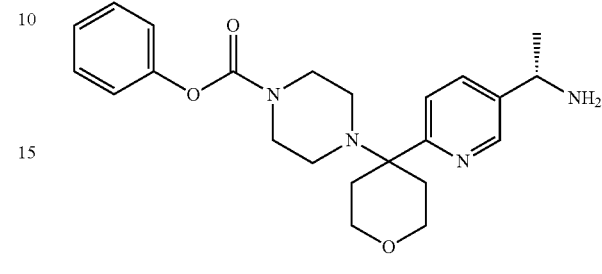

$^1$HNMR (500 MHz, DMSO-$d_6$) δ=8.70 (d, J=2.14 Hz, 1H), 7.94 (dd, J=2.36, 8.31 Hz, 1H), 7.46-7.50 (m, 1H), 7.31-7.36 (m, 2H), 7.16-7.21 (m, 1H), 6.98-7.05 (m, 2H), 4.40-4.51 (m, 1H), 3.81-3.89 (m, 2H), 3.52 (br. s., 2H), 3.24-3.32 (m, 2H), 2.27-2.40 (m, 6H), 2.01-2.14 (m, 2H), 1.52 (d, J=6.86 Hz, 3H).

Phenyl 4-(1-{4-[(1S)-1-aminoethyl]phenyl}cyclopentyl)piperazine-1-carboxylate [(V) R1a=methyl, R1b=H, A=phenyl, R4=H, R5a and R5b=cyclopentyl, M=Bond, G1=N, Z1, Z2=—CH2-, m1=m2=2, PG=phenylcarboxylate]

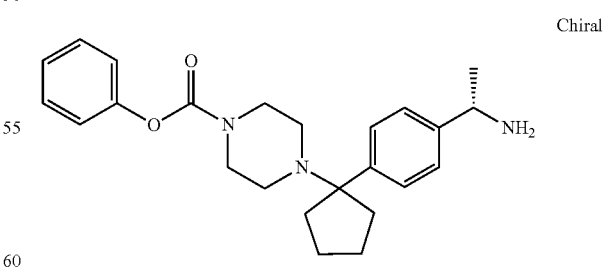

$^1$HNMR (500 MHz, DMSO-$d_6$) δ=7.31-7.36 (m, 4H), 7.27 (d, J=8.24 Hz, 2H), 7.18 (dd, J=7.4 and 7.3 Hz, 1H), 7.03 (d, J=8.54 Hz, 2H), 3.96 (q, J=6.56 Hz, 1H), 3.51 (br. s., 2H), 3.37-3.40 (m, 2H), 2.31 (br. s., 4H), 1.99-2.12 (m, 4H), 1.87 (br. s., 2H), 1.67-1.76 (m, 2H), 1.37-1.48 (m, 2H), 1.25 (d, J=6.56 Hz, 3H).

75

Phenyl 4-(3-{4-[(1S)-1-aminoethyl]phenyl}tetrahydrofuran-3-yl)piperazine-1-carboxylate [(V) R1a=methyl, R1b=H, A=phenyl, R4=H, R5a and R5b=cyclopentyl, M=Bond, G1=N, Z1, Z2=—CH2-, m1=m2=2, PG=phenylcarboxylate]

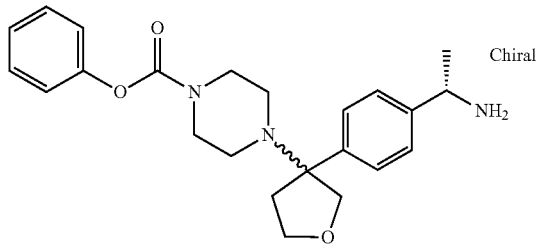 [SMILES: C[C@H](N)c1ccc(C2(N3CCN(C(=O)Oc4ccccc4)CC3)CCOC2)cc1]

¹HNMR (500 MHz, DMSO-d₆) δ=7.28-7.39 (m, 6H), 7.16-7.21 (m, 1H), 7.01-7.08 (m, 2H), 4.09 (d, J=9.15 Hz, 1H), 3.96-4.02 (m, 1H), 3.94 (d, J=8.85 Hz, 2H), 3.66 (q, J=7.78 Hz, 1H), 3.54 (br. s., 4H), 2.23-2.46 (m, 6H), 1.25 (d, J=6.71 Hz, 3H).

76

Phenyl 4-(4-{5-[(1R)-1-aminoethyl]pyridin-3-yl}tetrahydro-2H-pyran-4-yl)piperazine-1-carboxylate [(V) R1a=H, R1b=methyl, A=pyridine-2-yl, R4=H, R5a and R5b=tetrahydro-2H-pyran-4-yl, M=Bond, G1=N, Z1, Z2=—CH2-, m1=m2=2, PG=phenylcarboxylate]

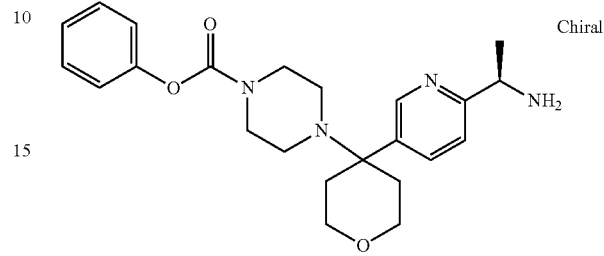

¹HNMR (500 MHz, DMSO-d₆) δ=8.46 (d, J=1.98 Hz, 1H), 7.68 (dd, J=2.29, 8.24 Hz, 1H), 7.42-7.53 (m, 1H), 7.29-7.37 (m, 2H), 7.15-7.22 (m, 1H), 7.00-7.07 (m, 2H), 3.99 (q, J=6.71 Hz, 1H), 3.81-3.90 (m, 2H), 3.54 (br. s., 2H), 3.37-3.42 (m, 4H), 2.01-2.31 (m, 8H), 1.29 (d, J=6.56 Hz, 3H).

Phenyl 4-(4-{5-[(1S)-1-aminoethyl]pyridin-3-yl}tetrahydro-2H-pyran-4-yl)piperazine-1-carboxylate [(V) R1a=methyl, R1b=H, A=pyridine-2-yl, R4=H, R5a and R5b=tetrahydro-2H-pyran-4-yl, M=Bond, G1=N, Z1, Z2=—CH2-, m1=m2=2, PG=phenylcarboxylate]

Benzyl 3-[(4-{4-[(1S)-1-aminoethyl]phenyl}tetrahydro-2H-pyran-4-yl)(methyl)amino]azetidine-1-carboxylate [(V) R1a=methyl, R1b=H, A=Phenyl, R4=H, R5a and R5b=tetrahydro-2H-pyran-4-yl, M=N(R6), R6=methyl, G1=CH, Z1, Z2=—CH2-, m1=m2=1, PG=benzylcarboxylate]

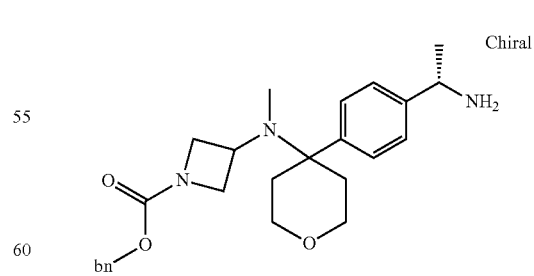

¹HNMR (400 MHz, CHLOROFORM-d) δ=8.50 (d, J=1.96 Hz, 1H) 7.53 (dd, J=8.19, 2.32 Hz, 1H) 7.33 (dd, J=16.44, 8.38 Hz, 3H) 7.13-7.22 (m, 1H) 7.04 (d, J=7.70 Hz, 2H) 4.19 (q, J=6.60 Hz, 1H) 3.91-4.07 (m, 2H) 3.46-3.72 (m, 6H) 2.39 (br t, J=4.52 Hz, 4H) 2.14-2.32 (m, 4H) 1.47 (d, J=6.72 Hz, 3H).

¹HNMR (500 MHz, DMSO-d₆) δ=7.23-7.37 (m, 9H), 4.94 (br. s., 2H), 4.07-4.15 (m, 1H), 3.97 (q, J=6.46 Hz, 1H), 3.66-3.73 (m, 2H), 3.53-3.65 (m, 2H), 3.36-3.53 (m, 2H), 3.25-3.33 (m, 2H), 2.13-2.19 (m, 2H), 2.11 (s, 3H), 1.96-2.06 (m, 2H), 1.22 (d, J=6.56 Hz, 3H).

77

Benzyl 3-[(1-{4-[(1S)-1-aminoethyl]phenyl}-4,4-difluorocyclohexyl)(methyl)amino]azetidine-1-carboxylate [(V) R1a=methyl, R1b=H, A=Phenyl, R4=H, R5a and R5b=4,4-difluorocyclohexyl, M=N(R6), R6=methyl, G1=CH, Z1, Z2=—CH2-, m1=m2=1, PG=benzylcarboxylate]

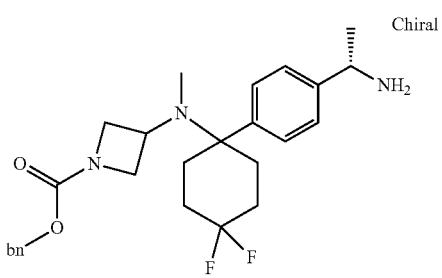

¹HNMR (500 MHz, DMSO-d₆) δ=7.25-7.36 (m, 9H), 4.95 (br. s., 2H), 4.19 (t, J=6.10 Hz, 1H), 3.97 (q, J=6.66 Hz, 1H), 3.59-3.78 (m, 2H), 3.39-3.51 (m, 2H), 2.30-2.44 (m, 2H), 2.14 (s, 4H), 1.87-2.02 (m, 4H), 1.73 (br. s., 2H), 1.22 (d, J=6.56 Hz, 3H).

Benzyl 4-(1-{4-[(1S)-1-aminoethyl]phenyl}-4,4-difluorocyclohexyl)piperazine-1-carboxylate [(V) R1a=methyl, R1b=H, A=phenyl, R4=H, R5a and R5b=4,4-difluorocyclohexyl, M=Bond, G1=N, Z1, Z2=—CH2-, m1=m2=2, PG=benzylcarboxylate]

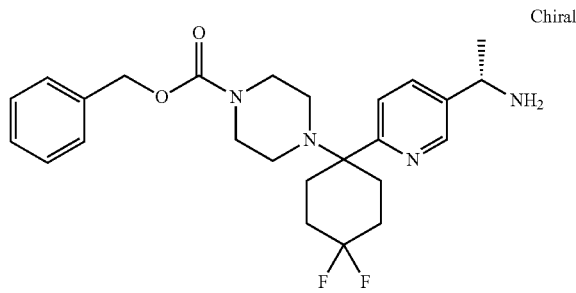 [SMILES: C[C@H](N)c1ccc(C2(N3CCN(C(=O)OCc4ccccc4)CC3)CCC(F)(F)CC2)nc1]

¹HNMR (500 MHz, DMSO-d₆) δ=7.21-7.37 (m, 9H), 4.98 (s, 2H), 3.96 (q, J=6.56 Hz, 2H), 2.06-2.28 (m, 8H), 1.89 (s, 3H), 1.79 (d, J=9.46 Hz, 5H), 1.20-1.25 (m, 3H).

78

Phenyl 4-(1-{4-[(1S)-1-aminoethyl]phenyl}-4,4-difluorocyclohexyl)piperazine-1-carboxylate [(V) R1a=methyl, R1b=H, A=phenyl, R4=H, R5a and R5b=4,4-difluorocyclohexyl, M=Bond, G1=N, Z1, Z2=—CH2-, m1=m2=2, PG=phenylcarboxylate]

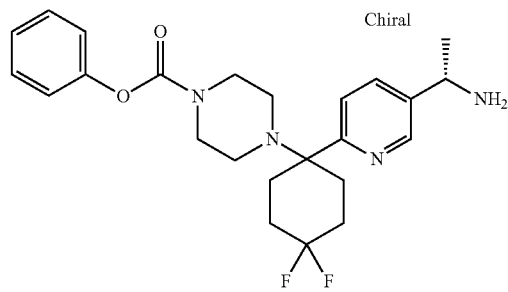 [SMILES: C[C@H](N)c1ccc(C2(N3CCN(C(=O)Oc4ccccc4)CC3)CCC(F)(F)CC2)nc1]

¹HNMR (500 MHz, DMSO-d₆) δ=7.35-7.39 (m, 2H), 7.31-7.35 (m, 2H), 7.27-7.31 (m, 2H), 7.12-7.20 (m, 1H), 6.96-7.07 (m, 2H), 3.97 (q, J=6.56 Hz, 1H), 3.53 (d, J=3.51 Hz, 2H), 2.53-2.61 (m, 2H), 2.28 (br. s., 4H), 2.08-2.22 (m, 4H), 1.71-2.03 (m, J=6.10 Hz, 4H), 1.24 (d, J=6.56 Hz, 3H).

Phenyl 4-(1-{4-[(1R)-1-aminoethyl]phenyl}-4,4-difluorocyclohexyl)piperazine-1-carboxylate [(V) R1a=methyl, R1b=H, A=phenyl, R4=H, R5a and R5b=4,4-difluorocyclohexyl, M=Bond, G1=N, Z1, Z2=—CH2-, m1=m2=2, PG=phenylcarboxylate]

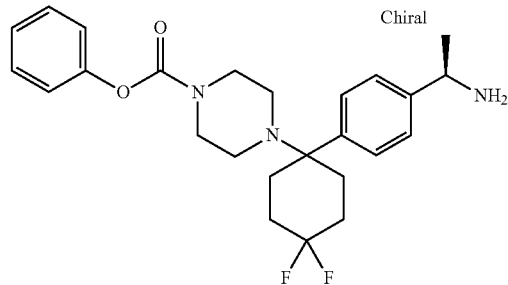 [SMILES: C[C@@H](N)c1ccc(C2(N3CCN(C(=O)Oc4ccccc4)CC3)CCC(F)(F)CC2)cc1]

¹HNMR (500 MHz, DMSO-d₆) δ=7.37-7.40 (m, 2H), 7.32-7.36 (m, 2H), 7.29-7.32 (m, 2H), 7.16-7.22 (m, 1H), 6.98-7.08 (m, 2H), 3.99 (q, J=6.56 Hz, 1H), 3.55 (br. s., 2H), 2.54-2.62 (m, 2H), 2.08-2.36 (m, 6H), 1.63-1.99 (m, J=6.10 Hz, 6H), 1.26 (d, J=6.71 Hz, 3H).

Preparation 12
Phenyl 4-(4-{4-[(1S)-1-aminoethyl]phenyl}tetrahydro-2H-pyran-4-yl)piperazine-1-carboxylate [(V) R1a=methyl, R1b=H, A=phenyl, R4=H, R5a and R5b=tetrahydro-2H-pyran-4-yl, M=Bond, G1=N, Z1, Z2=—CH2-, m1=m2=2, PG=phenylcarboxylate] Steps 5α-5e
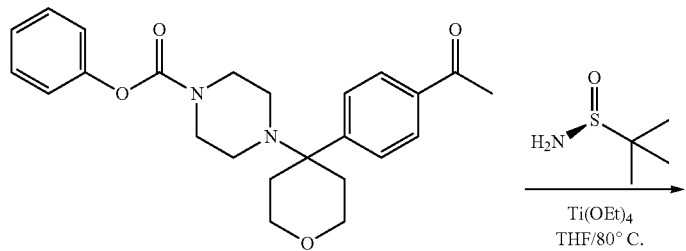
Step a
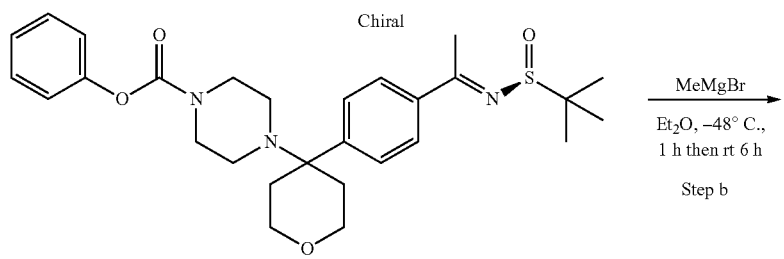
Step b
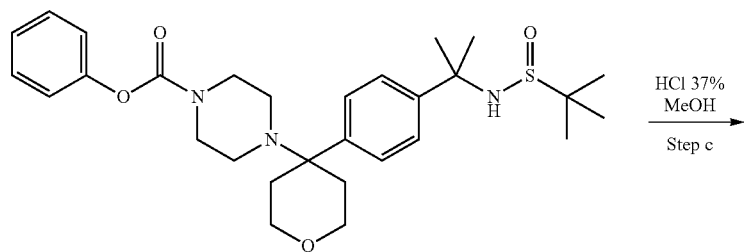
Step c
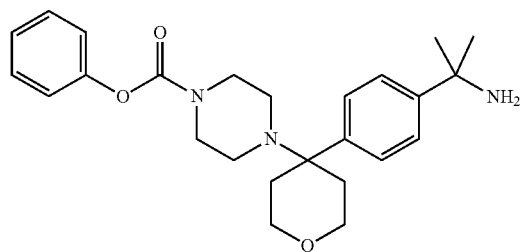

Step a Synthesis of phenyl 4-[4-(4-{(1E)-N—[(S)-tert-butylsulfinyl]ethanimidoyl}phenyl)tetrahydro-2H-pyran-4-yl]piperazine-1-carboxylate [(XXV) R1a=methyl, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5c"

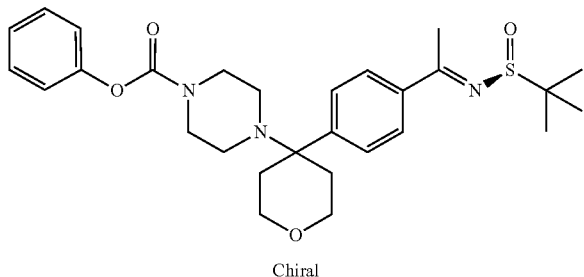 [SMILES: C/C(=N\[S@@](=O)C(C)(C)C)c1ccc(C2(N3CCN(C(=O)Oc4ccccc4)CC3)CCOCC2)cc1]
Chiral

A mixture of tetraethoxytitanium (2.5 eq., 1.57 mL, 7.5 mmol), (S)-2-methylpropane-2-sulfinamide (1.5 eq., 545 mg, 4.5 mmol), and phenyl 4-[4-(4-acetylphenyl)tetrahydro-2H-pyran-4-yl]piperazine-1-carboxylate (1.22 g, 3.0 mmol) in THF (80 mL) was heated to 80° C. overnight and then cooled to room temperature and concentrated. The residue was purified on a silical gel column chromatography system with gradient elution (100% DCM, then 0-20% Acetone/DCM) to afford title compound (966 mg, 63% yield).

$^1$H NMR (500 MHz, DMSO-d$_6$) δ=7.94 (d, J=8.39 Hz, 2H), 7.44 (d, J=8.54 Hz, 2H), 7.29-7.34 (m, 2H), 7.14-7.21 (m, 1H), 7.00-7.07 (m, 2H), 3.79-3.89 (m, 2H), 3.53 (br. s., 2H), 3.36-3.42 (m, 3H), 2.73 (s, 3H), 2.24-2.34 (m, 4H), 2.12-2.21 (m, 4H), 1.23 (s, 9H)

Step b Synthesis of phenyl 4-{4-[4-(2-{[(S)-tert-butylsulfinyl]amino}propan-2-yl)phenyl]tetrahydro-2H-pyran-4-yl}piperazine-1-carboxylate [(XXIV) R1a=R1b=methyl, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5e

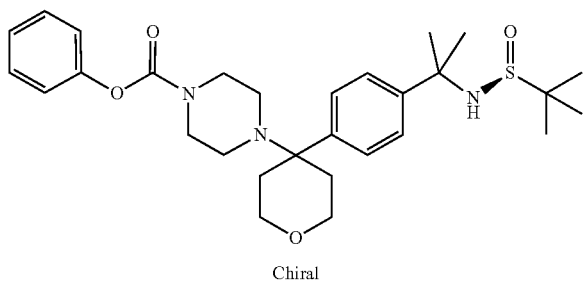 [SMILES: CC(C)(N[S@@](=O)C(C)(C)C)c1ccc(C2(N3CCN(C(=O)Oc4ccccc4)CC3)CCOCC2)cc1]
Chiral

To a solution of phenyl 4-[4-(4-{(1E)-N—[(S)-tert-butylsulfinyl]ethanimidoyl}phenyl)tetrahydro-2H-pyran-4-yl]piperazine-1-carboxylate (384 mg, 0.75 mmol) in 5 mL of dry DCM were added 0.375 mL (1.125 mmol, 1.5 eq.) of 3.0 M methylmagnesium bromide ether solution at −48° C. The mixture was allowed to warm to room temperature and stirred for 6 hours. The reaction mixture was quenched with saturated NaHCO$_3$ aqueous solution and the aqueous layer was extracted with DCM. The combined organic layers were dried over Na$_2$SO$_4$ and concentrated. The residue was purified on a silical gel column chromatography system with gradient elution (100% DCM, then 0-4% ethanol/DCM) to afford title compound (182 mg, 46% yield).

$^1$H NMR (500 MHz, DMSO-d$_6$) δ=7.47-7.53 (m, 2H), 7.30-7.36 (m, 2H), 7.25 (d, J=8.54 Hz, 2H), 7.16-7.20 (m, 1H), 6.99-7.04 (m, 2H), 5.36 (s, 1H), 3.84 (dd, J=7.93, 10.22 Hz, 2H), 3.53 (br. s., 2H), 3.36-3.43 (m, 3H), 2.25 (br. s., 3H), 2.03-2.21 (m, 4H), 1.58 (d, J=4.27 Hz, 5H), 1.09-1.13 (m, 8H)

Step c Synthesis of phenyl 4-{4-[4-(2-aminopropan-2-yl)phenyl]tetrahydro-2H-pyran-4-yl}piperazine-1-carboxylate [(V) R1a=R1b=methyl, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5d

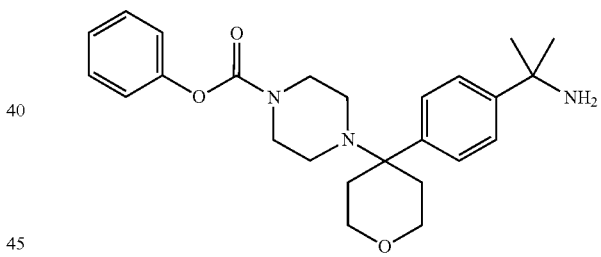

To a solution of phenyl 4-{4-[4-(2-{[(S)-tert-butylsulfinyl]amino}propan-2-yl)phenyl]tetrahydro-2H-pyran-4-yl}piperazine-1-carboxylate (180 mg, 0.341 mmol) in MeOH (5 mL) was added HCl 37% (0.25 mL) at 0° C. The mixture was stirred at room temperature for 1 h. To this mixture was added DCM and saturated solution of NaHCO$_3$ the aqueous phase was extracted with DCM twice, dried over Na$_2$SO$_4$ and concentrated to afford phenyl 4-{4-[4-(2-aminopropan-2-yl)phenyl]tetrahydro-2H-pyran-4-yl}piperazine-1-carboxylate (143 mg, 99% yield).

$^1$H NMR (500 MHz, DMSO-d$_6$) δ=7.52 (d, J=8.39 Hz, 2H), 7.30-7.36 (m, 2H), 7.22 (d, J=8.39 Hz, 2H), 7.14-7.20 (m, 1H), 7.00-7.06 (m, 2H), 3.79-3.86 (m, 2H), 3.52 (br. s., 2H), 3.36-3.44 (m, 3H), 2.26 (br. s., 4H), 2.04-2.20 (m, 4H), 1.90 (br. s., 2H), 1.34-1.40 (m, 6H).

According to the same method the following compound was prepared:

Phenyl 4-{1-[4-(2-aminopropan-2-yl)phenyl]-4,4-difluorocyclohexyl}piperazine-1-carboxylate [(V) R1a=R1b=methyl, A=phenyl, R4=H, R5a and R5b=4,4-difluorocyclohexyl, M=Bond, G1=N, Z1, Z2=—CH2-, m1=m2=2, PG=phenylcarboxylate]
Step 5d

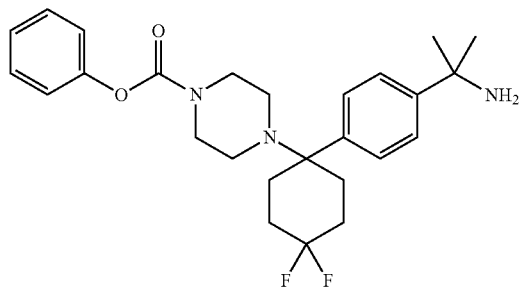 [SMILES: CC(C)(N)c1ccc(C2(N3CCN(C(=O)Oc4ccccc4)CC3)CCC(F)(F)CC2)cc1]

$^1$H NMR (500 MHz, DMSO-d$_6$) δ=7.52 (d, J=8.39 Hz, 2H), 7.31-7.37 (m, 2H), 7.29 (d, J=8.39 Hz, 2H), 7.13-7.22 (m, 1H), 7.03 (dd, J=0.92, 8.54 Hz, 2H), 3.53 (br. s., 2H), 3.38 (br. s., 2H), 2.54-2.62 (m, 2H), 2.28 (br. s., 2H), 2.05-2.24 (m, 4H), 1.68-1.92 (m, 4H), 1.37 (s, 6H).

Preparation 13

Synthesis of 3-(4-bromophenyl)pentan-3-amine [(XXI) W1=Br, A=Phenyl, R4=H, R5a and R5b=ethyl] Step 5a

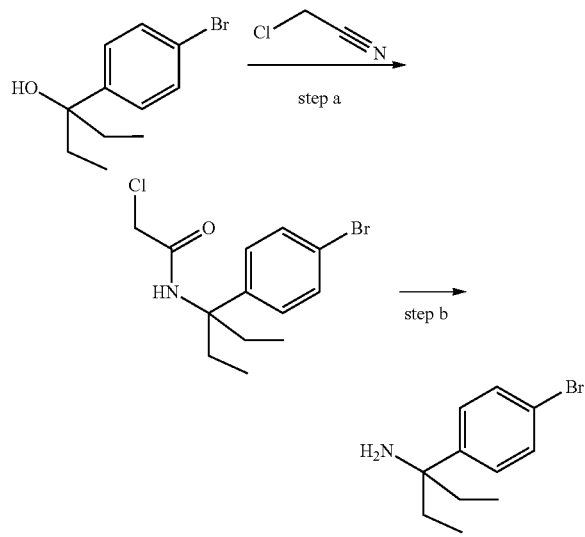

Step a Synthesis of N-[3-(4-bromophenyl)pentan-3-yl]-2-chloroacetamide

To the alcohol 3-(4-bromophenyl)pentan-3-ol (2.5 g, 10 mmol) and ClCH$_2$CN (1.5 g, 20 mmol) was added AcOH (25 mL) and the mixture was cooled to 0° C. H$_2$SO$_4$ (1.6 mL, 30 mmol) was added dropwise keeping the temperature below 10° C. The reaction mixture was allowed to reach r.t., stirred for 4 h and poured into ice water (20 mL). A light pink precipitate was formed and filtered. To obtain N-[3-(4-bromophenyl)pentan-3-yl]-2-chloroacetamide 2.7 g 85% yield as light pink solid.

$^1$H NMR (500 MHz, DMSO-d$_6$) δ=8.11 (s, 1H), 7.44-7.49 (m, 2H), 7.19-7.24 (m, 2H), 4.05-4.11 (m, 2H), 1.75-2.10 (m, 4H), 0.64 (t, J=7.40 Hz, 6H).

According to the same method the following compound was prepared:

2-chloro-N-[4-(6-chloropyridin-3-yl)tetrahydro-2H-pyran-4-yl]acetamide [(XXI) W1=Cl, A=pyridine-3-yl, R4=H, R5a and R5b=tetrahydro-2H-pyran-4-yl]
Step 5a

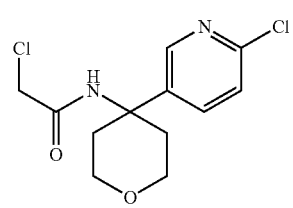 [SMILES: O=C(CCl)NC1(c2ccc(Cl)nc2)CCOCC1]

$^1$H NMR (400 MHz, CHLOROFORM-d) δ=8.51 (d, J=2.45 Hz, 1H) 7.79 (dd, J=8.38, 2.51 Hz, 1H) 7.33 (d, J=8.44 Hz, 1H) 3.84-4.01 (m, 4H) 2.08-2.17 (m, 2H) 1.70 (br d, J=13.08 Hz, 2H).

Step b Synthesis of 3-(4-bromophenyl)pentan-3-amine [(XXI) W1=Br, A=Phenyl, R4=H, R5a and R5b=ethyl]

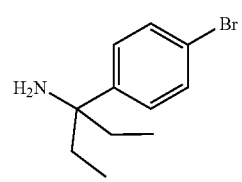

The chloroacetamide (2.7 g, 8.5 mmol) and thiourea (800 mg 10 mmol) were dissolved in a mixture of 1:5 AcOH/EtOH (22 mL) and refluxed for 10 h. To the cooled reaction was diluted in water and the precipitate filtered off. The filtrate was basified with NaOH and extract with Ethyl Acetate. The product was purified on silica Hexane/AcOEt 1:1 to give the 3-(4-bromophenyl)pentan-3-amine (1.4 g 68% yield).

$^1$H NMR (500 MHz, DMSO-d$_6$) δ=7.46-7.52 (m, 2H), 7.35-7.39 (m, 2H), 1.54-1.79 (m, 4H), 0.62 (t, J=7.40 Hz, 6H)

According to the same method the following compound was prepared:

4-(6-chloropyridin-3-yl)tetrahydro-2H-pyran-4-amine [(XXI) W1=Cl, A=pyridine-3-yl, R4=H, R5a and R5b=tetrahydro-2H-pyran-4-yl]

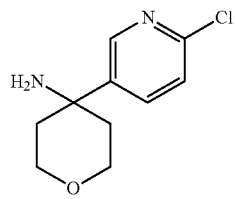 [SMILES: NC1(c2ccc(Cl)nc2)CCOCC1]

$^1$H NMR (400 MHz, CHLOROFORM-d) δ=8.54 (d, J=2.65 Hz, 1H) 7.79 (dd, J=8.38, 2.65 Hz, 1H) 7.32 (d, J=8.38 Hz, 1H) 3.77-4.01 (m, 4H) 2.08-2.26 (m, 2H) 1.64 (dd, J=13.89, 2.43 Hz, 2H).

Preparation 14

Synthesis of phenyl 4-(4-(4-acetylphenyl)tetrahydro-2H-pyran-4-yl)piperazine-1-carboxylate [(XXIII) W1=methylketone, A=Phenyl, R4=H, R5a and R5b=tetrahydro-2H-pyran-4-yl, M=Bond, G1=N, Z1, Z2=—CH2-, m1=m2=2, PG=phenylcarboxylate] Step 5a, 5b

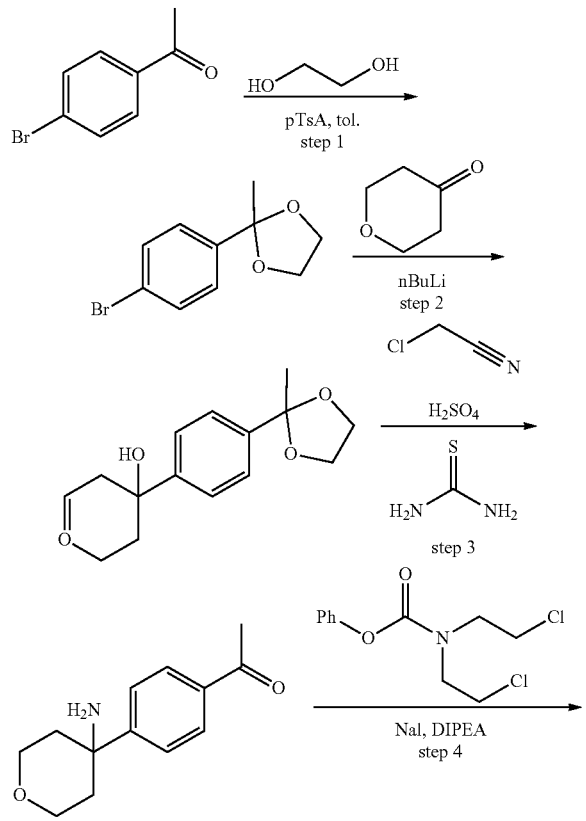

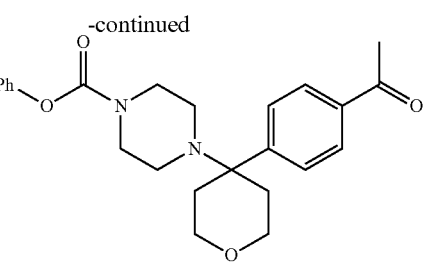

Step 1 Preparation of 2-(4-bromophenyl)-2-methyl-1,3-dioxolane

To a mixture of 1-(4-bromophenyl)ethanone (7.0 g, 35.2 mmol, 1 eq) and ethylene glycol (9.8 g, 158 mmol, 4.5 eq) in Toluene (35 mL) was added PTSA (0.669 g, 3.52 mmol, 0.1 eq) in one portion at 25° C.~30° C. under N$_2$. The mixture was stirred at reflux for 36 hrs and remove water by Dean-Stark trap. The mixture was cooled to 50° C. and concentrated in reduced pressure at 50° C. The residue was poured into saturated aqueous Na$_2$CO$_3$ (40 mL) and stirred for 20 min. The aqueous phase was extracted with mixed solvents (Petroleum ether/Ethyl acetate=5/1 40 ml, 30 ml). The combined organic phase was washed with brine (30 mL), dried with anhydrous Na$_2$SO$_4$, filtered and concentrated in vacuum to give the title compound (9.0 g purity 80%) as a light yellow oil. The crude product was used for next step without purification. LCMS:LCMS: m/z 244 [M+H]$^+$ r.t. 8.51 min.

Step 2 Preparation of 4-(4-(2-methyl-1,3-dioxolan-2-yl)phenyl)tetrahydro-2H-pyran-4-ol [(XX) W1=2-methyl-1,3-dioxolan-2-yl, A=Phenyl, R4=H, R5a and R5b=tetrahydro-2H-pyran-4-yl]

To a solution of n-BuLi (2.5 M, 12.6 mL, 1.2 eq) in THF (13 mL) was added a solution of 2-(4-bromophenyl)-2-methyl-1,3-dioxolane (6.4 g, 26.33 mmol, 1 eq) in THF (10.0 mL) drop-wise at −65° C. over a period of 30 min under N$_2$. Tetrahydropyran-4-one (2.50 g, 25.01 mmol, 2.30 mL, 0.95 eq) was added to above mixture in 20 min at −65° C. The reaction mixture was stirred at −65° C. for 30 min. TLC (Petroleum ether/Ethyl acetate=3/1, Rf=0.24) showed the starting material was consumed completely. The reaction mixture was quenched with saturated aqueous NH$_4$Cl at 0° C. and stirred at 20° C. for 30 min (During the stirring, a white precipitate was formed.) and filtered to give a white solid. The white solid was dissolved in DCM (150 mL), the organic phase was washed with saturated aqueous Na$_2$CO$_3$, dried with anhydrous Na$_2$SO$_4$, filtered and concentrated in vacuum. The crude product was triturated with MTBE at 20° C. for 30 min, filtered and dried for 10 h at 50° C. in the drying oven to a white powder (3.43 g, 37% yield for two step). LCMS: m/z 265 [M+H]$^+$ r.t. 6.35 min.

According to the same method the following compound was prepared:

4,4-difluoro-1-[4-(2-methyl-1,3-dioxolan-2-yl)phenyl]cyclohexanol [(XX) W1=2-methyl-1,3-dioxolan-2-yl, A=phenyl, R4=H, R5a and R5b=4,4-difluorocyclohexyl

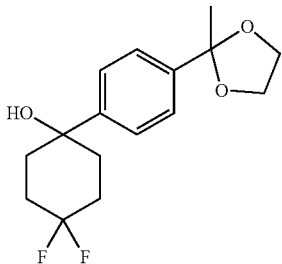 [SMILES: CC1(c2ccc(C3(O)CCC(F)(F)CC3)cc2)OCCO1]

$^1$H NMR (400 MHz, CHLOROFORM-d) δ=12.23 (d, J=8.3 Hz, 2H), 12.17-12.09 (m, 2H), 9.93 (s, 1H), 8.79-8.68 (m, 2H), 8.50-8.39 (m, 2H), 7.11-6.86 (m, 2H), 6.70 (br t, J=12.0 Hz, 4H), 6.52 (br d, J=12.6 Hz, 2H), 6.30 (s, 3H).

Step 3 Preparation of 4-(4-bromophenyl)tetrahydro-2H-pyran-4-amine [(XXI) W1=Br, A=Phenyl, R4=H, R5a and R5b=tetrahydro-2H-pyran-4-yl] Step 5a To a mixture of 4-(4-(2-methyl-1,3-dioxolan-2-yl)phenyl)tetrahydro-2H-pyran-4-ol (6.00 g, 22.7 mmol, 1.0 eq) and 2-chloroacetonitrile (28.5 g, 378 mmol, 24 mL, 16.7 eq) in 50 mL round bottom flask was added AcOH (1.36 g, 22.0 mmol, 1.30 mL, 1.0 eq) and H$_2$SO$_4$ (2.23 g, 22.7 mmol, 1.21 mL, 1.0 eq) drop-wise in turn at 0° C. over a period of 30 min under N$_2$. The mixture was stirred at 20° C. for 10 h. The mixture was poured into ice-water (w/w=1/1) (50 mL) and basified to pH 9 with saturated aqueous Na$_2$CO$_3$ (3.9 g). The aqueous phase was extracted with dichloromethane (15 mL×3). The combined organic phase was washed with brine (20 mL), dried with anhydrous Na$_2$SO$_4$, filtered and concentrated in vacuum. The crude product was triturated with MTBE (20 mL) at 20° C. for 10 min and filtered to give a white solid (4.0 g, 60.0% yield).

To a solution of N-(4-(4-acetylphenyl)tetrahydro-2H-pyran-4-yl)-2-chloroacetamide (6.00 g, 20.29 mol, 1 eq) in EtOH (30 mL) was added thiourea (1.85 g, 24.34 mmol, 1.2 eq) at 20° C. under N$_2$. AcOH (3.65 g, 60.8 mmol, 3.48 mL, 3 eq) was added to above mixture at 20° C. The reaction mixture was stirred at 100° C. for 10 h. The mixture was cooled to 60° C. and concentrated in reduced pressure at 55° C. The mixture was poured into ice-water (w/w=1/1) (10 mL) and basified to pH 9 with saturated aqueous Na$_2$CO$_3$. The aqueous phase was extracted with dichloromethane (20 mL×3). The combined organic phase was washed with brine (20 mL), dried with anhydrous Na$_2$SO$_4$, filtered and concentrated in vacuum. The crude product was triturated with MTBE (10 mL) at 25° C. for 10 min and filtered to give the title compound as a light yellow solid 4.0 g, 90.0% yield. LCMS: m/z 220 [M+H]$^+$ r.t. 4.85 min.

According to the same method the following compound was prepared:

1-[4-(1-amino-4,4-difluorocyclohexyl)phenyl]ethanone (XXI) [(XXI) W1=metylketone, A=phenyl, R4=H, R5a and R5b=4,4-difluorocyclohexyl]

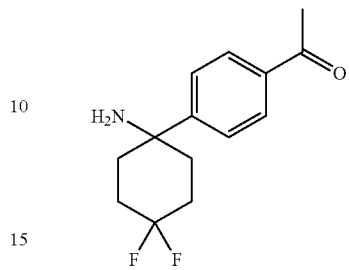

$^1$H NMR (500 MHz, DMSO-d$_6$) δ=7.90 (d, J=8.6 Hz, 2H), 7.68 (d, J=8.6 Hz, 2H), 2.56 (s, 3H), 2.42-2.23 (m, 2H), 2.03 (br s, 2H), 1.99 (s, 1H), 2.00-1.92 (m, 1H), 1.92-1.82 (m, 2H), 1.92-1.82 (m, 1H), 1.79-1.65 (m, 2H).

Step 4 Preparation of phenyl 4-(4-(4-acetylphenyl)tetrahydro-2H-pyran-4-yl)piperazine-1-carboxylate step 5b To a solution of 1-(4-(4-aminotetrahydro-2H-pyran-4-yl)phenyl)ethanone (1.50 g, 6.84 mmol, 1.0 eq) in DIPEA (5 mL) was added NaI (150.0 mg) at 20° C. under N$_2$. Phenyl bis(2-chloroethyl)carbamate (2.33 g, 8.89 mmol, 1.3 eq) was added to above mixture at 20° C. The reaction mixture was stirred at 140° C. for 10 h. The mixture was cooled to 40° C. and separated in 100 mL separating funnel. The lower was acidified to pH 6 with HCl (2N) and extracted with dichloromethane (20 mL×3). The combined organic phase was washed with brine (20 mL), dried with anhydrous Na$_2$SO$_4$, filtered and concentrated in vacuum. The residue was purified by silica gel chromatography (Petroleum ether/Ethyl acetate=20/1, 0/1) to afford a crude product that was triturated with MTBE (20 mL) at 25° C. for 10 min and filtered to give a white solid (1.28 g, 45.0% yield). $^1$H NMR (500 MHz, DMSO-d$_6$) δ=7.97 (d, J=8.39 Hz, 2H), 7.46 (d, J=8.54 Hz, 2H), 7.30-7.35 (m, 2H), 7.13-7.21 (m, 1H), 6.99-7.06 (m, 2H), 3.80-3.90 (m, 2H), 3.46-3.60 (m, 2H), 3.33-3.40 (m, 4H), 2.59 (s, 3H), 2.09-2.32 (m, 8H). LCMS: m/z 409 [M+H]$^+$ @ r.t. 6.02 min. HRMS (ESI) calcd for C$_{24}$H$_{29}$N$_2$O$_4$ [M+H]$^+$ 409.2122 found 409.2113.

Preparation 15

Synthesis of phenyl 4-{4-[4-(aminomethyl)phenyl]tetrahydro-2H-pyran-4-yl}piperazine-1-carboxylate [(V) R1a=R1b=H, A=phenyl, R4=H, R5a and R5b=tetrahydro-2H-pyran-4-yl, M=Bond, G1=N, Z1, Z2=—CH2-, m1=m2=2, PG=phenylcarboxylate] Steps 5α-5d

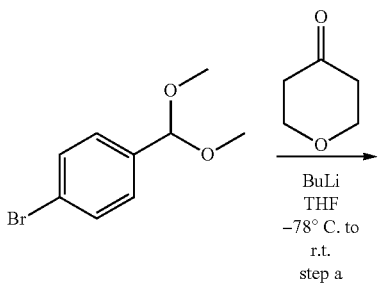

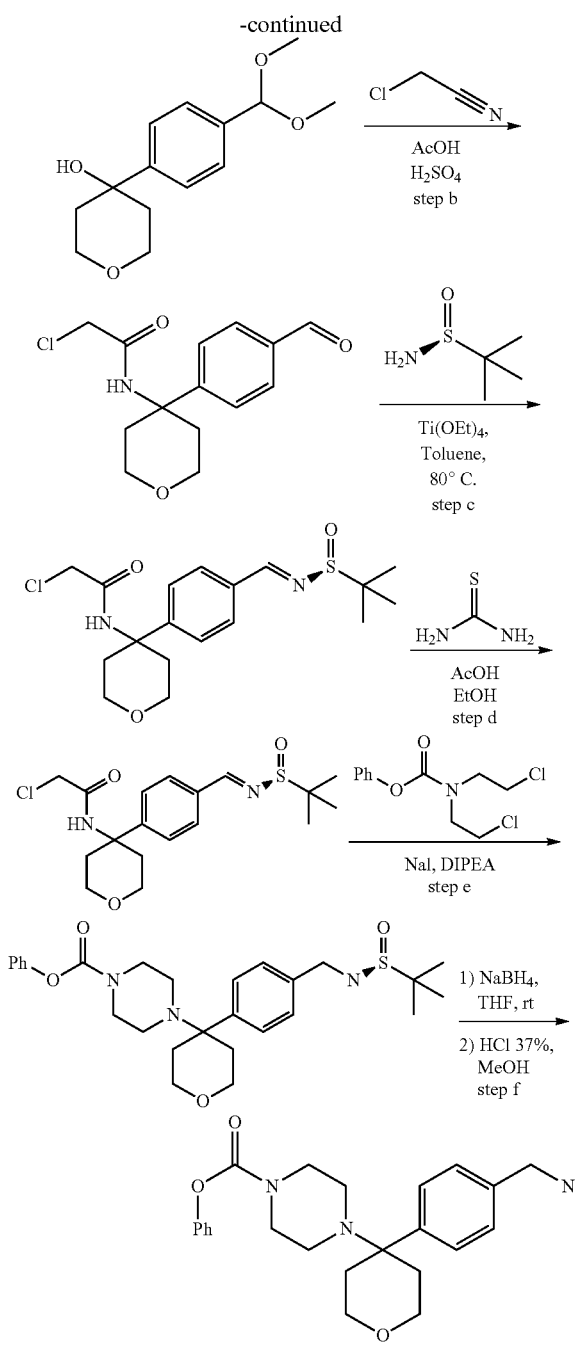

Step a Preparation of 4-[4-(dimethoxymethyl)phenyl]tetrahydro-2H-pyran-4-yl [dimethoxymethyl, A=Phenyl, R4=H, R5a and R51b=tetra hydro-2H-pyran-4-yl]

To a solution of n-BuLi (2.5 M, 12.6 mL, 1.2 eq) in THE (13 mL) was added a solution of 1-bromo-4-(dimethoxymethyl)benzene (6.4 g, 26.33 mmol, 1 eq) in THE (10.0 mL) drop-wise at −65° C. over a period of 30 min under $N_2$. Tetrahydropyran-4-one (2.50 g, 25.01 mmol, 2.30 mL, 0.95 eq) was added to above mixture in 20 min at −65° C. The reaction mixture was stirred at −65° C. for 30 min. The reaction mixture was quenched with saturated aqueous $NH_4Cl$ at 0° C. and stirred at 20° C. for 30 min (During the stirring, a white precipitate was formed.) and filtered to give a white solid. The white solid was dissolved in DCM (150 mL), the organic phase was washed with saturated aqueous $Na_2CO_3$, dried with anhydrous $Na_2SO_4$, filtered and concentrated in vacuum. The crude product was a white powder (3.98 g, 60% yield).

$^1$H NMR (500 MHz, DMSO-$d_6$) δ=7.47-7.51 (m, 2H), 7.33 (d, J=8.24 Hz, 2H), 5.35 (s, 1H), 5.04 (s, 1H), 3.74-3.81 (m, 2H), 3.67-3.72 (m, 2H), 3.23 (s, 6H), 1.95 (dt, J=5.11, 12.77 Hz, 2H), 1.52 (d, J=12.20 Hz, 2H). LCMS:LCMS: m/z 253 [M+H]$^+$ r.t. 6.35 min.

Step b Preparation of 2-chloro-N-[4-(4-formylphenyl)tetrahydro-2H-pyran-4-yl]acetamide step 5a To a mixture of 4-(4-(2-methyl-1,3-dioxolan-2-yl)phenyl)tetrahydro-2H-pyran-4-ol (6.00 g, 22.7 mmol, 1.0 eq) and 2-chloroacetonitrile (28.5 g, 378 mmol, 24 mL, 16.7 eq) in 50 mL round bottom flask was added AcOH (1.36 g, 22.0 mmol, 1.30 mL, 1.0 eq) and $H_2SO_4$ (2.23 g, 22.7 mmol, 1.21 mL, 1.0 eq) drop-wise in turn at 0° C. over a period of 30 min under $N_2$. The mixture was stirred at 20° C. for 10 h. The mixture was poured into ice-water (w/w=1/1) (50 mL) and basified to pH 9 with saturated aqueous $Na_2CO_3$ (3.9 g). The aqueous phase was extracted with dichloromethane (15 mL×3). The combined organic phase was washed with brine (20 mL), dried with anhydrous $Na_2SO_4$, filtered and concentrated in vacuum. The crude product was triturated with MTBE (20 mL) at 20° C. for 10 min and filtered to give a white solid (4.0 g, 60.0% yield). $^1$H NMR (500 MHz, DMSO-$d_6$) δ=9.98 (s, 1H), 8.57 (s, 1H), 7.87 (d, J=8.39 Hz, 2H), 7.60 (d, J=8.39 Hz, 2H), 4.13 (s, 2H), 3.76 (dd, J=2.75, 11.74 Hz, 2H), 3.60-3.69 (m, 2H), 2.24 (d, J=12.96 Hz, 2H), 1.92-2.02 (m, 2H). LCMS: m/z 282 [M+H]$^+$ r.t. 4.07 min.

Step c Preparation of N-(4-{4-[(E)-{[(S)-tert-butylsulfinyl]imino}methyl]phenyl}tetrahydro-2H-pyran-4-yl)-2-chloroacetamide A mixture of tetraethoxytitanium (2.5 eq., 4.0 mL, 19.08 mmol), (S)-2-methylpropane-2-sulfinamide (1.5 eq., 1.38 g, 11.4 mmol), and 2-chloro-N-[4-(4-formylphenyl)tetrahydro-2H-pyran-4-yl]acetamide (2.15 g, 7.63 mmol) in Toluene (20 mL) was heated to 80° C. overnight and then cooled to room temperature and concentrated. The residue was purified on a silical gel column chromatography system with gradient elution (100% DCM, then 0-20% Acetone/DCM) to afford title compound (1.76 mg, 60% yield). LCMS:LCMS: m/z 385 [M+H]$^+$ r.t. 6.85 min.

Step d Preparation of N-{(E)-[4-(4-aminotetrahydro-2H-pyran-4-yl)phenyl]methylidene}-2-methylpropane-2-sulfinamide [(XXI) W1=(S)-tert-butylsulfinamidemethylidene, A=Phenyl, R4=H, R5a and R5b=tetrahydro-2H-pyran-4-yl] Step 5a To a solution of N-(4-{4-[(E)-{[(S)-tert-butylsulfinyl]imino}methyl]phenyl}tetrahydro-2H-pyran-4-yl)-2-chloroacetamide (1.76 g, 4.58 mmol, 1 eq) in EtOH (30 mL) was added thiourea (0.418 g, 5.50 mmol, 1.2 eq) at 20° C. under $N_2$. AcOH (0.824 mL, 13.74 mmol, 3 eq) was added to above mixture at 20° C. The reaction mixture was stirred at 100° C. for 10 h. The mixture was cooled to 60° C. and concentrated in reduced pressure. The mixture was poured into ice-water (w/w=1/1) (10 mL) and basified to pH 9 with saturated aqueous $Na_2CO_3$. The aqueous phase was extracted with dichloromethane (20 mL×3). The combined organic phase was washed with brine (20 mL), dried with anhydrous Na$_2$SO$_4$, filtered and concentrated in vacuum. The crude product was triturated with MTBE (10 mL) at 25° C. for 10 min and filtered to give the title compound as a off-white solid 1.27 g, 90.0% yield.

$^1$H NMR (500 MHz, DMSO-d$_6$) δ=8.52 (s, 1H), 7.89 (d, J=8.39 Hz, 2H), 7.69 (d, J=8.54 Hz, 2H), 3.82-3.91 (m, 2H), 3.60-3.69 (m, 2H), 1.89-2.02 (m, 3H), 1.53 (d, J=11.74 Hz, 2H), 1.18 (s, 9H).

LCMS:LCMS: m/z 309 [M+H]$^+$ r.t. 2.32 min.

Step e Preparation of phenyl 4-(4-{4-[(E)-{[(S)-tert-butylsulfinyl]imino}methyl]phenyl}tetrahydro-2H-pyran-4-yl)piperazine-1-carboxylate [(XXIII) W1=(S)-tert-butylsulfinamidemethylidene, A=Phenyl, R4=H, R5a and R5b=tetrahydro-2H-pyran-4-yl] Step 5b To a solution of N-{(E)-[4-(4-aminotetrahydro-2H-pyran-4-yl)phenyl]methylidene}-2-methylpropane-2-sulfinamide (1.20 g, 3.89 mmol, 1.0 eq) in DIPEA (5 mL) was added NaI (130.0 mg) at 20° C. under N$_2$. Phenyl bis(2-chloroethyl)carbamate (1.32 g, 5.1 mmol, 1.3 eq) was added to above mixture at 20° C. The reaction mixture was stirred at 140° C. for 48 h. The mixture was cooled to 40° C. and separated in 100 mL separating funnel. The lower was acidified to pH 6 with HCl (2N) and extracted with dichloromethane (20 mL×3). The combined organic phase was washed with brine (20 mL), dried with anhydrous Na$_2$SO$_4$, filtered and concentrated in vacuum. The residue was purified by silica gel chromatography (Petroleum ether/Ethyl acetate=20/1, 0/1) to afford a crude product that was triturated with MTBE (20 mL) at 25° C. for 10 min and filtered to give a white solid (0.967 g, 50.0% yield). LCMS: m/z 498 [M+H]$^+$ @ r.t. 6.58 min.

Step f Synthesis of phenyl 4-{4-[4-(aminomethyl)phenyl]tetrahydro-2H-pyran-4-yl}piperazine-1-carboxylate [(V) R1a=R1b=H, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5d

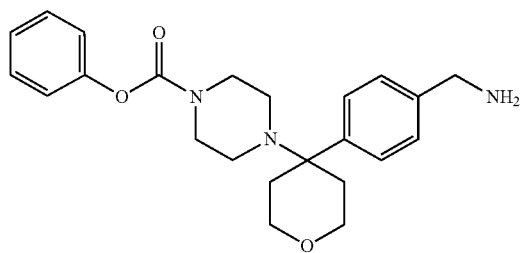 [SMILES: NCc1ccc(C2(N3CCN(C(=O)Oc4ccccc4)CC3)CCOCC2)cc1]

To a solution of phenyl 4-(4-{4-[(E)-{[(S)-tert-butylsulfinyl]imino}methyl]phenyl}tetrahydro-2H-pyran-4-yl)piperazine-1-carboxylate (910 mg, 1.82 mmol) in MeOH (5 mL) was added HCl 37% (0.25 mL) at 0° C. The mixture was stirred at room temperature for 1 h. To this mixture was added DCM and saturated solution of Na$_2$CO$_3$ the aqueous phase was extracted with DCM twice, dried over Na$_2$SO$_4$ and concentrated to afford the title compound as off-white solid (715 mg, 99% yield). LCMS: m/z 396 [M+H]$^+$ @ r.t. 2.35 min.

Preparation 16

Phenyl 4-{4-[4-(1-aminocyclopropyl)phenyl]tetrahydro-2H-pyran-4-yl}piperazine-1-carboxylate [(V) R1a and R1b=cyclopropyl, A=phenyl, R4=H, R5a and R5b=tetrahydro-2H-pyran-4-yl, M=Bond, G1=N, Z1, Z2=—CH2-, m1=m2=2, PG=phenylcarboxylate] conv. F-step 5c

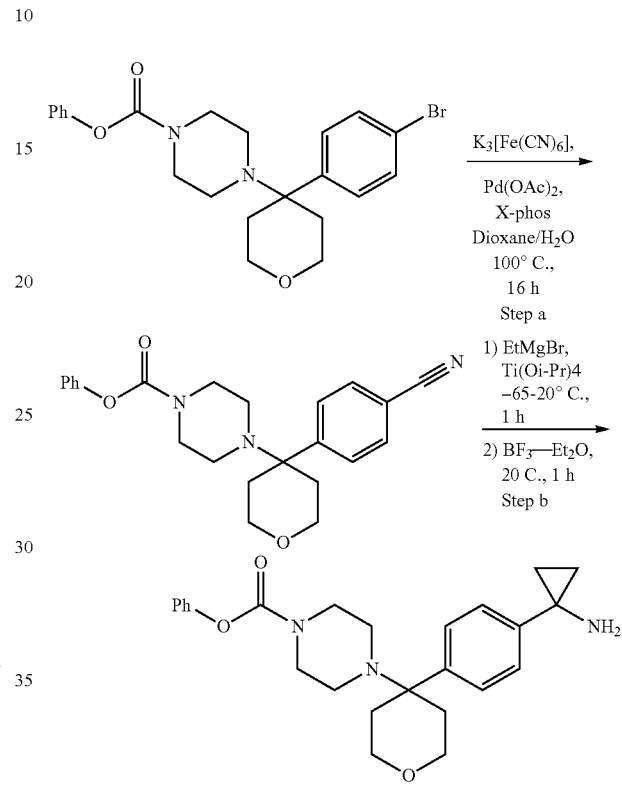

Step a Synthesis of phenyl 4-[4-(4-cyanophenyl)tetrahydro-2H-pyran-4-yl]piperazine-1-carboxylate [(XXIII) W1=—CN, A=phenyl, R4=H, R5a and R5b=tetrahydro-2H-pyran-4-yl, M=Bond, G1=N, Z1, Z2=—CH2-, m1=m2=2, PG=phenylcarboxylate] conv. F

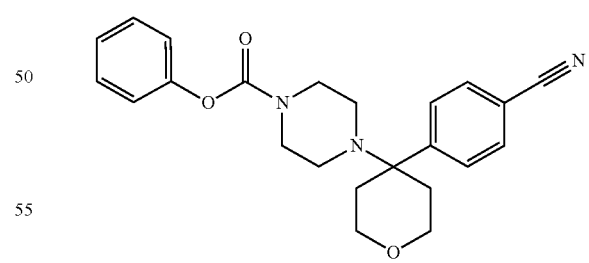

To a mixture of phenyl 4-[4-(4-bromophenyl)tetrahydro-2H-pyran-4-yl]piperazine-1-carboxylate (2 g, 4.15 mmol, 1 eq) in H$_2$O (4 mL) and dioxane (40 mL) X-phos (1 g, 2.08 mmol, 0.5 eq), K$_3$[Fe(CN)$_6$] (6.8 g, 22.29 mmol, 5 eq) and K$_2$CO$_3$ (1.15 g, 8.32 mmol, 2 eq), Pd(OAc)$_2$ (233.47 mg, 4.16 mmol, 0.25 eq) were added sequentially under N$_2$. The mixture was stirred at 100° C. for 16 h. TLC (PE:EA=1:1, Rf=0.41) indicated the reaction was completed, one major new spot with larger polarity was detected. 2 g*4 reactions were parallel run for this step. The four reaction mixtures were filtered by added THF (200 mL) quenched by addition of H₂O (100 mL) and extracted with EtOAc (100 mL*3). The combined organic layers were washed with brine 30 mL, dried over Na₂SO₄, filtered and concentrated under reduced pressure to give a residue, that was suspended in DMF (50 mL) and stirred for 2 h. The mixture was filtered, and the filter cake was concentrated to give the title compound [5 g (total from 2g*4 of bromo derivative), 72.93% yield.

¹H NMR (500 MHz, DMSO-d₆) δ=7.37-7.27 (t, 4H), 7.24-7.13 (m, 3H), 7.03 (d, J=7.9 Hz, 2H), 3.90-3.80 (m, 2H), 3.51-3.38 (m, 6H), 2.36-2.26 (m, 4H), 2.21-2.06 (m, 4H), 0.95 (br d, J=15.8 Hz, 4H).

Step b Synthesis of phenyl 4-{4-[4-(1-aminocyclopropyl)phenyl]tetrahydro-2H-pyran-4-yl}piperazine-1-carboxylate [(V) R1a and R1b=cyclopropyl, A=phenyl, R4=H, R5a and R5b=tetrahydro-2H-pyran-4-yl, M=Bond, G1=N, Z1, Z2=—CH2-, m1=m2=2, PG=phenylcarboxylate] Step 5c

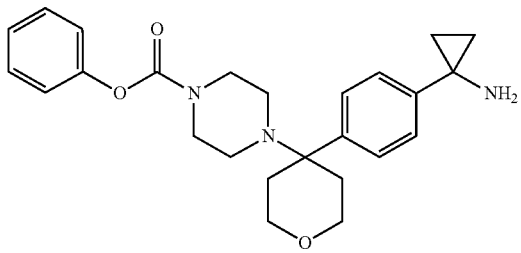 [SMILES: NC1(c2ccc(C3(N4CCN(C(=O)Oc5ccccc5)CC4)CCOCC3)cc2)CC1]

In a 3-necked bottle, phenyl 4-[4-(4-cyanophenyl)tetrahydro-2H-pyran-4-yl]piperazine-1-carboxylate (1 g, 2.43 mmol, 1 eq) was dissolved in THF (35 mL) and Et₂O (20 mL) and a cloudy suspension was obtained. Ti(Oi-Pr)₄ (875 mg, 3.08 mmol, 908.62 μL, 1.27 eq) was added at 20° C. The reaction was cooled to −65° C. under N₂·EtMgBr (3M, 2.25 mL, 2.78 eq) was added in 10 min at −65° C. and stirred for another 10 min, then allowed to raise 20° C., the yellow mixture become slowly black and was stirred for 1 hour at 20° C. Then BF₃·Et₂O (750 mg, 5.28 mmol, 652.17 μL, 2.18 eq) was added at 0° C. and stirred for 1 hour at 20° C. LCMS showed a mixture with desired product (RT=0.77, m/z=422.3, M+H). 1 g*5 reactions were parallel run for this step and 15%-30% of desired compound was detected by LCMS for the 5 reactions. The reaction mixtures were quenched by addition of HCl (1 M, 7.5 mL) at 0° C., and then diluted with NaOH (10%, 25 mL) and together extracted with EtOAc (100 mL*3). The combined organic layers were washed with brine 30 mL, dried over Na₂SO₄, filtered and concentrated under reduced pressure. The crude residue was purified by neutral prep-HPLC (HPLC: column: Agela DuraShell C18 250*25 mm*10 um; mobile phase: [water (10 mM NH₄HCO₃)-ACN];B %: 15%-45%, 22 min. Lyophilization gave the amine [676 mg (total from 5 g of starting material), 12.5% yield] as white solid.

¹H NMR (500 MHz, DMSO-d₆) δ=7.39-7.26 (m, 4H), 7.24-7.13 (m, 3H), 7.03 (br d, J=7.9 Hz, 2H), 3.92-3.76 (m, 2H), 3.40-3.29 (m, 6H), 2.35 (br d, J=15.2 Hz, 2H), 2.29-2.07 (m, 8H), 1.03-0.84 (m, 4H).

According to the same method the following compound was prepared:

Phenyl 4-{1-[4-(1-aminocyclopropyl)phenyl]cyclopentyl}piperazine-1-carboxylate [(V) R1a and R1b=cyclopropyl, A=phenyl, R4=H, R5a and R5b=cyclopentyl, M=Bond, G1=N, Z1, Z2=—CH2-, m1=m2=2, PG=phenylcarboxylate]

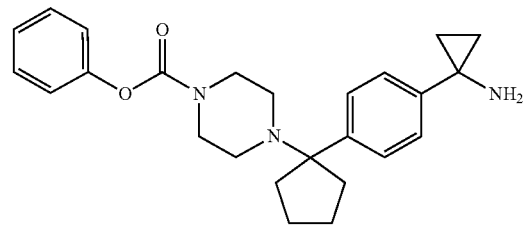 [SMILES: NC1(c2ccc(C3(N4CCN(C(=O)Oc5ccccc5)CC4)CCCC3)cc2)CC1]

¹H NMR (500 MHz, DMSO-d₆) δ=7.30-7.36 (m, 2H), 7.25 (s, 4H), 7.15-7.20 (m, 1H), 7.04 (dd, J=0.99, 8.62 Hz, 2H), 3.51 (br. s., 2H), 3.32-3.34 (br. s., 2H), 2.30 (br. s., 4H), 2.04-2.14 (m, 2H), 1.94-2.04 (m, 2H), 1.62-1.81 (m, 2H), 1.34-1.50 (m, 2H), 0.92-0.97 (m, 2H), 0.86-0.92 (m, 2H).

Preparation 17

Benzyl 3-{[4-(4-bromophenyl)tetrahydro-2H-pyran-4-yl](methyl)amino}azetidine-1-carboxylate [(XXIII) W1=Br, A=Phenyl, R4=H, R5a and R5b=tetrahydro-2H-pyran-4-yl, M=N(R6), R6=methyl, G1=CH, Z1, Z2=—CH2-, m1=m2=1, PG=benzylcarboxylate]-step 5b'

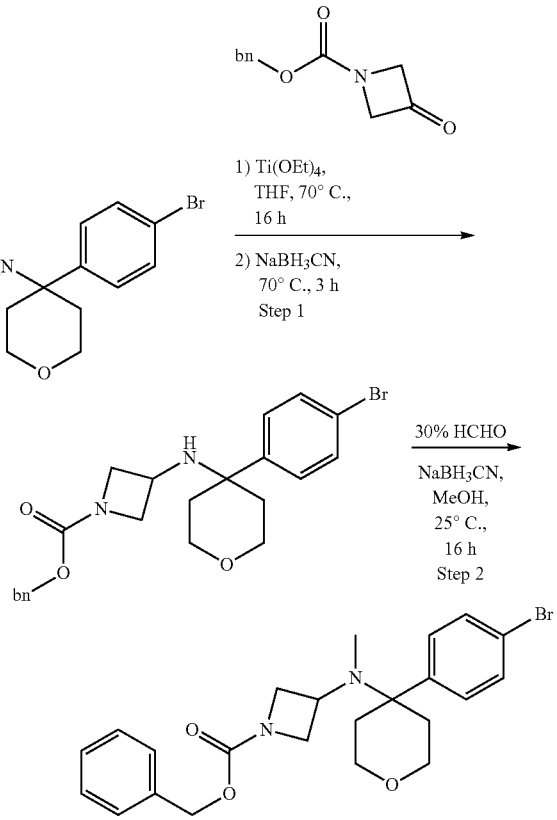

Step 1 Ti(OEt)$_4$ (18.70 g, 81.99 mmol, 17.00 mL, 1.5 eq) was added to a solution of compound 4-(4-bromophenyl)tetrahydro-2H-pyran-4-amine (14 g, 54.66 mmol, 1 eq) and benzyl 3-oxoazetidine-1-carboxylate (16.82 g, 81.99 mmol, 1.5 eq) in anhydrous of THF (150 mL) at 25° C. The reaction was stirred at 70° C. for 16 h. Then the reaction was cooled to 30° C. and NaBH$_3$CN (10.30 g, 163.97 mmol, 3 eq) was added. Then the reaction was stirred at 70° C. for 2 h. LCMS (t=1.818 min, Ms+H=445.1, 447.1) showed the reaction completion. The reaction mixture was quenched by addition of H$_2$O 100 mL and 1M HCl 50 mL at 25° C., and then diluted with EtOAc 200 mL. Then to the residue was added sat. Na$_2$CO$_3$ 50 mL and the mixture was stirred at 20° C. for 3 h. The residue was filtered through celite and extracted with EtOAc 200 mL (100 mL*2). The combined organic layers were washed with sat. NaCl 200 mL (100 mL*2), dried over Na$_2$SO$_4$, filtered and concentrated under reduced pressure. The residue was purified by flash silica gel chromatography Eluent of 0-70% Ethyl acetate/Petroleum ether-gradient, contained 10% DCM @ 100 mL/min), give benzyl 3-{[4-(4-bromophenyl)tetrahydro-2H-pyran-4-yl]amino}azetidine-1-carboxylate (20 g, 44.91 mmol, 82.16% yield) as a light yellow oil. $^1$H NMR (400 MHz, Chloroform d) δ=7.52-7.45 (m, 2H), 7.37-7.31 (m, 5H), 7.25-7.14 (m, 2H), 5.03 (s, 2H), 4.29-4.20 (m, 1H), 3.87-3.80 (m, 2H), 3.75-3.34 (m, 6H), 2.12-2.06 (m, 2H), 1.81 (br d, J=13.9 Hz, 2H).

Step 2 NaBH$_3$CN (11.29 g, 179.63 mmol, 5 eq) was added to a solution of compound benzyl 3-{[4-(4-bromophenyl)tetrahydro-2H-pyran-4-yl]amino}azetidine-1-carboxylate (16 g, 35.93 mmol, 1 eq), formaldehyde (8.72 g, 290.42 mmol, 8.00 mL, 8.08 eq) and AcOH (8.40 g, 139.88 mmol, 8.00 mL, 3.89 eq) in anhydrous of MeOH (160 mL) at 0° C. The reaction was stirred at 20° C. for 16 h. HPLC (t=2.757 min) showed the reaction completion. The reaction was concentrated in vacuo, and then diluted with EtOAc 100 mL the residue was added sat. Na$_2$CO$_3$ 100 mL at 0° C. to pH=8 and extracted with EtOAc 100 mL (50 mL*2). The combined organic layers were washed with brine 50 mL (25 mL*2), dried over Na$_2$SO$_4$, filtered and concentrated under reduced pressure. The residue was purified by flash silica gel chromatography Eluent of 0-100% Ethyl acetate/Petroleum ethergradient, contained 20% DCM @ 100 mL/min), give the title compound (15 g, 32.65 mmol, 90.89% yield) as a light yellow oil. $^1$H NMR (400 MHz, Chloroform d) δ=7.52-7.43 (m, 2H), 7.37-7.29 (m, 6H), 7.18-7.07 (m, 2H), 5.06-4.99 (m, 2H), 4.27-4.19 (m, 1H), 3.89-3.82 (m, 2H), 3.77-3.60 (m, 4H), 3.51-3.40 (m, 2H), 2.12 (br t, J=5.0 Hz, 4H), 1.27 (t, J=7.2 Hz, 3H).

Preparation 18

Benzyl 3-[acetyl(1-{4-[(1S)-1-aminoethyl]phenyl}-4,4-difluorocyclohexyl)amino]azetidine-1-carboxylate [(V) R1a=methyl, R1b=H, A=Phenyl, R4=H, R5a and R5b=4,4-difluorocyclohexyl, M=N(R6), R6=acetyl, G1=CH, Z1, Z2=—CH2-, m1=m2=1, PG=benzylcarboxylate] Step 5e

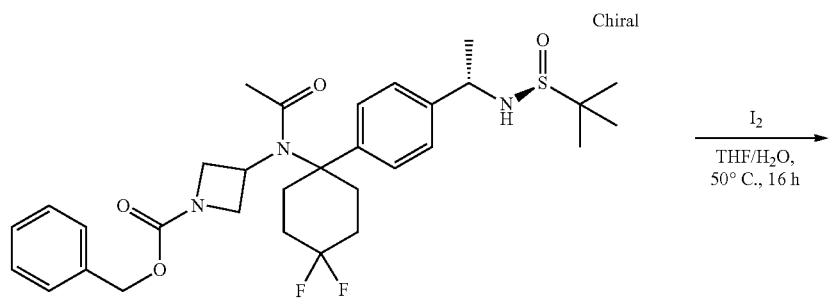

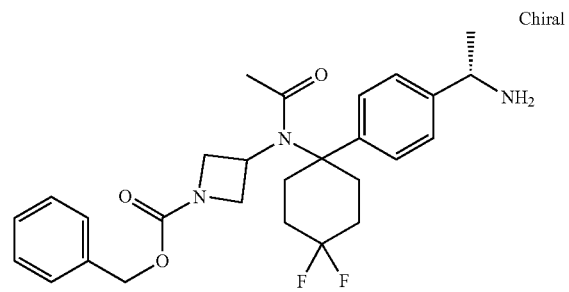

To a solution of benzyl 3-[acetyl(4-{4-[(1S)-1-{[(S)-tert-butylsulfinyl]amino}ethyl]phenyl}tetrahydro-2H-pyran-4-yl)amino]azetidine-1-carboxylate (140.00 mg, 237.39 umol, 1 eq) in THF (1 mL) and H$_2$O (0.2 mL) was add I$_2$ (6.03 mg, 23.74 umol, 4.78 μL, 0.1 eq). Then the reaction was stirred at 50° C. for 16 h. LCMS showed the reaction was complete. The reaction was slowly added Na$_2$SO$_3$ (1 M, 2 mL) to quench excess I$_2$ at 0° C. The reaction mixture was concentrated in vacuo to dryness. The residue was purified by prep-HPLC (column: Phenomenex Gemini-NX 80*40 mm*3 um; mobile phase: [water (10 mM NH$_4$HCO$_3$)-ACN];B %: 25%-55%, 8 min) to yield the title compound (60 mg, 123.57 umol, 52.05% yield, 100% purity) as white solid.

$^1$HNMR (500 MHz, DMSO-d$_6$) δ=7.26-7.42 (m, 7H), 7.20 (d, J=8.39 Hz, 2H), 4.93-5.09 (m, 2H), 4.57-4.73 (m, 1H), 4.02-4.34 (m, 4H), 3.94 (q, J=6.76 Hz, 1H), 2.61 (br. s., 2H), 2.07 (s, 3H), 1.93-2.06 (m, 4H), 1.61-1.87 (m, 3H), 1.21 (d, J=6.56 Hz, 3H).

Preparation 19

Benzyl {2-[(1-{4-[(1S)-1-aminoethyl]phenyl}-4,4-difluorocyclohexyl)amino]-2-oxoethyl}carbamate [(V) R1a=methyl, R1b=H, A=Phenyl, R4=H, R5a and R5b=4,4-difluorocyclohexyl, M=NH, G1=CO, Z1=—CH2-, m1=1, PG=benzylcarboxylate] Step 5b", Step 5c' and Step 5d

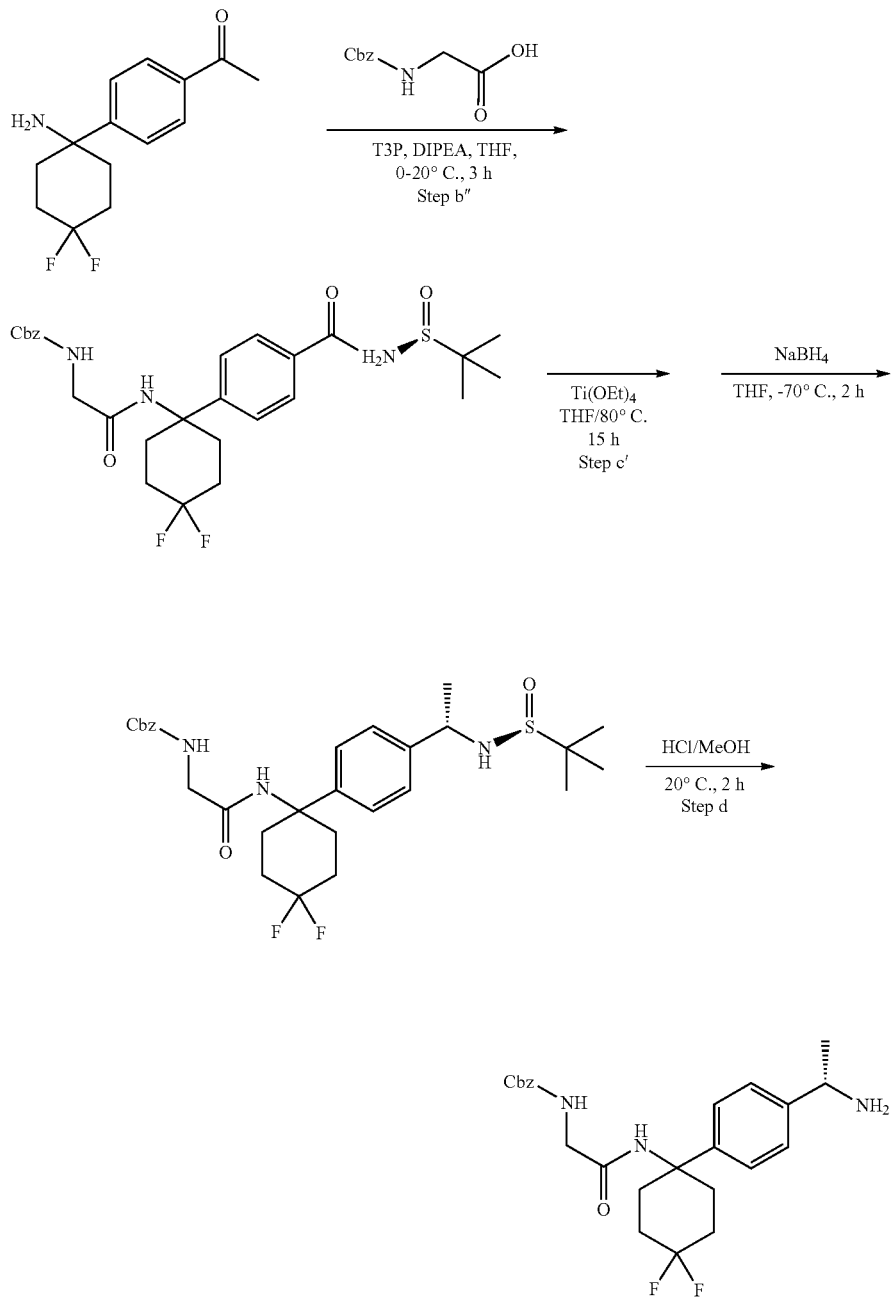

(step 5b") To a solution of 1-[4-(1-amino-4,4-difluorocyclohexyl)phenyl]ethanone (3.9 g, 15.40 mmol, 1 eq), DIEA (15.92 g, 123.18 mmol, 21.46 mL, 8 eq) and 2-(benzyloxycarbonylamino)acetic acid (3.87 g, 18.48 mmol, 1.2 eq) in DCM (30 mL) was added a solution of T3P (14.70 g, 23.10 mmol, 13.74 mL, 50% purity, 1.5 eq) at 0° C. The resulting mixture was stirred at 25° C. for 3 hr. TLC (PE:EA=3:1) showed the reaction was completed. showed the reaction was finished and desired product was observed on LCMS. The reaction mixture was concentrated and diluted with EA (100 mL), washed with H₂O (35 mL), saturated aqueous solution of brine (40 mL), dried over Na₂SO₄, filtered and concentrated to give crude. The crude was purified by flash silica gel chromatography (ISCO; 40 g SepaFlash Silica Flash Column, Eluent of 0-60% EA/PE gradient at 100 mL/min). benzyl (2-{[1-(4-acetylphenyl)-4,4-difluorocyclohexyl]amino}-2-oxoethyl)carbamate (4.5 g, 8.99 mmol, 58.39% yield, 88.8% purity) was obtained as yellow solid. 88.8% by LCMS (Rt=1.201 min, Ms+1=445.3).

(step 5c') Ti(OEt)₄ (5.93 g, 25.99 mmol, 5.39 mL, 3 eq) was added to a solution of benzyl (2-{[1-(4-acetylphenyl)-4,4-difluorocyclohexyl]amino}-2-oxoethyl)carbamate (3.85 g, 8.66 mmol, 1 eq) and with (S) tert-butanesulfinamide (3.67 g, 30.32 mmol, 3.5 eq) in anhydrous of THF (80 mL) at 20° C. The reaction was stirred at 80° C. for 16 h. TLC (SiO₂, PE:EtOAc=1:1) and LCMS showed the reaction was complete. Then the reaction was cooled to −70° C. NaBH₄ (655.37 mg, 17.32 mmol, 2 eq) was slowly added to the reaction at −70° C. Then the reaction was warmed to 20° C. and stirred for 2 h. TLC (PE:EtOAc=1:1) and LCMS (Rt=1.199 min, Ms+1=550.3) showed the reaction was completed. The reaction was slowly added MeOH (5 mL) to quench excess NaBH₄ at 0° C., then added H₂O (25 mL). The reaction mixture was filtered though celite, the filter cake was washed by EtOAc 100 mL (50 mL*2). The residue was extracted with EtOAc 40 mL (20 mL*2). Combined organic phase, dried over Na₂SO₄, filtered and concentrated in vacuo to dryness. The crude was purified by prep-HPLC (column: Agela DuraShell C18 250*70 mm*10 um; mobile phase: [water(10 mM NH₄HCO₃)-ACN]; B %: 45%-63%, 20 min); benzyl {2-[(1-{4-[(1S)-1-{[(S)-tert-butylsulfinyl]amino}ethyl]phenyl}-4,4-difluorocyclohexyl)amino]-2-oxoethyl}carbamate (3.8 g, 6.77 mmol, 78.21% yield, 98% purity) was obtained as yellow solid. 98% purity by HPLC (Rt=3.424 min)

(Step 5d) To a solution of benzyl {2-[(1-{4-[(1S)-1-{[(S)-tert-butylsulfinyl]amino}ethyl]phenyl}-4,4-difluorocyclohexyl)amino]-2-oxoethyl}carbamate (3.8 g, 6.91 mmol, 1 eq) in HCl/MeOH (4 M, 307.27 mL, 177.79 eq). The reaction was stirred at 25° C. for 2 h. LCMS (Rt=0.952 min, Ms+1=446.3) showed the reaction was completed. The reaction mixture was concentrated under reduced pressure. The resulting residue was purified by prep-HPLC (column: Agela DuraShell C18 250*70 mm*10 um; mobile phase: [water(10 mM NH₄HCO₃)-ACN];B %: 28%-55%, 20 min); compound benzyl {2-[(1-{4-[(1S)-1-aminoethyl]phenyl}-4, 4-difluorocyclohexyl)amino]-2-oxoethyl}carbamate (1.75 g, 3.93 mmol, 56.82% yield, 100% purity) was obtained as white solid. 100% purity by LCMS (Rt=0.952 min, Ms+1=446.3).

¹HNMR (500 MHz, DMSO-d₆) δ=8.00 (s, 1H), 7.40 (s, 1H), 7.28-7.38 (m, 4H), 7.27 (s, 4H), 7.17-7.24 (m, J=5.95 Hz, 1H), 5.02 (s, 2H), 3.93 (q, J=6.66 Hz, 1H), 3.70 (d, J=6.25 Hz, 2H), 2.39-2.48 (m, J=12.81 Hz, 2H), 1.77-2.16 (m, 8H), 1.21 (d, J=6.56 Hz, 3H).

According to the same method the following compound was prepared:

Benzyl {(2R)-1-[(1-{4-[(1S)-1-aminoethyl]phenyl}-4,4-difluorocyclohexyl)amino]-1-oxopropan-2-yl}carbamate [(V) R1a=methyl, R1b=H, A=Phenyl, R4=H, R5a and R5b=4,4-difluorocyclohexyl, M=NH, G1=CO, Z1=CR9aR9b, R9a=CH₃, R9b=H, m1=1, PG=benzylcarboxylate]

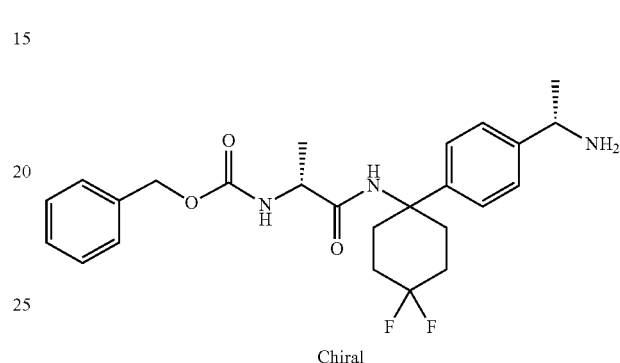

Chiral

¹HNMR (500 MHz, DMSO-d₆) δ=8.03 (s, 1H), 7.15-7.44 (m, 10H), 4.94-5.08 (m, 2H), 4.03-4.23 (m, 1H), 3.93 (q, J=6.41 Hz, 1H), 2.44 (br. s., 2H), 1.72-2.19 (m, 6H), 1.22 (dd, J=6.79 Hz, 6H).

Benzyl {(2S)-1-[(1-{4-[(1S)-1-aminoethyl]phenyl}-4,4-difluorocyclohexyl)amino]-1-oxopropan-2-yl}carbamate [(V) R1a=methyl, R1b=H, A=Phenyl, R4=H, R5a and R5b=4,4-difluorocyclohexyl, M=NH, G1=CO, Z1=CR9aR9b, R9a=CH₃, R9b=H, m1=1, PG=benzylcarboxylate]

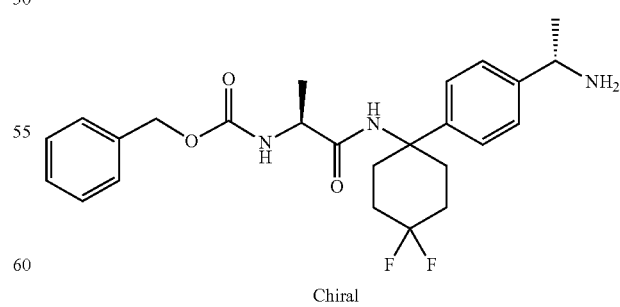

Chiral

¹HNMR (500 MHz, DMSO-d₆) δ=8.03 (s, 1H), 7.15-7.42 (m, 10H), 4.98-5.07 (m, 2H), 4.11-4.21 (m, 1H), 3.93 (q, J=6.56 Hz, 1H), 2.44 (br. s., 2H), 1.75-2.18 (m, 6H), 1.22 (t, J=6.25 Hz, 6H).

Preparation 20 benzyl {2-[(4-{4-[(1S)-1-aminoethyl]phenyl}tetrahydro-2H-pyran-4-yl)(trifluoroacetyl)amino]ethyl}carbamate [(V) R1a=methyl, R1b=H, A=Phenyl, R4=H, R5a and R5b=tetrahydro-2H-pyran-4-yl, M=NR6, R6=Trifluoroacetyl G1=CH2, Z1=CH2, m1=1, PG=benzylcarboxylate] Step b", Step c' and Step d

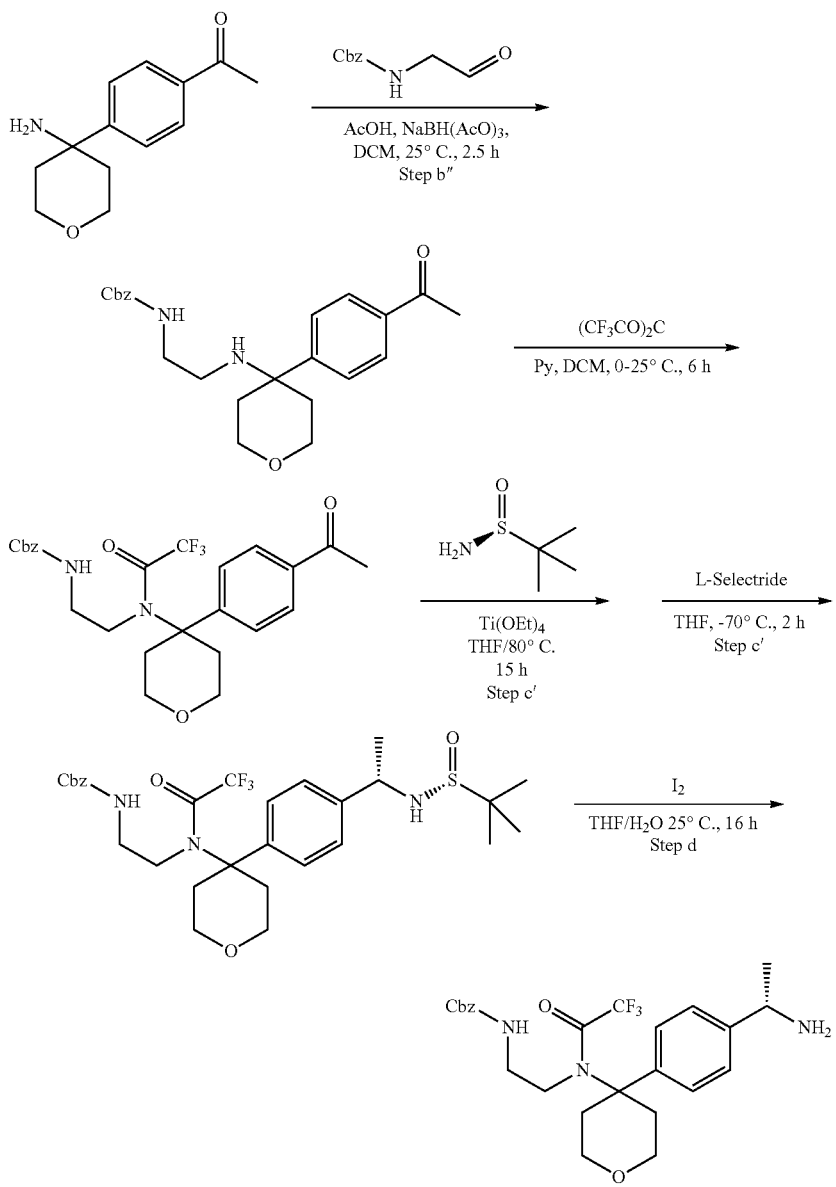

Step b" To a solution of 1-[4-(4-aminotetrahydro-2H-pyran-4-yl)phenyl]ethanone (9 g, 41.04 mmol, 1 eq) and benzyl N-(2-oxoethyl)carbamate (8.72 g, 45.15 mmol, 1.1 eq) in DCM (90 mL) was added HOAc (3.70 g, 61.57 mmol, 3.52 mL, 1.5 eq) and stirred at 25° C. for 0.5 h. NaBH(OAc)₃ (17.40 g, 82.09 mmol, 2 eq) was added to above mixture at 25° C. The reaction mixture was stirred at 25° C. for 2 h. TLC (n-Hexane:EtOAc=0:1) indicated completion of the reaction. The reaction mixture was quenched with H₂O (25 mL), filtrated through celite pad, and then extracted with DCM (55 mL*2), washed with brine (15 mL), dried over Na₂SO₄, filtered and concentrated. The crude was purified by flash silica gel chromatography (ISCO; 80 g SepaFlash Silica Flash Column, Eluent of 60-75% EtOAc/n-Hexane gradient @ 145 mL/min). Benzyl (2-{[4-(4-acetylphenyl)tetrahydro-2H-pyran-4-yl]amino}ethyl)carbamate (4.5 g, 10.21 mmol, 24.89% yield, 90% purity) was obtained as yellow solid.

¹H NMR (400 MHz, CHLOROFORM-d) δ=9.83 (br s, 2H), 8.06 (d, J=8.38 Hz, 2H), 7.82 (br d, J=8.13 Hz, 2H), 7.29-7.36 (m, 5H), 4.94 (s, 2H) 6.70 (br s, 1H), 4.01 (br d, J=12.01 Hz, 2H), 3.25-3.55 (m, 4H), 2.73 (br s, 2H) 2.54-2.65 (m, 7H).

To a solution of benzyl (2-{[4-(4-acetylphenyl)tetrahydro-2H-pyran-4-yl]amino}ethyl)carbamate (3.5 g, 8.83 mmol, 1 eq) was in DCM (20 mL). Pyridine (4.19 g, 52.97 mmol, 4.28 mL, 6 eq) and Trifluoroacetic anhydride (7.42 g, 35.31 mmol, 4.91 mL, 4 eq) was added to above mixture at 0° C. and stirred for 1 h. Then the reaction mixture was stirred at 25° C. for 5 h. LCMS showed the reaction was finished and desired product was observed. The reaction mixture was diluted with H₂O (15 mL), and then extracted with DCM (100 mL*2), washed with K₂CO₃ (50 mL) and brine (25 mL), dried over Na₂SO₄, filtered and concentrated to give a crude product. The crude was purified by flash silica gel chromatography (ISCO; 80 g SepaFlash Silica Flash Column, Eluent of 20-25% EtOAc/n-Hexane gradient @ 100 mL/min). benzyl (2-{[4-(4-acetylphenyl)tetrahydro-2H-pyran-4-yl](trifluoroacetyl)amino}ethyl)carbamate (3 g, 5.79 mmol, 65.55% yield, 95% purity) was obtained as yellow oil.

¹HNMR (500 MHz, DMSO-d₆) δ=7.90 (br d, J=8.31 Hz, 2H), 7.64 (br d, J=8.44 Hz, 3H), 7.25-7.42 (m, 1H), 7.25-7.43 (m, 4H), 5.06 (s, 2H), 3.64-3.86 (m, 4H), 3.26-3.34 (m, 3H), 2.75 (br d, J=11.98 Hz, 1H), 2.57 (s, 3H), 2.26-2.41 (m, 2H).

Step c' Ti(OEt)₄ (3.89 g, 17.06 mmol, 3.54 mL, 3 eq) was added to a solution of benzyl (2-{[4-(4-acetylphenyl)tetrahydro-2H-pyran-4-yl](trifluoroacetyl)amino}ethyl)carbamate (2.8 g, 5.69 mmol, 1 eq) and (R)-2-methylpropane-2-sulfinamide (2.41 g, 19.90 mmol, 3.5 eq) in anhydrous of THF (70 mL) at 25° C. The reaction was stirred at 80° C. for 16 h. LCMS showed the reaction was completed. Then the reaction was cooled to −70° C. lithium trisec-butylborohydride (1 M, 17.06 mL, 3 eq) was slowly added to the reaction at −70° C. and stirred for 2 h. LCMS HPLC showed the reaction was completed. To the reaction was slowly added MeOH (5 mL) to quench excess trisec-butylborohydride at 0° C., then added H₂O (15 mL). The reaction mixture was filtered through celite; the filter cake was washed by EtOAc 30 mL (15 mL*2). The residue was extracted with EtOAc 20 mL (10 mL*2). Combined organic phase, dried over Na₂SO₄, filtered and concentrated in vacuo to dryness. The residue was purified by prep-HPLC (column: Agela DuraShell C18 250*80 mm*10 um; mobile phase: [water (10 mM NH₄HCO₃)-ACN]; B %: 35%-65%, 20 min). Benzyl{2-[(4-{4-[(1S)-1-{[(R)-tert-butylsulfinyl]amino}ethyl]phenyl}tetrahydro-2H-pyran-4-yl)(trifluoroacetyl)amino]ethyl}carbamate (2.8 g, 4.64 mmol, 81.57% yield, 99% purity) as colorless oil. 99% ee.

Step d To a solution of benzyl {2-[(4-{4-[(1S)-1-{[(R)-tert-butylsulfinyl]amino}ethyl]phenyl}tetrahydro-2H-pyran-4-yl)(trifluoroacetyl)amino]ethyl}carbamate (2 g, 3.31 mmol, 99% purity, 1 eq) in THF (20 mL) and H₂O (20 mL), then I₂ (1.68 g, 6.63 mmol, 1.33 mL, 2 eq) was added. The reaction was stirred at 25° C. for 16 h. LCMS showed the reaction was completed. The reaction mixture was quenched with Na₂SO₃ (2 mL) and H₂O (10 mL), and then extracted with DCM (25 mL*2), washed with brine (15 mL), dried over Na₂SO₄, filtered and concentrated to give a crude product. The residue was purified by prep-HPLC (column: Welch Xtimate C18 250*70 mm #10 um; mobile phase: [water (0.05% NH₃H₂O+10 mM NH₄HCO₃)-ACN]; B %: 35%-65%, 25 min).

Benzyl {2-[(4-{4-[(1S)-1-aminoethyl]phenyl}tetrahydro-2H-pyran-4-yl)(trifluoroacetyl)amino]ethyl}carbamate (1.25 g, 2.48 mmol, 74.93% yield, 98% purity) was obtained as white solid.

¹HNMR (500 MHz, DMSO-d₆) δ=7.60 (t, J=5.80 Hz, 1H), 7.16-7.46 (m, 9H), 5.04 (s, 2H), 3.96 (q, J=6.66 Hz, 1H), 3.72-3.80 (m, J=12.05 Hz, 2H), 3.63 (t, J=7.63 Hz, 2H), 3.19-3.28 (m, 3H), 2.70 (d, J=11.74 Hz, 2H), 2.03-2.40 (m, 3H), 1.24 (d, J=6.56 Hz, 3H).

Preparation 21

Synthesis of phenyl 4-(4-{4-[(1S)-1-{[7-oxo-8-(propan-2-yl)-7,8-dihydropyrido[2,3-d]pyrimidin-2-yl]amino}ethyl]phenyl} tetrahydro-2H-pyran-4-yl)piperazine-1-carboxylate [(VI) X=N, U=Y=CH, R1a=methyl, R1b=H, A=phenyl, R2=propan-2-yl R3=H, R4=H, R5a and R5b=tetrahydro-2H-pyran-4-yl, M=Bond, G1=N, Z1, Z2=—CH2-, m1=m2=2, PG=phenyl carboxylate] Step 2a

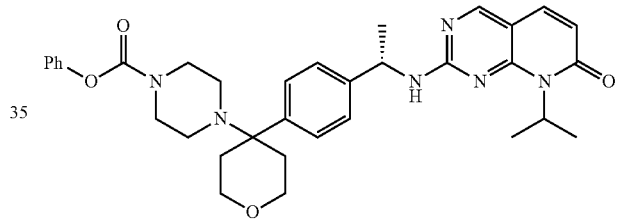

Phenyl 4-(4-{4-[(1S)-1-aminoethyl]phenyl}tetrahydro-2H-pyran-4-yl)piperazine-1-carboxylate (377.17 mg 0.921 mmol, 1.1 eq.) was dissolved in DMSO (11 ml). To this solution is then sequentially added 2-(methylsulfonyl)-8-(propan-2-yl)pyrido[2,3-d]pyrimidin-7(8H)-one (223.7 mg, 0.837 mmol), CsF (140 mg, 0.920 mmol) and DIPEA (0.175 ml, 0.1 mmol). The reaction mixture is then heated at 75° C. for 4 hours and then left at room temperature. The reaction mixture is slowly poured over cold water/brine. The precipitated solids are filtered, washed with water, and dried under vacuum. The dried solid obtained phenyl 4-(4-{4-[(1S)-1-{[7-oxo-8-(propan-2-yl)-7,8-dihydropyrido[2,3-d]pyrimidin-2-yl]amino}ethyl]phenyl} tetrahydro-2H-pyran-4-yl)piperazine-1-carboxylate (349 mg, 70%) is taken forward without further purification.

¹H NMR (500 MHz, DMSO-d₆) δ=8.57 (s, 1H), 8.38 (d, J=6.86 Hz, 1H), 7.63 (d, J=9.15 Hz, 1H), 7.30-7.42 (m, 4H), 7.24 (d, J=8.24 Hz, 2H), 7.14-7.21 (m, 1H), 6.92-7.06 (m, 2H), 6.18 (d, J=9.00 Hz, 1H), 5.47 (br. s., 1H), 5.01 (t, J=6.56 Hz, 1H), 3.81 (dd, J=4.96, 10.90 Hz, 2H), 3.43-3.57 (m, 2H), 3.36-3.40 (m, 4H), 1.94-2.32 (m, 8H), 1.50 (d, J=7.02 Hz, 3H), 1.24-1.45 (m, 6H). LCMS: m/z 597 [M+H]⁺ @ r.t. 8.67 min. HRMS (ESI) calcd for C₃₄H₄₁N₆O₄ [M+H]⁺ 597.3184 found 597.3157.

According to the same method the following compounds were prepared:

Phenyl 4-(3-{4-[(1S)-1-{[7-oxo-8-(propan-2-yl)-7,8-dihydropyrido[2,3-d]pyrimidin-2-yl]amino}ethyl]phenyl}pentan-3-yl)piperazine-1-carboxylate [(VI) X=N, U=Y=CH, =, R1a=methyl, R1b=H, A=phenyl, R2=propan-2-yl R3=H, R4=H, R5a and R5b=ethyl, M=Bond, G1=N, Z1, Z2=—CH2-, m1=m2=2, PG=phenyl carboxylate]

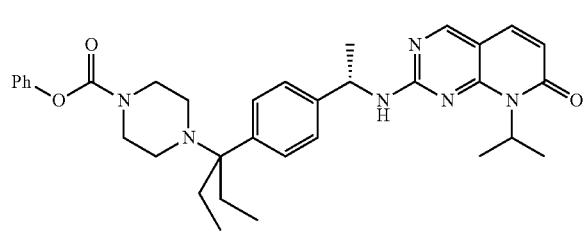 [SMILES: CCC(CC)(c1ccc([C@H](C)Nc2ncc3ccc(=O)n(C(C)C)c3n2)cc1)N1CCN(C(=O)Oc2ccccc2)CC1]

$^1$H NMR (500 MHz, DMSO-d$_6$) δ=8.57 (s, 1H), 8.36 (d, J=7.02 Hz, 1H), 7.63 (d, J=9.15 Hz, 1H), 7.28-7.38 (m, 6H), 7.19 (dd, J=7.32 Hz, 1H), 6.99-7.09 (m, 2H), 6.16 (d, J=9.00 Hz, 1H), 5.41-5.86 (m, 1H), 5.00 (t, J=6.86 Hz, 1H), 3.42-3.57 (m, 2H), 3.32 (m, 2H), 2.34-2.49 (m, 4H), 1.77-1.95 (m, 4H), 1.49 (d, J=7.02 Hz, 3H), 1.23-1.45 (m, 6H), 0.73 (q, J=7.17 Hz, 6H).

Phenyl 4-(3-{4-[(1S)-1-{[7-oxo-8-(propan-2-yl)-7,8-dihydropyrido[2,3-d]pyrimidin-2-yl]amino}ethyl]phenyl}oxetan-3-yl)piperazine-1-carboxylate [(VI) X=N, U=Y=CH, =, R1a=methyl, R1b=H, A=phenyl, R2=propan-2-yl R3=H, R4=H, R5a and R5b=oxetan-3-yl, M=Bond, G1=N, Z1, Z2=—CH2-, m1=m2=2, PG=phenyl carboxylate]

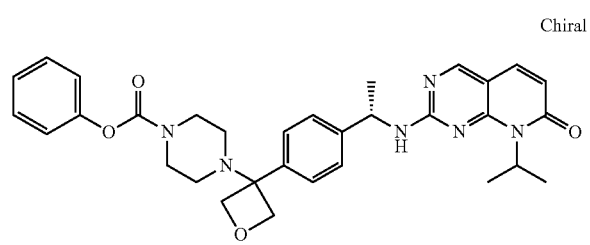 [SMILES: CC(C)n1c(=O)ccc2cnc(N[C@@H](C)c3ccc(C4(N5CCN(C(=O)Oc6ccccc6)CC5)COC4)cc3)nc21]

LCMS:LCMS: m/z 569 [M+H]$^+$ @ r.t. 8.95 min.

Ethyl 4-(2-{4-[(1S)-1-{[7-oxo-8-(propan-2-yl)-7,8-dihydropyrido[2,3-d]pyrimidin-2-yl]amino}ethyl]phenyl}propan-2-yl)piperazine-1-carboxylate [(VI) X=N, U=Y=CH, =, R1a=methyl, R1b=H, A=phenyl, R2=propan-2-yl R3=H, R4=H, R5a and R5b=methyl, M=Bond, G1=N, Z1, Z2=—CH2-, m1=m2=2, PG=ethyl carboxylate]

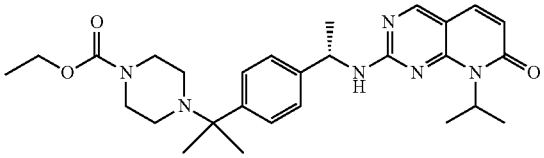

$^1$H NMR (500 MHz, DMSO-d$_6$) δ=8.55 (s, 1H), 8.35 (d, J=7.17 Hz, 1H), 7.62 (d, J=9.30 Hz, 1H), 7.41 (d, J=8.24 Hz, 2H), 7.30 (d, J=7.93 Hz, 2H), 6.15 (d, J=9.30 Hz, 1H), 5.41-5.67 (m, 1H), 4.98 (m, 1H), 3.95-4.03 (m, 2H), 3.29 (br, s, 4H), 2.25-2.39 (m, 4H), 1.21-1.53 (m, 15H), 1.10-1.16 (m, 3H).

Phenyl 4-(1-acetyl-4-{4-[(1S)-1-{[7-oxo-8-(propan-2-yl)-7,8-dihydropyrido[2,3-d]pyrimidin-2-yl]amino}ethyl]phenyl} piperidin-4-yl)piperazine-1-carboxylate [(VI) X=N, U=Y=CH, =, R1a=methyl, R1b=H, A=phenyl, R2=propan-2-yl R3=H, R4=H, R5a and R5b=1-acetylpiperidin-4-yl, M=Bond, G1=N, Z1, Z2=—CH2-, m1=m2=2, PG=phenyl carboxylate]

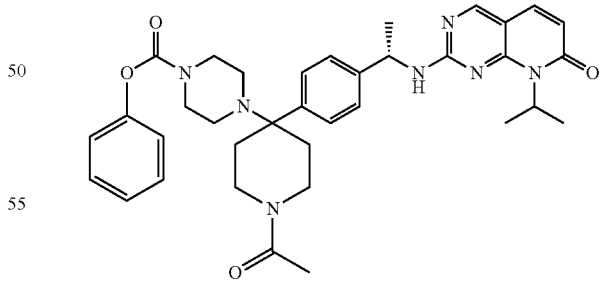

$^1$H NMR (500 MHz, DMSO-d$_6$) δ=8.52-8.60 (m, 1H), 8.36 (d, J=6.25 Hz, 1H), 7.57-7.66 (m, 1H), 7.25-7.41 (m, 6H), 7.14-7.21 (m, 1H), 6.90-7.05 (m, 2H), 6.17 (d, J=5.49 Hz, 1H), 5.46 (br.s, 1H), 4.97-5.01 (m, 1H), 3.70-3.76 (m, 2H), 3.53-3.62 (m, 2H), 3.15-3.35 (m, 2H), 2.15-2.33 (m, 8H), 1.98 (s, 3H), 1.77-1.96 (m, 2H) 1.30-1.52 (m, 9H). LCMS: m/z 638 [M+H]$^+$ @ r.t. 8.70 min. HRMS (ESI) calcd for C$_{36}$H$_{43}$N$_7$O$_4$ [M+H]$^+$ 638.3450 found 638.34.

107

Phenyl 4-(4-{4-[(1R)-1-{[7-oxo-8-(propan-2-yl)-7,8-dihydropyrido[2,3-d]pyrimidin-2-yl]amino}ethyl]phenyl}tetrahydro-2H-pyran-4-yl)piperazine-1-carboxylate [(VI) X=N, U=Y=CH, =, R1a=H, R1b=methyl, A=phenyl, R2=propan-2-yl R3=H, R4=H, R5a and R5b=tetrahydro-2H-pyran-4-yl, M=Bond, G1=N, Z1, Z2=—CH2-, m1=m2=2, PG=phenyl carboxylate]

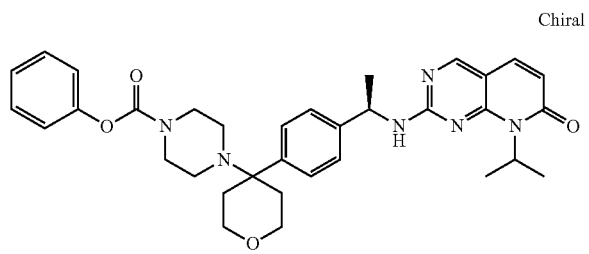 [SMILES: CC(C)n1c(=O)ccc2cnc(N[C@H](C)c3ccc(C4(N5CCN(C(=O)Oc6ccccc6)CC5)CCOCC4)cc3)nc21]

Chiral $^1$H NMR (500 MHz, DMSO-d$_6$) δ=8.57 (s, 1H), 8.36 (d, J=6.86 Hz, 1H), 7.63 (d, J=9.30 Hz, 1H), 7.30-7.42 (m, 4H), 7.21-7.27 (m, 2H), 7.17 (t, J=7.32 Hz, 1H), 6.90-7.05 (m, 2H), 6.18 (d, J=9.30 Hz, 1H), 5.450-5.46 (m, 1H), 4.96-5.03 (m, 1H), 3.76-3.91 (m, 3H), 3.23-3.39 (m, 6H), 2.02-2.31 (m, 7H), 1.47 (d, J=6.86 hz, 3H), 1.25-1.46 (m, 6H). LCMS: m/z 597 [M+H]$^+$ @ r.t. 8.58 min. HRMS (ESI) calcd for C$_{34}$H$_{41}$N$_6$O$_4$ [M+H]$^+$ 597.3184 found 597.3185.

108

Phenyl 4-(4-{4-[(1S)-1-{[4-methyl-7-oxo-8-(propan-2-yl)-7,8-dihydropyrido[2,3-d]pyrimidin-2-yl]amino}ethyl]phenyl}tetrahydro-2H-pyran-4-yl)piperazine-1-carboxylate [(VI) X=N, U=Y=CH, =, R1a=methyl, R1b=H, A=phenyl, R2=propan-2-yl R3=methyl, R4=H, R5a and R5b=tetrahydro-2H-pyran-4-yl, M=Bond, G1=N, Z1, Z2=—CH2-, m1=m2=2, PG=phenyl carboxylate]

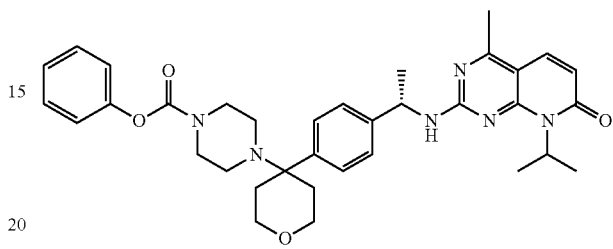

$^1$H NMR (DMSO-d$_6$) δ=8.00-8.37 (m, 1H), 7.81 (d, J=9.61 Hz, 1H), 7.30-7.45 (m, 4H), 7.23 (d, J=8.24 Hz, 2H), 7.14-7.20 (m, 1H), 6.88-7.07 (m, 2H), 6.14-6.20 (m, 1H), 5.45-5.60 (br. m, 1H), 4.48-5.05 (br. M, 1H), 3.81 (dd, J=4.96, 10.75 Hz, 4H), 3.48 (br. m, 4H), 2.54 (s, 3H), 2.01-2.33 (m, 8H), 1.48 (d, J=7.02 Hz, 3H), 0.90-1.42 (br m, 6H). LCMS:LCMS: m/z 611 [M+H]$^+$ @ r.t. 6.8 min.

Phenyl 4-(4-{5-[(1S)-1-{[7-oxo-8-(propan-2-yl)-7,8-dihydropyrido[2,3-d]pyrimidin-2-yl]amino}ethyl]pyridin-2-yl}tetrahydro-2H-pyran-4-yl)piperazine-1-carboxylate [(VI) X=N, U=Y=CH, =, R1a=methyl, R1b=H, A=pyrimidin-2-yl, R2=propan-2-yl R3=H, R4=H, R5a and R5b=tetrahydro-2H-pyran-4-yl, M=Bond, G1=N, Z1, Z2=—CH2-, m1=m2=2, PG=phenyl carboxylate]

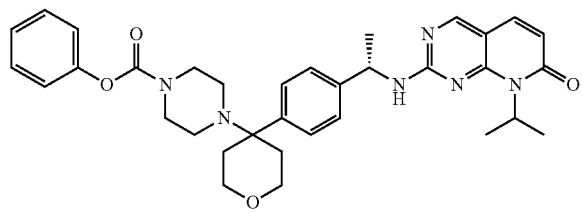 [SMILES: CC(C)n1c(=O)ccc2cnc(N[C@@H](C)c3ccc(C4(N5CCN(C(=O)Oc6ccccc6)CC5)CCOCC4)cc3)nc21]

$^1$H NMR (DMSO-d$_6$) δ=8.55-8.63 (m, 2H), 8.20-8.47 (m, 1H), 7.72-7.89 (m, 1H), 7.65 (d, J=9.30 Hz, 1H), 7.27-7.39 (m, 2H), 7.15-7.22 (m, 1H), 6.91-7.07 (m, 2H), 6.20 (d, J=8.39 Hz, 1H), 5.42-5.79 (m, 1H), 4.97-5.38 (m, 1H), 3.75-3.88 (m, 2H), 3.40-3.54 (m, 2H), 3.18-3.30 (4H), 2.18-2.34 (m, 6H), 1.97-2.07 (m, 2H), 1.53 (d, J=7.02 Hz, 3H), 1.22-1.31 (m, 6H). LCMS: m/z 598 [M+H]$^+$ @ r.t. 5.95 min.

Phenyl 4-[4-(4-{(1S)-1-[(8-ethyl-7-oxo-7,8-dihydropyrido[2,3-d]pyrimidin-2-yl)amino]ethyl}phenyl)tetrahydro-2H-pyran-4-yl]piperazine-1-carboxylate [(VI) X=N, U=Y=CH, =, R1a=methyl, R1b=H, A=phenyl, R2=ethyl R3=H, R4=H, R5a and R5b=tetrahydro-2H-pyran-4-yl, M=Bond, G1=N, Z1, Z2=—CH2-, m1=m2=2, PG=phenyl carboxylate]

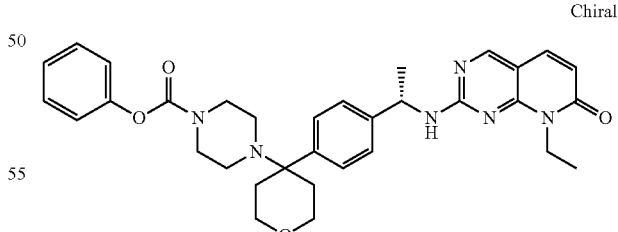

Chiral $^1$H NMR (DMSO-d$_6$) δ=8.59 (s, 1H), 8.44 (d, J=7.02 Hz, 1H), 7.68 (d, J=9.30 Hz, 1H), 7.22-7.40 (m, 4H), 7.18 (dd, J=7.47, 7.32 Hz, 1H), 7.02 (, dd, J=2.90, 6.71 Hz, 1H), 6.97 (d, J=7.78 Hz, 1H), 6.22 (d, J=9.30 Hz, 1H), 5.04 (t, J=6.94 Hz, 1H), 4.01-4.27 (m, 1H), 3.72-3.92 (m, 3H), 3.46-3.55 (m, 6H), 3.37-3.41 (m, 2H), 1.94-2.33 (m, 8H), 1.49 (d, J=7.02 Hz, 3H), 0.83 (t, J=6.86 Hz, 3H). LCMS: m/z 583 [M+H]$^+$ @ r.t. 6.26 min.

Phenyl 4-[4-(4-{(1S)-1-[(8-cyclopentyl-5-methyl-7-oxo-7,8-dihydropyrido[2,3-d]pyrimidin-2-yl)amino]ethyl}phenyl)tetrahydro-2H-pyran-4-yl]piperazine-1-carboxylate carboxylate [(VI) X=N, U=methyl, Y=CH, =, R1a=methyl, R1b=H, A=phenyl, R2=cyclopentyl, R3=H, R4=H, R5a and R5b=tetrahydro-2H-pyran-4-yl, M=Bond, G1=N, Z1, Z2=—CH2-, m1=m2=2, PG=phenyl carboxylate]

Phenyl 4-(4-{4-[(1S)-1-{[5-methyl-7-oxo-8-(propan-2-yl)-7,8-dihydropyrido[2,3-d]pyrimidin-2-yl]amino}ethyl]phenyl}tetrahydro-2H-pyran-4-yl)piperazine-1-carboxylate [(VI) X=N, U=CMe, Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, PG=phenyl carboxylate]

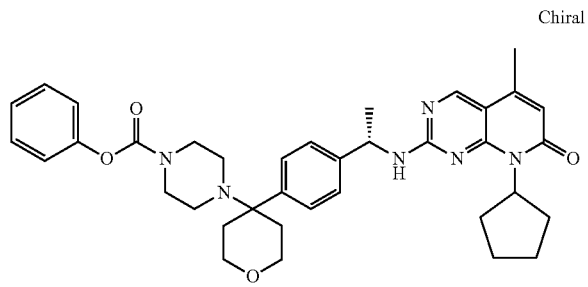 [SMILES: Cc1cc(=O)n(C2CCCC2)c2nc(N[C@@H](C)c3ccc(C4(N5CCN(C(=O)Oc6ccccc6)CC5)CCOCC4)cc3)ncc12]

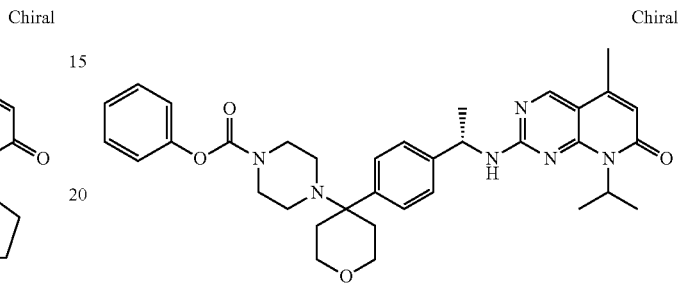

$^1$H NMR (DMSO-d$_6$) δ=8.66 (s, 1H), 8.36 (d, J=6.86 Hz, 1H), 7.29-7.42 (m, 4H), 7.23 (d, J=8.24 Hz, 2H), 7.15-7.20 (m, 1H), 6.96 (d, J=7.93 Hz, 2H), 6.05 (d, J=1.07 Hz, 1H), 5.55 (d, J=8.85 Hz, 1H), 4.90-5.37 (m, 1H), 3.72-3.89 (m, 2H), 3.49 (br. s., 2H), 3.39 (br. s., 2H), 2.30 (s, 3H), 1.93-2.28 (m, 8H), 1.67-1.86 (m, 5H), 1.50 (d, J=7.02 Hz, 3H), 1.23-1.47 (m, 4H). LCMS: m/z 636 [M+H]$^+$ @ r.t. 10.06 min.

$^1$H NMR (DMSO-d$_6$) δ=8.64 (s, 1H), 8.35 (d, J=6.86 Hz, 1H), 7.22-7.45 (m, 6H), 7.14-7.21 (m, 1H), 6.90-7.06 (m, 2H), 6.05 (br. s., 1H), 5.45 (br. s., 1H), 4.94-5.33 (m, 1H), 3.81 (dd, J=5.26, 10.75 Hz, 2H), 3.43-3.54 (m, 2H), 3.29-3.33 (m, 4H), 2.29 (s, 3H), 2.02-2.28 (m, 8H), 1.49 (d, J=7.02 Hz, 3H), 1.23-1.44 (m, 6H).

LCMS: m/z 611 [M+H]$^+$ @ r.t. 9.02 min.

Phenyl 4-(3-{4-[(1S)-1-{[7-oxo-8-(propan-2-yl)-7,8-dihydropyrido[2,3-d]pyrimidin-2-yl]amino}ethyl]phenyl}tetrahydrofuran-3-yl)piperazine-1-carboxylate [(VI) X=N, U=Y=CH, =, R1a=methyl, R1b=H, A=phenyl, R2=propan-2-yl, R3=H, R4=H, R5a and R5b=tetrahydrofuran-3-yl, M=Bond, G1=N, Z1, Z2=—CH2-, m1=m2=2, PG=phenyl carboxylate]

Phenyl 4-(1-{4-[(1S)-1-{[7-oxo-8-(propan-2-yl)-7,8-dihydropyrido[2,3-d]pyrimidin-2-yl]amino}ethyl]phenyl}cyclopentyl)piperazine-1-carboxylate [(VI) X=N, U=Y=CH, =, R1a=methyl, R1b=H, A=phenyl, R2=propan-2-yl, R3=H, R4=H, R5a and R5b=cyclopentyl, M=Bond, G1=N, Z1, Z2=—CH2-, m1=m2=2, PG=phenyl carboxylate]

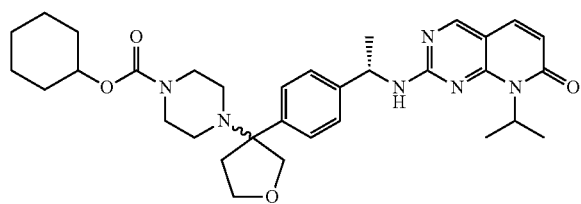 [SMILES: CC(C)n1c(=O)ccc2cnc(N[C@@H](C)c3ccc(C4(N5CCN(C(=O)OC6CCCCC6)CC5)CCOC4)cc3)nc21]

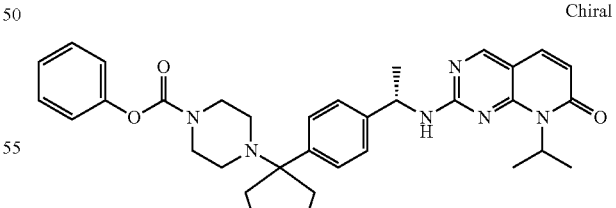

$^1$H NMR (DMSO-d$_6$) δ=8.57 (s, 1H), 8.38 (br. s., 1H), 7.63 (d, J=9.15 Hz, 1H), 7.27-7.43 (m, 6H), 7.13-7.23 (m, 1H), 6.93-7.09 (m, 2H), 6.17 (d, J=7.78 Hz, 1H), 5.42-5.83 (m, 1H), 4.89-5.35 (m, 1H), 4.01-4.13 (m, 1H), 3.88-3.98 (m, 2H), 3.58-3.68 (m, 1H), 3.43-3.56 (m, 2H), 3.28-3.32 (m, 2H), 2.14-2.46 (m, 6H), 1.49 (d, J=7.02 Hz, 3H), 1.30-1.45 (m, 6H). LCMS: m/z 583 [M+H]$^+$ @ r.t. 10.41 min.

$^1$H NMR (DMSO-d$_6$) δ=8.57 (s, 1H), 8.37 (d, J=6.86 Hz, 1H), 7.63 (d, J=9.30 Hz, 1H), 7.27-7.40 (m, 6H), 7.15-7.21 (m, 1H), 6.91-7.06 (m, 2H), 6.17 (d, J=8.24 Hz, 1H), 5.47 (br. s., 1H), 4.99 (t, J=6.86 Hz, 1H), 3.42-3.55 (m, 3H), 3.25-3.33 (m, 2H), 2.17-2.35 (m, 5H), 1.91-2.13 (m, 4H), 1.71 (br. s., 2H), 1.49 (d, J=6.86 Hz, 3H), 1.33-1.44 (m, 6H). LCMS: m/z 581 [M+H]$^+$ @ r.t. 9.06 min.

111

Phenyl 4-(4-{4-[(1S)-1-{[7-oxo-8-(pentan-3-yl)-7,8-dihydropyrido[2,3-d]pyrimidin-2-yl]amino}ethyl]phenyl}tetrahydro-2H-pyran-4-yl)piperazine-1-carboxylate [(VI) X═N, U=methyl, Y═CH, ═, R1a=methyl, R1b=H, A=phenyl, R2=pentan-3-yl, R3=H, R4=H, R5a and R5b=tetrahydro-2H-pyran-4-yl, M=Bond, G1=N, Z1, Z2═—CH2-, m1=m2=2, PG=phenyl carboxylate]

$^1$H NMR (DMSO-d$_6$) δ=8.58 (s, 1H), 8.30-8.44 (m, 1H), 7.66 (d, J=9.30 Hz, 1H), 7.29-7.43 (m, 4H), 7.24 (d, J=8.24 Hz, 2H), 7.13-7.21 (m, 1H), 6.90-7.03 (m, 2H), 6.08-6.26 (m, 1H), 4.89-5.36 (m, 2H), 3.81 (dd, J=3.20, 7.17 Hz, 2H), 3.46-3.55 (m, 2H), 1.71-2.25 (m, 12H), 1.48 (d, J=7.02 Hz, 3H), 0.63-0.81 (m, 3H), 0.31 (t, J=7.32 Hz, 2H), 0.19 (t, J=7.32 Hz, 1H).

112

Phenyl 4-(4-{4-[(1S)-1-{[4-(dimethylamino)-7-oxo-8-(propan-2-yl)-7,8-dihydropyrido[2,3-d]pyrimidin-2-yl]amino}ethyl]phenyl}tetrahydro-2H-pyran-4-yl)piperazine-1-carboxylate [(VI) X═N, U=methyl, Y═CH, ═, R1a=methyl, R1b=H, A=phenyl, R2=propan-2-yl, R3=N(Me)$_2$, R4=H, R5a and R5b=tetrahydro-2H-pyran-4-yl, M=Bond, G1=N, Z1, Z2═—CH2-, m1=m2=2, PG=phenyl carboxylate]

$^1$H NMR (DMSO-d$_6$) δ=7.64-7.75 (m, 1H), 7.30-7.40 (m, 4H), 7.23 (d, J=8.24 Hz, 2H), 7.16-7.20 (m, 1H), 6.93-7.05 (m, 2H), 5.85-5.99 (m, 1H), 5.54 (br. s., 1H), 4.92-5.15 (m, 1H), 3.76-3.88 (m, 2H), 3.50 (br. s., 2H), 3.36-3.40 (m, 2H), 2.97-3.13 (m, 6H), 1.97-2.33 (m, 8H), 1.46 (d, J=6.87 Hz, 3H), 1.04-1.40 (m, 6).

Preparation 22

Synthesis of phenyl 4-{4-[4-(2-{[7-oxo-8-(propan-2-yl)-7,8-dihydropyrido[2,3-d]pyrimidin-2-yl]amino}propan-2-yl)phenyl]tetrahydro-2H-pyran-4-yl}piperazine-1-carboxylate [(VI) X═N, U═Y═CH, ═, R1a=R1b=methyl, A=phenyl, R2=propan-2-yl R3=H, R4=H, R5a and R5b=tetrahydro-2H-pyran-4-yl, M=Bond, G1=N, Z1, Z2═—CH2-, m1=m2=2, PG=phenyl carboxylate] Step 2a

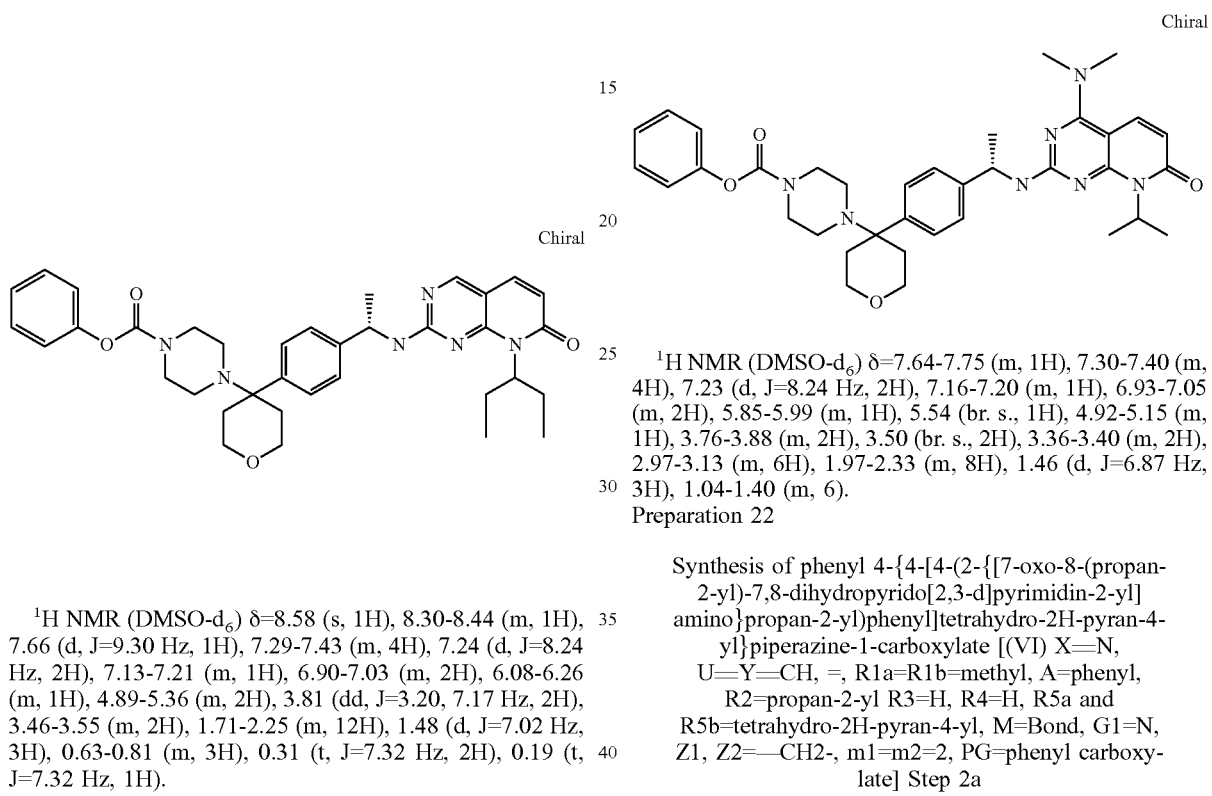

phenyl 4-{4-[4-(2-aminopropan-2-yl)phenyl]tetrahydro-2H-pyran-4-yl}piperazine-1-carboxylate (143 mg, 0.34 mmol, 1 eq.) was dissolved in 1,4-dioxane (6 ml). To this solution is then sequentially added 2-(methylsulfonyl)-8-(propan-2-yl)pyrido[2,3-d]pyrimidin-7(8H)-one (104 mg, 0.308 mmol, 0.9 eq.), and DIPEA (0.088 ml, 1.5 eq.). The reaction mixture is then heated at 60° C. for 48 hours and then allowed to warm to room temperature. The reaction mixture is slowly poured over cold water/brine. The precipitated solids are filtered, washed with water, and dried under vacuum. The title compound was obtained as solid (144 mg, 77%) and was taken forward without further purification.

$^1$H NMR (DMSO-d$_6$) δ=8.57 (s, 1H), 8.21 (br. s., 1H), 7.61 (d, J=8.85 Hz, 1H), 7.32-7.39 (m, 4H), 7.16-7.24 (m, 3H), 6.94-7.05 (m, 2H), 6.12 (d, J=9.15 Hz, 1H), 4.98-5.28 (m, 1H), 3.81 (t, J=8.46 Hz, 2H), 3.49 (br. s., 2H), 3.36-3.43 (m, 4H), 2.12-2.34 (m, 6H), 1.99 (br. s., 2H), 1.65-1.77 (m, 6H), 0.91-1.35 (m, 6H) LCMS: m/z 611 [M+H]$^+$ @ r.t. 3.98 min.

According to the same method the following compound was prepared:

Phenyl 4-{4-[4-(1-{[7-oxo-8-(propan-2-yl)-7,8-dihydropyrido[2,3-d]pyrimidin-2-yl]amino}cyclopropyl)phenyl]tetrahydro-2H-pyran-4-yl}piperazine-1-carboxylate [(VI) X=N, U=Y=CH, =, R1a and R1b=cyclopropyl, A=phenyl, R2=propan-2-yl R3=H, R4=H, R5a and R51b=tetrahydro-2H-pyran-4-yl, M=Bond, G1=N, Z1, Z2=—CH2-, m1=m2=2, PG=phenyl carboxylate]

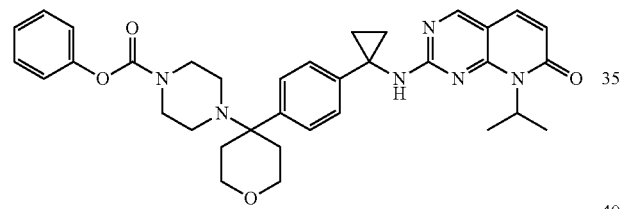

$^1$H NMR (DMSO-d$_6$) δ=8.65 (s, 1H), 8.61 (s, 1H), 7.67 (d, J=9.30 Hz, 1H), 7.30-7.40 (m, 1H), 7.15-7.22 (m, 3H), 7.08-7.14 (m, 2H), 6.98 (d, J=7.78 Hz, 2H), 6.23 (d, J=9.30 Hz, 1H), 5.37 (br. s, 1H), 3.72-3.85 (m, 2H), 3.48 (br. s., 2H), 3.25-3.32 (m, 4H), 1.94-2.31 (m, 8H), 1.03-1.54 (m, 10H).

Preparation 23

Synthesis of phenyl 4-(4-{4-[(1S)-1-{[2-oxo-1-(propan-2-yl)-1,2-dihydro-1,6-naphthyridin-7-yl]amino}ethyl]phenyl}tetrahydro-2H-pyran-4-yl)piperazine-1-carboxylate [(VI) X=CH, U=Y=CH, R1a=methyl, R1b=H, A=phenyl, R2=propan-2-yl R3=H, R4=H, R5a and R5b=tetrahydro-2H-pyran-4-yl, M=Bond, G1=N, Z2=—CH2-, m1=m2=2, PG=phenyl carboxylate] Step 2a

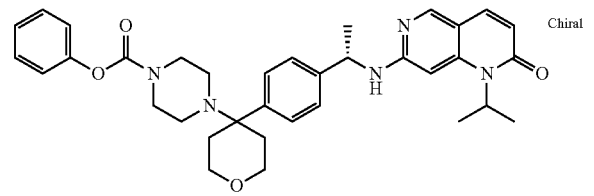 [SMILES: CC(C)n1c(=O)ccc2cnc(N[C@@H](C)c3ccc(C4(N5CCN(C(=O)Oc6ccccc6)CC5)CCOCC4)cc3)cc21]

To a solution of phenyl 4-(4-{4-[(1S)-1-aminoethyl]phenyl}tetrahydro-2H-pyran-4-yl)piperazine-1-carboxylate (0.25 g, 0.61 mmol), 7-Chloro-1-isopropyl-1H-[1,6]naphthyridin-2-one (0.17 g, 0.76 mmol) and cesium carbonate (0.50 g, 1.53 mmol) in toluene (7 mL) under nitrogen is added dichloro[1,3-bis(2,6-di-3-pentylphenyl)imidazole-2-ylidene](3-chloropyridyl)palladium(II) (0.06 g, 0.08 mmol) and the mixture is heated at 100° C. overnight. After cooling to room temperature, the mixture is filtered through a plug of silica gel and eluted with ethyl acetate. The filtrate is concentrated under reduced pressure and the residue is purified by silica gel chromatography (0 to 40%) Acetone/EtOAc $^1$H NMR (DMSO-d$_6$) δ=8.31 (s, 1H), 7.62 (d, J=9.30 Hz, 1H), 7.45-7.49 (m, 1H), 7.40 (d, J=8.24 Hz, 2H), 7.30-7.36 (m, 2H), 7.27 (d, J=8.24 Hz, 2H), 7.14-7.20 (m, 1H), 6.95-7.02 (m, 2H), 6.43 (br. m, 1H), 6.12 (d, J=9.46 Hz, 1H), 4.85-5.07 (m, 2H), 3.76-3.88 (m, 2H), 3.36-3.53 (m, 6H), 2.01-2.30 (m, 8H), 1.48 (d, J=6.86 Hz, 3H), 1.41 (d, J=6.56 Hz, 3H), 1.22-1.28 (br. m, 3H). LCMS: m/z 596 [M+H]$^+$ @ r.t. 7.39 min. HRMS (ESI) calcd for $C_{35}H_{42}N_5O_4$ [M+H]$^+$ 596.3232 found 596.3244.

According to the same method the following compounds were prepared:

Benzyl 4-(4,4-difluoro-1-{4-[(1S)-1-{[2-oxo-1-(propan-2-yl)-1,2-dihydro-1,6-naphthyridin-7-yl]amino}ethyl]phenyl}cyclohexyl)piperazine-1-carboxylate [(VI) X=CH, U=Y=CH, =, R1a=methyl, R1b=H, A=phenyl, R2=propan-2-yl R3=H, R4=H, R5a and R5b=4,4-difluorocyclohexyl, M=Bond, G1=N, Z1, Z2=—CH2-, m1=m2=2, PG=benzyl carboxylate]

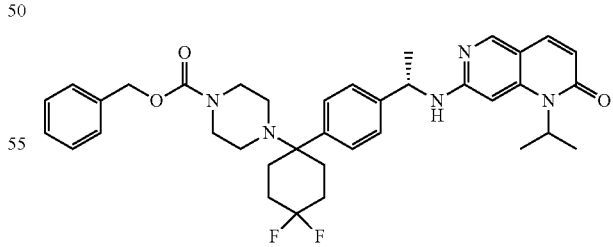

$^1$H NMR (DMSO-d$_6$) δ=8.29 (s, 1H), 7.61 (d, J=9.30 Hz, 1H), 7.45 (d, J=6.25 Hz, 1H), 7.34-7.40 (m, 2H), 7.23-7.34 (m, 7H), 6.17-6.41 (m, 1H), 6.11 (d, J=9.15 Hz, 1H), 4.86-5.04 (m, 3H), 2.07-2.28 (m, 8H), 1.72-1.92 (m, 8H), 1.09-1.60 (m, 9H.

Benzyl 4-(4,4-difluoro-1-{4-[(1S)-1-{[2-oxo-1-(propan-2-yl)-1,2-dihydro-1,6-naphthyridin-7-yl]amino}ethyl]phenyl}cyclohexyl)piperazine-1-carboxylate [(VI) X=CH, U=Y=CH, =, R1a=methyl, R1b=H, A=phenyl, R2=propan-2-yl R3=H, R4=H, R5a and R5b=4,4-difluorocyclohexyl, M=Bond, G1=N, Z1, Z2=—CH2-, m1=m2=2, PG=phenyl carboxylate]

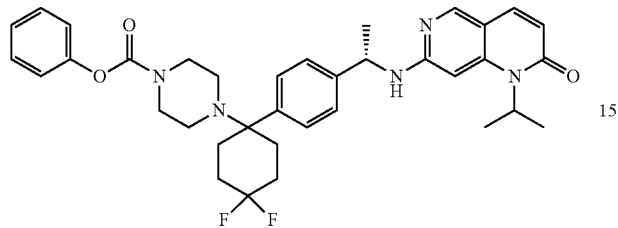

$^1$H NMR (DMSO-d$_6$) δ=8.30 (s, 1H), 7.62 (d, J=9.46 Hz, 1H), 7.43-7.53 (m, 1H), 7.37-7.43 (m, 2H), 7.28-7.37 (m, 4H), 7.12-7.20 (m, 1H), 6.99 (d, J=7.78 Hz, 2H), 6.17-6.54 (m, 1H), 6.12 (d, J=8.85 Hz, 2H), 4.73-5.18 (m, 2H), 3.50 (d, J=3.97 Hz, 2H), 3.25-3.33 m, 2H), 2.55 (d, J=11.90 Hz, 2H), 2.03-2.34 (m, 6H), 1.80 (br. s., 4H), 1.48 (d, J=6.86 Hz, 3H), 1.18-1.44 (m, 6H).

7-{[(1S)-1-(4-{1-[(1-benzylazetidin-3-yl)(methyl)amino]-4,4-difluorocyclohexyl}phenyl)ethyl]amino}-1-(propan-2-yl)-1,6-naphthyridin-2(1H)-one [(VI) X=CH, U=Y=CH, =, R1a=methyl, R1b=H, A=phenyl, R2=propan-2-yl R3=H, R4=H, R5a and R5b=4,4-difluorocyclohexyl, M=NR6, R6=Methyl, G1=CH, Z1, Z2=—CH2-, m1=m2=1, PG=benzyl carboxylate]

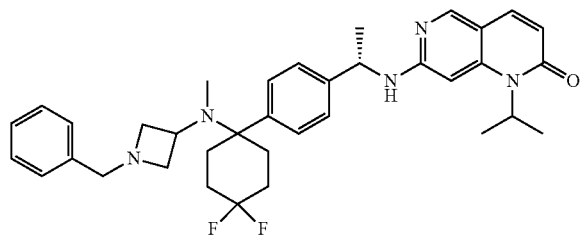 [SMILES: CC(C)n1c(=O)ccc2cnc(N[C@@H](C)c3ccc(C4(N(C)C5CN(Cc6ccccc6)C5)CCC(F)(F)CC4)cc3)cc21]

$^1$H NMR (DMSO-d$_6$) δ=8.26 (s, 1H), 7.57 (d, J=9.30 Hz, 1H), 7.43 (d, J=7.17 Hz, 1H), 7.23-7.37 (m, 10H), 6.31-6.47 (m, 1H), 6.09 (d, J=9.15 Hz, 1H), 4.94 (br. s., 3H), 4.15 (t, J=6.86 Hz, 1H), 3.40-3.72 (m, 4H), 2.31-2.40 (m, 2H), 2.11 (s, 3H), 1.88-2.02 (m, 4H), 1.71 (br. s., 2H), 1.21-1.47 (m, 9H).

7-{[(1S)-1-(4-{1-[(1-benzylazetidin-3-yl)(methyl)amino]-4,4-difluorocyclohexyl}phenyl)ethyl]amino}-1-(propan-2-yl)-1,6-naphthyridin-2(1H)-one [(VI) X=CH, U=Y=CH, =, R1a=methyl, R1b=H, A=phenyl, R2=propan-2-yl R3=H, R4=H, R5a and R5b=4,4-difluorocyclohexyl, M=NR6, R6=acetyl, G1=CH, Z1, Z2=—CH2-, m1=m2=1, PG=benzyl carboxylate]

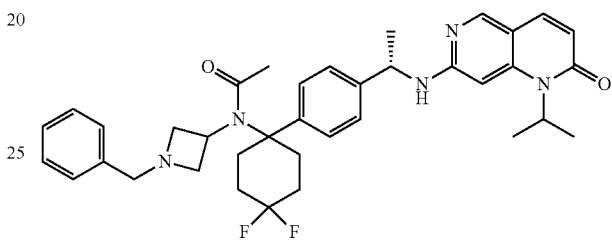

$^1$H NMR (DMSO-d$_6$) δ=8.26 (s, 1H), 7.59 (d, J=9.30 Hz, 1H), 7.44 (d, J=7.02 Hz, 1H), 7.27-7.38 (m, 7H), 7.23 (d, J=8.39 Hz, 2H), 6.26-6.57 (m, 1H), 6.10 (d, J=9.30 Hz, 1H), 4.83-5.13 (m, J=5.19 Hz, 3H), 4.51-4.72 (m, 1H), 4.05-4.34 (m, 4H), 2.54-2.65 (m, 2H), 2.06 (s, 3H), 1.89-2.04 (m, 4H), 1.64-1.86 (m, 2H), 1.21-1.53 (m, 9H).

Preparation 24

Synthesis of phenyl 4-(4-{4-[(1S)-1-{[4-methyl-7-oxo-8-(propan-2-yl)-7,8-dihydropyrido[2,3-d]pyrimidin-2-yl]amino}ethyl] phenyl}tetrahydro-2H-pyran-4-yl)piperazine-1-carboxylate [(VI) X=N, U=Y=CH, R1a=methyl, R1b=H, A=phenyl, R2=propan-2-yl R3=NH$_2$, R4=H, R5a and R5b=tetrahydro-2H-pyran-4-yl, M=bond, G1=N, Z1, Z2=—CH2-, m1=m2=2, PG=phenyl carboxylate]

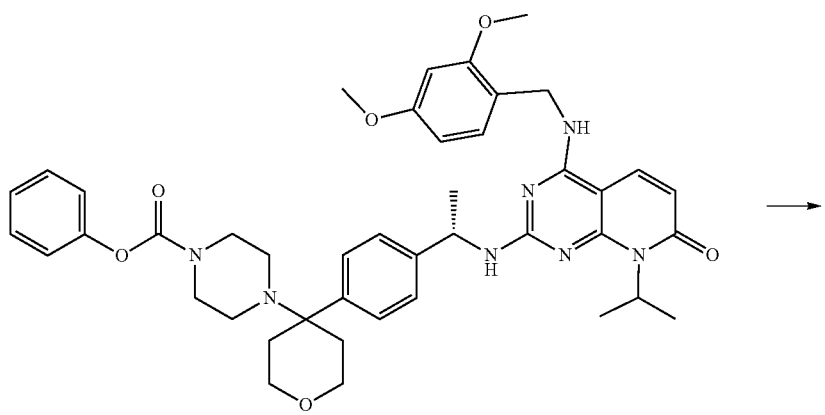

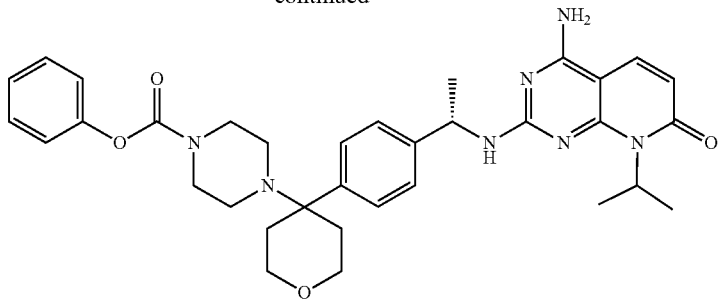

To a solution of phenyl 4-(4-{4-[(1S)-1-({4-[(2,4-dimethoxybenzyl)amino]-7-oxo-8-(propan-2-yl)-7,8-dihydropyrido[2,3-d]pyrimidin-2-yl}amino)ethyl]phenyl}tetrahydro-2H-pyran-4-yl)piperazine-1-carboxylate (175 mg, 0.227 mmol) in CH₂Cl₂ (5 mL), trifluoroacetic acid (2 mL) was added. The yellow solution was stirred ad room temperature overnight. 15 mL CH₂Cl₂ were added and the organic solution was washed with a satured solution of NaHCO₃, dryed on Na₂SO₄ and evaporated to dryness to give 170 mg of title compound. Solvent was evaporated and the residue was suspend. The reaction mixture was evaporated to dryness and the residue was purified on silica gel (AcOEt/Hexane: 1/1) to give a white solid (170 mg). ¹H NMR (DMSO-d₆) δ=7.84 (d, J=9.6 Hz, 1H), 7.51-7.39 (m, 1H), 7.38-7.06 (m, 7H), 7.03-6.87 (m, 3H), 5.00 (br. s., 1H), 3.90-3.73 (m, 3H), 3.56-3.43 (m, 3H), 2.33-1.98 (m, 8H).

Preparation 25

2-{[(1S)-1-{4-[4-(piperazin-1-yl)tetrahydro-2H-pyran-4-yl]phenyl}ethyl]amino}-8-(propan-2-yl)pyrido[2,3-d]pyrimidin-7(8H)-one [(II) X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2] Step 2b

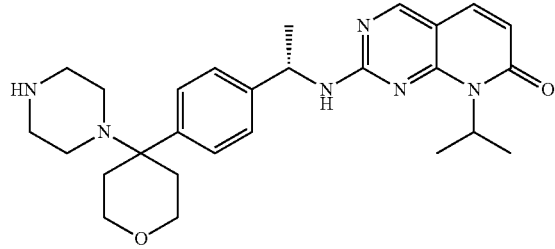 [SMILES: CC(C)n1c(=O)ccc2cnc(N[C@@H](C)c3ccc(C4(N5CCNCC5)CCOCC4)cc3)nc21]

To a solution of phenyl 4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazine-1-carboxylate (149.0 mg, 0.25 mmol) in a mixture of i-propanol (4.0 mL) is added NaOH (1.0 mL, 12.5 mmol). The mixture is stirred 8 hours at 80° C. and then concentrated to dryness, 5-10% of isopropylcarbamate is still present in the mixture. The crude is dissolved in DCM and water pH 10, the organic phase is separated and washed with brine, died (Na₂SO₄) and volatiles removed in vacuo to provide 2-{[(1S)-1-{4-[4-(piperazin-1-yl)tetrahydro-2H-pyran-4-yl]phenyl}ethyl]amino}-8-(propan-2-yl)pyrido[2,3-d]pyrimidin-7(8H)-one as light yellow oil (109.0 mg, 92%).

¹H NMR (500 MHz, DMSO-d₆) δ=8.56 (s, 1H), 8.13-8.41 (m, 1H), 7.63 (d, J=9.30 Hz, 1H), 7.29-7.42 (m, 2H), 7.13-7.24 (m, 2H), 6.16 (d, J=9.30 Hz, 1H), 5.49 (br. s., 1H), 4.91-5.35 (m, 1H), 3.76 (d, J=7.47 Hz, 2H), 3.36 (m, 3H), 2.55-2.62 (m, 4H), 1.85-2.20 (m, 8H) 1.49 (d, J=6.81 Hz 3H), 1.21-1.43 (m, 6H).

According to the same method the following compounds were prepared:

2-{[(1R)-1-{4-[4-(piperazin-1-yl)tetrahydro-2H-pyran-4-yl]phenyl}ethyl]amino}-8-(propan-2-yl)pyrido[2,3-d]pyrimidin-7(8H)-one [(II) X=N, U=Y=CH, =, R1a=H, R1b=methyl, A=phenyl, R2=propan-2-yl, R3=H, R4=H, R5a and R5b=tetrahydro-2H-pyran-4-yl, M=Bond, G1=N, Z1, Z2=—CH2-, m1=m2=2]

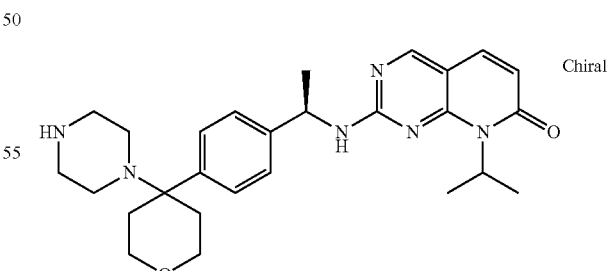

¹H NMR (500 MHz, DMSO-d6) δ=8.56 (s, 1H), 8.34 (d, J=7.17 Hz, 1H), 7.63 (d, J=9.15 Hz, 1H), 7.30-7.39 (m, 2H), 7.15-7.24 (m, 2H), 6.16 (d, J=9.15 Hz, 1H), 5.42-5.56 (m, 1H), 5.02-5.04 (m, 1H), 3.71-3.80 (m, 2H), 3.28-3.37 (m, 2H), 2.55-2.61 (m, 4H), 1.95-2.15 (m, 8H), 1.47 (d, J=6.86 Hz, 3H), 1.03-1.44 (m, 6H).

8-ethyl-2-{[(1S)-1-{4-[4-(piperazin-1-yl)tetrahydro-2H-pyran-4-yl]phenyl}ethyl]amino}pyrido[2,3-d]pyrimidin-7(8H)-one [(II) X=N, U=Y=CH, =, R1a=methyl, R1b=H, A=phenyl, R2=ethyl, R3=H, R4=H, R5a and R5b=tetrahydro-2H-pyran-4-yl, M=Bond, G1=N, Z1, Z2=—CH2-, m1=m2=2]

4-methyl-2-{[(1S)-1-{4-[4-(piperazin-1-yl)tetrahydro-2H-pyran-4-yl]phenyl}ethyl]amino}-8-(propan-2-yl)pyrido[2,3-d]pyrimidin-7(8H)-one [(II) X=N, U=Y=CH, =, R1a=methyl, R1b=H, A=phenyl, R2=propan-2-yl, R3=methyl, R4=H, R5a and R5b=tetrahydro-2H-pyran-4-yl, M=Bond, G1=N, Z1, Z2=—CH2-, m1=m2=2]

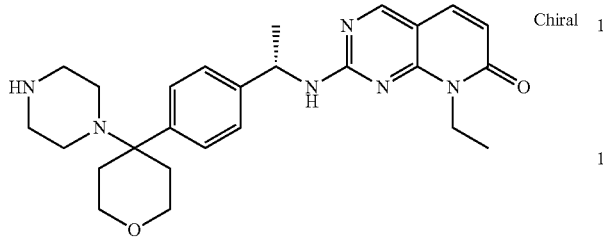

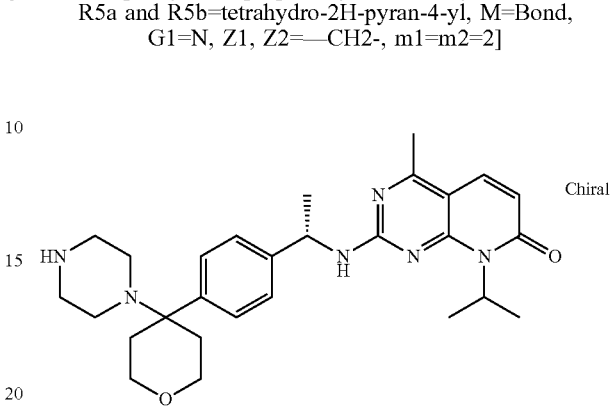

$^1$H NMR (500 MHz, DMSO-d6) δ=8.58 (s, 1H), 8.42 (d, J=7.02 Hz, 1H), 7.68 (d, J=9.30 Hz, 1H), 7.32-7.42 (m, 2H), 7.15-7.25 (m, 2H), 6.21 (d, J=9.30 Hz, 1H), 5.06 (t, J=7.09 Hz, 1H), 4.05-4.30 (m, 2H), 3.64-3.87 (m, 2H), 3.26-3.31 (m, 2H), 2.57-2.69 (m, 4H), 1.88-2.22 (m, 8H), 1.49 (d, J=6.86 Hz, 3H), 0.91 (t, J=6.71 Hz, 3H).

$^1$H NMR (500 MHz, DMSO-d6) δ=8.29 (d, J=7.32 Hz, 1H), 7.80 (d, J=9.61 Hz, 1H), 7.27-7.43 (m, 2H), 7.16-7.23 (m, 2H), 6.12 (d, J=9.76 Hz, 1H), 5.47-5.57 (m, 1H), 4.98-5.03 (m, 1H), 3.76 (d, J=7.17 Hz, 2H), 3.25-3.33 (m, 2H), 2.58 (br. s., 4H), 2.48 (s, 3H), 1.89-2.22 (m, 8H), 1.47 (d, J=7.02 Hz, 3H), 1.12-1.41 (m, 6H).

2-{[(1S)-1-{6-[4-(piperazin-1-yl)tetrahydro-2H-pyran-4-yl]pyridin-3-yl}ethyl]amino}-8-(propan-2-yl)pyrido[2,3-d]pyrimidin-7(8H)-one [(II) X=N, U=Y=CH, =, R1a=methyl, R1b=H, A=pyrimidin-2-yl, R2=propan-2-yl, R3=H, R4=H, R5a and R5b=tetrahydro-2H-pyran-4-yl, M=Bond, G1=N, Z1, Z2=—CH2-, m1=m2=2]

8-cyclopentyl-5-methyl-2-{[(1S)-1-{4-[4-(piperazin-1-yl)tetrahydro-2H-pyran-4-yl]phenyl}ethyl]amino}pyrido[2,3-d]pyrimidin-7(8H)-one [(II) X=N, U=CMe, Y=CH, =, R1a=methyl, R1b=H, A=phenyl, R2=cyclopentyl, R3=H, R4=H, R5a and R5b=tetrahydro-2H-pyran-4-yl, M=Bond, G1=N, Z1, Z2=—CH2-, m1=m2=2]

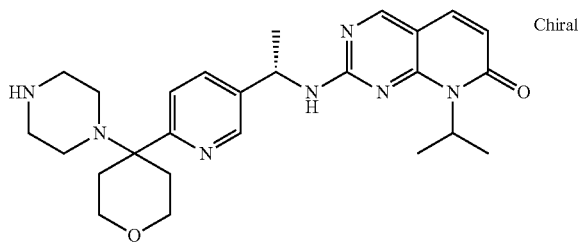 [SMILES: CC(C)n1c(=O)ccc2cnc(N[C@@H](C)c3ccc(C4(N5CCNCC5)CCOCC4)nc3)nc21]

$^1$H NMR (DMSO-d$_6$) δ=8.55-8.63 (m, 2H), 8.20-8.47 (m, 1H), 7.72-7.89 (m, 1H), 7.65 (d, J=9.30 Hz, 1H), 7.27-7.39 (m, 3H), 7.15-7.22 (m, 1H), 6.91-7.07 (m, 2H), 6.20 (d, J=8.39 Hz, 1H), 5.42-5.79 (m, 1H), 4.97-5.38 (m, 1H), 3.75-3.88 (m, 2H), 3.40-3.54 (m, 2H), 3.19-3.30 (m, 2H), 2.16-2.35 (m, 4H), 1.97-2.07 (m, 2H), 1.53 (d, J=7.0 Hz, 3H), 1.22-1.45 (m, 6H).

$^1$H NMR (DMSO-d$_6$) δ=8.64 (s, 1H), 8.35 (d, J=6.86 Hz, 1H), 7.31 (d, J=7.78 Hz, 2H), 7.19 (d, J=7.93 Hz, 2H), 6.01-6.07 (m, 1H), 5.53-5.92 (m, 1H), 4.99 (t, J=6.86 Hz, 1H), 3.67-3.90 (m, 2H), 3.27-3.31 (m, 2H), 2.58 (br. s., 3H), 2.29 (s, 5H), 1.92-2.17 (m, 8H), 1.67-1.88 (m, 4H), 1.55 (br. s., 2H), 1.49 (d, J=7.02 Hz, 3H), 1.35-1.42 (m, 2H).

121

2-{[(1S)-1-{4-[3-(piperazin-1-yl)tetrahydrofuran-3-yl]phenyl}ethyl]amino}-8-(propan-2-yl)pyrido[2,3-d]pyrimidin-7(8H)-one [(VI) X=N, U=Y=CH, =, R1a=methyl, R1b=H, A=phenyl, R2=propan-2-yl, R3=H, R4=H, R5a and R5b=tetrahydrofuran-3-yl, M=Bond, G1=N, Z1, Z2=—CH2-, m1=m2=2]

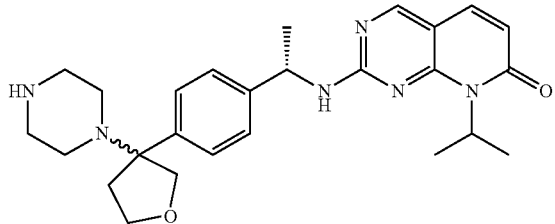 [SMILES: CC(C)n1c(=O)ccc2cnc(N[C@@H](C)c3ccc(C4(N5CCNCC5)CCOC4)cc3)nc21]

$^1$H NMR (DMSO-d$_6$) δ=8.50-8.59 (m, 1H), 8.37 (br. s., 1H), 7.62 (d, J=9.30 Hz, 1H), 7.20-7.42 (m, 4H), 6.16 (d, J=9.00 Hz, 1H), 5.49 (br. s., 1H), 5.02 (br. s., 1H), 3.80-4.05 (m, 5H), 2.61-2.71 (m, 4H), 2.08-2.36 (m, 6H), 1.48 d, J=7.02 Hz, 3H), 1.12-1.42 (m, 6H).

122

2-{[(1S)-1-{4-[1-(piperazin-1-yl)cyclopentyl]phenyl}ethyl]amino}-8-(propan-2-yl)pyrido[2,3-d]pyrimidin-7(8H)-one [(II) X=N, U=Y=CH, =, R1a=methyl, R1b=H, A=phenyl, R2=propan-2-yl, R3=H, R4=H, R5a and R5b=cyclopentyl, M=Bond, G1=N, Z1, Z2=—CH2-, m1=m2=2]

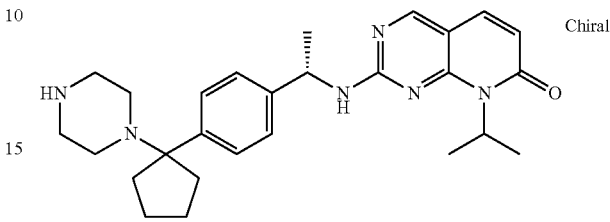

$^1$H NMR (DMSO-d$_6$) δ=8.56 (s, 1H), 8.14-8.39 (m, 1H), 7.62 (d, J=9.15 Hz, 1H), 7.28-7.39 (m, 2H), 7.23-7.27 (m, 2H), 6.15 (d, J=9.15 Hz, 1H), 5.50 (br. s., 1H), 4.94-5.35 (m, 1H), 2.58 (br. s., 4H), 2.06-2.29 (m, 4H), 1.82-2.03 (m, 5H), 1.65 (br. s., 2H), 0.82-1.54 (m, 11H).

5-methyl-2-{[(1S)-1-{4-[4-(piperazin-1-yl)tetrahydro-2H-pyran-4-yl]phenyl}ethyl]amino}-8-(propan-2-yl)pyrido [2,3-d]pyrimidin-7(8H)-one [(VI) X=N, U=C-Me, Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2]

4-amino-2-{[(1S)-1-{4-[4-(piperazin-1-yl)tetrahydro-2H-pyran-4-yl]phenyl}ethyl]amino}-8-(propan-2-yl) pyrido [2,3-d]pyrimidin-7(8H)-one [(II) X=N, U=Y=CH, =, R1a=methyl, R1b=H, A=phenyl, R2=propan-2-yl, R3=NH$_2$, R4=H, R5a and R5b=tetrahydro-2H-pyran-4-yl, M=Bond, G1=N, Z1, Z2=—CH2-, m1=m2=2]

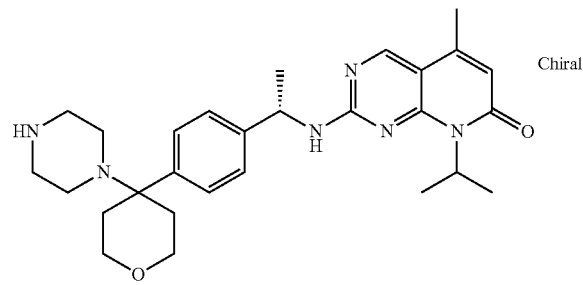 [SMILES: Cc1cc(=O)n(C(C)C)c2nc(N[C@@H](C)c3ccc(C4(N5CCNCC5)CCOCC4)cc3)ncc12]

$^1$H NMR (DMSO-d$_6$) δ=8.63 (s, 1H), 8.10-8.38 (m, 1H), 7.27-7.43 (m, 2H), 7.11-7.25 (m, 2H), 6.03 (s, 1H), 5.48 (br. s., 1H), 5.03 (br. s., 1H), 3.76 (d, J=6.71 Hz, 2H), 3.26-3.33 (m, 2H), 2.58 (br. s., 5H), 2.29 (s, 3H), 1.83-2.24 (m, 8H), 1.49 (d, J=6.86 Hz, 3H), 1.27-1.43 (m, 6H).

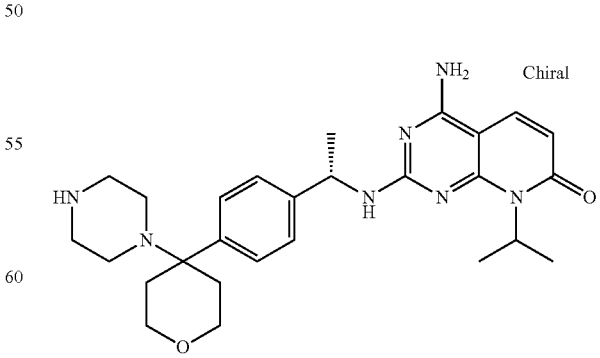

LCMS: m/z 514 [M+Na]$^+$ @ r.t. 6.16 min. HRMS (ESI) calcd for C$_{27}$H$_{38}$N$_7$NaO$_2$ [M+Na]$^+$ 514.2907 found 514.2907.

123

8-(pentan-3-yl)-2-{[(1S)-1-{4-[4-(piperazin-1-yl)tetrahydro-2H-pyran-4-yl]phenyl}ethyl]amino}pyrido[2,3-d]pyrimidin-7(8H)-one [(II) X=N, U=Y=CH, =, R1a=methyl, R1b=H, A=phenyl, R2=pentan-3-yl, R3=R4=H, R5a and R5b=tetrahydro-2H-pyran-4-yl, M=Bond, G1=N, Z1, Z2=—CH2-, m1=m2=2]

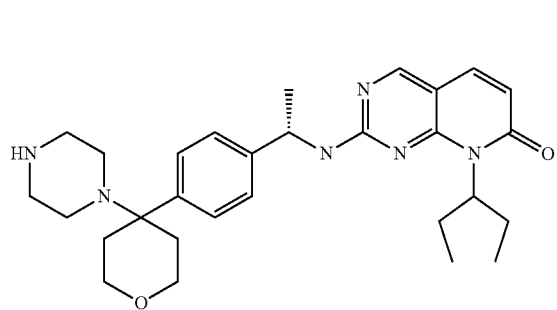 [SMILES: CCC(CC)n1c(=O)ccc2cnc(N[C@@H](C)c3ccc(C4(N5CCNCC5)CCOCC4)cc3)nc21]

¹H NMR (DMSO-d₆) δ=8.53-8.61 (m, 1H), 8.28-8.42 (m, 1H), 7.66 (d, J=9.30 Hz, 1H), 7.27-7.41 (m, 2H), 7.19 (d, J=8.08 Hz, 2H), 6.08-6.27 (m, 1H), 4.83-5.39 (m, 2H), 3.71-3.86 (m, 3H), 3.29-3.33 (m, 2H), 2.56-2.66 (m, 4H), 1.70-2.18 (m, 12H), 1.48 (d, J=7.0 Hz, 3H), 0.62-0.81 (m, 3H), 0.35 (t, J=7.47 Hz, 3H).

124

4-(dimethylamino)-8-(pentan-3-yl)-2-{[(1S)-1-{4-[4-(piperazin-1-yl)tetrahydro-2H-pyran-4-yl]phenyl}ethyl]amino}pyrido[2,3-d]pyrimidin-7(8H)-one [(II) X=N, U=Y=CH, =, R1a=methyl, R1b=H, A=phenyl, R2=propan-2-yl R3=N(Me)₂, R4=H, R5a and R5b=tetrahydro-2H-pyran-4-yl, M=Bond, G1=N, Z1, Z2=—CH2-, m1=m2=2]

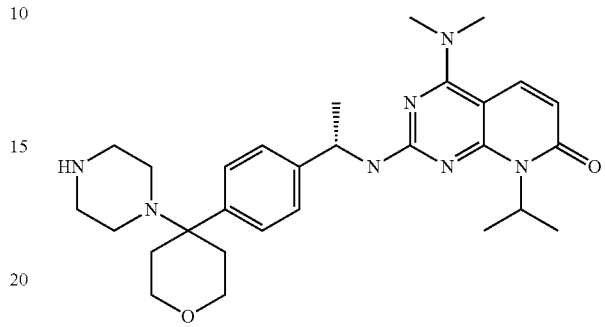

LCMS: in/z 520 [M+H]⁺ @ r.t. 7.77 min. HRMS (ESI) calcd for C₂₉H₄₂1N₇O₂[M+Na]⁺520.3395 found 520.3393.

Preparation 26

2-{[(1S)-1-(4-{4-[azetidin-3-yl(methyl)amino]tetrahydro-2H-pyran-4-yl}phenyl)ethyl]amino}-8-(propan-2-yl) pyrido[2,3-d]pyrimidin-7(8H)-one [(II) X=N, U=Y=CH, =, R1a=methyl, R1b=H, A=phenyl, R2=propan-2-yl, R3=H, R4=H, R5a and R5b=tetrahydro-2H-pyran-4-yl, M=NR6, G1=CH, Z1, Z2=—CH2-, m1=m2=1, R6=methyl] Step 2b

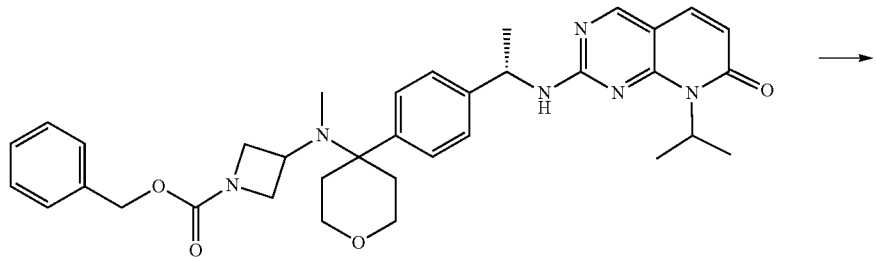

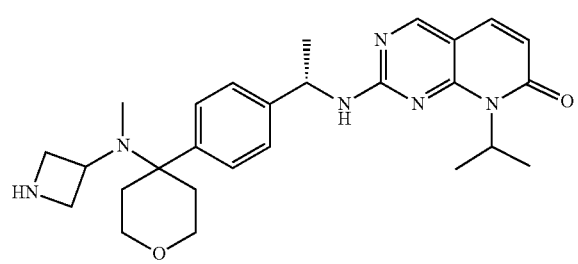

To a stirred solution of benzyl 3-[methyl(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)amino]azetidine-1-carboxylate (200.0 mg, 0.327 mmol) in THF (30.0 mL) was added, under nitrogen atmosphere ammonium formate (1.4 ml of 25% solution in water), followed by 10% Pd/C (120 mg). The suspension was stirred at 60° C. for 1 hour. The catalyst was removed by filtration through a pad of celite and the filtrate was evaporated to dryness under vacuum to give the title product (150 mg, 96% yield).

$^1$H NMR (500 MHz, DMSO-$d_6$) δ=8.53-8.58 (m, 1H), 8.37 (d, J=7.02 Hz, 1H), 7.58-7.67 (m, 1H), 7.31-7.37 (m, 2H), 7.26 (d, J=7.93 Hz, 2H), 6.65 (s, 1H), 6.16 (d, J=9.46 Hz, 1H), 5.49 (br. s, 1H), 5.03 (br. m, 1H), 3.69 (m, 2H), 3.06-3.27 (m, 7H), 2.18 (s, 2H), 2.04-2.15 (m, 3H), 1.86-1.97 (m, 2H), 1.50 (d, J=6.10 Hz, 3H), 1.35 (m, 6H).

LCMS: m/z 477 [M+H]$^+$ @ r.t. 6.28 min. HRMS (ESI) calcd for $C_{27}H_{37}N_6O_2$ [M+H]$^+$ 477.2973 found 477.2971.

According to the same method the following compounds were prepared:

7-{[(1S)-1-{4-[4,4-difluoro-1-(piperazin-1-yl)cyclohexyl]phenyl}ethyl]amino}-1-(propan-2-yl)-1,6-naphthyridin-2(1H)-one [(II) X=CH, U=Y=CH, =, R1a=methyl, R1b=H, A=phenyl, R2=propan-2-yl R3=H, R4=H, R5a and R5b=4,4-difluorocyclohexyl, M=Bond, G1=N, Z1, Z2=CH2-, m1=m2=2,]

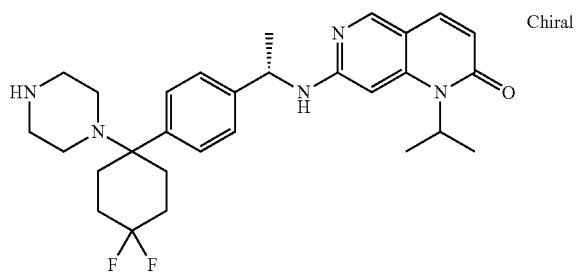

$^1$H NMR (DMSO-$d_6$) δ=8.19-8.38 (m, 1H), 7.61 (d, J=9.30 Hz, 1H), 7.26-7.47 (m, 5H), 6.11 (d, J=9.30 Hz, 1H), 4.79-5.16 (m, 1H), 2.67-2.72 (m, 4H), 2.02-2.20 (m, 8H), 1.66-1.82 (m, 4H), 1.15-1.52 (m, 9H).

2-{[(1S)-1-{4-[4,4-difluoro-1-(piperazin-1-yl)cyclohexyl]phenyl}ethyl]amino}-8-(propan-2-yl)pyrido[2,3-d]pyrimidin-7(8H)-one [(II) X=N, U=Y=CH, =, R1a=methyl, R1b=H, A=phenyl, R2=propan-2-yl, R3=H, R4=H, R5a and R5b=4,4-difluorocyclohexyl, M=Bond, G1=N, Z1, Z2=CH2-, m1=m2=2]

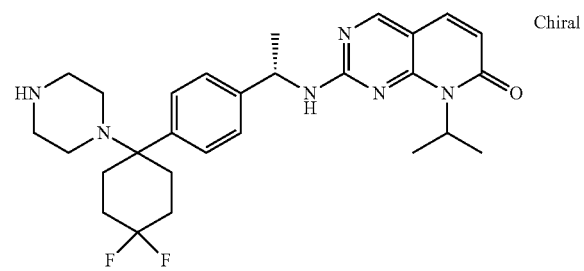 [SMILES: CC(C)n1c(=O)ccc2cnc(N[C@@H](C)c3ccc(C4(N5CCNCC5)CCC(F)(F)CC4)cc3)nc21]

$^1$H NMR (500 MHz, DMSO-$d_6$) δ=8.56 (s, 1H), 8.37 (d, J=6.71 Hz, 1H), 7.62 (d, J=9.30 Hz, 1H), 7.22-7.42 (m, 4H), 6.16 (d, J=9.30 Hz, 1H), 5.41-5.79 (m, 1H), 4.96-5.33 (m, 1H), 2.55-2.64 (m, 4H), 2.00-2.22 (m, 8H), 1.66-1.79 (m, 4H), 1.17-1.50 (m, 9H). LCMS: m/z 511 [M+H]$^+$ @ r.t. 8.63 min HRMS (ESI) calcd for $C_{28}H_{37}F_2N_6O_2$[M+H]$^+$ 511.2992 found 511.2987.

N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-D-alaninamide [(II) X=N, U=Y=CH, =, R1a=methyl, R1b=H, A=phenyl, R2=propan-2-yl R3=N(Me)$_2$, R4=H, R5a and R5b=4,4-difluorocyclohexyl, M=NH, G1=CO, Z1=CR9aR9b, R9a=CH$_3$, R9b=H, m1=1]

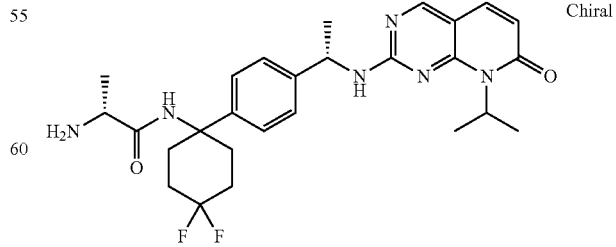

LCMS: m/z 513 [M+H]$^+$ @ r.t. 9.60 min. HRMS (ESI) calcd for $C_{27}H_{35}F_2N_6O_2$[M+H]$^+$ 513.2784 found 513.2774.

N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-L-alaninamide [(II) X=N, U=Y=CH, =, R1a=methyl, R1b=H, A=phenyl, R2=propan-2-yl R3=N(Me)₂, R4=H, R5a and R5b=4,4-difluorocyclohexyl, M=NH, G1=CO, Z1=CR9aR9b, R9a=CH₃, R9b=H, m1=1]

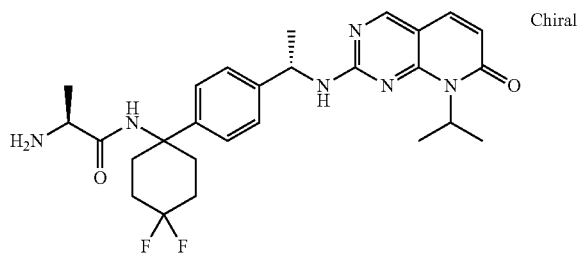 [SMILES: CC(C)n1c(=O)ccc2cnc(N[C@@H](C)c3ccc(C4(NC(=O)[C@H](C)N)CCC(F)(F)CC4)cc3)nc21]

LCMS: m/z 513 [M+H]⁺ @ r.t. 9.58 min. HRMS (ESI) calcd for C₂₇H₃₅F₂N₆O₂[M+H]⁺ 513.2784 found 513.2772.

Example 1

2-{[(1S)-1-{4-[4-(4-acryloylpiperazin-1-yl)tetrahydro-2H-pyran-4-yl]phenyl}ethyl]amino}-8-(propan-2-yl) pyrido [2,3-d]pyrimidin-7(8H)-one [X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 1, Step 1a

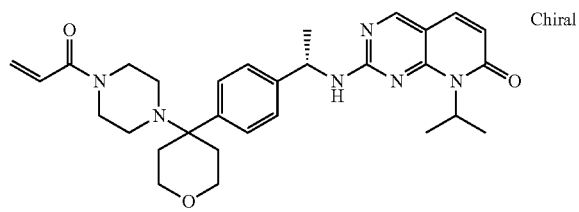 [SMILES: C=CC(=O)N1CCN(C2(c3ccc([C@H](C)Nc4ncc5ccc(=O)n(C(C)C)c5n4)cc3)CCOCC2)CC1]

To a solution of 2-{[(1S)-1-{4-[4-(piperazin-1-yl)tetrahydro-2H-pyran-4-yl]phenyl}ethyl]amino}-8-(propan-2-yl) pyrido[2,3-d]pyrimidin-7(8H)-one (57.0 mg, 0.12 mmol) in DCM (1.0 mL) is added acryloyl chloride (0.01 mL, 0.13 mmol) at 0° C. After 30 minutes, the reaction is quenched with water. The mixture is extracted with DCM, dried over Na₂SO₄, filtered, and concentrated to yield a yellow oil. The crude product is purified by silica gel chromatography (1 to 10% MeOH/DCM) to give the title product as a white foam (40 mg, 66% yield).

¹H NMR (500 MHz, DMSO-d₆) δ=8.55 (s, 1H), 8.31 (d, J=6.71 Hz, 1H), 7.61 (d, J=9.28 Hz, 1H), 7.33 (d, J=7.81 Hz, 2H), 7.21 (d, J=8.18 Hz, 2H), 6.63 (dd, J=10.50, 16.72 Hz, 1H), 6.15 (d, J=9.28 Hz, 1H), 5.91-6.03 (m, 1H), 5.55 (d, J=10.62 Hz, 1H), 5.42 (br. m. 1H), 5.00 (t, J=6.65 Hz, 1H), 3.79 (d, J=7.08 Hz, 2H), 3.34-3.54 (m, 6H), 2.12 (br. s., 8H), 1.49 (d, J=6.96 Hz, 3H), 1.42-1.21 (br. m. 6H). LCMS: m/z 531 [M+H]⁺ @ r.t. 6.03 min. HRMS (ESI) calcd for C₃₀H₃₉N₆O₃ [M+H]⁺ 531.3078 found 531.3067.

According to the same method, the following compounds were prepared:

2-{[(1S)-1-{4-[2-(4-acryloylpiperazin-1-yl)propan-2-yl]phenyl}ethyl]amino}-8-(propan-2-yl)pyrido[2,3-d]pyrimidin-7(8H)-one [X=N, U=Y=CH, =, R1a=methyl, R1b=H, A=phenyl, R2=propan-2-yl, R3=H, R4=H, R5a and R5b=Methyl, M=Bond, G1=N, Z1, Z2=—CH2-, m1=m2=2, E=acryloyl] Cpd 2

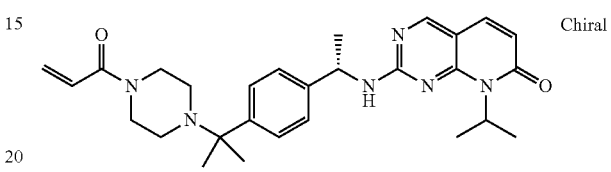

¹H NMR (500 MHz, DMSO-d₆) δ=8.56 (s, 1H), 8.35 (d, J=6.86 Hz, 1H), 7.62 (d, J=9.30 Hz, 1H), 7.38-7.46 (m, 2H), 7.24-7.36 (m, 2H), 6.73 (dd, J=10.45, 16.70 Hz, 1H), 6.15 (d, J=9.30 Hz, 1H), 5.99-6.10 (m, 1H), 5.63 (dd, J=2.14, 10.52 Hz, 1H), 5.40-5.56 (br. s., 1H), 4.98 (q, J=6.71 Hz, 1H), 3.46 (br. s., 4H), 2.22-2.41 (m, 4H), 1.47 (d, J=6.71 Hz, 3H), 1.29-1.44 (br. m, 6H), 1.25 (s, 3H), 1.24 (s, 3H). LCMS: m/z 489 [M+H]⁺ r.t. 6.49 min. HRMS (ESI) calcd for C₂₈H₃₇N₆O₂ [M+H]⁺ 489.2973 found 489.2979.

2-{[(1S)-1-{4-[3-(4-acryloylpiperazin-1-yl)oxetan-3-yl]phenyl}ethyl]amino}-8-(propan-2-yl)pyrido[2,3-d]pyrimidin-7(8H)-one [X=N, U=Y=CH, =, R1a=methyl, R1b=H, A=phenyl, R2=propan-2-yl, R3=H, R4=H, R5a and R5b=oxetan-3-yl, M=Bond, G1=N, Z1, Z2=—CH2-, m1=m2=2, E=acryloyl] Cpd 3

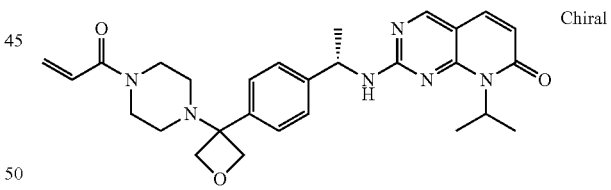

¹H NMR (500 MHz, DMSO-d₆) δ=8.51-8.59 (m, 1H), 8.15-8.40 (m, 1H), 7.60-7.64 (m, 1H), 7.33-7.43 (m, 2H), 7.03-7.10 (m, 2H), 6.66 (dd, J=10.45, 16.70 Hz, 1H), 6.15 (d, J=9.30 Hz, 1H), 5.93-6.00 (m, 1H), 5.56 (d, J=10.37 Hz, 1H), 5.35-5.42 (br., m, 1H), 4.99 (q, J=7.30 Hz, 1H), 4.69-4.75 (m, 4H), 3.52 (br. s., 4H), 1.99-2.22 (m, 4H), 1.48 (d, J=7.30 Hz, 3H), 1.17-1.32 (br., m, 6H). LCMS: m/z 503 [M+H]⁺ @ r.t. 8.72 min. HRMS (ESI) calcd for C₂₈H₃₅N₆O₃ [M+H]⁺ 503.2765 found 503.2758.

2-{[(1S)-1-{4-[3-(4-acryloylpiperazin-1-yl)pentan-3-yl]phenyl}ethyl]amino}-8-(propan-2-yl)pyrido[2,3-d]pyrimidin-7(8H)-one [X=N, U=Y=CH, ═, R1a=methyl, R1b=H, A=phenyl, R2=propan-2-yl, R3=H, R4=H, R5a and R5b=Ethyl, M=Bond, G1=N, Z1, Z2=—CH2-, m1=m2=2, E=acryloyl] Cpd 4

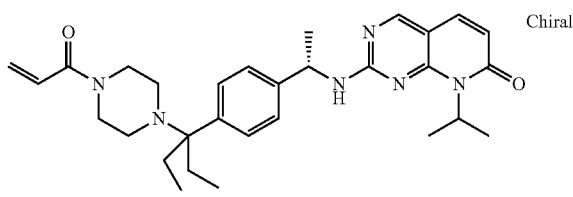 [SMILES: C=CC(=O)N1CCN(C(CC)(CC)c2ccc([C@H](C)Nc3ncc4ccc(=O)n(C(C)C)c4n3)cc2)CC1]

¹H NMR (500 MHz, DMSO-d₆) δ=8.56 (s, 1H), 8.34 (d, J=6.86 Hz, 1H), 7.62 (d, J=9.30 Hz, 1H), 7.18-7.39 (m, 4H), 6.68 (dd, J=10.45, 16.55 Hz, 1H), 6.15 (d, J=9.30 Hz, 1H), 6.02 (dd, J=1.91, 16.55 Hz, 1H), 5.59 (dd, J=1.91, 10.29 Hz, 1H), 5.37-5.42 (br., m, 1H), 4.99 (t, J=6.63 Hz, 1H), 3.37-3.51 (m, 4H), 2.25-2.41 (m, 4H), 1.75-1.94 (m, 4H), 1.48 (d, J=7.02 Hz, 3H), 1.35-1.44 (br., m, 6H), 0.70 (q, J=6.96 Hz, 6H). LCMS: m/z 517 [M+H]⁺ @r.t. 7.73 min. HRMS (ESI) calcd for $C_{30}H_{41}N_6O_2$ [M+H]⁺ 517.3286 found 517.3271.

2-{[(1S)-1-{4-[1-acetyl-4-(4-acryloylpiperazin-1-yl)piperidin-4-yl]phenyl}ethyl]amino}-8-(propan-2-yl)pyrido[2,3-d]pyrimidin-7(8H)-one [X=N, U=Y=CH, ═, R1a=methyl, R1b=H, A=phenyl, R2=propan-2-yl, R3=H, R4=H, R5a and R5b=N-acetylpiperidin-4-yl, M=Bond, G1=N, Z1, Z2=—CH2-, m1=m2=2, E=acryloyl] Cpd 6

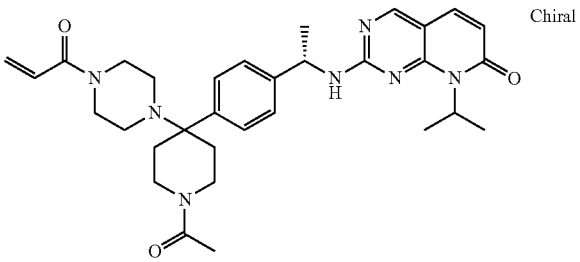 [SMILES: C=CC(=O)N1CCN(C2(c3ccc([C@H](C)Nc4ncc5ccc(=O)n(C(C)C)c5n4)cc3)CCN(C(C)=O)CC2)CC1]

¹H NMR (500 MHz, DMSO-d₆) δ=8.48-8.59 (m, 1H), 8.34 (d, J=6.71 Hz, 1H), 7.62 (d, J=9.30 Hz, 1H), 7.32 (d, J=8.08 Hz, 2H), 7.23 (d, J=8.08 Hz, 2H), 6.64 (dd, J=10.45, 16.70 Hz, 1H), 6.15 (d, J=9.30 Hz, 1H), 5.97 (d, J=16.47 Hz, 1H), 5.56 (d, J=10.68 Hz, 1H), 5.36-5.42 (br., m, 1H), 4.99 (t, J=6.62 Hz, 1H), 3.37-3.57 (m, 8H), 2.08-2.33 (m, 4H), 1.97 (s, 3H), 1.74-1.94 (m, 4H), 1.48 (d, J=7.02 Hz, 3H), 1.35-1.44 (br., m, 6H). LCMS: m/z 572 [M+H]⁺ @ r.t. 6.71 min. HRMS (ESI) calcd for $C_{32}H_{42}N_7O_3$ [M+H]⁺ 572.3344 found 572.3356.

2-{[(1S)-1-{4-[4-(4-propanoylpiperazin-1-yl)tetrahydro-2H-pyran-4-yl]phenyl}ethyl]amino}-8-(propan-2-yl) pyrido[2,3-d]pyrimidin-7(8H)-one [X=N, U=Y=CH, ═, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=propanoyl] Cpd 8

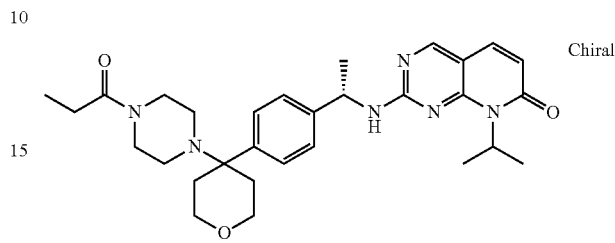

¹H NMR (500 MHz, DMSO-d₆) δ=8.56 (s, 1H), 8.13-8.38 (m, 1H), 7.62 (d, J=9.30 Hz, 1H), 7.30-7.43 (m, 2H), 7.20 (d, J=8.08 Hz, 2H), 6.15 (d, J=9.30 Hz, 1H), 5.35-5.85 (m, 1H), 4.90-5.32 (m, 1H), 3.79 (dd, J=5.41, 10.75 Hz, 2H), 3.26-3.32 (m, 6H), 1.93-2.28 (m, 10H), 1.48 (d, J=7.02 Hz, 3H), 1.35-1.44 (br., m, 6H), 0.81-0.88 (m, 3H). LCMS: m/z 533 [M+H]⁺ @ r.t. 6.38 min. HRMS (ESI) calcd for $C_{30}H_{41}N_6O_3$ [M+H]⁺ 533.3235 found 533.3232.

2-{[(1R)-1-{4-[4-(4-acryloylpiperazin-1-yl)tetrahydro-2H-pyran-4-yl]phenyl}ethyl]amino}-8-(propan-2-yl) pyrido[2,3-d]pyrimidin-7(8H)-one [X=N, U=Y=CH, ═, R1a=H, R1b=methyl, A=phenyl, R2=propan-2-yl, R3 =H, R4=H, R5a and R5b=tetrahydro-2H-pyran-4-yl, M=Bond, G1=N, Z1, Z2=—CH2-, m1=m2=2, E=acryloyl] Cpd 9

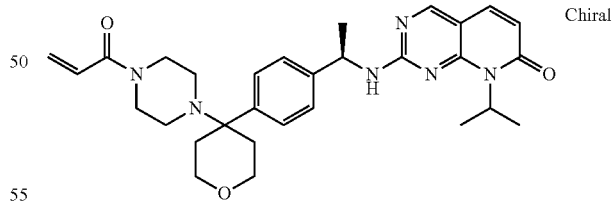

¹H NMR (500 MHz, DMSO-d₆) δ=8.56 (s, 1H), 8.34 (d, J=6.86 Hz, 1H), 7.62 (d, J=9.30 Hz, 1H), 7.29-7.42 (m, 2H), 7.18-7.24 (m, 2H), 6.64 (dd, J=10.52, 16.78 Hz, 1H), 6.15 (d, J=9.30 Hz, 1H), 5.96 (dd, J=1.98, 16.78 Hz, 1H), 5.55 (dd, J=1.98, 10.52 Hz, 1H), 5.32-5.47 (m, 1H), 4.94-5.12 (m, 1H), 3.79 (dd, J=4.96, 10.60 Hz, 2H), 3.39-3.49 (br., m, 6H), 2.10 (br. s., 8H), 1.48 (d, J=7.02 Hz, 3H), 1.23-1.40 (br., m, 6H).

LCMS: m/z 531 [M+H]⁺ @ r.t. 6.36 min. HRMS (ESI) calcd for $C_{30}H_{39}N_6O_3$[M+H]⁺ 531.3078 found 531.3077.

2-{[(1S)-1-{6-[4-(4-acryloylpiperazin-1-yl)tetra-
hydro-2H-pyran-4-yl]pyridin-3-yl}ethyl]amino}-8-
(propan-2-yl) pyrido[2,3-d]pyrimidin-7(8H)-one
[X=N, U=Y=CH, =, R1a=methyl, R1b=H,
A=Pyridin-3-yl, R2=propan-2-yl, R3=H, R4=H,
R5a and R5b=tetrahydro-2H-pyran-4-yl, M=Bond,
G1=N, Z1, Z2=—CH2-, m1=m2=2, E=acryloyl]
Cpd 12

2-{[(1S)-1-{4-[4-(4-acryloylpiperazin-1-yl)tetra-
hydro-2H-pyran-4-yl]phenyl}ethyl]amino}-8-eth-
ylpyrido[2,3-d]pyrimidin-7(8H)-one [X=N,
U=Y=CH, =, R1a=methyl, R1b=H, A=phenyl,
R2=Ethyl, R3=H, R4=H, R5a and R5b=tetrahydro-
2H-pyran-4-yl, M=Bond, G1=N, Z1, Z2=—CH2-,
m1=m2=2, E=acryloyl] Cpd 14

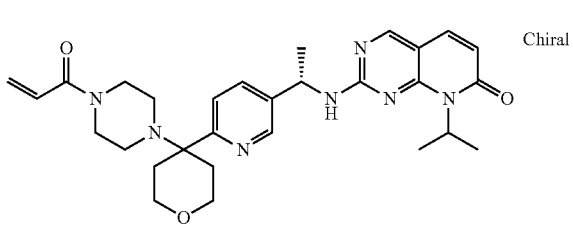 [SMILES: C=CC(=O)N1CCN(C2(c3ccc([C@H](C)Nc4ncc5ccc(=O)n(C(C)C)c5n4)cn3)CCOCC2)CC1]

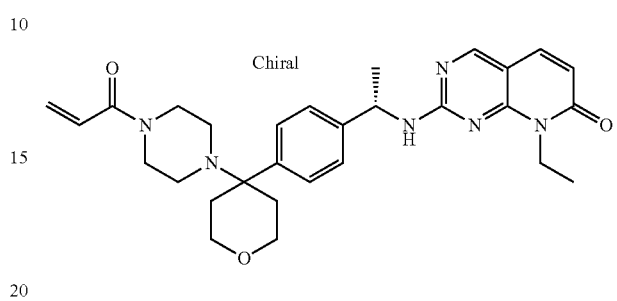

¹H NMR (500 MHz, DMSO-d₆) δ=8.50-8.64 (m, 2H), 8.41 (d, J=6.71 Hz, 1H), 7.69-7.85 (m, 1H), 7.63 (d, J=9.30 Hz, 1H), 7.31 (d, J=8.24 Hz, 1H), 6.64 (dd, J=10.29, 16.55 Hz, 1H), 6.17 (d, J=9.30 Hz, 1H), 5.97 (d, J=16.17 Hz, 1H), 5.56 (d, J=10.52 Hz, 1H), 5.41 (br. s, 1H), 5.04 (q, J=6.71 Hz, 1H), 3.74-3.82 (m, 2H), 3.37-3.45 (m, 4H), 3.15-3.28 (m, 2H), 1.96-2.32 (m, 8H), 1.50 (d, J=7.02 Hz, 3H), 1.20-1.42 (m, 6H).

LCMS: m/z 532 [M+H]⁺ @ r.t. 4.69 min.

¹H NMR (500 MHz, DMSO-d₆) δ=8.58 (s, 1H), 8.40 (d, J=7.17 Hz, 1H), 7.67 (d, J=9.30 Hz, 1H), 7.35 (d, J=8.10 Hz, 2H), 7.21 (d, J=8.10 Hz, 2H), 6.64 (dd, J=10.52, 16.62 Hz, 1H), 6.20 (d, J=9.30 Hz, 1H), 5.96 (dd, J=2.13, 16.62 Hz, 1H), 5.51-5.64 (m, 1H), 5.03 (t, J=6.94 Hz, 1H), 3.91-4.16 (m, 2H), 3.74-3.86 (m, 2H), 3.40-3.47 (m, 6H), 1.94-2.24 (m, 8H), 1.47 (d, J=7.17 Hz, 3H), 0.79 (t, J=6.86 Hz, 3H).

LCMS: m/z 517 [M+H]⁺ @ r.t. 4.93 min. HRMS (ESI) calcd for $C_{29}H_{37}N_6O_3$ [M+H]⁺ 517.3078 found 517.3077.

2-{[(1S)-1-{4-[4-(4-acryloylpiperazin-1-yl)tetra-
hydro-2H-pyran-4-yl]phenyl}ethyl]amino}-4-
methyl-8-(propan-2-yl)pyrido[2,3-d]pyrimidin-7
(8H)-one [X=N, U=Y=CH, =, R1a=methyl,
R1b=H, A=phenyl, R2=propan-2-yl, R3=Methyl,
R4=H, R5a and R5b=tetrahydro-2H-pyran-4-yl,
M=Bond, G1=N, Z1, Z2=—CH2-, m1=m2=2,
E=acryloyl] Cpd 13

2-{[(1S)-1-{4-[4-(4-acryloylpiperazin-1-yl)tetra-
hydro-2H-pyran-4-yl]phenyl}ethyl]amino}-8-cyclo-
pentyl-5-methylpyrido[2,3-d]pyrimidin-7(8H)-one
[X=N, U=CMe, Y=CH, =, R1a=methyl, R1b=H,
A=phenyl, R2=cyclopentyl, R3=H, R4=H, R5a and
R5b=tetrahydro-2H-pyran-4-yl, M=Bond, G1=N,
Z1, Z2=—CH2-, m1=m2=2, E=acryloyl] Cpd 15

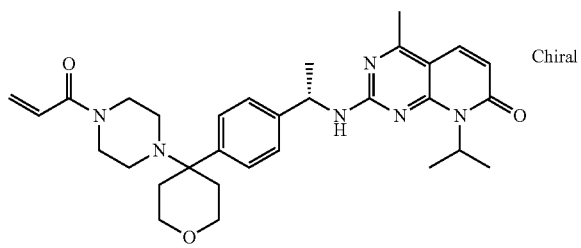 [SMILES: C=CC(=O)N1CCN(C2(c3ccc([C@H](C)Nc4nc(C)c5ccc(=O)n(C(C)C)c5n4)cc3)CCOCC2)CC1]

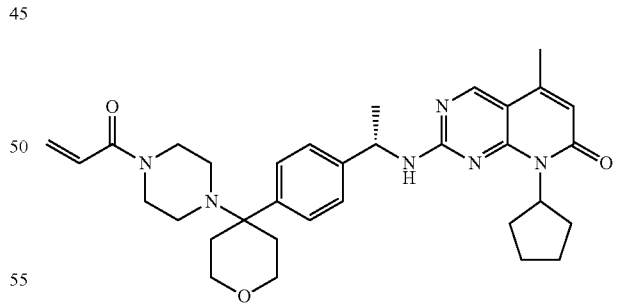

¹H NMR (500 MHz, DMSO-d₆) δ=8.27 (d, J=6.86 Hz, 1H), 7.80 (d, J=9.46 Hz, 1H), 7.31 (d, J=7.93 Hz, 2H), 7.19 (d, J=8.08 Hz, 2H), 6.63 (dd, J=10.37, 16.78 Hz, 1H), 6.12 (d, J=9.30 Hz, 1H), 5.96 (dd, J=2.06, 16.70 Hz, 1H), 5.55 (dd, J=2.14, 10.22 Hz, 1H), 5.44 (br. s, 1H), 4.98 (q, J=6.56 Hz, 1H), 3.75-3.82 (m, 2H), 3.38-3.46 (m, 4H), 3.27-3.32 (m, 2H), 2.48 (s, 3H), 2.0-2.18 (m, 8H), 1.47 (d, J=7.02 Hz, 3H), 1.18-1.42 (m, 6H).

LCMS: m/z 545 [M+H]⁺ @ r.t. 4.69 min. HRMS (ESI) calcd for $C_{31}H_{41}N_7O_3$ [M+H]⁺ 545.3235 found 545.3232.

¹H NMR (500 MHz, DMSO-d₆) δ=8.64 (s, 1H), 8.32 (d, J=7.02 Hz, 1H), 7.29 (d, J=8.08 Hz, 2H), 7.20 (d, J=8.08 Hz, 2H), 6.64 (dd, J=10.37, 16.62 Hz, 1H), 6.03 (s, 1H), 5.97 (dd, J=1.83, 16.62 Hz, 1H), 5.54-5.64 (m, 1H), 5.51 (q, J=9.01 Hz, 1H), 4.96 (q, J=6.94 Hz, 1H), 3.70-3.86 (m, 2H), 3.41-3.51 (m, 4H), 3.29-3.32 (m, 2H), 2.29 (s, 3H), 1.97-2.22 (m, 8H), 1.64-1.92 (m, 4H), 1.47 (d, J=7.17 Hz, 3H), 1.23-1.45 (m, 4H).

LCMS: m/z 571 [M+H]⁺ @ r.t. 8.0 min.

7-{[(1S)-1-{4-[4-(4-acryloylpiperazin-1-yl)tetrahydro-2H-pyran-4-yl]phenyl}ethyl]amino}-1-(propan-2-yl)-1,6-naphthyridin-2(1H)-one one [X=CH, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 11

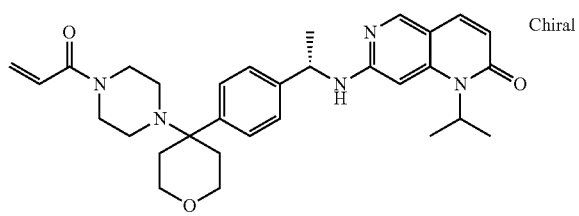 [SMILES: C=CC(=O)N1CCN(C2(c3ccc([C@H](C)Nc4cc5c(ccc(=O)n5C(C)C)cn4)cc3)CCOCC2)CC1]

$^1$H NMR (500 MHz, DMSO-d$_6$) δ=8.29 (s, 1H), 7.61 (d, J=9.30 Hz, 1H), 7.43 (d, J=6.71 Hz, 1H), 7.37 (d, J=8.24 Hz, 2H), 7.23 (d, J=8.24 Hz, 2H), 6.66 (dd, J=10.52, 16.62 Hz, 1H), 6.30 (br. s., 1H), 6.10 (d, J=9.30 Hz, 1H), 5.98 (dd, J=2.29, 16.62 Hz, 1H), 5.55-5.60 (m, 1H), 4.94 (br. s., 2H), 3.74-3.86 (m, 2H), 3.46 (br. s., 6H), 2.00-2.21 (m, 8H), 1.46 (d, J=6.71 Hz, 3H), 1.23-1.40 (m, 6H). LCMS: m/z 530 [M+H]$^+$ @ r.t. 4.72 min. HRMS (ESI) calcd for C$_{31}$H$_{40}$N$_5$O$_3$ [M+H]$^+$ 530.3126 found 530.3128.

2-{[(1S)-1-{4-[1-(4-acryloylpiperazin-1-yl)cyclopentyl]phenyl}ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=cyclopentyl, M=Bond, G1=N, Z1, Z2=—CH2-, m1=m2=2, E=acryloyl] Cpd 16

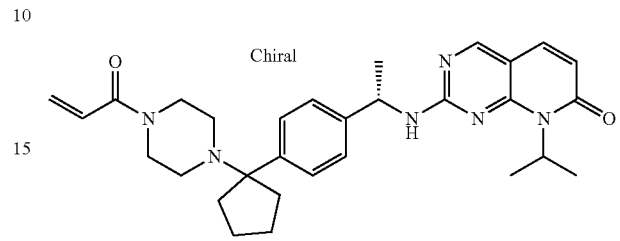

$^1$H NMR (500 MHz, DMSO-d$_6$) δ=8.55 (s, 1H), 8.33 (d, J=6.86 Hz, 1H), 7.62 (d, J=9.30 Hz, 1H), 7.20-7.37 (m, 4H), 6.64 (dd, J=10.37, 16.62 Hz, 1H), 6.15 (d, J=9.30 Hz, 1H), 5.97 (dd, J=1.91, 16.70 Hz, 1H), 5.52-5.61 (m, 1H), 5.42 (br. s, 1H), 4.98 (t, J=7.02 Hz, 1H), 3.39-3.52 (m, 4H), 2.09-2.29 (m, 4H), 1.91-2.08 (m, 4H), 1.68 (br. s., 2H), 1.31-1.51 (m, 9H). LCMS: m/z 515 [M+H]$^+$ @ r.t. 7.01 min.

2-{[(1S)-1-{4-[3-(4-acryloylpiperazin-1-yl)tetrahydrofuran-3-yl]phenyl}ethyl]amino}-8-(propan-2-yl)pyrido[2,3-d]pyrimidin-7(8H)-one one [X=N, U=Y=CH, =, R1a=methyl, R1b=H, A=phenyl, R2=propan-2-yl, R3=H, R4=H, R5a and R5b=tetrahydrofuran-3-yl, M=Bond, G1=N, Z1, Z2=—CH2-, m1=m2=2, E=acryloyl] cpd

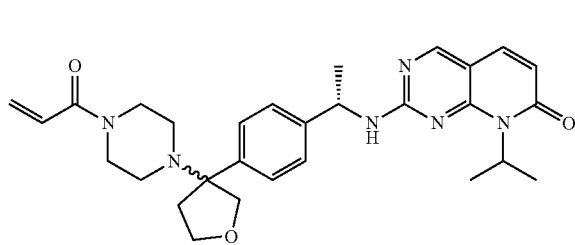 [SMILES: C=CC(=O)N1CCN(C2(c3ccc([C@H](C)Nc4ncc5ccc(=O)n(C(C)C)c5n4)cc3)CCOC2)CC1]

$^1$H NMR (500 MHz, DMSO-d$_6$) δ=8.51-8.60 (m, 1H), 8.12-8.38 (m, 1H), 7.62 (d, J=9.30 Hz, 1H), 7.20-7.35 (m, 4H), 6.60-6.72 (m, 1H), 6.15 (d, J=9.30 Hz, 1H), 5.91-6.09 (m, 1H), 5.55-5.61 (m, 1H), 5.43 (br.s, 1H), 4.93-5.05 (m, 1H), 3.99-4.10 (m, 1H), 3.85-3.98 (m, 2H), 3.56-3.65 (m, 1H), 3.39-3.53 (m, 4H), 2.09-2.42 (m, 6H), 1.47 (d, J=7.02 Hz, 3H), 1.23-1.39 (m, 6H).

LCMS: m/z 517 [M+H]$^+$ @ r.t. 7.77 min.

2-{[(1S)-1-{4-[4-(4-acryloylpiperazin-1-yl)tetrahydro-2H-pyran-4-yl]phenyl}ethyl]amino}-5-methyl-8-(propan-2-yl)pyrido[2,3-d]pyrimidin-7(8H)-one [(I) X=N, U=C-Me, Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 18

$^1$H NMR (500 MHz, DMSO-d$_6$) δ=8.62 (s, 1H), 8.31 (d, J=6.71 Hz, 1H), 7.27-7.42 (m, 2H), 7.13-7.26 (m, 2H), 6.63 (dd, J=10.52, 16.62 Hz, 1H), 6.03 (s, 1H), 5.85-5.99 (m, 1H), 5.51-5.60 (m, 1H), 5.39 (br.s, 1H), 4.99 (t, J=6.86 Hz, 1H), 3.79 (dd, J=5.57, 11.06 Hz, 2H), 3.40-3.49 (m, 2H), 3.28-3.33 (m, 4H), 2.28 (s, 3H), 2.08 (d, J=9.91 Hz, 8H), 1.47 (d J=7.0 Hz, 3H), 1.23-1.39 (m, 6H). LCMS: m/z 545 [M+H]$^+$ @ r.t. 6.81 min.

2-{[(1S)-1-{4-[4-(4-acryloylpiperazin-1-yl)tetra-hydro-2H-pyran-4-yl]phenyl}ethyl]amino}-4-amino-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=NH₂, R4=H, R5a and R5b=tetrahydro-2H-pyran-4-yl, M=Bond, G1=N, Z1, Z2=—CH2-, m1=m2=2, E=acryloyl]
Cpd 19

2-{[(1S)-1-(4-{4-[4-(chloroacetyl)piperazin-1-yl]tetrahydro-2H-pyran-4-yl}phenyl)ethyl]amino}-8-(propan-2-yl) pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=chloroacetyl] Cpd 22

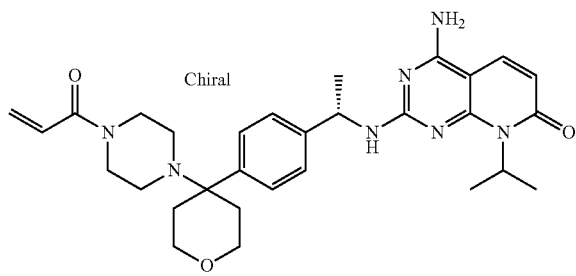 [SMILES: C=CC(=O)N1CCN(C2(c3ccc([C@H](C)Nc4nc(N)c5ccc(=O)n(C(C)C)c5n4)cc3)CCOCC2)CC1]

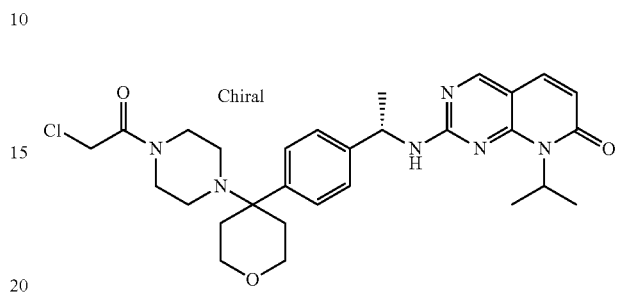

¹H NMR (500 MHz, DMSO-d₆) δ=7.83 (d, J=9.61 Hz, 1H), 7.35-7.47 (m, 1H), 7.16-7.33 (m, 4H), 6.97 (br. s., 2H), 6.64 (dd, J=10.60, 16.40 Hz, 1H), 5.83-6.06 (m, 2H), 5.56 (d, J=10.07 Hz, 1H), 4.90-5.32 (m, 2H), 3.71-3.90 (m, 2H), 3.40-3.51 (m, 4H), 3.28-3.32 (m, 2H), 1.92-2.27 (m, 8H), 1.43 (d, J=7.02 Hz, 3H), 1.21-1.35 (m, 6H). LCMS: m/z 546 [M+H]⁺ @ r.t. 5.88 min.

¹H NMR (500 MHz, DMSO-d₆) δ=8.56 (s, 1H), 8.35 (d, J=7.17 Hz, 1H), 7.62 (d, J=9.15 Hz, 1H), 7.31-7.43 (m, 2H), 7.21 (d, J=8.08 Hz, 2H), 6.15 (d, J=9.30 Hz, 1H), 5.38-5.76 (m, 1H), 4.88-5.33 (m, 1H), 4.11-4.33 (m, 2H), 3.71-3.86 (m, 2H), 3.28-3.33 (m, 6H), 1.94-2.29 (m, 8H), 1.48 (d, J=6.86 Hz, 3H), 1.23-1.41 (m, 6H). LCMS: m/z 554 [M+H]⁺ @ r.t. 6.64 min.

2-{[(1S)-1-(4-{4-[4-(2-methylacryloyl)piperazin-1-yl]tetrahydro-2H-pyran-4-yl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=2-methylacryloyl]
Cpd 21

2-{[(1S)-1-(4-{4-[4-(3-chloropropanoyl)piperazin-1-yl]tetrahydro-2H-pyran-4-yl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=3-chloropropanoyl]
Cpd 23

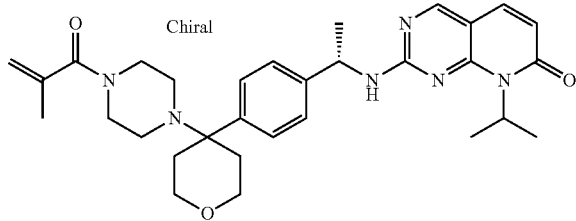 [SMILES: C=C(C)C(=O)N1CCN(C2(c3ccc([C@H](C)Nc4ncc5ccc(=O)n(C(C)C)c5n4)cc3)CCOCC2)CC1]

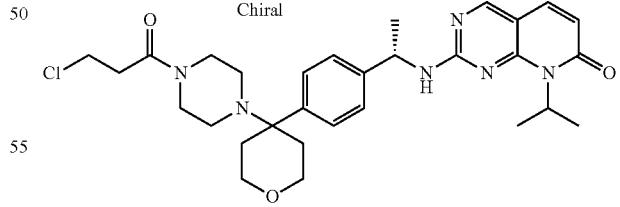

¹H NMR (500 MHz, DMSO-d₆) δ=8.56 (s, 1H), 8.36 (d, J=7.02 Hz, 1H), 7.62 (d, J=9.30 Hz, 1H), 7.33 (d, J=7.93 Hz, 2H), 7.20 (d, J=8.08 Hz, 2H), 6.15 (d, J=9.15 Hz, 1H), 5.37-5.87 (m, 1H), 5.05 (s, 1H), 4.99 (d, J=6.71 Hz, 1H), 4.73 (s, 1H), 3.71-3.84 (m, 2H), 3.28-3.33 (m, 6H), 1.94-2.33 (m, 8H), 1.62-1.78 (m, 3H), 1.48 (d, J=6.76 Hz, 3H), 1.23-1.41 (m, 6H). LCMS: m/z 545 [M+H]⁺ @ r.t. 6.93 min. HRMS (ESI) calcd for C₃₁H₄₁N₆O₃ [M+H]⁺ 545.3078 found 545.306.

¹H NMR (500 MHz, DMSO-d₆) δ=8.57 (br. s, 1H), 8.43 (br. s, 1H), 7.62 (d, J=9.15 Hz, 1H), 7.45-7.57 (m, 2H), 7.21-7.33 (m, 2H), 6.17 (d, J=9.15 Hz, 1H), 5.42 (br. s, 1H), 5.05 (br. s, 1H), 4.33-4.43 (m, 2H), 3.73-3.99 (m, 2H), 3.55-3.70 (m, 4H), 3.28-3.32 (m, 2H), 2.65-2.96 (m, 2H), 1.99-2.29 (m, 8H), 1.50 (br. s, 3H), 1.21-1.41 (m, 6H). LCMS: m/z 567 [M+H]⁺ @ r.t. 6.93 min. HRMS (ESI) calcd for C₃₀H₄₀ClN₆O₃[M+H]⁺ 567.2845 found 567.2852.

2-{[(1S)-1-{4-[1-(4-acryloylpiperazin-1-yl)cyclohexyl]phenyl}ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=cyclohexyl, M=Bond, G1=N, Z1, Z2=—CH2-, m1=m2=2, E=acryloyl] Cpd 20

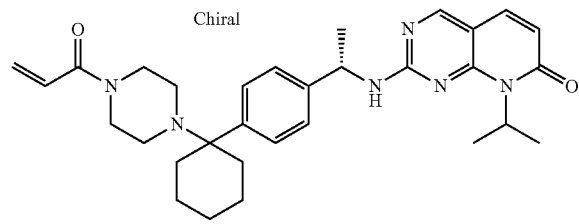 [SMILES: C=CC(=O)N1CCN(C2(c3ccc([C@H](C)Nc4ncc5ccc(=O)n(C(C)C)c5n4)cc3)CCCCC2)CC1]

$^1$H NMR (500 MHz, DMSO-d$_6$) δ=8.56 (s, 1H), 8.33 (d, J=7.17 Hz, 1H), 7.62 (d, J=9.15 Hz, 1H), 7.18-7.32 (m, 4H), 6.63 (dd, J=10.45, 16.55 Hz, 1H), 6.15 (d, J=9.30 Hz, 1H), 5.96 (dd, J=1.83, 16.78 Hz, 1H), 5.51-5.58 (m, 1H), 5.25-5.40 (m, 1H), 4.95-5.01 (m, 1H), 3.39-3.46 (m, 2H), 1.85-2.25 (m, 10H), 1.58-168 (m, 2H), 1.47 (d, J=7.02 Hz, 3H), 1.20-1.44 (m, 10H).

LCMS: m/z 529 [M+H]$^+$ @ r.t. 7.28 min. HRMS (ESI) calcd for C$_{31}$H$_{41}$N$_6$O$_3$ [M+H]$^+$ 529.3286 found 529.3282.

7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrimido[4,5-d][1,3]oxazin-2-one [(I) X=N, U=CH$_2$, Y=O, —, R1a=methyl, R1b=H, A=phenyl, R2=ethyl, R3=H, R4=H, R5a and R5b=tetrahydro-2H-pyran-4-yl, M=Bond, G1=N, Z1, Z2=—CH2-, m1=m2=2, E=acryloyl] Cpd 24

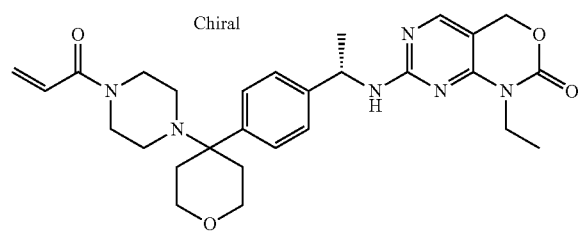 [SMILES: C=CC(=O)N1CCN(C2(c3ccc([C@H](C)Nc4ncc5c(n4)N(CC)C(=O)OC5)cc3)CCOCC2)CC1]

$^1$H NMR (500 MHz, DMSO-d$_6$) δ=7.99 (br. s., 1H), 7.86 (br. s., 1H), 7.32 (d, J=6.86 Hz, 2H), 7.19 (d, J=8.39 Hz, 2H), 6.66 (dd, J=10.45, 16.70 Hz, 1H), 5.99 (dd, J=2.29, 16.62 Hz, 1H), 5.58 (dd, J=2.29, 10.37 Hz, 1H), 5.09 (s, 2H), 4.92 (br.s, 1H), 3.80 (d, J=7.63 Hz, 3H), 3.36-3.48 (m, 6H), 1.99-2.22 (m, 8H), 1.43 (d, J=7.02 Hz, 3H), 0.77-0.88 (m, 3H).

LCMS: m/z 521 [M+H]$^+$ @ r.t. 4.06 min. HRMS (ESI) calcd for C$_{28}$H$_{37}$N$_6$O$_4$ [M+H]$^+$ 521.2871 found 521.2867.

7-{[(1S)-1-{4-[4-(4-acryloylpiperazin-1-yl)tetrahydro-2H-pyran-4-yl]phenyl}ethyl]amino}-1-(propan-2-yl)-1,4-dihydro-2H-pyrido[4,3-d][1,3]oxazin-2-one [(I) X=CH, U=CH$_2$, Y=O, —, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 25

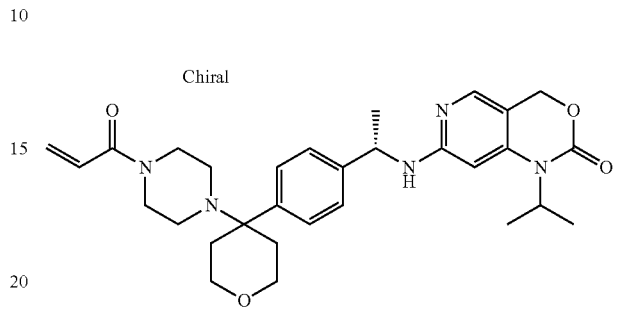

LCMS: m/z 534 [M+H]$^+$ @ r.t. 6.65 min.

7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrido[4,3-d][1,3]oxazin-2-one [(I) X=CH, U=CH$_2$, Y=O, —, R1a=methyl, R1b=H, A=phenyl, R2=ethyl, R3=H, R4=H, R5a and R5b=tetrahydro-2H-pyran-4-yl, M=Bond, G1=N, Z1, Z2=—CH2-, m1=m2=2, E=acryloyl] Cpd 44

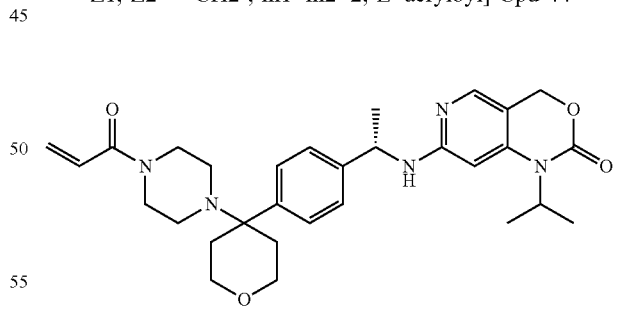

$^1$H NMR (500 MHz, DMSO-d$_6$) δ=7.72 (s, 1H), 7.34 (d, J=8.39 Hz, 2H), 7.21 (d, J=8.24 Hz, 2H), 7.05 (d, J=7.47 Hz, 1H), 6.67 (dd, J=10.45, 16.70 Hz, 1H), 6.03-6.07 (m, 1H), 6.00 (dd, J=2.44, 16.62 Hz, 1H), 5.57-5.60 (m, 1H), 5.06 (s, 2H), 4.98 (br. s., 1H), 3.76-3.85 (m, 2H), 3.56-3.73 (m, 2H), 3.41-3.50 (m, 6H), 2.00-2.22 (m, 8H), 1.41 (d, J=6.86 Hz, 3H), 1.23 (br.s, 3H).

LCMS: m/z 520 [M+H]$^+$ @ r.t. 2.49 min. HRMS (ESI) calcd for C$_{29}$H$_{38}$N$_5$O$_4$ [M+H]$^+$ 520.2919 found 520.2924.

2-{[(1S)-1-{4-[1-(4-acryloylpiperazin-1-yl)-4,4-difluorocyclohexyl]phenyl}ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=4,4-difluorocyclohexyl, M=Bond, G1=N, Z1, Z2=—CH2-, m1=m2=2, E=acryloyl] Cpd 26

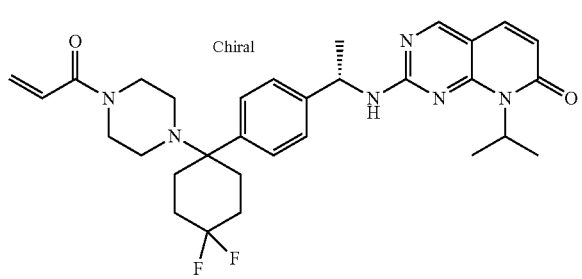 [SMILES: C=CC(=O)N1CCN(C2(c3ccc([C@H](C)Nc4ncc5ccc(=O)n(C(C)C)c5n4)cc3)CCC(F)(F)CC2)CC1]

$^1$H NMR (500 MHz, DMSO-$d_6$) δ=8.50-8.58 (m, 1H), 8.34 (d, J=6.86 Hz, 1H), 7.62 (d, J=9.15 Hz, 1H), 7.23-7.40 (m, 4H), 6.64 (dd, J=10.52, 16.62 Hz, 1H), 6.15 (d, J=9.15 Hz, 1H), 5.96 (dd, J=1.83, 16.47 Hz, 1H), 5.52-5.61 (m, 1H), 5.40 (br. s, 1H), 4.98 (t, J=6.63 Hz, 1H), 3.39-3.50 (m, 4H), 2.14 (br. s, 8H), 1.78 (br. s, 4H), 1.47 (d, J=7.02 Hz, 3H), 0.9-1.42 (m, 6H).

LCMS: m/z 565 [M+H]$^+$ @ r.t. 8.60 min. HRMS (ESI) calcd for $C_{31}H_{37}F_2N_6O_2$[M+H]$^+$ 565.3097 found 565.3086.

7-{[(1S)-1-{4-[1-(4-acryloylpiperazin-1-yl)-4,4-difluorocyclohexyl]phenyl}ethyl]amino}-1-(propan-2-yl)-1,6-naphthyridin-2(1H)-one [(I) X=CH, U=Y=CH, =, R1a=methyl, R1b=H, A=phenyl, R2=propan-2-yl, R3=H, R4=H, R5a and R5b=4,4-difluorocyclohexyl, M=Bond, G1=N, Z1, Z2=—CH2-, m1=m2=2, E=acryloyl] Cpd 47

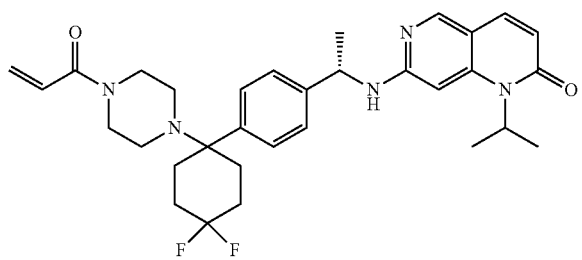 [SMILES: C=CC(=O)N1CCN(C2(c3ccc([C@H](C)Nc4cc5c(ccc(=O)n5C(C)C)cn4)cc3)CCC(F)(F)CC2)CC1]

$^1$H NMR (500 MHz, DMSO-$d_6$) δ=8.28 (s, 1H), 7.60 (d, J=9.30 Hz, 1H), 7.43 (d, J=6.71 Hz, 1H), 7.37 (d, J=8.39 Hz, 2H), 7.37 (d, J=8.39 Hz, 2H), 6.66 (dd, J=10.45, 16.70 Hz, 1H), 6.15-6.52 (br. s, 1H), 6.10 (d, J=9.30 Hz, 1H), 5.98 (dd, J=2.36, 16.70 Hz, 1H), 5.60 (dd, J=2.3, 10.50 Hz, 1H), 4.57-5.44 (m, 2H), 3.40-3.49 (m, 2H), 3.29-3.32 (m, 2H), 2.52-2.59 (m, 4H), 2.16 (br. s., 4H), 1.78 (br. s., 4H), 1.48 (d, J=6.71 Hz, 3H), 1.34-1.41 (m, 3H), 1.03 (d, J=6.10 Hz, 3H). LCMS: m/z 564 [M+H]$^+$ @ r.t. 6.62 min. HRMS (ESI) calcd for $C_{32}H_{40}F_2N_5O_2$ [M+H]$^+$ 564.3145 found 564.3157.

7-{[(1R)-1-{4-[1-(4-acryloylpiperazin-1-yl)-4,4-difluorocyclohexyl]phenyl}ethyl]amino}-1-(propan-2-yl)-1,6-naphthyridin-2(1H)-one [(I) X=CH, U=Y=CH, =, R1a=HR1b=, methyl, A=phenyl, R2=propan-2-yl, R3=H, R4=H, R5a and R5b=4,4-difluorocyclohexyl, M=Bond, G1=N, Z1, Z2=—CH2-, m1=m2=2, E=acryloyl] Cpd 63

LCMS: m/z 564 [M+H]$^+$ @ r.t. 6.62 min. HRMS (ESI) calcd for $C_{32}H_{40}F_2N_5O_2$[M+H]$^+$ 564.3145 found 564.3150.

7-{[(1S)-1-{4-[4,4-difluoro-1-(4-propanoylpiperazin-1-yl)cyclohexyl]phenyl}ethyl]amino}-1-(propan-2-yl)-1,6-naphthyridin-2(1H)-one [(I) X=CH, U=Y=CH, =, R1a=methyl, R1b=H, A=phenyl, R2=propan-2-yl, R3=H, R4=H, R5a and R5b=4,4-difluorocyclohexyl, M=Bond, G1=N, Z1, Z2=—CH2-, m1=m2=2, E=propanoyl] Cpd 67

LCMS: m/z 566 [M+H]$^+$ @ r.t. 6.67 min. HRMS (ESI) calcd for $C_{32}H_{42}F_2N_5O_2$[M+H]$^+$ 566.6970 found 566.6968.

2-{[(1S)-1-{5-[4-(4-acryloylpiperazin-1-yl)tetrahydro-2H-pyran-4-yl]pyridin-2-yl}ethyl]amino}-8-(propan-2-yl)pyrido[2,3-d]pyrimidin-7(8H)-one [(I) X=N, U=Y=CH, =, R1a=methyl, R1b=H, A=pyridine-2-yl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 27

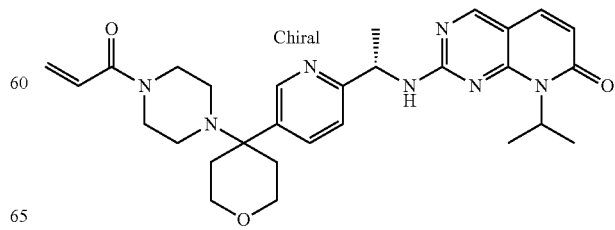

¹H NMR (500 MHz, DMSO-d₆) δ=8.57-8.61 (m, 1H), 8.43-8.50 (m, 1H), 8.31-8.37 (m, 1H), 7.58-7.68 (m, 2H), 7.26-7.32 (m, 1H), 6.61-6.69 (m, 1H), 6.10-6.22 (m, 1H), 5.94-6.02 (m, 1H), 5.54-5.60 (m, 1H), 5.34 (br s, 1H), 4.97-5.07 (m, 1H), 3.74-3.87 (m, 2H), 3.39-3.53 (m, 4H), 3.26-3.32 (m, 2H), 1.99-2.26 (m, 8H), 1.46-1.56 (m, 3H), 1.01-1.05 (m, 6H).

LCMS: m/z 532 [M+H]⁺ @ r.t. 5.54 min. HRMS (ESI) calcd for C₂₉H₃₈N₇O₂ [M+H]⁺ 532.3031 found 532.3035.

2-{[(1S)-1-(4-{4-[(1-acryloylazetidin-3-yl)(methyl)amino]tetrahydro-2H-pyran-4-yl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=tetrahydro-2H-pyran-4-yl, M=NR6, G1=CH, Z1, Z2=—CH2-, m1=m2=1, R6=methyl, E=acryloyl] Cpd 28

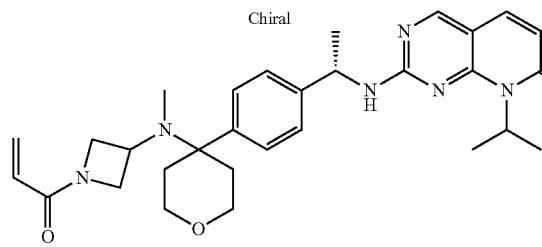

¹H NMR (500 MHz, DMSO-d₆) δ=8.57 (d, J=3.66 Hz, 1H), 8.13-8.44 (m, 1H), 7.64 (dd, J=3.97, 9.30 Hz, 1H), 7.25-7.43 (m, 4H), 6.16 (d, J=9.46 Hz, 1H), 5.91-6.02 (m, 2H), 5.43-5.58 (m, 1H), 5.00-5.09 (m, 1H), 4.02-4.12 (m, 2H), 3.76-3.82 (m, 1H), 3.64-3.75 (m, 4H), 3.38-3.63 (m, 2H), 3.19-3.31 (m, 2H), 1.95-2.21 (m, 6H), 1.50 (d, J=6.67 Hz, 3H), 1.15-1.44 (m, 3H), 0.91 (d, J=7.51 Hz, 3H).

LCMS: m/z 531 [M+H]⁺ @ r.t. 7.25 min. HRMS (ESI) calcd for C₃₀H₃₉N₆O₃[M+H]⁺ 531.3078 found 531.3077.

7-{[(1S)-1-(4-{4-[(1-acryloylazetidin-3-yl)(methyl)amino]tetrahydro-2H-pyran-4-yl}phenyl)ethyl]amino}-1-(propan-2-yl)-1,6-naphthyridin-2(1H)-one [(I) X=CH, U=Y=CH, =, R1a=methyl, R1b=H, A=phenyl, R2=propan-2-yl, R3=H, R4=H, R5a and R5b=tetrahydro-2H-pyran-4-yl, M=NR6, G1=CH, Z1, Z2=—CH2-, m1=m2=1, R6=methyl, E=acryloyl] Cpd 48

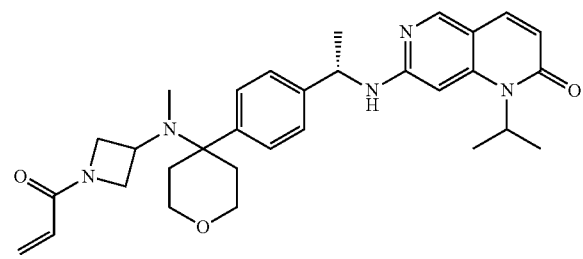 [SMILES: C=CC(=O)N1CC(N(C)C2(c3ccc([C@H](C)Nc4cc5c(ccc(=O)n5C(C)C)cn4)cc3)CCOCC2)C1]

¹H NMR (500 MHz, DMSO-d₆) δ=8.29 (s, 1H), 7.61 (dd, J=2.67, 9.23 Hz, 1H), 7.25-7.52 (m, 5H), 5.86-6.13 (m, 3H), 5.44-5.60 (m, 1H), 5.00 (br. s, 1H), 4.05-4.15 (m, 1H), 3.84 (dd, J=7.93 and 8.39 Hz, 1H), 3.65-3.76 (m, 4H), 3.51-3.57 (m, 1H), 3.39-3.44 (m, 2H), 3.24-3.32 (m, 2H), 2.08 (s, 3H), 1.99-2.05 (m, 4H), 1.48 (d, J=6.86 Hz, 3H), 1.22-1.41 (m, 6H). LCMS: m/z 530 [M+H]⁺ @ r.t. 5.62 min. HRMS (ESI) calcd for C₃₁H₄₀N₅O₃ [M+H]⁺ 530.3126 found 530.3127.

2-{[(1S)-1-(4-{1-[(1-acryloylazetidin-3-yl)(methyl)amino]-4,4-difluorocyclohexyl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=4,4-difluorocyclohexyl, M=NR6, G1=CH, Z1, Z2=—CH2-, m1=m2=1, R6=methyl, E=acryloyl] Cpd 50

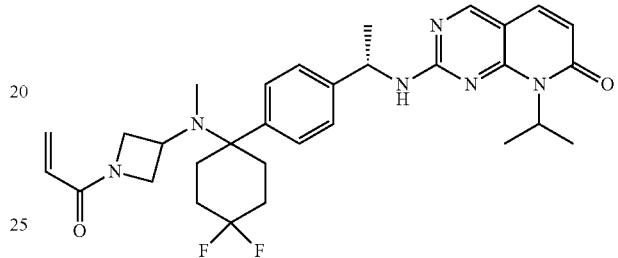

¹H NMR (500 MHz, DMSO-d₆) δ=8.57 (d, J=3.36 Hz, 1H), 8.33-8.44 (m, 1H), 8.20 (br. s., 1H), 7.63 (d, J=9.15 Hz, 1H), 7.27-7.43 (m, 4H), 6.16 (d, J=9.30 Hz, 1H), 6.01-6.10 (m, 1H), 5.97 (d, J=19.37 Hz, 1H), 5.41-5.59 (m, 2H), 5.04 (br. s., 1H), 4.16 (br. s., 1H), 3.49-3.96 (m, 3H), 3.37-3.49 (m, 1H), 2.07-2.42 (m, 4H), 1.95 (d, J=8.69 Hz, 4H), 1.70 (br. s., 2H), 1.49 (d, J=6.71 Hz, 3H), 1.07-1.43 (m, 3H), 1.03 (d, J=6.10 Hz, 3H).

LCMS: m/z 565 [M+H]⁺ @ r.t. 9.57 min. HRMS (ESI) calcd for C₃₁H₃₉F₂N₆O₂[M+H]⁺ 565.3097 found 565.3077.

7-{[(1S)-1-(4-{1-[(1-acryloylazetidin-3-yl)(methyl)amino]-4,4-difluorocyclohexyl}phenyl)ethyl]amino}-1-(propan-2-yl)-1,6-naphthyridin-2(1H)-one [(I) X=CH, U=Y=CH, =, R1a=methyl, R1b=H, A=phenyl, R2=propan-2-yl, R3=H, R4=H, R5a and R5b=4,4-difluorocyclohexyl, M=NR6, G1=CH, Z1, Z2=—CH2-, m1=m2=1, R6=methyl, E=acryloyl] Cpd 61

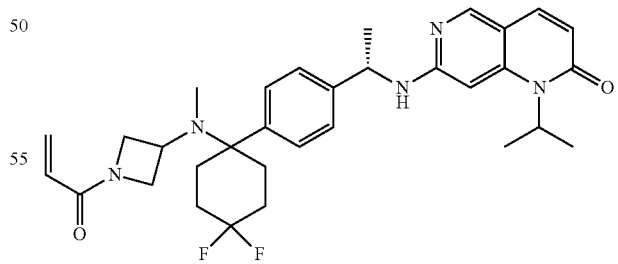

1H NMR (500 MHz, DMSO-d6) δ=8.29 (s, 1H), 7.61 (dd, J=1.98, 9.30 Hz, 1H), 7.41-7.51 (m, 1H), 7.28-7.41 (m, 4H), 6.18-6.53 (m, 1H), 6.04-6.16 (m, 2H), 5.89-6.03 (m, 2H), 5.45-5.64 (m, 1H), 4.75-5.20 (m, 1H), 4.09-4.25 (m, 1H), 3.87-3.93 (m, 1H), 3.76-3.84 (m, 1H), 3.57-3.52 (m, 2H), 2.29-2.43 (m, 2H), 2.12 (s, 3H), 1.84-2.05 (m, 4H), 1.73 (br. s., 2H), 1.13-1.57 (m, 9H).

LCMS: m/z 564 [M+H]+ @ r.t. 8.12 min. HRMS (ESI) calcd for $C_{32}H_{40}F_2N_6O_2$ [M+H]+ 564.3145 found 564.3140.

N-(1-acryloylazetidin-3-yl)-N-(4,4-difluoro-1-{4-[(1S)-1-{[2-oxo-1-(propan-2-yl)-1,2-dihydro-1,6-naphthyridin-7-yl]amino}ethyl]phenyl}cyclohexyl) acetamide [(I) X=CH, U=Y=CH, =, R1a=methyl, R1b=H, A=phenyl, R2=propan-2-yl, R3=H, R4=H, R5a and R5b=4,4-difluorocyclohexyl, M=NR6, G1=CH, Z1, Z2=—CH2-, m1=m2=1, R6=Acetyl, E=acryloyl] Cpd 62

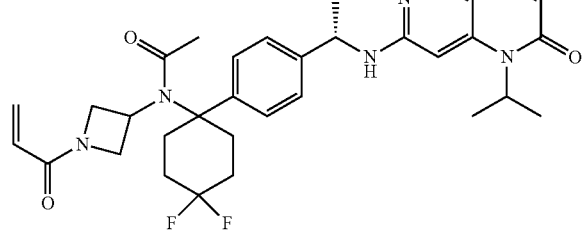

$^1$H NMR (500 MHz, DMSO-d$_6$) δ=8.26 (s, 1H), 7.60 (d, J=9.15 Hz, 1H), 7.40-7.47 (m, 1H), 7.36 (d, J=8.24 Hz, 2H), 7.24 (d, J=8.39 Hz, 2H), 6.33-6.53 (m, 1H), 6.20-6.31 (m, 1H), 5.94-6.14 (m, 2H), 5.60-5.68 (m, 1H), 4.86-5.21 (m, 1H), 4.57-4.73 (m, J=5.26, 9.38 Hz, 1H), 4.50 (t, J=6.18 Hz, 1H), 4.31-4.44 (m, 1H), 4.20 (t, J=7.55 Hz, 1H), 3.97-4.15 (m, 1H), 2.56-2.68 (m, 2H), 1.93-2.11 (m, 7H), 1.65-1.86 (m, 2H), 1.09-1.59 (m, 9H). LCMS: m/z 592 [M+H]+ @ r.t. 8.79 min. HRMS (ESI) calcd for $C_{33}H_{40}F_2N_6O_3$[M+H]+ 592.3094 found 592.3092.

2-{[(1S)-1-(4-{4-[(1-acryloylazetidin-3-yl)oxy]tetrahydro-2H-pyran-4-yl}phenyl)ethyl]amino}-8-(propan-2-yl) pyrido[2,3-d]pyrimidin-7(8H)-one [(I) X=N, U=Y=CH, =, R1a=methyl, R1b=H, A=pyridine-2-yl, R2=propan-2-yl, R3=H, R4=H, R5a and R5b=tetrahydro-2H-pyran-4-yl, M=O, G1=CH, Z1, Z2=—CH2-, m1=m2=1, E=acryloyl] Cpd 29

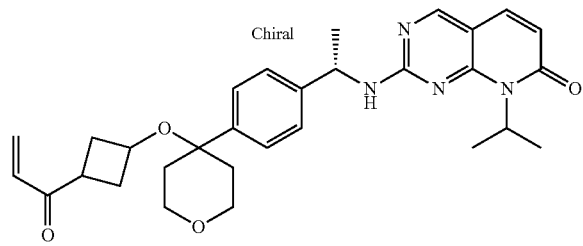 [SMILES: C=CC(=O)C1CC(OC2(c3ccc([C@H](C)Nc4ncc5ccc(=O)n(C(C)C)c5n4)cc3)CCOCC2)C1]

LCMS:LCMS: m/z 518 [M+H]+ @ r.t. 6.28 min.

2-[(1-{4-[4-(4-acryloylpiperazin-1-yl)tetrahydro-2H-pyran-4-yl]phenyl}cyclopropyl)amino]-8-(propan-2-yl) pyrido[2,3-d]pyrimidin-7(8H)-one [(I) X=N, U=Y=CH, R1a and R1b=—CH$_2$—CH$_2$—, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 30

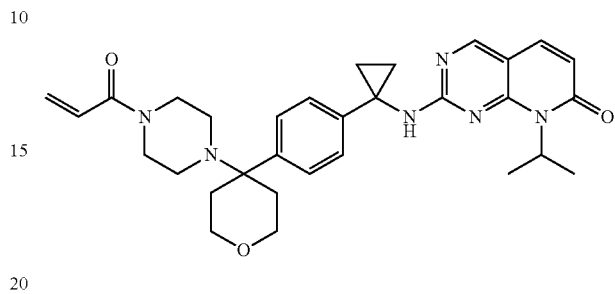

$^1$H NMR (500 MHz, DMSO-d$_6$) δ=8.61 (s, 1H), 8.59 (s, 1H), 7.65 (d, J=9.30 Hz, 1H), 7.03-7.18 (m, 4H), 6.64 (dd, J=10.37, 16.62 Hz, 1H), 6.20 (d, J=9.30 Hz, 1H), 5.99 (dd, J=2.29, 16.62 Hz, 1H), 5.53-5.59 (m, 1H), 5.27 (br. s., 1H), 3.77 (dd, J=3.43, 7.40 Hz, 2H), 3.43 (d, J=3.05 Hz, 4H), 3.19-3.31 (m, 2H), 1.96-2.23 (m, 8H), 1.01-1.52 (m, 10H). LCMS: m/z 543 [M+H]+ @ (r.t. 6.31 min. HRMS (ESI) calcd for $C_{31}H_{39}N_6O_3$ [M+H]+ 543.3078 found 543.3087.

2-({4-[4-(4-acryloylpiperazin-1-yl)tetrahydro-2H-pyran-4-yl]benzyl}amino)-8-(propan-2-yl)pyrido[2,3-d]pyrimidin-7(8H)-one [(I) X=N, U=Y=CH, =, R1a=R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=acryloyl] Cpd 31

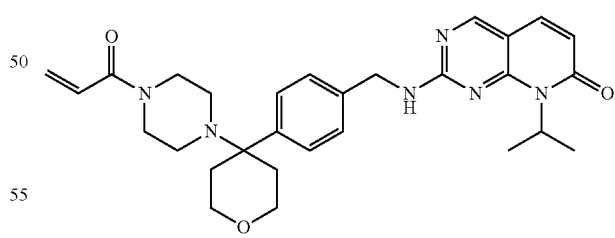

$^1$H NMR (500 MHz, DMSO-d$_6$) δ=8.57 (s, 1H), 8.38 (t, J=5.95 Hz, 1H), 7.64 (d, J=9.30 Hz, 1H), 7.18-7.33 (m, 4H), 6.65 (dd, J=10.45, 16.85 Hz, 1H), 6.18 (d, J=9.15 Hz, 1H), 5.98 (d, J=16.62 Hz, 1H), 5.57 (d, J=10.68 Hz, 1H), 5.39-5.53 (br. s 1H), 4.56-4.60 (m, 1H), 4.53 (d, J=5.64 Hz, 1H), 3.76-3.83 (m, 2H), 3.40-3.48 (m, 4H), 3.28-3.32 (m, 2H), 2.03-2.18 (m, 8H), 1.20-1.28 (m, 3H), 1.03 (d, J=6.10 Hz, 3H). LCMS: m/z 517 [M+H]+ @ r.t. 5.54 min. HRMS (ESI) calcd for $C_{29}H_{37}N_6O_3$ [M+H]+ 517.2922 found 517.2921.

2-{[(1S)-1-{4-[4-(4-acryloylpiperazin-1-yl)-1-methylpiperidin-4-yl]phenyl}ethyl]amino}-8-(propan-2-yl) pyrido [2,3-d]pyrimidin-7(8H)-one [(I) X=N, U=Y=CH, =, R1a=methyl, R1b=H, A=phenyl, R2=propan-2-yl, R3=H, R4=H, R5a and R5b=1-methylpiperidin-4-yl, M=Bond, G1=N, Z1, Z2=—CH2-, m1=m2=2, E=acryloyl] Cpd 32

2-{[(1S)-1-{4-[(2S)-2-(4-acryloylpiperazin-1-yl) butan-2-yl]phenyl}ethyl]amino}-8-(propan-2-yl) pyrido[2,3-d]pyrimidin-7(8H)-one [(I) X=N, U=Y=CH, =, R1a=methyl, R1b=H, A=phenyl, R2=propan-2-yl, R3=H, R4=H, R5a=ethyl, R5b=methyl, M=Bond, G1=N, Z1, Z2=—CH2-, m1=m2=2, E=acryloyl] Cpd 34

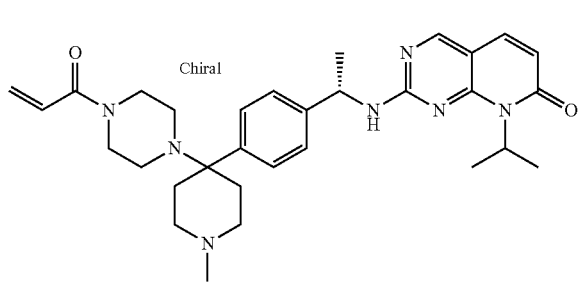 [SMILES: C=CC(=O)N1CCN(C2(c3ccc([C@H](C)Nc4ncc5ccc(=O)n(C(C)C)c5n4)cc3)CCN(C)CC2)CC1]

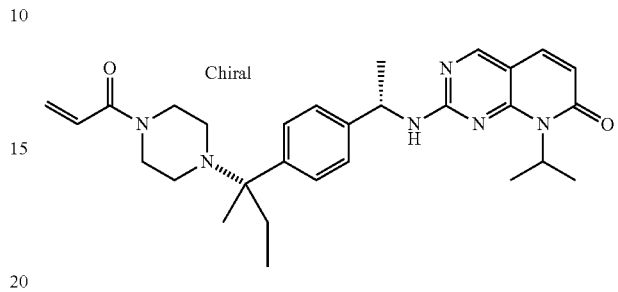

¹H NMR (500 MHz, DMSO-d₆) δ=8.56 (s, 1H), 8.34 (d, J=7.02 Hz, 1H), 7.62 (d, J=9.30 Hz, 1H), 7.30 (d, J=7.93 Hz, 2H), 7.19 (d, J=7.93 Hz, 2H), 6.63 (dd, J=10.45, 16.85 Hz, 1H), 6.15 (d, J=9.30 Hz, 1H), 5.96 (d, J=16.62 Hz, 1H), 5.55 (d, J=10.68 Hz, 1H), 5.24-5.45 (m, 1H), 4.99 (q, J=7.47 Hz, 1H), 3.38-3.48 (m, 4H), 3.26-3.32 (m, 4H), 1.96-2.22 (m, 11H), 1.48 (d, J=7.02 Hz, 3H), 1.23-1.44 (m, 3H), 1.03 (d, J=6.10 Hz, 3H). LCMS: m/z 544 [M+H]⁺@ r.t. 6.18 min. HRMS (ESI) calcd for C₃₁H₄₁N₇O₂ [M+H]⁺ 544.3395 found 544.3405.

LCMS:LCMS: m/z 503 [M+H]⁺ @ r.t. 7.02 min.

2-{[(1S)-1-{4-[2-(4-acryloylpiperazin-1-yl)butan-2-yl]phenyl}ethyl]amino}-8-(propan-2-yl)pyrido[2,3-d]pyrimidin-7(8H)-one one [(I) X=N, U=Y=CH, =, R1a=methyl, R1b=H, A=phenyl, R2=propan-2-yl, R3=H, R4=H, R5a=ethyl, R5b=methyl, M=Bond, G1=N, Z1, Z2=—CH2-, m1=m2=2, E=acryloyl] Cpd 46

2-{[(1S)-1-{4-[(2R)-2-(4-acryloylpiperazin-1-yl) butan-2-yl]phenyl}ethyl]amino}-8-(propan-2-yl) pyrido[2,3-d]pyrimidin-7(8H)-one [(I) X=N, U=Y=CH, =, R1a=methyl, R1b=H, A=phenyl, R2=propan-2-yl, R3=H, R4=H, R5a=methyl, R5b=ethyl, M=Bond, G1=N, Z1, Z2=—CH2-, m1=m2=2, E=acryloyl] Cpd 33

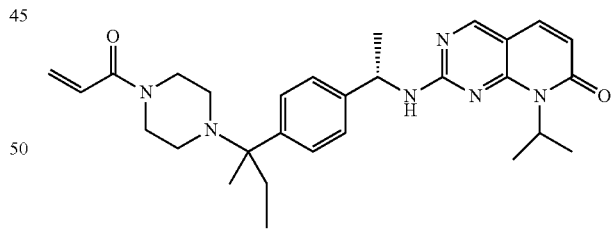

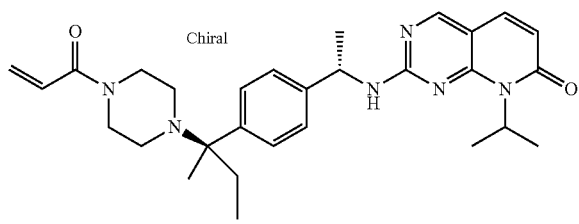 [SMILES: C=CC(=O)N1CCN([C@](C)(CC)c2ccc([C@H](C)Nc3ncc4ccc(=O)n(C(C)C)c4n3)cc2)CC1]

¹H NMR (500 MHz, DMSO-d₆) δ=8.56 (s, 1H), 8.35 (t, J=7.47 Hz, 1H), 7.62 (d, J=9.30 Hz, 2H), 7.36 (d, J=7.02 Hz, 2H), 7.30 (d, J=8.02 Hz, 1H), 6.73 (ddd, J=3.81, 10.45, 16.70 Hz, 1H), 6.16 (d, J=9.00 Hz, 1H), 6.07 (dd, J=2.06, 16.70 Hz, 1H), 5.63 (d, J=10.52 Hz, 1H), 5.25-5.55 (br. s, 1H), 5.00 (d, J=6.56 Hz, 1H), 3.49 (d, J=7.47 Hz, 2H), 3.30-3.33 (m, 2H), 2.17-2.47 (m, 4H), 1.64-1.75 (m, 1H), 1.53-1.58 (m, 1H), 1.48 (d, J=6.86 Hz, 3H), 1.15-1.40 (m, 6H), 1.10 (s, 3H), 0.45-0.52 (m, 3H). LCMS: m/z 503 [M+H]⁺ @ r.t. 7.02 min. HRMS (ESI) calcd for C₂₉H₃₉N₆O₂ [M+H]⁺ 503.3129 found 503.3109.

LCMS:LCMS: m/z 503 [M+H]⁺ @ r.t. 7.02 min.

2-{[(1S)-1-{4-[4-(4-acryloylpiperazin-1-yl)tetra-hydro-2H-pyran-4-yl]phenyl}ethyl]amino}-8-(pentan-3-yl) pyrido [2,3-d]pyrimidin-7(8H)-one [(I) X=N, U=Y=CH, =, R1a=methyl, R1b=H, A=phenyl, R2=pentan-3-yl, R3=R4=H, R5a and R5b=tetrahydro-2H-pyran-4-yl, M=Bond, G1=N, Z1, Z2=—CH2-, m1=m2=2, E=acryloyl] Cpd 35

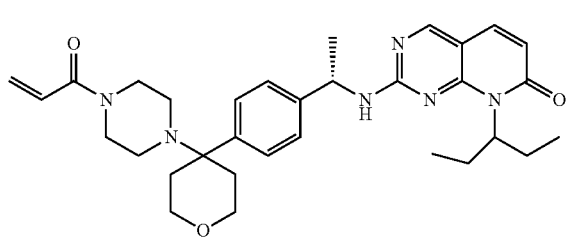 [SMILES: C=CC(=O)N1CCN(C2(c3ccc([C@H](C)Nc4ncc5ccc(=O)n(C(CC)CC)c5n4)cc3)CCOCC2)CC1]

¹H NMR (500 MHz, DMSO-d₆) δ=8.6 (s, 1H), 8.25-8.45 (m, 1H), 7.65 (d, J=9.30 Hz, 1H), 7.26-7.40 (m, 2H), 7.20 (d, J=8.24 Hz, 2H), 6.55-6.70 (m, 1H), 6.08-6.23 (m, 1H), 5.96 (d, J=16.47 Hz, 1H), 5.56 (d, J=10.52 Hz, 1H), 4.87-5.31 (m, 2H), 3.72-3.85 (m, 2H), 3.45 (br. s., 4H), 3.29-3.32 (m, 2H), 1.69-2.25 (m, 12H), 1.46 (d, J=7.02 Hz, 3H), 0.63-0.78 (m, 3H), 0.12 (t, J=7.32 Hz, 3H).

LCMS: m/z 559 [M+H]⁺ @ r.t. 7.02 min. HRMS (ESI) calcd for $C_{32}H_{43}N_6O_3$ [M+H]⁺ 559.3391 found 559.3392.

2-{[(1S)-1-{4-[4-(4-acryloylpiperazin-1-yl)tetra-hydro-2H-pyran-4-yl]phenyl}ethyl]amino}-4-(methylamino)-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=NHMe, R4=H, R5a=ethyl, R5b=methyl, M=Bond, G1=N, Z1, Z2=—CH2-, m1=m2=2, E=acryloyl] Cpd 37

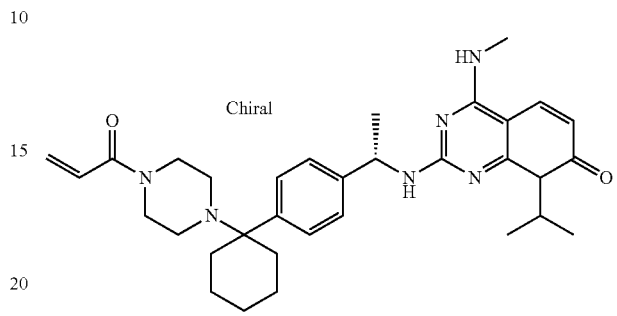

¹H NMR (500 MHz, DMSO-d₆) δ=7.70-7.80 (m, 1H), 7.50-7.62 (m, 2H), 7.27-7.42 (m, 2H), 7.19 (d, J=7.78 Hz, 2H), 6.64 (dd, J=10.52, 16.62 Hz, 1H), 5.86-6.04 (m, 2H), 5.52-5.65 (m, 2H), 4.94-5.20 (m, 1H), 3.79 (d, J=5.64 Hz, 2H), 3.40-3.47 (m, 4H), 3.28-3.32 (m, 4H), 2.89 (d, J=3.97 Hz, 3H), 2.11 (br. s., 6H), 1.21-1.63 (m, 9H).

LCMS: m/z 560 [M+H]⁺ @ r.t. 6.98 min. HRMS (ESI) calcd for $C_{31}H_{42}N_7O_3$ [M+H]⁺ 560.3344 found 560.3359.

2-{[(1S)-1-{4-[4-(4-acryloylpiperazin-1-yl)tetra-hydro-2H-pyran-4-yl]phenyl}ethyl]amino}-4-(dimethylamino)-8-(propan-2-yl)pyrido[2,3-d]pyrimidin-7(8H)-one [(I) X=N, U=Y=CH, =, R1a=methyl, R1b=H, A=phenyl, R2=propan-2-yl R3=N(Me)₂, R4=H, R5a and R5b=tetrahydro-2H-pyran-4-yl, M=Bond, G1=N, Z1, Z2=—CH2-, m1=m2=2, E=acryloyl] Cpd 36

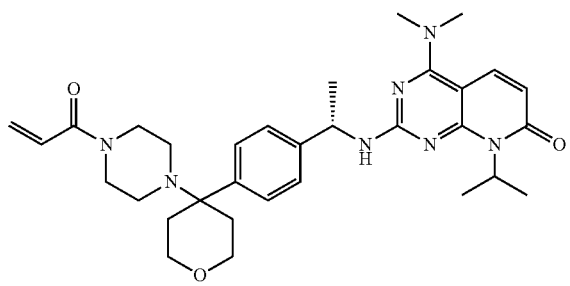

¹H NMR (500 MHz, DMSO-d₆) δ=7.67-7.74 (m, 1H), 7.64 (d, J=7.17 Hz, 1H), 7.28-7.37 (m, 2H), 7.19 (d, J=8.39 Hz, 2H), 6.59-6.74 (m, 1H), 5.84-6.04 (m, 2H), 5.53-5.61 (m, 1H), 5.47 (br.s, 1H), 4.93-5.11 (m, 1H), 3.72-3.85 (m, 2H), 3.44 (dd, J=5.11, 6.94 Hz, 4H), 3.29-3.32 (m, 2H), 2.94-3.11 (m, 6H), 2.00-2.24 (m, 8H), 1.20-1.50 (m, 9H). LCMS: m/z 574 [M+H]⁺ @ r.t. 7.57 min. HRMS (ESI) calcd for $C_{32}H_{44}N_7O_3$ [M+H]⁺ 574.35 found 574.3489.

2-{[(1S)-1-{4-[4-(4-acryloylpiperazin-1-yl)tetra-hydro-2H-pyran-4-yl]phenyl}ethyl]amino}-7-oxo-8-(propan-2-yl)-7,8-dihydropyrido[2,3-d]pyrimidine-4-carbonitrile [(I) X=N, U=Y=CH, =, R1a=methyl, R1b=H, A=phenyl, R2=propan-2-yl, R3=CN, R4=H R5a and R5b=tetrahydro-2H-pyran-4-yl, M=Bond, G1=N, Z1, Z2=—CH2-, m1=m2=2, E=acryloyl] Cpd 38

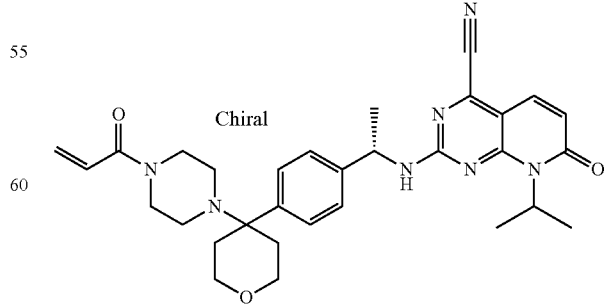

LCMS: m/z 556 [M+H]⁺ @ r.t. 7.25 min.

2-{[(1S)-1-(4-{4-[(1-acryloylpiperidin-4-yl)oxy]
tetrahydro-2H-pyran-4-yl}phenyl)ethyl]amino}-8-
(propan-2-yl) pyrido[2,3-d]pyrimidin-7(8H)-one [(I)
X=N, U=Y=CH, =, R1a=methyl, R1b=H,
A=phenyl, R2=propan-2-yl, R3=R4=H, R5a and
R5b=tetrahydro-2H-pyran-4-yl, M=O, G1=CH, Z1,
Z2=—CH2-, m1=m2=2, E=acryloyl] Cpd 39

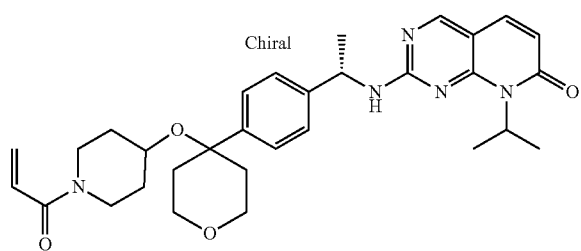

LCMS: m/z 546 [M+H]⁺ @ r.t. 7.82 min.

2-[(2-{4-[1-(4-acryloylpiperazin-1-yl)-4,4-difluoro-
cyclohexyl]phenyl}propan-2-yl)amino]-8-(propan-2-
yl) pyrido[2,3-d]pyrimidin-7(8H)-one [(I) X=N,
U=Y=CH, =, R1a=R1b=Me, A=phenyl,
R2=propan-2-yl, R3=H, R4=H, R5a and R5b=4,4-
difluorocyclohexyl, M=Bond, G1=N, Z1, Z2=—
CH2-, m1=m2=2, E=acryloyl] Cpd 52

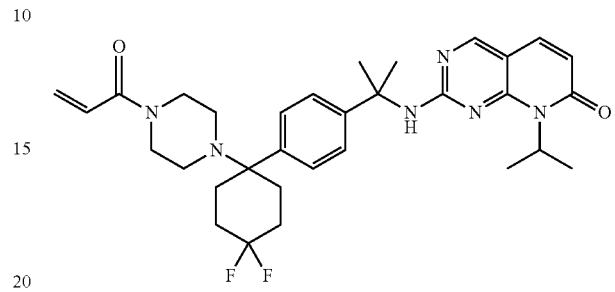

$^1$H NMR (500 MHz, DMSO-$d_6$) δ=8.55 (s, 1H), 8.18 (br.s, 1H), 7.59 (d, J=9.00 Hz, 1H), 7.33 (d, J=8.39 Hz, 2H), 7.25 (d, J=8.39 Hz, 2H), 6.65 (dd, J=10.45, 16.70 Hz, 1H), 6.09 (d, J=9.00 Hz, 1H), 5.99 (dd, J=1.98, 16.62 Hz, 1H), 5.58 (dd, J=1.91, 10.45 Hz, 1H), 4.99 (br. s., 1H), 3.39-3.53 (m, 4H), 3.29-3.31 (m, 2H), 2.52-2.61 (m, 2H), 2.01-2.33 (m, 6H), 1.70-1.88 (m, 2H), 1.67 (s, 6H), 1.44-1.56 (m, 3H), 1.03 (d, J=6.10 Hz, 3H).
LCMS: m/z 579 [M+H]⁺ @ r.t. 9.96 min. HRMS (ESI) calcd for $C_{32}H_{41}F_2N_6O_2$[M+H]⁺ 579.3254 found 579.3255.

2-[(2-{4-[4-(4-acryloylpiperazin-1-yl)tetrahydro-2H-
pyran-4-yl]phenyl}propan-2-yl)amino]-8-(propan-2-
yl) pyrido[2,3-d]pyrimidin-7(8H)-one [(I) X=N,
U=Y=CH, =, R1a=R1b=Me, A=phenyl,
R2=propan-2-yl, R3=H, R4=H, R5a and
R5b=tetrahydro-2H-pyran-4-yl, M=Bond, G1=N,
Z1, Z2=—CH2-, m1=m2=2, E=acryloyl] Cpd 40

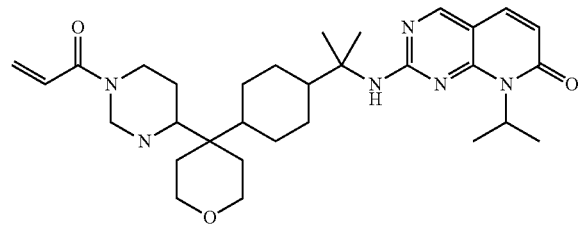 [SMILES: C=CC(=O)N1CCC(C2(C3CCC(C(C)(C)Nc4ncc5ccc(=O)n(C(C)C)c5n4)CC3)CCOCC2)NC1]

$^1$H NMR (500 MHz, DMSO-$d_6$) δ=8.55 (s, 1H), 8.17 (br. s., 1H), 7.59 (d, J=9.15 Hz, 1H), 7.34 (d, J=8.39 Hz, 2H), 7.18 (d, J=8.39 Hz, 2H), 6.65 (dd, J=10.37, 16.62 Hz, 1H), 6.10 (d, J=7.78 Hz, 1H), 5.92-6.05 (m, 1H), 5.54-5.62 (m, 1H), 5.04 (br. s., 1H), 3.79 (t, J=8.46 Hz, 2H), 3.36-3.48 (m, 6H), 2.15 (br. s., 6H), 1.95 (br. s., 2H), 1.68 (s, 6H), 1.05 (br. s., 6H). LCMS: m/z 545 [M+H]⁺ @ r.t. 6.59 min. HRMS (ESI) calcd for $C_{31}H_{41}N_6O_3$ [M+H]⁺ 545.3235 found 545.3246.

7-{[(1S)-1-{4-[4-(4-acryloylpiperazin-1-yl)tetra-
hydro-2H-pyran-4-yl]phenyl}ethyl]amino}-5-amino-
1-(propan-2-yl)-1,4-dihydro-2H-pyrimido[4,5-d][1,
3]oxazin-2-one [(I) X=N, U=CH$_2$, Y=O, =,
R1a=methyl, R1b=H, A=phenyl, R2=propan-2-yl,
R3=NH$_2$, R4=H, R5a and R5b=tetrahydro-2H-
pyran-4-yl, M=Bond, G1=N, Z1, Z2=—CH2-,
m1=m2=2, E=acryloyl] Cpd 41

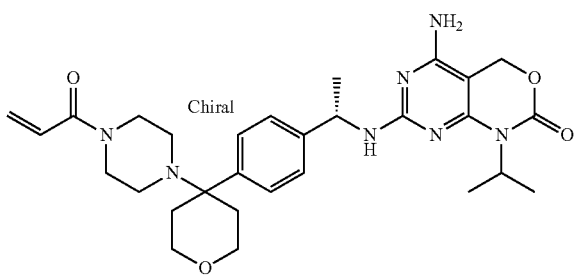 [SMILES: C=CC(=O)N1CCN(C2(c3ccc([C@H](C)Nc4nc(N)c5c(n4)N(C(C)C)C(=O)OC5)cc3)CCOCC2)CC1]

LCMS: m/z 550 [M+H]⁺ @ r.t. 5.78 min.

2-{[(1S)-1-{4-[(2S)-2-(4-acryloylpiperazin-1-yl)-1-(morpholin-4-yl)propan-2-yl]phenyl}ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=R4=H R5a=methyl, R5b=morpholin-4-yl-methanyl, M=Bond, G1=N, Z1, Z2=—CH2-, m1=m2=2, E=acryloyl] Cpd 42

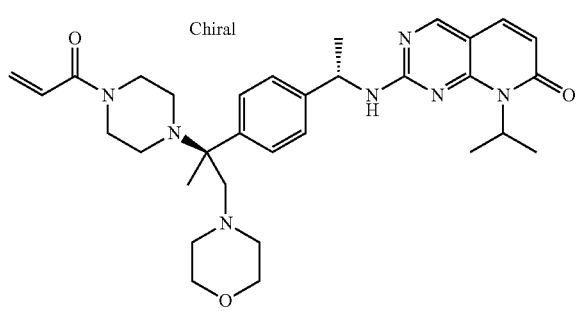 [SMILES: C=CC(=O)N1CCN([C@](C)(CN2CCOCC2)c2ccc([C@H](C)Nc3ncc4ccc(=O)n(C(C)C)c4n3)cc2)CC1]

LCMS: m/z 574 [M+H]+ @ r.t. 6.98 min.

2-{[(1S)-1-{4-[(2S)-2-(4-acryloylpiperazin-1-yl)-1-(morpholin-4-yl)propan-2-yl]phenyl}ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=R4=H R5a=morpholin-4-yl-methanyl, R5b=methyl, M=Bond, G1=N, Z1, Z2=—CH2-, m1=m2=2, E=acryloyl] Cpd 43

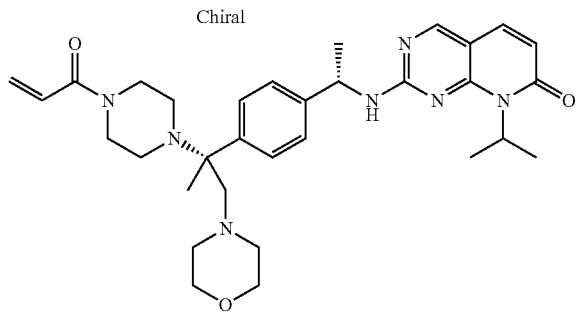 [SMILES: C=CC(=O)N1CCN([C@@](C)(CN2CCOCC2)c2ccc([C@H](C)Nc3ncc4ccc(=O)n(C(C)C)c4n3)cc2)CC1]

¹H NMR (500 MHz, DMSO-d₆) δ=8.47-8.57 (m, 1H), 8.36 (d, J=7.47 Hz, 1H), 7.62 (d, J=9.30 Hz, 1H), 7.43 (d, J=8.08 Hz, 2H), 7.30 (d, J=8.08 Hz, 2H), 6.72 (dd, J=10.45, 16.55 Hz, 1H), 6.14 (d, J=8.69 Hz, 1H), 6.06 (dd, J=2.29, 16.62 Hz, 1H), 5.63 (dd, J=2.14, 10.52 Hz, 1H), 5.53 (br. s., 1H), 4.98 (br. s., 1H), 3.42-3.55 (m, 4H), 2.96-3.21 (m, 4H), 2.59 (d, J=13.27 Hz, 1H), 2.38-2.47 (m, 1H), 2.23-2.33 (m, 3H), 2.07 (br. s., 2H), 1.62-1.78 (m, 2H), 1.32-1.53 (m, 9H), 1.27 (s, 3H).

LCMS: m/z 574 [M+H]+ @ r.t. 7.14 min. HRMS (ESI) calcd for C₃₂H₄₄N₇O₃ [M+H]+ 574.35 found 574.3479.

2-[(1-{4-[1-(4-acryloylpiperazin-1-yl)cyclopentyl]phenyl}cyclopropyl)amino]-8-(propan-2-yl)pyrido[2,3-d]pyrimidin-7(8H)-one [(I) X=N, U=Y=CH, R1a and R1b=—CH₂—CH₂—, A=phenyl, R2=propan-2-yl, R3=H, R4=H, R5a and R5b=cyclopentyl, M=Bond, G1=N, Z1, Z2=—CH2-, m1=m2=2, E=acryloyl] Cpd 49

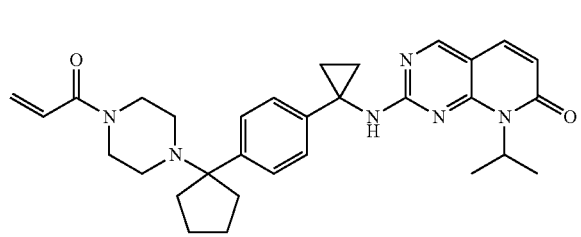 [SMILES: C=CC(=O)N1CCN(C2(c3ccc(C4(Nc5ncc6ccc(=O)n(C(C)C)c6n5)CC4)cc3)CCCC2)CC1]

¹H NMR (500 MHz, DMSO-d₆) δ=8.62 (s, 1H), 8.60 (s, 1H), 7.66 (d, J=9.30 Hz, 1H), 7.20 (d, J=8.39 Hz, 2H), 7.02-7.12 (m, 2H), 6.65 (dd, J=10.52, 16.62 Hz, 1H), 6.21 (d, J=9.15 Hz, 1H), 6.00 (dd, J=2.36, 16.70 Hz, 1H), 5.58 (dd, J=2.36, 10.45 Hz, 1H), 5.29 (br. s., 1H), 3.39-3.52 (m, 4H), 3.27-3.32 (m, 2H), 2.07-2.22 (m, 4H), 1.87-1.93 (m, 2H), 1.63-1.73 (m, 2H), 1.50-1.57 (m, 2H), 1.25-1.41 (m, 4H), 0.93-1.1 (m, 6H).

LCMS: m/z 527 [M+H]+ @ r.t. 7.63 min. HRMS (ESI) calcd for C₃₁H₃₉N₆O₂ [M+H]+ 527.3129 found 527.3132.

8-(propan-2-yl)-2-({(1S)-1-[4-(4-{4-[(²H3)prop-2-enoyl]piperazin-1-yl}tetrahydro-2H-pyran-4-yl)phenyl]ethyl}amino)pyrido[2,3-d]pyrimidin-7(8H)-one [(I) X=N, U=Y=CH, =, R1a=methyl, R1b=H, A=phenyl, R2=propan-2-yl, R3=R4=H, R5a and R5b=tetrahydro-2H-pyran-4-yl, M=Bond, G1=N, Z1, Z2=—CH2-, m1=m2=2, E=—[(²H3)acryloyl] Cpd 51

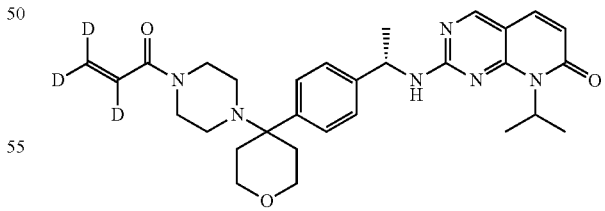

¹H NMR (500 MHz, DMSO-d₆) δ=8.56 (s, 1H), 8.09-8.41 (m, 1H), 7.62 (d, J=9.30 Hz, 1H), 7.26-7.44 (m, 2H), 7.20 (d, J=8.24 Hz, 2H), 6.16 (d, J=9.15 Hz, 1H), 5.33-5.84 (m, 1H), 4.99 (q, J=6.71 Hz, 1H), 3.70-3.87 (m, 2H), 3.38-3.51 (m, 4H), 3.28-3.32 (m, 2H), 2.10 (br. s., 8H), 1.48 (d, J=7.02 Hz, 3H), 1.10-1.43 (m, 3H), 1.03 (d, J=6.10 Hz, 3H).

LCMS: m/z 534 [M+H]+ @ r.t. 7.60 min. HRMS (ESI) calcd for C₃₀H₃₉N₆O₃ [M+H]+ 534.3267 found 534.3265.

2-{[(1S)-1-{4-[4-(4-acryloylpiperazin-1-yl)tetra-hydro-2H-pyran-4-yl]phenyl}ethyl]amino}-8-[($^2$H7)propan-2-yl]pyrido[2,3-d]pyrimidin-7(8H)-one [(I) X=N, U=Y=CH, =, R1a=methyl, R1b=H, A=phenyl, R2=—($^2$H7)propan-2-yl, R3=R4=H, R5a and R5b=tetrahydro-2H-pyran-4-yl, M=Bond, G1=N, Z1, Z2=—CH2-, m1=m2=2, E=acryloyl] Cpd 55

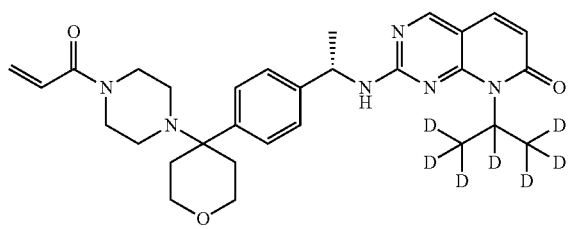 [SMILES: [2H]C([2H])([2H])C([2H])(n1c(=O)ccc2cnc(N[C@@H](C)c3ccc(C4(N5CCN(C(=O)C=C)CC5)CCOCC4)cc3)nc21)C([2H])([2H])[2H]]

$^1$H NMR (500 MHz, DMSO-d$_6$) δ=8.55 (s, 1H), 8.31 (d, J=6.59 Hz, 1H), 7.61 (d, J=9.52 Hz, 1H), 7.33 (d, J=7.93 Hz, 2H), 7.20 (d, J=8.30 Hz, 2H), 6.63 (dd, J=10.62, 16.60 Hz, 1H), 6.15 (d, J=9.15 Hz, 1H), 5.96 (d, J=15.50 Hz, 1H), 5.55 (d, J=10.99 Hz, 1H), 5.00 (br. s., 1H), 3.79 (d, J=7.20 Hz, 2H), 3.44 (br. s., 4H), 3.23-3.28 (m, 2H), 2.11 (br. s., 8H), 1.48 (d, J=7.20 Hz, 3H). LCMS: m/z 538 [M+H]$^+$ @ r.t. 6.74 min. HRMS (ESI) calcd for C$_{30}$H$_{39}$N$_6$O$_3$ [M+H]$^+$ 538.7073 found 538.7072.

Example 2

N-{2-[(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)amino]-2-oxoethyl}prop-2-enamide [X=N, U=Y=CH, =, R1a=methyl, R1b=H, A=phenyl, R2=propan-2-yl, R3=H, R4=H, R5a and R5b=4,4-difluorocyclohexyl, M=NH, G1=CO, Z1=CR9aR9b, R9a=R9b=H, m1=1, E=acryloyl] Cpd 56, Step 1a

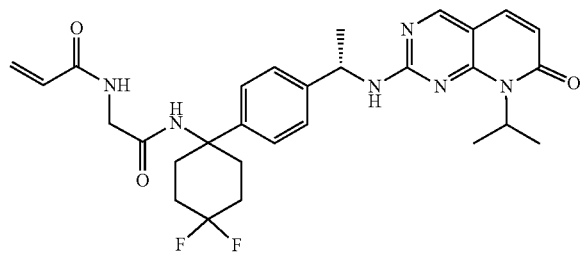 [SMILES: C=CC(=O)NCC(=O)NC1(c2ccc([C@H](C)Nc3ncc4ccc(=O)n(C(C)C)c4n3)cc2)CCC(F)(F)CC1]

To a solution of N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)glycinamide (150 mg, 0.30 mmol) and DIPEA (100 μL, 0.6 mmol) in DCM (10.0 mL) is added acryloyl chloride (27 μL, 0.3 mmol) at −10° C. After 30 minutes, the reaction is quenched with water. The mixture is extracted with DCM, dried over Na$_2$SO$_4$, filtered, and concentrated to yield a yellow oil. The crude product is purified by silica gel chromatography (1 to 10% MeOH/DCM) to give the title product as a white foam (99 mg, 60% yield). $^1$H NMR (500 MHz, DMSO-d$_6$) δ=8.54 (s, 1H), 8.35 (d, J=7.02 Hz, 1H), 8.26 (t, J=5.80 Hz, 1H), 8.05-8.12 (m, 1H), 7.61 (d, J=9.15 Hz, 1H), 7.22-7.39 (m, 4H), 6.27 (dd, J=10.22, 17.08 Hz, 1H), 6.15 (d, J=9.30 Hz, 1H), 6.08 (dd, J=2.14, 17.08 Hz, 1H), 5.58 (dd, J=2.14, 10.22 Hz, 1H), 5.52 (br. s, 1H), 4.99 (br. m, 1H), 3.87 (d, J=5.64 Hz, 2H), 2.37-2.46 (m, 2H), 1.78-2.14 (m, 6H), 1.22-1.52 (m, 9H). LCMS: m/z 553 [M+H]$^+$ @ r.t. 11.08 min. HRMS (ESI) calcd for C$_{29}$H$_{35}$F$_2$N$_6$O$_3$[M+H]$^+$ 553.2733 found 553.2726.

According to the same method, the following compounds were prepared:

N2-acryloyl-N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-D-alaninamide [X=N, U=Y=CH, =, R1a=methyl, R1b=H, A=phenyl, R2=propan-2-yl, R3=H, R4=H, R5a and R5b=4,4-difluorocyclohexyl, M=NH, G1=CO, Z1=CR9aR9b, R9a =CH$_3$, R9b=H, m1=1, E=acryloyl] Cpd 57

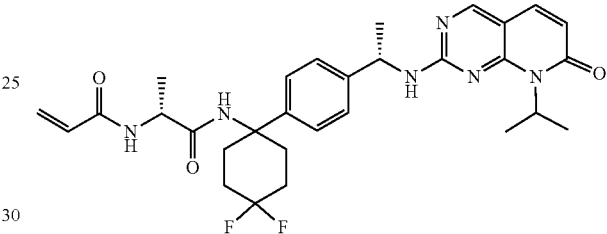

$^1$H NMR (500 MHz, DMSO-d$_6$) δ=8.54 (s, 1H), 8.34 (d, J=7.02 Hz, 1H), 8.21 (d, J=6.86 Hz, 1H), 8.08 (s, 1H), 7.61 (d, J=9.15 Hz, 1H), 7.25-7.34 (m, 4H), 6.29 (dd, J=10.29, 17.16 Hz, 1H), 6.15 (d, J=9.46 Hz, 1H), 6.09 (dd, J=1.98, 17.23 Hz, 1H), 5.58 (dd, J=2.14, 10.22 Hz, 1H), 5.53 (br. s, 1H), 4.99 (br. m, 1H), 4.45 (dq, J=8.13 and 6.86 Hz, 1H), 2.37-2.46 (m, 2H), 1.77-2.11 (m, 6H), 1.22-1.52 (m, 12H). LCMS: m/z 567 [M+H]$^+$ @ r.t. 11.27 min. HRMS (ESI) calcd for C$_{30}$H$_{37}$F$_2$N$_6$O$_3$[M+H]$^+$ 567.2890 found 567.2887.

N2-acryloyl-N-(4,4-difluoro-1-{4-[(1S)-1-{[7-oxo-8-(propan-2-yl)-7,8-dihydropyrido[2,3-d]pyrimidin-2-yl]amino}ethyl]phenyl}cyclohexyl)-L-alaninamide [X=N, U=Y=CH, =, R1a=methyl, R1b=H, A=phenyl, R2=propan-2-yl, R3=H, R4=H, R5a and R5b=4,4-difluorocyclohexyl, M=NH, G1=CO, Z1=CR9aR9b, R9a =H, R9b=CH$_3$, m1=1, E=acryloyl] Cpd 58

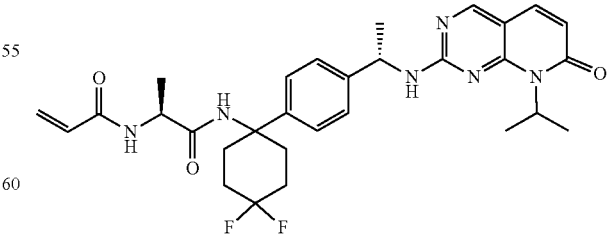

$^1$H NMR (500 MHz, DMSO-d$_6$) δ=8.54 (s, 1H), 8.14-8.40 (m, 2H), 8.10 (s, 1H), 7.61 (d, J=9.30 Hz, 1H), 7.16-7.39 (m, 4H), 6.29 (dd, J=10.29, 17.16 Hz, 1H), 6.14 (d, J=9.15 Hz, 1H), 6.09 (dd, J=2.14, 17.08 Hz, 1H), 5.37-5.74 (m, 2H), 4.99 (br. s., 1H), 4.45 (t, J=7.02 Hz, 1H), 2.36-2.47 (m, 2H), 1.69-2.16 (m, 6H), 1.03-1.58 (m, 12H).

LCMS: m/z 567 [M+H]⁺ @ r.t. 11.30 min.

N-{2-[(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)(trifluoroacetyl)amino]ethyl}prop-2-enamide [X=N, U=Y=CH, =, R1a=methyl, R1b=H, A=phenyl, R2=propan-2-yl, R3=H, R4=H, R5a and R5b=tetrahydro-2H-pyran-4-yl, M=NR6, R6=Trifluoroacetyl, G1=CH₂, Z1=—CH₂, m1=1, E=acryloyl] Cpd 66

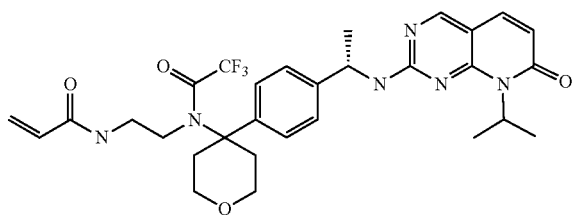

LCMS: m/z 601 [M+H]⁺ @ r.t. 4.59 min.

N-{2-[(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)amino]ethyl}prop-2-enamide [X=N, U=Y=CH, =, R1a=methyl, R1b=H, A=phenyl, R2=propan-2-yl, R3=H, R4=H, R5a and R5b=tetrahydro-2H-pyran-4-yl, M=NH, G1=CH₂, Z1=—CH₂, m1=1, E=acryloyl] Cpd 59

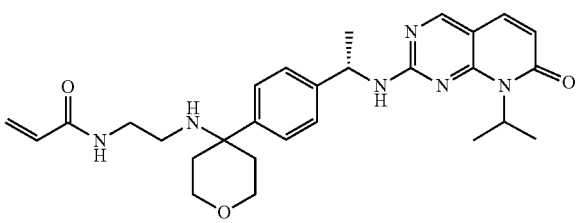 [SMILES: C=CC(=O)NCCNC1(c2ccc([C@H](C)Nc3ncc4ccc(=O)n(C(C)C)c4n3)cc2)CCOCC1]

LCMS: m/z 505 [M+H]⁺ @ r.t. 8.25 min.

Example 3

2-{[(1S)-1-(4-{4-[4-(but-2-ynoyl)piperazin-1-yl]tetrahydro-2H-pyran-4-yl}phenyl)ethyl]amino}-8-(propan-2-yl) pyrido[2,3-d]pyrimidin-7(8H)-one [X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=but-2-ynoyl] Cpd 5

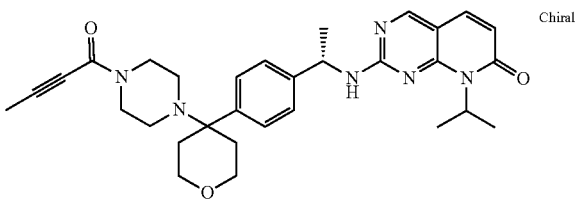 [SMILES: CC#CC(=O)N1CCN(C2(c3ccc([C@H](C)Nc4ncc5ccc(=O)n(C(C)C)c5n4)cc3)CCOCC2)CC1]

To a solution of 2-{[(1S)-1-{4-[4-(piperazin-1-yl)tetrahydro-2H-pyran-4-yl]phenyl}ethyl]amino}-8-(propan-2-yl) pyrido[2,3-d]pyrimidin-7(8H)-one (166.0 mg, 0.349 mmol), DIPEA ((140 µL, 0.803 mmol), and 2-butynoic acid (36 mg, 0.419 mmol), in DMF (4.0 mL), was added HATU (163 mg, 0.419 mmol). The mixture was stirred for 2 h at room temperature. The mixture was washed with water dried over magnesium sulphate and concentrated in vacuo. The residue was purified by silica gel chromatography (1 to 5% EtOH/DCM) to give the title product as a white solid (84.6 mg, 44% yield).

¹H NMR (500 MHz, DMSO-d₆) δ=8.57 (s, 1H), 8.35 (d, J=7.17 Hz, 1H), 7.63 (d, J=9.15 Hz, 1H), 7.29-7.41 (m, 2H), 7.20 (d, J=8.08 Hz, 2H), 6.16 (d, J=9.15 Hz, 1H), 5.43 (br. s., 1H), 5.00 (t, J=6.79 Hz, 1H), 3.79 (dd, J=4.96, 10.75 Hz, 2H), 3.50-3.60 (m, 2H), 3.36-3.40 (br., m, 4H), 1.99-2.27 (m, 8H), 1.93 (s, 3H), 1.49 (d, J=7.02 Hz, 3H), 1.17-1.45 (br., m, 6H). LCMS: m/z 543 [M+H]⁺ @ r.t. 6.92 min. HRMS (ESI) calcd for C₃₁H₃₉N₆O₃ [M+H]⁺ 543.3078 found 543.306.

Example 4

2-{[4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazin-1-yl]methyl}prop-2-enoic acid [X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=methylprop-2-enoic acid] Cpd 7

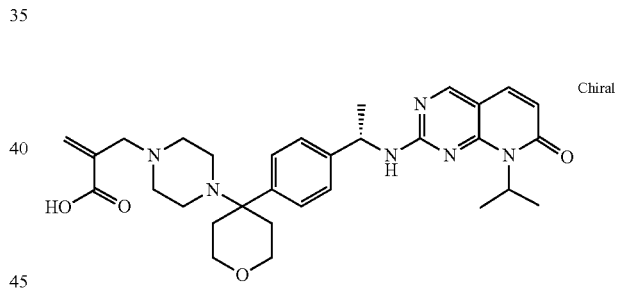

To a solution of 2-{[(1S)-1-{4-[4-(piperazin-1-yl)tetrahydro-2H-pyran-4-yl]phenyl}ethyl]amino}-8-(propan-2-yl) pyrido[2,3-d]pyrimidin-7(8H)-one (60.0 mg, 0.126 mmol) in acetonitrile (6.0 mL) in the presence of K2CO3 (35.5 mg, 0.257 mmol) is added 2-bromomethylacrylic acid (28 µL, 0.166 mmol) at rt. After 2 h, the reaction is filtered and washed with acetonitrile. The organic part is evaporated in vacuo to yield a yellow oil. The crude product is purified by silica gel chromatography (1 to 7% MeOH/DCM with 1% of water) to give the title product as a white foam (44 mg, 58% yield).

¹H NMR (500 MHz, DMSO-d₆) δ=8.57 (s, 1H), 8.36 (d, J=7.47 Hz, 1H), 7.63 (d, J=9.30 Hz, 1H), 7.32-7.42 (m, 2H), 7.22 (d, J=8.24 Hz, 2H), 6.16 (d, J=9.30 Hz, 1H), 6.00 (s, 1H), 5.52 (br. s., 1H), 5.27-5.50 (br., m, 1H), 5.04 (t, J=6.71 Hz, 1H), 3.75 (d, J=9.30 Hz, 2H), 3.26 (br., m, 6H), 3.12 (s, 2H), 2.41 (br., m, 4H), 1.90-2.13 (m, 4H), 1.50 (d, J=6.86 Hz, 3H), 1.24-1.45 (br., m, 6H). LCMS: m/z 561 [M+H]⁺ @ r.t. 7.44 min. HRMS (ESI) calcd for C₃₁H₄₁N₆O₄ [M+H]⁺ 561.3184 found 561.3181.

According to the same method, the following compound was prepared:

7-{[(1S)-1-{4-[4-(4-ethylpiperazin-1-yl)tetrahydro-2H-pyran-4-yl]phenyl}ethyl]amino}-1-ethyl-1,4-dihydro-2H-pyrimido[4,5-d][1,3]oxazin-2-one [(I) X=N, U=CH₂, Y=O, —, R1a=methyl, R1b=H, A=phenyl, R2=ethyl, R3=H, R4=H, R5a and R5b=tetrahydro-2H-pyran-4-yl, M=Bond, G1=N, Z1, Z2=—CH2-, m1=m2=2, E=ethyl] Cpd 45

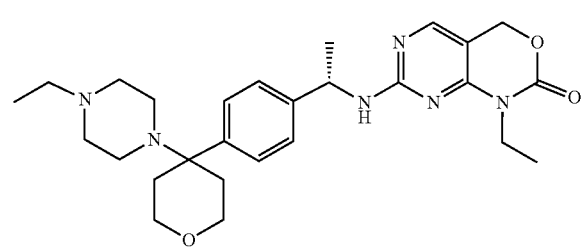 [SMILES: CCN1CCN(C2(c3ccc([C@H](C)Nc4ncc5c(n4)N(CC)C(=O)OC5)cc3)CCOCC2)CC1]

¹H NMR (500 MHz, DMSO-d₆) δ=7.99 (s, 1H), 7.88 (br. s., 1H), 7.34 (d, J=7.78 Hz, 2H), 7.19 (d, J=8.24 Hz, 2H), 5.10 (s, 2H), 4.94 (br. s., 1H), 3.54-4.03 (m, 6H), 1.91-2.32 (m, 10H), 1.44 (d, J=7.02 Hz, 3H), 1.23 (br.s, 3H), 0.88 (t, J=7.17 Hz, 3H). LCMS: m/z 495 [M+H]⁺ @ r.t. 4.57 min. HRMS (ESI) calcd for C₂₇H₃₉N₆O₃ [M+H]⁺ 495.3078 found 495.3079.

2-{[(1S)-1-(4-{4,4-difluoro-1-[4-(4-hydroxybutyl)piperazin-1-yl]cyclohexyl}phenyl)ethyl]amino}-8-(propan-2-yl) pyrido[2,3-d]pyrimidin-7(8H)-one [X=N, U=Y=CH, =, R1a=methyl, R1b=H, A=phenyl, R2=propan-2-yl, R3=H, R4=H, R5a and R5b=4,4-difluoro-cyclohexyl, M=Bond, G1=N, Z1, Z2=—CH2-, m1=m2=2, E=4-hydroxybutyl] Cpd 64

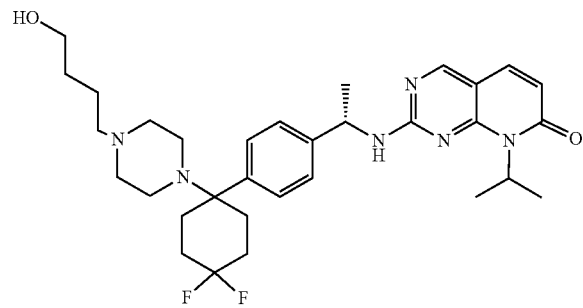 [SMILES: CC(C)n1c(=O)ccc2cnc(N[C@@H](C)c3ccc(C4(N5CCN(CCCCO)CC5)CCC(F)(F)CC4)cc3)nc21]

¹H NMR (500 MHz, DMSO-d₆) δ=8.56 (s, 1H), 8.13-8.42 (m, 1H), 7.62 (d, J=9.15 Hz, 1H), 7.30-7.43 (m, 2H), 7.18-7.31 (m, 2H), 6.15 (d, J=9.15 Hz, 1H), 5.47 (br. s., 1H), 4.88-5.35 (m, 1H), 4.39 (br. s., 1H), 3.30 (br. s., 2H), 1.90-2.48 (m, 14H), 1.74 (br. s., 4H), 0.92-1.55 (m, 13H).

LCMS: m/z 583 [M+H]⁺ @ r.t. 9.36 min. HRMS (ESI) calcd for C₃₂H₄₅F₂N₆O₂[M+H]⁺ 583.3567 found 583.3566.

Example 5

4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazine-1-carbonitrile [X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=carbonitrile] Cpd 65

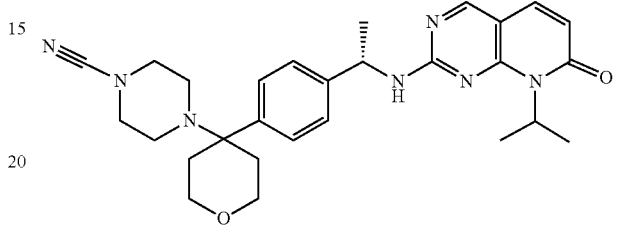

To a solution of 2-{[(1S)-1-{4-[4-(piperazin-1-yl)tetrahydro-2H-pyran-4-yl]phenyl}ethyl]amino}-8-(propan-2-yl) pyrido[2,3-d]pyrimidin-7(8H)-one (54.0 mg, 0.113 mmol) in DCM (10.0 mL) in the presence of DIPEA (19 μL, 0.113 mmol) is added cyanogen bromide (12 μL, 0.113 mmol) at 0° C. After 1 h, the reaction is left to reach room temperature for 2 h then is diluted with water and DCM. The organic part is dried over Na₂SO₄ and evaporated in vacuo to yield a yellow oil. The crude product is purified by silica gel chromatography (1 to 7% EtOH/DCM 2/98 up to 10/90) to give the title product as a white foam (30 mg, 52% yield).

¹H NMR (500 MHz, DMSO-d₆) δ=8.57 (s, 1H), 8.37 (d, J=7.02 Hz, 1H), 7.63 (d, J=9.15 Hz, 1H), 7.36 (d, J=7.78 Hz, 1H), 7.22 (d, J=8.24 Hz, 1H), 6.16 (d, J=9.15 Hz, 1H), 5.25-5.52 (m, 1H), 5.03 (t, J=6.79 Hz, 1H), 3.68-3.82 (m, 2H), 3.27-3.32 (m, 2H), 3.07-3.13 (m, 4H), 1.99-2.27 (m, 8H), 1.50 (d, J=7.02 Hz, 3H), LCMS: m/z 502 [M+H]⁺ @ r.t. 6.94 min. HRMS (ESI) calcd for C₂₈H₃₆N₇O₂ [M+H]⁺ 502.2925. found 502.2917.

Example 6

2-{[(1S)-1-(4-{4-[4-(2,3-dihydroxypropanoyl)piperazin-1-yl]tetrahydro-2H-pyran-4-yl}phenyl)ethyl]amino}-8-(propan-2-yl)pyrido[2,3-d]pyrimidin-7(8H)-one [X=N, U=Y=CH, =, R1a=methyl, R1b=H, A=phenyl, R2=propan-2-yl, R3=H, R4=H, R5a and R5b=tetrahydro-2H-pyran-4-yl, M=Bond, G1=N, Z1, Z2=—CH2-, m1=m2=2, E=2,3-dihydroxypropanoyl] Cpd 10

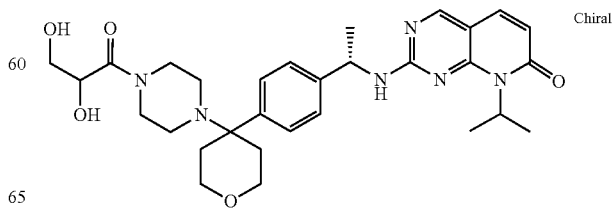

A mixture of 2-{[(1S)-1-{4-[4-(4-acryloylpiperazin-1-yl) tetrahydro-2H-pyran-4-yl]phenyl}ethyl]amino}-8-(propan-2-yl)pyrido[2,3-d]pyrimidin-7(8H)-one (52 mg, 0.099 mmol), OsO$_4$ (2.5 wt % in t-BuOH, 1.52 mL, 0.122 mmol) and pyridine (9 μL) was stirred at room temperature for 18 hrs. The mixture was worked up with sat. aqueous NaHSO$_3$ solution (1.5 mL) and stirred for another hour. The aqueous mixture was extracted with EtOAc (30 mL, 15 mL and 5 mL). The combined organic extractants were dried (Na$_2$SO$_4$), filtered and evaporated in vacuo. The crude was dissolved in small amount of dichloromethane, and purified by flash chromatography (silica, 5% MeOH in CH$_2$Cl$_2$ to 10% MeOH in CH$_2$Cl$_2$) to afford the title compound as a white solid (34 mg yield 65%).

$^1$H NMR (500 MHz, DMSO-d$_6$) δ=8.56 (s, 1H), 8.13-8.36 (m, 1H), 7.62 (d, J=9.30 Hz, 1H), 7.30-7.44 (m, 2H), 7.22 (d, J=8.24 Hz, 2H), 6.16 (d, J=9.30 Hz, 1H), 5.37-5.79 (m, 1H), 4.94-5.32 (m, 1H), 4.71-4.84 (m, 1H), 4.57 (q, J=6.00 Hz, 1H), 4.17 (br. s., 1H), 3.79 (d, J=5.64 Hz, 2H), 3.36-3.50 (m, 4H), 3.24-3.32 (m, 4H), 1.96-2.33 (m, 8H), 1.48 (d, J=7.02 Hz, 3H), 1.26-1.43 (br., m, 6H). LCMS: m/z 565 [M+H]$^+$ @ r.t. 5.84 min. HRMS (ESI) calcd for C$_{30}$H$_{41}$N$_6$O$_4$ [M+H]$^+$ 565.3133 found 565.3141.

According to the same method, the following compound was prepared:

7-{[(1S)-1-(4-{1-[4-(2,3-dihydroxypropanoyl)piperazin-1-yl]-4,4-difluorocyclohexyl}phenyl)ethyl]amino}-1-(propan-2-yl)-1,6-naphthyridin-2(1H)-one [X=CH, U=Y=CH, =, R1a=methyl, R1b=H, A=phenyl, R2=propan-2-yl, R3=H, R4=H, R5a and R5b=4,4-difluorocyclohexyl, M=Bond, G1=N, Z1, Z2=—CH2-, m1=m2=2, E=2,3-dihydroxypropanoyl] Cpd 60

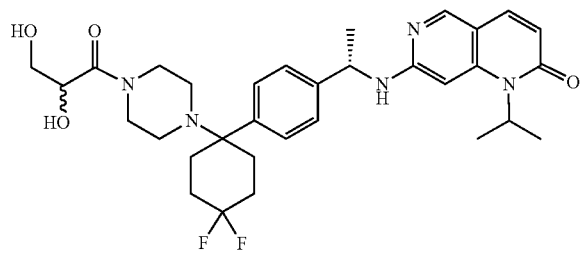 [SMILES: CC(C)n1c(=O)ccc2cnc(N[C@@H](C)c3ccc(C4(N5CCN(C(=O)C(O)CO)CC5)CCC(F)(F)CC4)cc3)cc21]

$^1$H NMR (500 MHz, DMSO-d$_6$) δ=8.28 (s, 1H), 7.60 (d, J=9.30 Hz, 1H), 7.42 (d, J=6.10 Hz, 1H), 7.33-7.39 (m, 2H), 7.28-7.33 (m, 2H), 6.36 (br. s., 1H), 6.10 (d, J=9.30 Hz, 1H), 4.99 (d, J=5.19 Hz, 1H), 4.79 (dd, J=2.90, 7.17 Hz, 1H), 4.53-4.63 (m, 1H), 4.13-4.23 (m, 1H), 3.45-3.56 (m, 2H), 3.39-3.45 (m, 2H), 3.25-3.32 (m, 4H), 2.54 (br. s., 1H), 2.28 (br. s., 2H), 1.96-2.20 (m, 4H), 1.69-1.86 (m, 4H), 1.11-1.51 (m, 6H), 0.99-1.07 (m, 3H).

LCMS: m/z 598 [M+H]$^+$ @ r.t. 5.83 min. HRMS (ESI) calcd for C$_{32}$H$_{42}$F$_2$N$_6$O4 [M+H]$^+$ 598.32 found 598.3192.

Example 7

2-{[(1S)-1-(4-{1-[{1-[chloro(fluoro)acetyl]azetidin-3-yl}(methyl)amino]-4,4-difluorocyclohexyl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=H, R4=H, R5a and R5b=4,4-difluorocyclohexyl, M=NR6, G1=CH, Z1, Z2=—CH2-, m1=m2=1, R6=methyl, E=acryloyl] Cpd 53

To a stirred solution of 2-{[(1S)-1-(4-{1-[azetidin-3-yl (methyl)amino]-4,4-difluorocyclohexyl}phenyl)ethyl]amino}-8-(propan-2-yl)pyrido[2,3-d]pyrimidin-7(8H)-one (150 mg, 0.294 mmol) and sodium chlorofluoroacetate (80 mg, 0.588 mmol) in dry CH$_2$Cl$_2$ (5.0 mL) was added DIPEA (50.0 μL, 0.294 mmol) and T3P (50 wt. % in AcOEt, 262.0 μL, 0.441 mmol) at ambient temperature. After stirring for 3 h, the reaction mixture was diluted with AcOEt and sat. NaHCO$_3$. The organic layer was separated, and the aqueous phase was extracted thrice with AcOEt. The combined organic layers were washed with brine, dried over MgSO$_4$, and concentrated in vacuo. The residue was purified by flash column chromatography on silica gel (CH$_2$Cl$_2$/EtOH=98:2 to 9:1) to give the title compound (79.2 mg, 45% yield) as an off-white solid.

$^1$H NMR (500 MHz, DMSO-d$_6$) δ=8.56 (s, 1H), 8.12-8.42 (m, 1H), 7.61 (d, J=9.30 Hz, 1H), 7.36 (s, 4H), 6.58-6.79 (m, 1H), 6.16 (d, J=9.30 Hz, 1H), 5.34-5.84 (m, 1H), 4.88-5.32 (m, 1H), 4.21-4.36 (m, 2H), 3.44-4.00 (m, 4H), 2.07-2.42 (m, 4H), 1.95 (d, J=8.69 Hz, 4H), 1.71 (br. s., 2H), 1.48 (d, J=6.70 Hz, 3H), 1.16-1.43 (m, 3H), 1.03 (d, J=6.10 Hz, 3H). LCMS: m/z 605 [M+H]$^+$ @ r.t. 10.97 min. HRMS (ESI) calcd for C$_{30}$H$_{37}$ClF$_3$N$_6$O$_2$ [M+H]$^+$ 605.2613 found 605.2617.

According to the same method, but employing 2-{[(1S)-1-{4-[4-(piperazin-1-yl)tetrahydro-2H-pyran-4-yl]phenyl}ethyl]amino}-8-(propan-2-yl)pyrido[2,3-d]pyrimidin-7(8H)-one and the 2-fluoroacrylic acid the following compound was prepared:

2-{[(1S)-1-(4-{4-[4-(2-fluoroacryloyl)piperazin-1-yl]tetrahydro-2H-pyran-4-yl}phenyl)ethyl]amino}-8-(propan-2-yl)pyrido[2,3-d]pyrimidin-7(8H)-one [(I) X=N, U=Y=CH, =, R1a=methyl, R1b=H, A=phenyl, R2=propan-2-yl, R3=R4=H, R5a and R5b=tetrahydro-2H-pyran-4-yl, M=Bond, G1=N, Z1, Z2=—CH2-, m1=m2=2, E=2-fluoroacryloyl]
Cpd 54

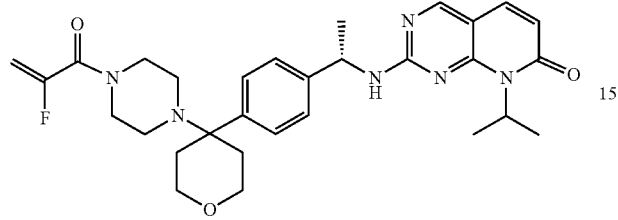

$^1$H NMR (500 MHz, DMSO-d$_6$) δ=8.58 (s, 1H), 8.36 (d, J=6.71 Hz, 1H), 7.64 (d, J=9.30 Hz, 1H), 7.34 (d, J=7.93 Hz, 2H), 7.22 (d, J=7.93 Hz, 2H), 6.17 (d, J=9.15 Hz, 1H), 5.24-5.56 (m, 1H), 5.18 (dd, J=3.97, 18.15 Hz, 1H), 4.89-5.08 (m, 2H), 3.71-3.85 (m, 2H), 3.51-3.65 (m, 4H), 3.26-3.32 (m, 2H), 1.95-2.31 (m, 8H), 1.26-1.61 (m, 9H). LCMS: m/z 549 [M+H]$^+$ @ r.t. 7.19 min. HRMS (ESI) calcd for C$_{30}$H$_{38}$FN$_6$O$_3$[M+H]$^+$ 549.2984 found 549.2984.

The invention claimed is:
1. A compound of formula (I):

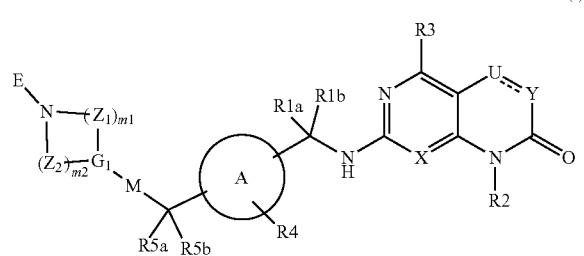

wherein:
X is nitrogen or —CH—;
U is CH, CH2, or CMe;
Y is CH, CF, or O;
═══ indicate a single or a double bond;
R1a, R1b are each independently hydrogen, an optionally substituted straight or branched (C1-C6)alkyl, or together with the atom to which they are bound, may form a (C3-C6)cycloalkyl;
A is a phenyl or pyridyl ring;
R4 is hydrogen, halogen, cyano or an optionally substituted straight or branched (C1-C6) alkyl;
R5a and R5b are each independently a group selected from an optionally substituted straight or branched (C1-C6)alkyl, (C3-C6)cycloalkyl, or together with the atom to which they are bound, may form a 3 to 7 membered cyclylalkyl or heterocyclyl group containing one heteroatom selected from O, S, N—R6;

wherein:
R6 is an optionally substituted straight or branched (C1-C6) alkyl, —COOR7 or —COR8;
wherein:
R7 and R8 are an optionally substituted straight or branched (C1-C6)alkyl;
M is a bond, NH, NR6 or O, wherein R6 is as defined above;
G1 is N or CH;
Z1 is CR9aR9b;
Z2 is CR10aR10b;
wherein:
R9a, R9b, R10a and R10b are independently hydrogen or an optionally substituted straight or branched (C1-C6) alkyl;
m1 is 1 or 2;
m2 is 1 or 2;
E is CN, or an optionally substituted straight or branched (C1-C6)alkyl, (C2-C6)alkenyl, (C2-C6)alkynyl or a group of formula-COR11, wherein one or more hydrogen atoms in any of the foregoing groups is/are optionally replaced with one or more deuterium atoms;
wherein:
R11 is an optionally substituted straight or branched (C2-C6)alkyl or (C2-C6)alkenyl or (C2-C6)alkynyl;
R2 is an optionally substituted group selected from straight or branched (C1-C6)alkyl, or (C3-C6)cycloalkyl-(C1-C6)alkyl, wherein one or more hydrogen atoms in any of the foregoing groups is/are optionally replaced with one or more deuterium atoms;
R3 is hydrogen, chloro, cyano, CONH2, NH2, NR12aR12b, OR13, or an optionally substituted group selected from straight or branched (C1-C6)alkyl, (C3-C6)cycloalkyl-(C1-C6)alkyl, aryl and heteroaryl;
wherein:
R12a, R12b are each independently selected from hydrogen or optionally substituted straight or branched (C1-C6)alkyl;
R13 is an optionally substituted straight or branched (C1-C6)alkyl;
or a pharmaceutically acceptable salt thereof.
2. A compound of formula (I) or a pharmaceutical acceptable salt thereof, according to claim 1, wherein:
Y is CH, or O;
R3 is hydrogen, chloro, cyano, CONH2, NH2, NR12aR12b, OR13, or an optionally substituted group selected from straight or branched (C1-C6)alkyl, (C3-C6)cycloalkyl-(C1-C6)alkyl;
wherein:
R12a, R12b are each independently selected from hydrogen or optionally substituted straight or branched (C1-C6)alkyl; and
R13 is an optionally substituted straight or branched (C1-C6)alkyl.
3. A compound of formula (I) or a pharmaceutical acceptable salt thereof, according to claim 2, wherein:
R4 is hydrogen, halogen or an optionally substituted straight or branched (C1-C6) alkyl;
R3 is hydrogen, chloro, cyano, CONH2, NH2, NR12aR12b, or an optionally substituted group selected from straight or branched (C1-C6)alkyl, (C3-C6)cycloalkyl-(C1-C6)alkyl;
wherein:
R12a, R12b are each independently selected from hydrogen or optionally substituted straight or branched (C1-C6)alkyl.

4. A compound of formula (I) or a pharmaceutical acceptable salt thereof, according to claim 3, wherein:
R4 is hydrogen or halogen;
R3 is hydrogen, chloro, cyano, CONH2, NH2, NR12aR12b, or an optionally substituted group selected from straight or branched (C1-C6)alkyl; wherein:
R12a, R12b are each independently selected from hydrogen or optionally substituted straight or branched (C1-C6)alkyl.

5. A compound of formula (I) or a pharmaceutical acceptable salt thereof, according to claim 4, wherein:
R1a, R1b are each independently hydrogen, straight or branched (C1-C3)alkyl, or together with the atom to which they are bound, may form a cyclopropyl group;
R5a and R5b are each independently a group selected from a straight or branched (C1-C6)alkyl, or together with the atom to which they are bound, may form a 3 to 7 membered cyclylalkyl or heterocyclyl group containing one heteroatom selected from O or N—R6; wherein:
R6 is a straight or branched (C1-C6) alkyl or COR8; wherein:
R8 is a straight or branched (C1-C6)alkyl; and
R3 is hydrogen, chloro, cyano, NH2, NR12aR12b or a straight or branched (C1-C6)alkyl.

6. A compound of formula (I), or a pharmaceutical acceptable salt thereof, according to claim 5 wherein:
R1a, R1b are each independently hydrogen, methyl, ethyl, or together with the atom to which they are bound, may form a cyclopropyl group;
R4 is hydrogen;
R5a and R5b are each independently a group selected from methyl or ethyl, or together with the atom to which they are bound, may form an optionally substituted (C3-C6)cycloalkyl group selected from cyclopentyl, cycloexyl, 4,4-difluorocycloexyl or an heterocyclyl group selected from pyranyl, oxetyl, N-methylpiperidinyl, N-acetylpiperidinyl;
R2 is methyl, ethyl, or isopropyl; and
R3 is hydrogen, cyano, methyl, NH2, NHMe or N (Me)2.

7. A compound of formula (I) according to claim 1, or a pharmaceutical acceptable salt thereof selected from the group consisting of:
2-{[(1S)-1-{4-[4-(4-acryloylpiperazin-1-yl)tetrahydro-2H-pyran-4-yl]phenyl}ethyl]amino}-8-(propan-2-yl)pyrido[2,3-d]pyrimidin-7(8H)-one (cpd 1);
2-{[(1S)-1-{4-[2-(4-acryloylpiperazin-1-yl)propan-2-yl]phenyl}ethyl]amino}-8-(propan-2-yl)pyrido[2,3-d]pyrimidin-7(8H)-one (cpd 2);
2-{[(1S)-1-{4-[3-(4-acryloylpiperazin-1-yl)oxetan-3-yl]phenyl}ethyl]amino}-8-(propan-2-yl)pyrido[2,3-d]pyrimidin-7(8H)-one (cpd 3);
2-{[(1S)-1-{4-[3-(4-acryloylpiperazin-1-yl)pentan-3-yl]phenyl}ethyl]amino}-8-(propan-2-yl)pyrido[2,3-d]pyrimidin-7(8H)-one (cpd 4);
2-{[(1S)-1-(4-{4-[4-(but-2-ynoyl)piperazin-1-yl]tetrahydro-2H-pyran-4-yl}phenyl)ethyl]amino}-8-(propan-2-yl)pyrido[2,3-d]pyrimidin-7(8H)-one (cpd 5);
2-{[(1S)-1-{4-[1-acetyl-4-(4-acryloylpiperazin-1-yl)piperidin-4-yl]phenyl}ethyl]amino}-8-(propan-2-yl)pyrido[2,3-d]pyrimidin-7(8H)-one (cpd 6);
2-{[4-(4-{4-[(1S)-1-{[7-oxo-8-(propan-2-yl)-7,8-dihydropyrido[2,3-d]pyrimidin-2-yl]amino}ethyl]phenyl}tetrahydro-2H-pyran-4-yl)piperazin-1-yl]methyl}prop-2-enoic acid (cpd 7);
2-{[(1S)-1-{4-[4-(4-propanoylpiperazin-1-yl)tetrahydro-2H-pyran-4-yl]phenyl}ethyl]amino}-8-(propan-2-yl)pyrido[2,3-d]pyrimidin-7(8H)-one (cpd 8);
2-{[(1R)-1-{4-[4-(4-acryloylpiperazin-1-yl)tetrahydro-2H-pyran-4-yl]phenyl}ethyl]amino}-8-(propan-2-yl)pyrido[2,3-d]pyrimidin-7(8H)-one (cpd 9);
2-{[(1S)-1-(4-{4-[4-(2,3-dihydroxypropanoyl)piperazin-1-yl]tetrahydro-2H-pyran-4-yl}phenyl)ethyl]amino}-8-(propan-2-yl)pyrido[2,3-d]pyrimidin-7(8H)-one (cpd 10);
7-{[(1S)-1-{4-[4-(4-acryloylpiperazin-1-yl)tetrahydro-2H-pyran-4-yl]phenyl}ethyl]amino}-1-(propan-2-yl)-1,6-naphthyridin-2(1H)-one (cpd 11);
2-{[(1S)-1-{6-[4-(4-acryloylpiperazin-1-yl)tetrahydro-2H-pyran-4-yl]pyridin-3-yl}ethyl]amino}-8-(propan-2-yl)pyrido[2,3-d]pyrimidin-7(8H)-one (cpd 12);
2-{[(1S)-1-{4-[4-(4-acryloylpiperazin-1-yl)tetrahydro-2H-pyran-4-yl]phenyl}ethyl]amino}-4-methyl-8-(propan-2-yl) pyrido[2,3-d]pyrimidin-7(8H)-one (cpd 13);
2-{[(1S)-1-{4-[4-(4-acryloylpiperazin-1-yl)tetrahydro-2H-pyran-4-yl]phenyl}ethyl]amino}-8-ethylpyrido[2,3-d]pyrimidin-7(8H)-one (cpd 14);
2-{[(1S)-1-{4-[4-(4-acryloylpiperazin-1-yl)tetrahydro-2H-pyran-4-yl]phenyl}ethyl]amino}-8-cyclopentyl-5-methylpyrido[2,3-d]pyrimidin-7(8H)-one (cpd 15);
2-{[(1S)-1-{4-[1-(4-acryloylpiperazin-1-yl)cyclopentyl]phenyl}ethyl]amino}-8-(propan-2-yl)pyrido[2,3-d]pyrimidin-7(8H)-one (cpd 16);
2-{[(1S)-1-{4-[3-(4-acryloylpiperazin-1-yl)tetrahydrofuran-3-yl]phenyl}ethyl]amino}-8-(propan-2-yl)pyrido[2,3-d]pyrimidin-7(8H)-one (cpd 17);
2-{[(1S)-1-{4-[4-(4-acryloylpiperazin-1-yl)tetrahydro-2H-pyran-4-yl]phenyl}ethyl]amino}-5-methyl-8-(propan-2-yl) pyrido[2,3-d]pyrimidin-7(8H)-one (cpd 18);
2-{[(1S)-1-{4-[4-(4-acryloylpiperazin-1-yl)tetrahydro-2H-pyran-4-yl]phenyl}ethyl]amino}-4-amino-8-(propan-2-yl) pyrido[2,3-d]pyrimidin-7(8H)-one (cpd 19);
2-{[(1S)-1-{4-[1-(4-acryloylpiperazin-1-yl)cyclohexyl]phenyl}ethyl]amino}-8-(propan-2-yl)pyrido[2,3-d]pyrimidin-7(8H)-one (cpd 20);
2-{[(1S)-1-(4-{4-[4-(2-methylacryloyl)piperazin-1-yl]tetrahydro-2H-pyran-4-yl}phenyl)ethyl]amino}-8-(propan-2-yl) pyrido[2,3-d]pyrimidin-7(8H)-one (cpd 21);
2-{[(1S)-1-(4-{4-[4-(chloroacetyl)piperazin-1-yl]tetrahydro-2H-pyran-4-yl}phenyl)ethyl]amino}-8-(propan-2-yl) pyrido[2,3-d]pyrimidin-7(8H)-one (cpd 22);
2-{[(1S)-1-(4-{4-[4-(3-chloropropanoyl)piperazin-1-yl]tetrahydro-2H-pyran-4-yl}phenyl)ethyl]amino}-8-(propan-2-yl) pyrido[2,3-d]pyrimidin-7(8H)-one (cpd 23);
7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrimido[4,5-d][1,3]oxazin-2-one (cpd 24);
7-{[(1S)-1-{4-[4-(4-acryloylpiperazin-1-yl)tetrahydro-2H-pyran-4-yl]phenyl}ethyl]amino}-1-(propan-2-yl)-1,4-dihydro-2H-pyrido[4,3-d][1,3]oxazin-2-one (cpd 25);
2-{[(1S)-1-{4-[1-(4-acryloylpiperazin-1-yl)-4,4-difluorocyclohexyl]phenyl}ethyl]amino}-8-(propan-2-yl) pyrido[2,3-d]pyrimidin-7(8H)-one (cpd 26);
2-{[(1S)-1-{5-[4-(4-acryloylpiperazin-1-yl)tetrahydro-2H-pyran-4-yl]pyridin-2-yl}ethyl]amino}-8-(propan-2-yl)pyrido[2,3-d]pyrimidin-7(8H)-one (cpd 27);

2-{[(1S)-1-(4-{4-[(1-acryloylazetidin-3-yl)(methyl) amino]tetrahydro-2H-pyran-4-yl}phenyl)ethyl] amino}-8-(propan-2-yl)pyrido[2,3-d]pyrimidin-7(8H)-one (cpd 28);

2-{[(1S)-1-(4-{4-[(1-acryloylazetidin-3-yl)oxy]tetrahydro-2H-pyran-4-yl}phenyl)ethyl]amino}-8-(propan-2-yl)pyrido[2,3-d]pyrimidin-7(8H)-one (cpd 29);

2-[(1-{4-[4-(4-acryloylpiperazin-1-yl)tetrahydro-2H-pyran-4-yl]phenyl}cyclopropyl)amino]-8-(propan-2-yl)pyrido[2,3-d]pyrimidin-7(8H)-one (cpd 30);

2-({4-[4-(4-acryloylpiperazin-1-yl)tetrahydro-2H-pyran-4-yl]benzyl}amino)-8-(propan-2-yl)pyrido[2,3-d]pyrimidin-7(8H)-one (cpd 31);

2-{[(1S)-1-{4-[4-(4-acryloylpiperazin-1-yl)-1-methylpiperidin-4-yl]phenyl}ethyl]amino}-8-(propan-2-yl) pyrido[2,3-d]pyrimidin-7(8H)-one (cpd 32);

2-{[(1S)-1-{4-[(2R)-2-(4-acryloylpiperazin-1-yl)butan-2-yl]phenyl}ethyl]amino}-8-(propan-2-yl)pyrido[2,3-d] pyrimidin-7(8H)-one (cpd 33);

2-{[(1S)-1-{4-[(2S)-2-(4-acryloylpiperazin-1-yl)butan-2-yl]phenyl}ethyl]amino}-8-(propan-2-yl)pyrido[2,3-d] pyrimidin-7(8H)-one (cpd 34);

2-{[(1S)-1-{4-[4-(4-acryloylpiperazin-1-yl)tetrahydro-2H-pyran-4-yl]phenyl}ethyl]amino}-8-(pentan-3-yl) pyrido[2,3-d]pyrimidin-7(8H)-one (cpd 35);

2-{[(1S)-1-{4-[4-(4-acryloylpiperazin-1-yl)tetrahydro-2H-pyran-4-yl]phenyl}ethyl]amino}-4-(dimethylamino)-8-(propan-2-yl)pyrido[2,3-d]pyrimidin-7(8H)-one (cpd 36);

2-{[(1S)-1-{4-[4-(4-acryloylpiperazin-1-yl)tetrahydro-2H-pyran-4-yl]phenyl}ethyl]amino}-4-(methylamino)-8-(propan-2-yl)pyrido[2,3-d]pyrimidin-7(8H)-one (cpd 37);

2-{[(1S)-1-{4-[4-(4-acryloylpiperazin-1-yl)tetrahydro-2H-pyran-4-yl]phenyl}ethyl]amino}-7-oxo-8-(propan-2-yl)-7,8-dihydropyrido[2,3-d]pyrimidine-4-carbonitrile (cpd 38);

2-{[(1S)-1-(4-{4-[(1-acryloylpiperidin-4-yl)oxy]tetrahydro-2H-pyran-4-yl}phenyl)ethyl]amino}-8-(propan-2-yl)pyrido[2,3-d]pyrimidin-7(8H)-one (cpd 39);

2-[(2-{4-[4-(4-acryloylpiperazin-1-yl)tetrahydro-2H-pyran-4-yl]phenyl}propan-2-yl)amino]-8-(propan-2-yl)pyrido[2,3-d]pyrimidin-7(8H)-one (cpd 40);

7-{[(1S)-1-{4-[4-(4-acryloylpiperazin-1-yl)tetrahydro-2H-pyran-4-yl]phenyl}ethyl]amino}-5-amino-1-(propan-2-yl)-1,4-dihydro-2H-pyrimido[4,5-d][1,3]oxazin-2-one (cpd 41);

2-{[(1S)-1-{4-[(2S)-2-(4-acryloylpiperazin-1-yl)-1-(morpholin-4-yl)propan-2-yl]phenyl}ethyl]amino}-8-(propan-2-yl) pyrido[2,3-d]pyrimidin-7(8H)-one (cpd 42);

2-{[(1S)-1-{4-[(2R)-2-(4-acryloylpiperazin-1-yl)-1-(morpholin-4-yl)propan-2-yl]phenyl}ethyl]amino}-8-(propan-2-yl) pyrido[2,3-d]pyrimidin-7(8H)-one (cpd 43);

7-{[(1S)-1-{4-[4-(4-acryloylpiperazin-1-yl)tetrahydro-2H-pyran-4-yl]phenyl}ethyl]amino}-1-ethyl-1,4-dihydro-2H-pyrido[4,3-d][1,3]oxazin-2-one (cpd 44);

7-{[(1S)-1-{4-[4-(4-ethylpiperazin-1-yl)tetrahydro-2H-pyran-4-yl]phenyl}ethyl]amino}-1-ethyl-1,4-dihydro-2H-pyrimido[4,5-d][1,3]oxazin-2-one (cpd 45);

2-{[(1S)-1-{4-[2-(4-acryloylpiperazin-1-yl)butan-2-yl] phenyl}ethyl]amino}-8-(propan-2-yl)pyrido[2,3-d]pyrimidin-7(8H)-one (cpd 46);

7-{[(1S)-1-{4-[1-(4-acryloylpiperazin-1-yl)-4,4-difluorocyclohexyl]phenyl}ethyl]amino}-1-(propan-2-yl)-1,6-naphthyridin-2(1H)-one (cpd 47);

7-{[(1S)-1-(4-{4-[(1-acryloylazetidin-3-yl)(methyl) amino]tetrahydro-2H-pyran-4-yl}phenyl)ethyl] amino}-1-(propan-2-yl)-1,6-naphthyridin-2(1H)-one (cpd 48);

2-[(1-{4-[1-(4-acryloylpiperazin-1-yl)cyclopentyl] phenyl}cyclopropyl)amino]-8-(propan-2-yl)pyrido[2, 3-d]pyrimidin-7(8H)-one (cpd 49);

2-{[(1S)-1-(4-{1-[(1-acryloylazetidin-3-yl)(methyl) amino]-4,4-difluorocyclohexyl}phenyl)ethyl]amino}-8-(propan-2-yl) pyrido[2,3-d]pyrimidin-7(8H)-one (cpd 50);

8-(propan-2-yl)-2-({(1S)-1-[4-(4-{4-[(2H3)prop-2-enoyl] piperazin-1-yl}tetrahydro-2H-pyran-4-yl) phenyl] ethyl}amino)pyrido[2,3-d]pyrimidin-7(8H)-one (cpd 51):

2-[(2-{4-[1-(4-acryloylpiperazin-1-yl)-4,4-difluorocyclohexyl]phenyl}propan-2-yl)amino]-8-(propan-2-yl) pyrido[2,3-d]pyrimidin-7(8H)-one (cpd 52);

2-{[(1S)-1-(4-{1-[{1-[chloro(fluoro)acetyl]azetidin-3-yl} (methyl)amino]-4,4-difluorocyclohexyl}phenyl)ethyl] amino}-8-(propan-2-yl)pyrido[2,3-d]pyrimidin-7(8H)-one (cpd 53);

2-{[(1S)-1-(4-{4-[4-(2-fluoroacryloyl)piperazin-1-yl]tetrahydro-2H-pyran-4-yl}phenyl)ethyl]amino}-8-(propan-2-yl)pyrido[2,3-d]pyrimidin-7(8H)-one (cpd 54);

2-{[(1S)-1-{4-[4-(4-acryloylpiperazin-1-yl)tetrahydro-2H-pyran-4-yl]phenyl}ethyl]amino}-8-[($^2$H7)propan-2-yl]pyrido[2,3-d]pyrimidin-7(8H)-one (cpd 55);

7-{[(1S)-1-(4-{1-[4-(2,3-dihydroxypropanoyl)piperazin-1-yl]-4,4-difluorocyclohexyl}phenyl)ethyl]amino}-1-(propan-2-yl)-1,6-naphthyridin-2(1H)-one (cpd 60);

7-{[(1S)-1-(4-{1-[(1-acryloylazetidin-3-yl)(methyl) amino]-4,4-difluorocyclohexyl}phenyl)ethyl]amino}-1-(propan-2-yl)-1,6-naphthyridin-2(1H)-one (cpd 61);

N-(1-acryloylazetidin-3-yl)-N-(4,4-difluoro-1-{4-[(1S)-1-{[2-oxo-1-(propan-2-yl)-1,2-dihydro-1,6-naphthyridin-7-yl]amino}ethyl]phenyl}cyclohexyl)acetamide (cpd 62);

7-{[(1R)-1-{4-[1-(4-acryloylpiperazin-1-yl)-4,4-difluorocyclohexyl]phenyl}ethyl]amino}-1-(propan-2-yl)-1,6-naphthyridin-2(1H)-one (cpd 63);

2-{[(1S)-1-(4-{4,4-difluoro-1-[4-(4-hydroxybutyl)piperazin-1-yl]cyclohexyl}phenyl)ethyl]amino}-8-(propan-2-yl) pyrido[2,3-d]pyrimidin-7(8H)-one (cpd 64);

4-(4-{4-[(1S)-1-{[7-oxo-8-(propan-2-yl)-7,8-dihydropyrido[2,3-d]pyrimidin-2-yl]amino}ethyl] phenyl}tetrahydro-2H-pyran-4-yl)piperazine-1-carbonitrile (cpd 65);

and

7-{[(1S)-1-{4-[4,4-difluoro-1-(4-propanoylpiperazin-1-yl)cyclohexyl]phenyl}ethyl]amino}-1-(propan-2-yl)-1,6-naphthyridin-2(1H)-one (cpd 67).

8. A pharmaceutical composition comprising a compound of formula (I) or a pharmaceutically acceptable salt thereof, as defined in claim 1, in association with a pharmaceutically acceptable excipient, carrier or diluent.

9. A pharmaceutical composition according to claim 8 further comprising one or more chemotherapeutic agents.

10. A process for the preparation of a compound of formula (I) or a pharmaceutically acceptable salt thereof, as defined in claim 1, said process comprising:

Step 1a) reacting a compound of formula (II):

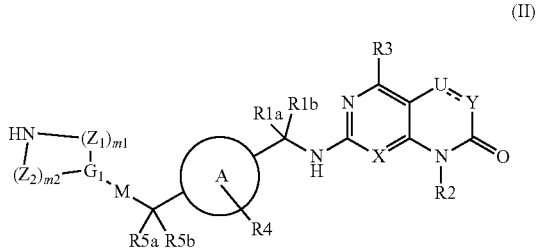

(II)

wherein X, U, Y, ═══,, R2, R3, R1a, R1b, A, R4, R5a, R5b, M, G1, Z1 and Z2 are as defined in claim 1 with a compound of formula (III):

(III)

wherein E is as defined in claim 1 and Q is hydroxy, or chloro, or bromo, to yield a compound of formula (I);

the compound of formula (II) is prepared from a compound of formula (IV) according to a process comprising the following steps:

Step 2a) reacting a compound of formula (IV):

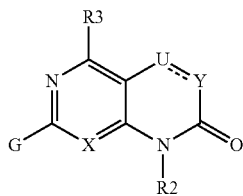

(IV)

wherein G is chloro, $MeS(O)_2$—, $MeS(O)$—, or OTrif, with a compound of formula (V):

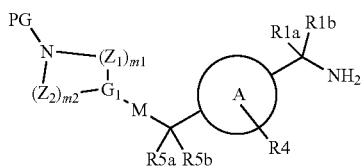

(V)

wherein PG is a protecting group selected from tert-butylcarboxylate, benzyl-carboxylate, phenyl-carboxylate;

Step 2b reacting a compound of formula (VI):

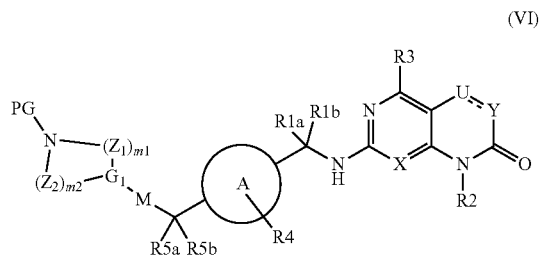

(VI)

with a suitable deprotecting agent;
to yield a compound of formula (II);
the compound of formula (IV):

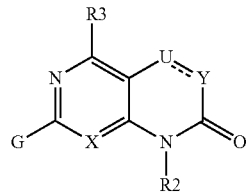

(IV)

wherein G is $MeS(O)_2$—, or $MeS(O)$—, X is N, R3 is hydrogen or chloro, is prepared according to a process comprising the following steps:

Step 3a) substituting the chlorine of an intermediate compound of formula (VII):

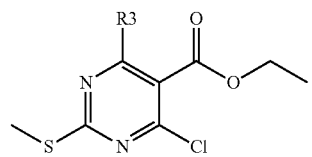

(VII)

wherein R3 is hydrogen, chloro, or an optionally substituted straight or branched ($C_1$-$C_6$)alkyl, with an amine intermediate compound of formula (VIII):

(VIII)

Step 3b) reacting a compound of formula (IX):

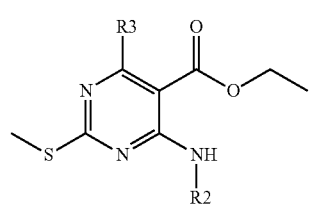

(IX)

with a reducing agent;

Step 3c) reacting the resultant compound of formula (X):

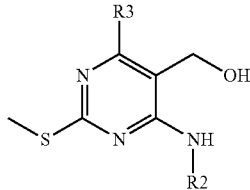
(X)

with an appropriate oxidant reagent;

Step 3d) reacting the resultant compound of formula (XI):

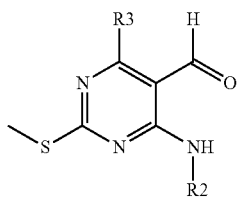
(XI)

with a reagent of formula T-CH$_2$COOEt (XIV), wherein T is hydrogen or fluoro:

Step 3e) mixing the resultant intermediate compound of formula (XII):

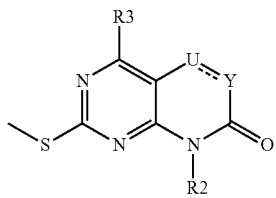
(XII)

with a oxidant reagent, to give a compound of formula (IV) wherein G is MeS(O)$_2$— or MeS(O)— and X is N;

or

Step 3f) reacting the compound of formula (X):

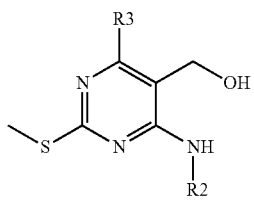
(X)

with carbonyldiimidazole or triphosgene, to give a compound of formula (XII) wherein U is CH2, Y is O, and ⇌ is a single bond;

or

Step 3g) alkylating the intermediate compound of formula (XIII):

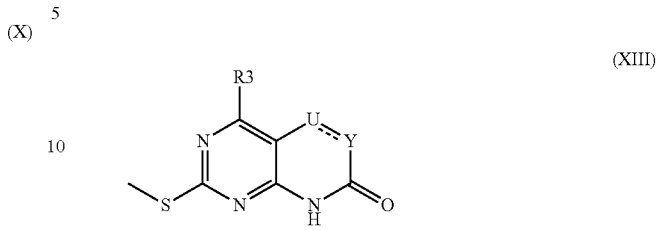
(XIII)

with an alkylating agent of formula R2-Lg (XV), wherein Lg is bromine, iodine, —OMs —OTs or hydroxy to give a compound of formula (XII);

the compound of formula (IV) wherein G is chloro is prepared according to a process comprising following steps:

Step 4a) substituting the chlorine of an intermediate compound of formula (XVI):

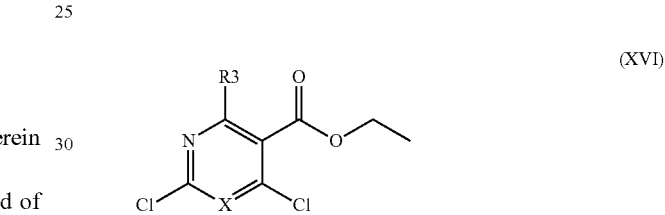
(XVI)

with an amine intermediate compound of formula (VIII):

R2-NH$_2$  (VIII)

Step 4b) reacting a compound of formula (XVII):

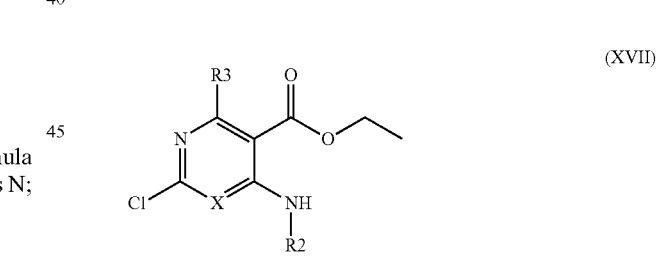
(XVII)

with a reducing agent;

Step 4c) reacting the resultant compound of formula (XVIII):

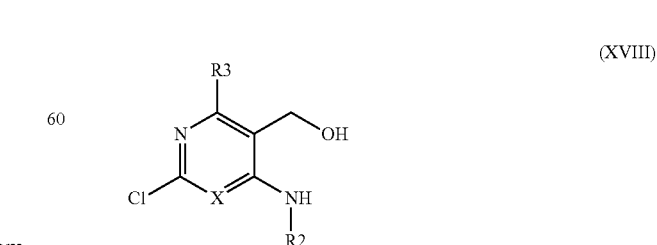
(XVIII)

with an appropriate oxidant reagent;
then
Sten 4d) reacting the resultant compound of formula (XIX):

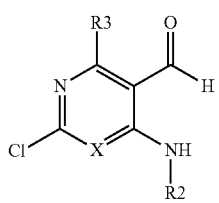

(XIX)

with a compound of formula T-CH₂COOEt (XIV), wherein T is hydrogen or fluoro, to give a compound of formula (IV) wherein G is chloro;
or
Step 4e) reacting the resultant compound of formula (XVIII):

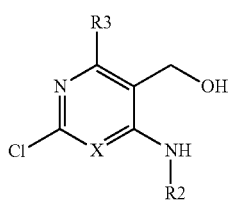

(XVIII)

with carbonyldiimidazole or triphosgene;
to give a compound of formula (IV) wherein G is chloro, U is CH2, Y is O, and $\rightleftharpoons$ is a single bond;
optionally, converting a first compound of formula (XII) into a second compound of formula (XII) according to a process comprising the following conversions:
conv. A) converting a compound of formula (XII):

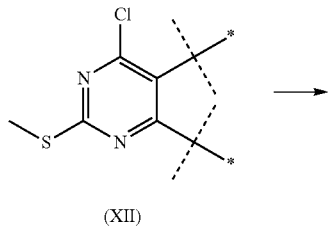

(XII)

wherein R3 is chloro, into a compound of formula (XII) wherein R3 is CN, by reacting with a source of cyanide;

conv. B) converting a compound of formula (XII):

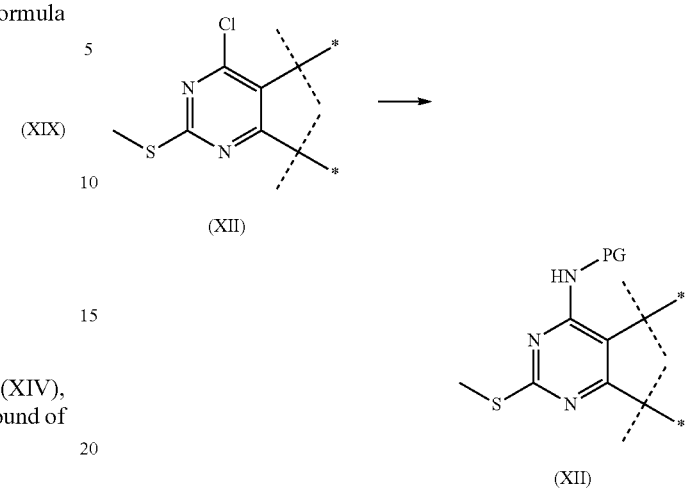

(XII)

(XII)

wherein R3 is chloro, into a compound of formula (XII) wherein R3 is NHPG, by reacting with an amine PG-NH2;

conv. C) converting a compound of formula (XII):

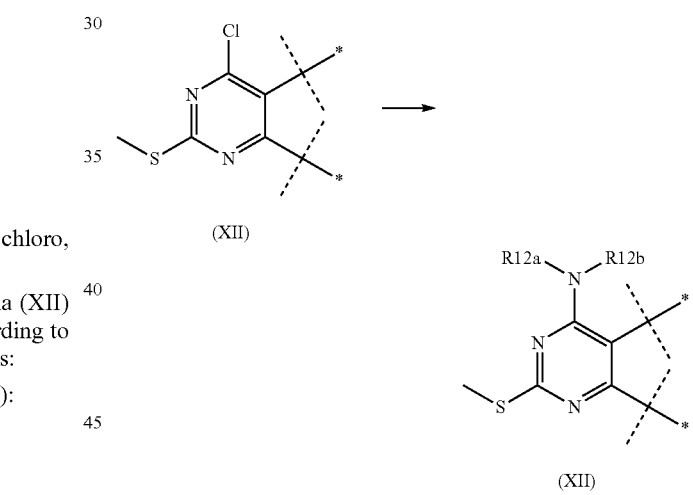

(XII)

(XII)

wherein R3 is chloro, into a compound of formula (XII) wherein R3 is NR12aR12b, by reacting with an amine HNR12aR12b wherein R12a and R12b are each independently selected from hydrogen or optionally substituted straight or branched (C₁-C₆)alkyl;

conv. D) converting a compound of formula (XII):

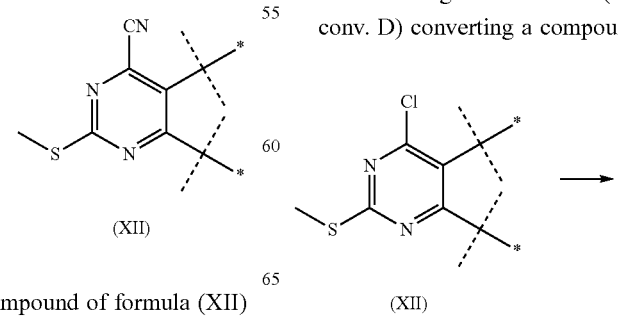

(XII)

-continued

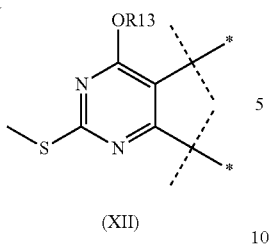

(XII)

wherein R3 is chloro, into a compound of formula (XII) wherein R3 is OR13, by reacting with an alcohol R13-OH wherein R13 is an optionally substituted straight or branched ($C_1$-$C_6$)alkyl;

conv. E) converting a compound of formula (XII):

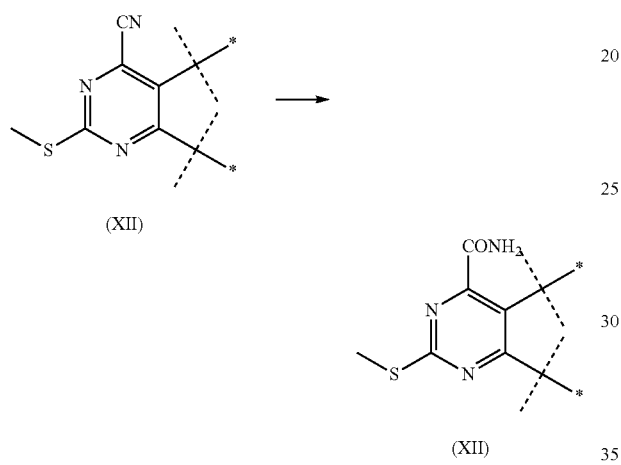

wherein R3 is cyano, into a compound of formula (XII) wherein R3 is CONH2, by hydrolysis with a suitable agent;

optionally, converting a first compound of formula (IV) into a second compound of formula (IV) according to a process comprising the following conversion:

conv. A1) converting a compound of formula (IV):

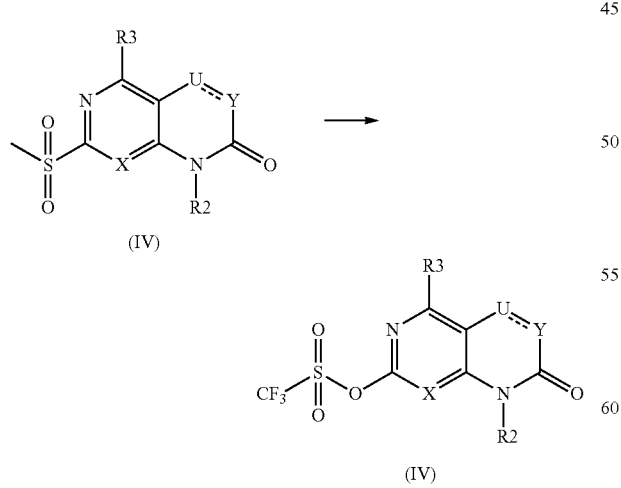

wherein G is $MeS(O)_2$—, into a compound of formula (IV) wherein G is -OTrif (triflate), by a two steps sequence with suitable reagents;

the compound of formula (V) wherein PG is a protecting group, is prepared according to a process comprising the following steps:

Step 5a) reacting a compound of formula (XX)

wherein W1 is bromo, cyano, or COR1a, with $ClCH_2CN$, followed by deprotection of the amide intermediate with acid conditions, basic conditions or with thiourea, to obtain the compound of formula (XXI);

Step 5b) reacting amino intermediate of formula (XXI):

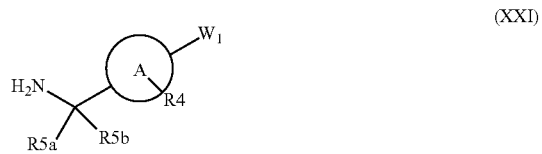

with a compound of formula (XXII):

wherein PG is a protecting group and Hal is halogen, to yield a compound of formula (XXIII) wherein m1 and m2 are 1 or 2, G1 is N and M is a bond;

or,

Step 5b') reacting the amino intermediate of formula (XXI) with a heterocyclyl halide of formula (XXIIa)

wherein and Hal is halogen, then reacting the obtained intermediate by reductive amination with formaldehyde or with a suitable alkylaldehyde derivative or by acylation with suitable haloacyl derivative R8CO-hal or by reaction with alkylcholoroformate derivative R7OCO—Cl; to form a compound of formula (XXIII) wherein G1 is CH and M is NR6;

or,

Step 5b") reacting the amino intermediate of formula (XXI) with a protected aminoalkyl of formula (XXIIb)

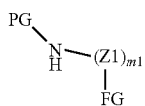

(XXIIb)

wherein FG is a functional group selected from aldehyde (—CHO) or carboxylic acid (—COOH), to yield a compound of formula (XXIII) wherein m2 is 0, G1 is CH2 or CO, M is NH or NR6;
or,
Step 5a') reacting a compound of formula (XX):

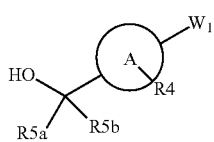

(XX)

with a heterocyclyl halide of formula (XXIIa)

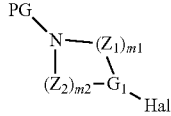

(XXIIa)

to form a compound of formula (XXIII) wherein G1 is CH and M is O;
then
Step 5c) reacting a compound of formula (XXIII):

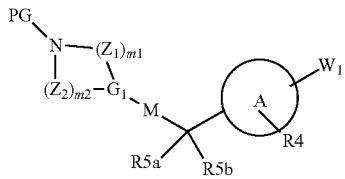

(XXIII)

obtained from step 5b or 5b' or 5b" or 5a', wherein W1 is cyano, with ethylmagnesium bromide and boron trifluoride diethyl etherate, to give the desired compound of formula (V) wherein R1a and R1b are the same or R1a taken together with R1b is cyclopropyl;
or
Step 5c') reacting a compound of formula (XXIII):

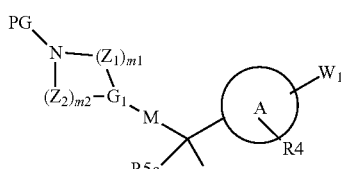

(XXIII)

obtained from step 5b or 5b' or 5b" or 5a', wherein W1 is COR1a with tert butanesulfinamide, to yield a compound of formula (XXIV) wherein R1b is hydrogen;

or
Step 5c") reacting a compound of formula (XXIII):

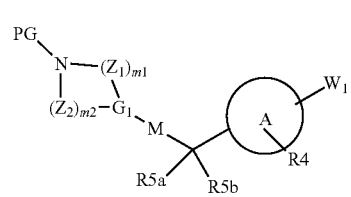

(XXIII)

obtained from step 5b or 5b' or 5b" or 5a', wherein W1 is COR1a with tert butanesulfinamide, to yield a compound of formula (XXV);
then
Step 5e) reacting the obtained compound of formula (XXV):

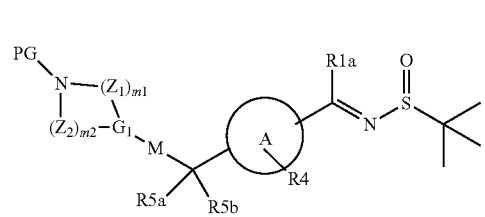

(XXV)

with an alkyl Grignard reagent to give the desired compound of formula (XXIV);
finally
Step 5d) reacting the compound of formula (XXIV) obtained as described in step 5c' or 5e:

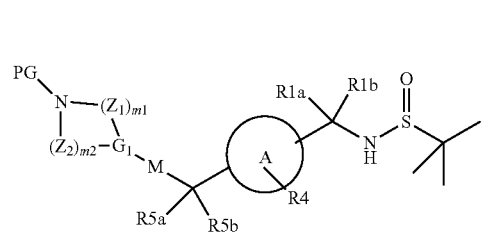

(XXIV)

with an acidic deprotecting reagent, or with iodine, to give the desired compound of formula (V) wherein PG is a protecting group;
alternatively, a compound of formula (XXIII) can also be obtained by conversion of another compound of formula (XXIII) accordingly the conversions below:
conv. F) a compound of formula (XXIII) wherein W1 is cyano is obtained by conversion of the corresponding compound of formula (XXIII), obtained from step 5b or 5b' or 5b" or 5a', wherein W1 is bromo, with a source of cyanide, following the condition known in the art for palladium-catalyzed cyanation of aryl halides;

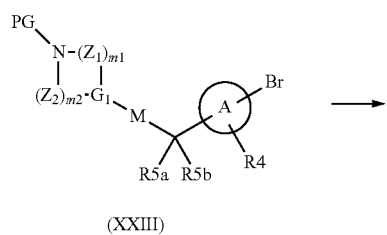

(XXIII)

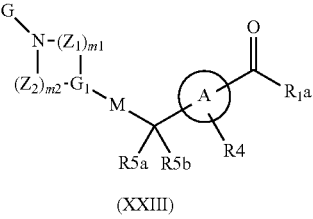

(XXIII)

a compound of formula (I) prepared according to step 1a, is optionally further converted into another compound of formula (I) according to a process comprising the following conversion:

conv. 1) converting a compound of formula (I):

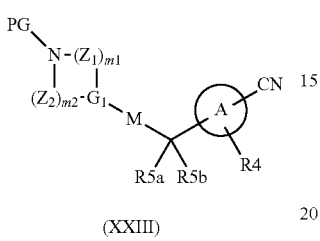

(XXIII)

conv. G) a compound of formula (XXIII) wherein W1 is COR1a is obtained by conversion of the compound of formula (XXIII), obtained from step 5b or 5b' or 5b" or 5a', wherein W1 is bromo, with a suitable enol ether organometal derivative followed by hydrolysis;

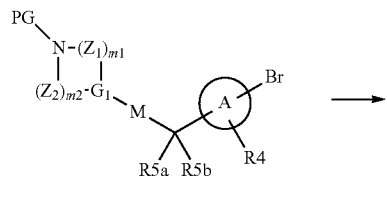

(XXIII)

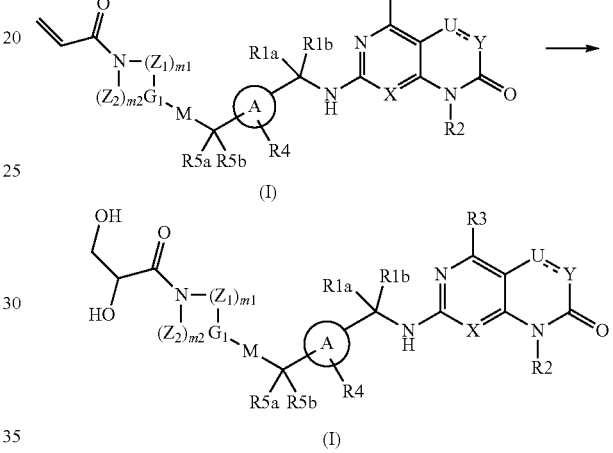

wherein E is an acrylamide group, into a compound wherein E is a dihydroxypropionic group.

* * * * *